US012067894B2

(12) United States Patent
Lalvani

(10) Patent No.: US 12,067,894 B2
(45) Date of Patent: Aug. 20, 2024

(54) HYPER-CUBIC PERIODIC TABLE OF CHEMICAL ELEMENTS AND COMPOUNDS

(71) Applicant: Haresh Lalvani, New York, NY (US)

(72) Inventor: Haresh Lalvani, New York, NY (US)

( * ) Notice: Subject to any disclaimer, the term of this patent is extended or adjusted under 35 U.S.C. 154(b) by 239 days.

(21) Appl. No.: 16/873,842

(22) Filed: Jul. 22, 2020

(65) Prior Publication Data

US 2023/0005388 A1 Jan. 5, 2023

Related U.S. Application Data

(60) Provisional application No. 62/922,071, filed on Jul. 22, 2019.

(51) Int. Cl.
*G09B 23/26* (2006.01)
*G09B 1/40* (2006.01)
*G09B 5/02* (2006.01)

(52) U.S. Cl.
CPC ................ *G09B 23/26* (2013.01); *G09B 1/40* (2013.01); *G09B 5/02* (2013.01)

(58) Field of Classification Search
CPC ...................................................... G09B 23/26
USPC ......................................................... 434/282
See application file for complete search history.

(56) References Cited

U.S. PATENT DOCUMENTS 3,600,825 A 8/1971 Pearce
3,722,153 A 3/1973 Baer
4,014,110 A * 3/1977 Mayer .................... G09B 23/26 446/118
4,701,131 A * 10/1987 Hildebrandt ........... G09B 23/04 434/211
4,723,382 A 2/1988 Lalvani
5,007,220 A 4/1991 Lalvani
(Continued)

FOREIGN PATENT DOCUMENTS

CA 2985760 A1 * 5/2018 ............. G09B 23/24

OTHER PUBLICATIONS

J.G. Moxness, 4D Stowe-Janet-Scerri Periodic Table, https://web.archive.org/web/20171218203433/http://www.meta-synthesis.com/webbook/35_pt/pt_database.php?PT_id=589, Available Dec. 18, 2017 (Accessed Aug. 15, 2023) (Year: 2017).*
(Continued)

*Primary Examiner* — Jay Trent Liddle
*Assistant Examiner* — Alyssa N Brandley

(57) ABSTRACT

This invention describes a 4-dimensional periodic table of elements (4D PT) based on the 4 known quantum numbers of the atom—n (principal), l (azimuthal), m (magnetic) and s (spin)—which determine the 4D Cartesian co-ordinates (n,l,m,s) of a 4-dimensional cubic lattice. Since the four quantum number combinations of each element are unique by Pauli's exclusion principle, each chemical element occupies a different vertex of this lattice and has a unique location in 4D space and hence in the periodic table. The 4D PT of elements extends to chemical molecules and compounds by adding coordinates of individual elements into composite coordinates of molecules and compounds in a larger expansive PT. The higher-dimensional table of elements and compounds can be represented in any digital media or print media as 2D charts or cards. The 4D PT #can be physically built as 3D model kits comprising nodes and connecting struts or 3D blocks or connected 2D panels.

18 Claims, 96 Drawing Sheets

(56) References Cited

U.S. PATENT DOCUMENTS

| | | | | |
|---|---|---|---|---|
| 5,505,035 | A | 4/1996 | Lalvani | |
| 7,297,000 | B1 * | 11/2007 | Bernard | G09B 23/24<br>434/282 |

OTHER PUBLICATIONS

P. Nobbs, Old Nobby—Molecular model kit with bonus instruction guide—239 piece edition, https://www.youtube.com/watch?v=Dwf1NjBhcio, Available Jun. 25, 2019 (Accessed Aug. 15, 2023) (Year: 2019).*

V. Tsimmerman, Finally, The Perfect Arrangement of the Elements is Found, https://perfectperiodictable.com/, Latest Update Mar. 19, 2009 (Accessed Aug. 15, 2023) (Year: 2009).*

* cited by examiner

Extent of (n,l,m,s) Vectors

26 l-m-s

| | Vertices, N0 | Edges, N1 | Faces, N2 | 3D Cells, N3 | 4D Cells, N4 |
|---|---|---|---|---|---|
| 4D PT Lattice | 120 | 284 | 238 | 83 | 10 |

Topological Elements in the 4D PT

TABLE 1

Fig.34

ELEMENT CONNECTIVITY IN THE 4D PERIODIC TABLE

| s=1/2 Elements | | s=-1/2 Elements | | Location Within the Block |
|---|---|---|---|---|
| **s-Block** | | | | |
| H | 2 | He | 2 | Vertex |
| Li | 4 | Be | 4 | Edge |
| Na | 4 | Mg | 4 | Edgc |
| K | 4 | Ca | 4 | Edge |
| Rb | 4 | Sr | 4 | Edge |
| Cs | 4 | Ba | 4 | Edge |
| Fr | 4 | Ra | 4 | Edge |
| Uue | 2 | Ubn | 2 | Vertex |
| **p-Block** | | | | |
| B | 3 | O | 3 | Vertex |
| C | 5 | F | 5 | Edge |
| N | 3 | Ne | 3 | Vertex |
| Al | 5 | S | 5 | Edge |
| Si | 7 | Cl | 7 | Face |
| P | 5 | Ar | 5 | Edge |
| Ga | 5 | Se | 5 | Edge |
| Ge | 7 | Br | 7 | Face |
| As | 5 | Kr | 5 | Edge |
| In | 5 | Te | 5 | Edge |
| Sn | 7 | I | 7 | Face |
| Sb | 5 | Xe | 5 | Edge |
| Tl | 5 | Po | 5 | Edge |
| Pb | 7 | At | 7 | Face |
| Bi | 5 | Rn | 5 | Edge |
| Nh | 3 | Lv | 3 | Vertex |
| Fl | 5 | Ts | 5 | Edge |
| Mc | 3 | Og | 3 | Vertex |
| **d-Block** | | | | |
| Sc | 3 | Fe | 3 | Vertex |
| Ti | 5 | Co | 5 | Edge |
| V | 5 | Ni | 5 | Edgc |
| Cr | 5 | Cu | 5 | Edge |
| Mn | 3 | Zn | 3 | Vertex |
| Y | 5 | Ru | 5 | Edge |
| Zr | 7 | Rh | 7 | Face |
| Nb | 7 | Pd | 7 | Face |
| Mo | 7 | Ag | 7 | Face |
| Tc | 5 | Cd | 5 | Edge |
| Lu | 5 | Os | 5 | Edge |
| Hf | 7 | Ir | 7 | Face |
| Ta | 7 | Pt | 7 | Face |
| W | 7 | Au | 7 | Face |
| Re | 5 | Hg | 5 | Edge |
| Lr | 3 | Hs | 3 | Vertex |
| Rf | 5 | Mt | 5 | Edge |
| Db | 5 | Ds | 5 | Edge |
| Sg | 5 | Rg | 5 | Edge |
| Bh | 3 | Cn | 3 | Vertex |
| **f-Block** | | | | |
| La | 3 | Gd | 3 | Vertex |
| Ce | 5 | Tb | 5 | Edge |
| Pr | 5 | Dy | 5 | Edge |
| Nd | 5 | Ho | 5 | Edge |
| Pm | 5 | Er | 5 | Edge |
| Sm | 5 | Tm | 5 | Edge |
| Eu | 3 | Yb | 3 | Vertex |
| Ac | 3 | Cm | 3 | Vertex |
| Th | 5 | Bk | 5 | Edge |
| Pa | 5 | Cf | 5 | Edge |
| U | 5 | Es | 5 | Edge |
| Np | 5 | Fm | 5 | Edge |
| Pu | 5 | Md | 5 | Edge |
| Am | 3 | No | 3 | Vertex |

TABLE 2

Fig.36 n-l-m cube
l-m plane

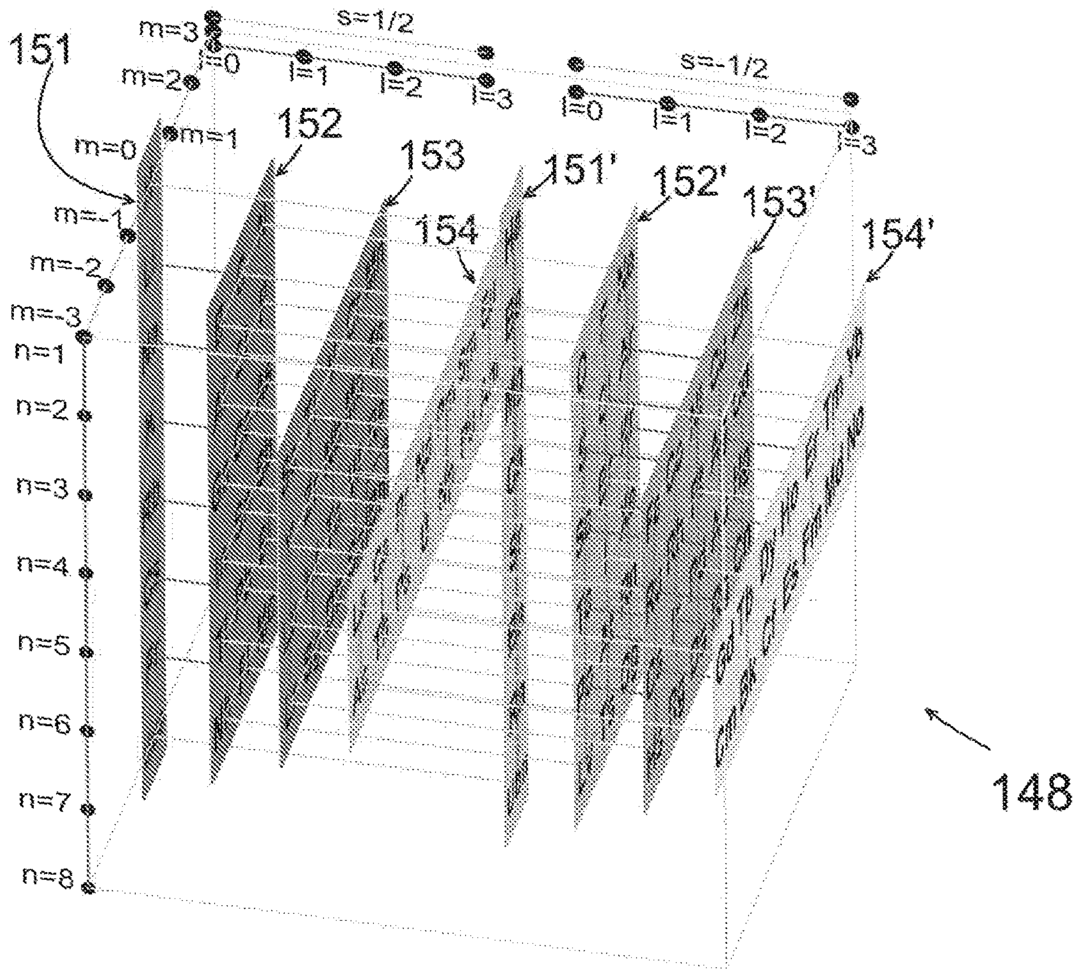
n, H-Li (0,0,-1)
l, Li-C (0,-1,0)
s, H-He (0,-4,0)
m, C-N (1,0,0)
element tile, n-m
n-l-m cube
n-m plane
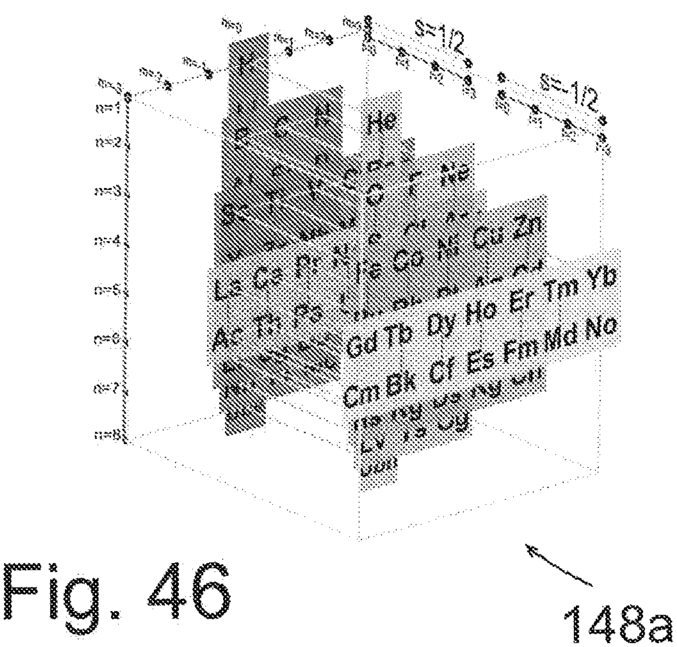
Fig. 46
148a n-l-m cube
n-m plane

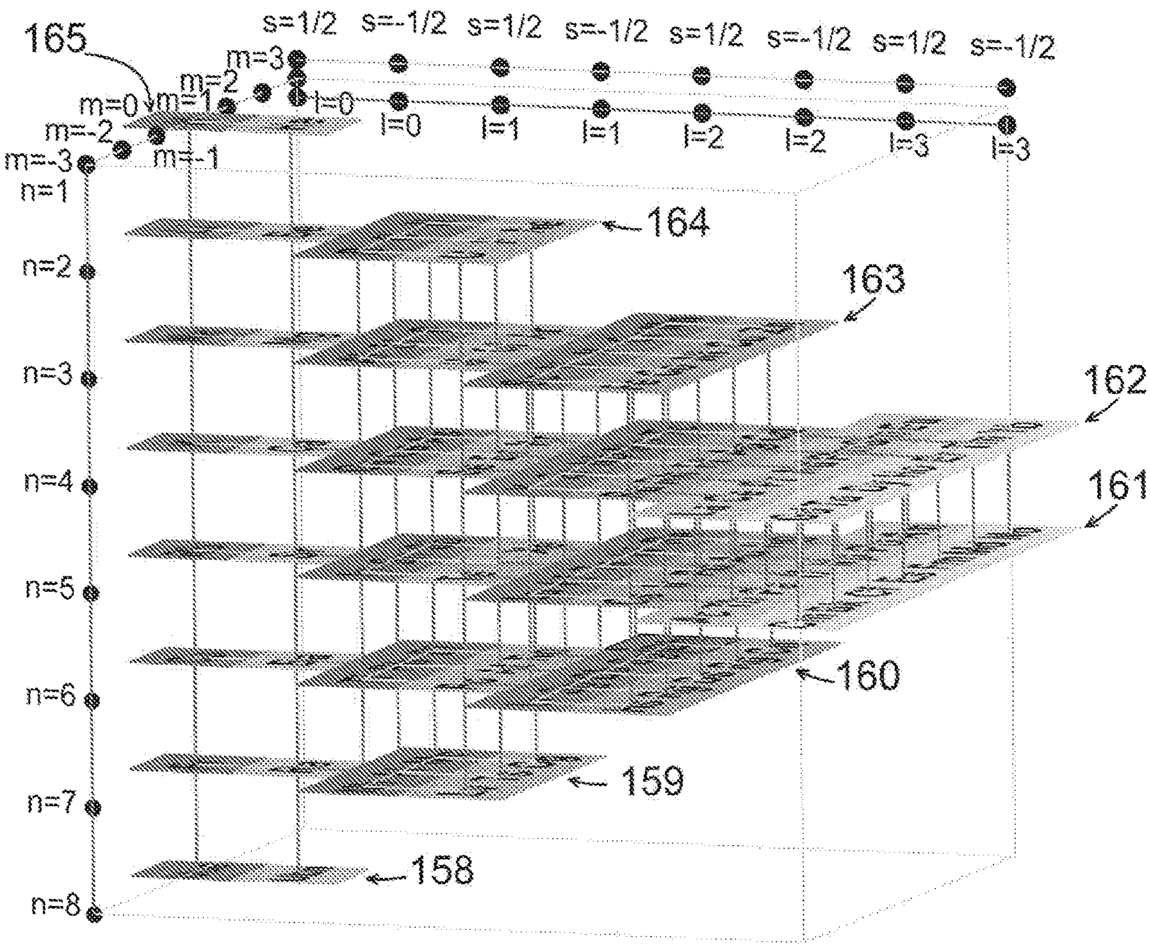
157
n, H-Li (0,0,-1)
l, Li-C (0,-1,0)
s, H-He (0,-4,0)
m, C-N (1,0,0)
element tile, m-s
n-m-s cube
m-s plane
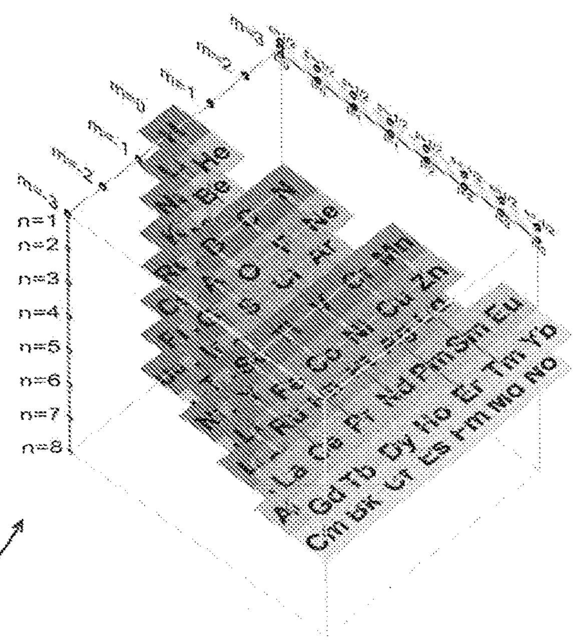
157a
Fig. 51

PERIODIC TABLE OF 120 ELEMENTS IN COMPLEMENTARY PAIRS WITH THEIR SUMS

| s=1/2 Elements | | | | s=-1/2 Elements | | | | Complementary Z Sum | Complementary Quantum Sum |
|---|---|---|---|---|---|---|---|---|---|
| **s-Block** | | | | | | | | | |
| 1 | Hydrogen | H | (1,0,0,1/2) | 120 | Unbinilium | Ubn | (8,0,0,-1/2) | 121 | (9,0,0,0) |
| 3 | Lithium | Li | (2,0,0,1/2) | 88 | Radium | Ra | (7,0,0,-1/2) | 91 | (9,0,0,0) |
| 11 | Sodium | Na | (3,0,0,1/2) | 56 | Barium | Ba | (6,0,0,-1/2) | 67 | (9,0,0,0) |
| 19 | Potassium | K | (4,0,0,1/2) | 38 | Strontium | Sr | (5,0,0,-1/2) | 57 | (9,0,0,0) |
| 37 | Rubidium | Rb | (5,0,0,1/2) | 20 | Calcium | Ca | (4,0,0,-1/2) | 57 | (9,0,0,0) |
| 55 | Cesium | Cs | (6,0,0,1/2) | 12 | Magnesium | Mg | (3,0,0,-1/2) | 67 | (9,0,0,0) |
| 87 | Francium | Fr | (7,0,0,1/2) | 4 | Beryllium | Be | (2,0,0,-1/2) | 91 | (9,0,0,0) |
| 119 | Ununennium | Uue | (8,0,0,1/2) | 2 | Helium | He | (1,0,0,-1/2) | 121 | (9,0,0,0) |
| **p-Block** | | | | | | | | | |
| 5 | Boron | B | (2,1,-1,1/2) | 118 | Oganesson | Og | (7,1,1,-1/2) | 123 | (9,2,0,0) |
| 6 | Carbon | C | (2,1,0,1/2) | 117 | Tennessine | Ts | (7,1,0,-1/2) | 123 | (9,2,0,0) |
| 7 | Nitrogen | N | (2,1,1,1/2) | 116 | Livermorium | Lv | (7,1,-1,-1/2) | 123 | (9,2,0,0) |
| 13 | Aluminum | Al | (3,1,-1,1/2) | 86 | Radon | Rn | (6,1,1,-1/2) | 99 | (9,2,0,0) |
| 14 | Silicon | Si | (3,1,0,1/2) | 85 | Astatine | At | (6,1,0,-1/2) | 99 | (9,2,0,0) |
| 15 | Phosphorus | P | (3,1,1,1/2) | 84 | Polonium | Po | (6,1,-1,-1/2) | 99 | (9,2,0,0) |
| 31 | Gallium | Ga | (4,1,-1,1/2) | 54 | Xenon | Xe | (5,1,1,-1/2) | 85 | (9,2,0,0) |
| 32 | Germanium | Ge | (4,1,0,1/2) | 53 | Iodine | I | (5,1,0,-1/2) | 85 | (9,2,0,0) |
| 33 | Arsenic | As | (4,1,1,1/2) | 52 | Tellurium | Te | (5,1,-1,-1/2) | 85 | (9,2,0,0) |
| 49 | Indium | In | (5,1,-1,1/2) | 36 | Krypton | Kr | (4,1,1,-1/2) | 85 | (9,2,0,0) |
| 50 | Tin | Sn | (5,1,0,1/2) | 35 | Bromine | Br | (4,1,0,-1/2) | 85 | (9,2,0,0) |
| 51 | Antimony | Sb | (5,1,1,1/2) | 34 | Selenium | Se | (4,1,-1,-1/2) | 85 | (9,2,0,0) |
| 81 | Thallium | Tl | (6,1,-1,1/2) | 18 | Argon | Ar | (3,1,1,-1/2) | 99 | (9,2,0,0) |
| 82 | Lead | Pb | (6,1,0,1/2) | 17 | Chlorine | Cl | (3,1,0,-1/2) | 99 | (9,2,0,0) |
| 83 | Bismuth | Bi | (6,1,1,1/2) | 16 | Sulfur | S | (3,1,-1,-1/2) | 99 | (9,2,0,0) |
| 113 | Nihonium | Nh | (7,1,-1,1/2) | 10 | Neon | Ne | (2,1,1,-1/2) | 123 | (9,2,0,0) |
| 114 | Flerovium | Fl | (7,1,0,1/2) | 9 | Fluorine | F | (2,1,0,-1/2) | 123 | (9,2,0,0) |
| 115 | Moscovium | Mc | (7,1,1,1/2) | 8 | Oxygen | O | (2,1,-1,-1/2) | 123 | (9,2,0,0) |
| **d-Block** | | | | | | | | | |
| 21 | Scandium | Sc | (3,2,-2,1/2) | 112 | Copernicium | Cn | (6,2,2,-1/2) | 133 | (9,4,0,0) |
| 22 | Titanium | Ti | (3,2,-1,1/2) | 111 | Roentgenium | Rg | (6,2,1,-1/2) | 133 | (9,4,0,0) |
| 23 | Vanadium | V | (3,2,0,1/2) | 110 | Darmstadtium | Ds | (6,2,0,-1/2) | 133 | (9,4,0,0) |
| 24 | Chromium | Cr | (3,2,1,1/2) | 109 | Meitnerium | Mt | (6,2,-1,1/2) | 133 | (9,4,0,0) |
| 25 | Manganese | Mn | (3,2,2,1/2) | 108 | Hassium | Hs | (6,2,-2,-1/2) | 133 | (9,4,0,0) |
| 39 | Yttrium | Y | (4,2,-2,1/2) | 80 | Mercury | Hg | (5,2,2,-1/2) | 119 | (9,4,0,0) |
| 40 | Zirconium | Zr | (4,2,-1,1/2) | 79 | Gold | Au | (5,2,1,-1/2) | 119 | (9,4,0,0) |
| 41 | Niobium | Nb | (4,2,0,1/2) | 78 | Platinum | Pt | (5,2,0,-1/2) | 119 | (9,4,0,0) |
| 42 | Molybdenum | Mo | (4,2,1,1/2) | 77 | Iridium | Ir | (5,2,-1,-1/2) | 119 | (9,4,0,0) |
| 43 | Technetium | Tc | (4,2,2,1/2) | 76 | Osmium | Os | (5,2,-2,-1/2) | 119 | (9,4,0,0) |
| 71 | Lutetium | Lu | (5,2,-2,1/2) | 48 | Cadmium | Cd | (4,2,2,-1/2) | 119 | (9,4,0,0) |
| 72 | Hafnium | Hf | (5,2,-1,1/2) | 47 | Silver | Ag | (4,2,1,-1/2) | 119 | (9,4,0,0) |
| 73 | Tantalum | Ta | (5,2,0,1/2) | 46 | Palladium | Pd | (4,2,0,-1/2) | 119 | (9,4,0,0) |
| 74 | Wolfram | W | (5,2,1,1/2) | 45 | Rhodium | Rh | (4,2,-1,-1/2) | 119 | (9,4,0,0) |
| 75 | Rhenium | Re | (5,2,2,1/2) | 44 | Ruthenium | Ru | (4,2,-2,-1/2) | 119 | (9,4,0,0) |
| 103 | Lawrencium | Lr | (6,2,-2,1/2) | 30 | Zinc | Zn | (3,2,2,-1/2) | 133 | (9,4,0,0) |
| 104 | Rutherfordium | Rf | (6,2,-1,1/2) | 29 | Copper | Cu | (3,2,1,-1/2) | 133 | (9,4,0,0) |
| 105 | Dubnium | Db | (6,2,0,1/2) | 28 | Nickel | Ni | (3,2,0,-1/2) | 133 | (9,4,0,0) |
| 106 | Seaborgnium | Sg | (6,2,1,1/2) | 27 | Cobalt | Co | (3,2,-1,-1/2) | 133 | (9,4,0,0) |
| 107 | Borium | Bh | (6,2,2,1/2) | 26 | Iron | Fe | (3,2,-2,-1/2) | 133 | (9,4,0,0) |
| **f-Block** | | | | | | | | | |
| 57 | Lanthanum | La | (4,3,-3,1/2) | 102 | Nobelium | No | (5,3,3,-1/2) | 159 | (9,6,0,0) |
| 58 | Cerium | Ce | (4,3,-2,1/2) | 101 | Mendelevium | Md | (5,3,2,-1/2) | 159 | (9,6,0,0) |
| 59 | Praseodymium | Pr | (4,3,-1,1/2) | 100 | Fermium | Fm | (5,3,1,-1/2) | 159 | (9,6,0,0) |
| 60 | Neodymium | Nd | (4,3,0,1/2) | 99 | Einsteinium | Es | (5,3,0,-1/2) | 159 | (9,6,0,0) |
| 61 | Promethium | Pm | (4,3,1,1/2) | 98 | Californium | Cf | (5,3,-1,-1/2) | 159 | (9,6,0,0) |
| 62 | Samarium | Sm | (4,3,2,1/2) | 97 | Berkelium | Bk | (5,3,-2,-1/2) | 159 | (9,6,0,0) |
| 63 | Europium | Eu | (4,3,3,1/2) | 96 | Curium | Cm | (5,3,-3,-1/2) | 159 | (9,6,0,0) |
| 89 | Actinium | Ac | (5,3,-3,1/2) | 70 | Ytterbium | Yb | (4,3,3,-1/2) | 159 | (9,6,0,0) |
| 90 | Thorium | Th | (5,3,-2,1/2) | 69 | Thulium | Tm | (4,3,2,-1/2) | 159 | (9,6,0,0) |
| 91 | Protactinium | Pa | (5,3,-1,1/2) | 68 | Erbium | Er | (4,3,1,-1/2) | 159 | (9,6,0,0) |
| 92 | Uranium | U | (5,3,0,1/2) | 67 | Holmium | Ho | (4,3,0,-1/2) | 159 | (9,6,0,0) |
| 93 | Neptunium | Np | (5,3,1,1/2) | 66 | Dysprosium | Dy | (4,3,-1,-1/2) | 159 | (9,6,0,0) |
| 94 | Plutonium | Pu | (5,3,2,1/2) | 65 | Terbium | Tb | (4,3,-2,-1/2) | 159 | (9,6,0,0) |
| 95 | Americium | Am | (5,3,3,1/2) | 64 | Gadolinium | Gd | (4,3,-3,-1/2) | 159 | (9,6,0,0) |

TABLE 3

Fig.65

Total Electron Binding Energy (eV)
(Data from Dan Thomas (1997))

Simplified xcerpt from B2FH cycle of nucleosynthesis with Atomic Masses and Mass Differences added by the author

| B2FH Cycles* | neutrons, protons | Atomic Mass |
|---|---|---|
| 12C | 6,6 | 12.000000000000 |
| 13C | 7,6 | 13.003354835209 |
| 14N | 7,7 | 14.003074004460 |
| 15N | 8,7 | 15.000108898939 |
| 16O | 8,8 | 15.994914619598 |
| 17O | 9,8 | 16.999131756642 |
| 18O | 10,8 | 17.999159612840 |
| 19F | 10,9 | 18.998403162882 |
| 20Ne | 10,10 | 19.992440176200 |
| 21Ne | 11,10 | 20.993846690000 |
| 22Ne | 12,10 | 21.991385110000 |
| 23Na | 12,11 | 22.989769282000 |

* Isotopes from Burbidge et al (1957), Masses from Wang et al (2017)

TABLE 4

Fig.82

| cycle of elements | cycl1 (12C,13C,16O) | cycl2 (13C,14N,17O,16O) | cycl3 (14N,15N,18O) | cycl4 (16O,17O,20Ne) | cycl5 (14N,18O,22Ne,21Ne,20Ne,17O) | cycl6 (15N,19F,23Na,22Ne,18O) |
|---|---|---|---|---|---|---|
| edge1 | 13C-12C | 14N-13C | 15N-14N | 17O-16O | 18O-14N | 19F-15N |
| | 1.003354835209 | 0.999719169251 | 0.997034894479 | 1.004217137044 | 3.996085608380 | 3.998294263943 |
| edge2 | 16O-13C | 17O-14N | 18O-15N | 20Ne-17O | 22Ne-18O | 23Na-19F |
| | 2.991559784389 | 2.996057752182 | 2.999050713901 | 2.993308419558 | 3.992225497160 | 3.991366119118 |
| edge3 | 12C-16O | 16O-17O | 14N-18O | 16O-20Ne | 21Ne-22Ne | 22Ne-23Na |
| | -3.994914619598 | -1.004217137044 | -3.996085608380 | -3.997525556602 | -0.997538420000 | -0.998384172000 |
| edge4 | | 13C-16O | | | 20Ne-21Ne | 18O-22Ne |
| | | -2.991559784389 | | | -1.001406513800 | -3.992225497160 |
| edge5 | | | | | 17O-20Ne | 15N-18O |
| | | | | | -2.993308419558 | -2.999050713901 |
| edge6 | | | | | 14N-17O | |
| | | | | | -2.996057752182 | |
| cycle sum | 0.000000000000 | 0.000000000000 | 0.000000000000 | 0.000000000000 | 0.000000000000 | 0.000000000000 |

Mass Differences in the 6 nucleosynthesis cycles in B2FH paper (1957)

Fig.83

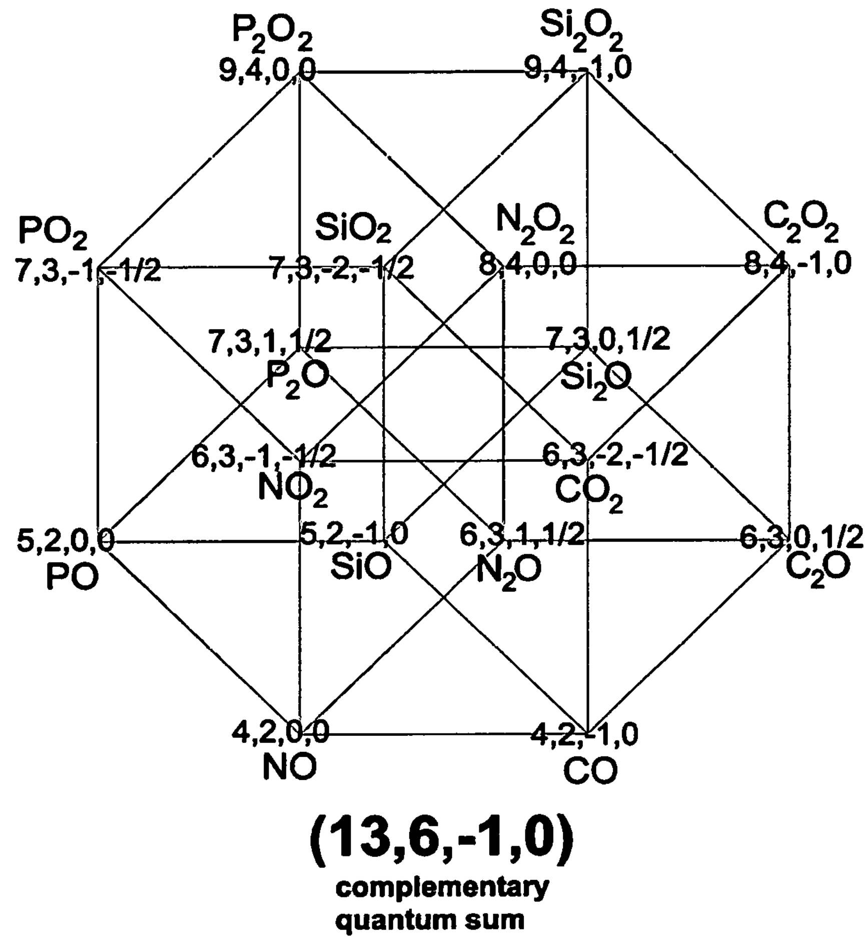
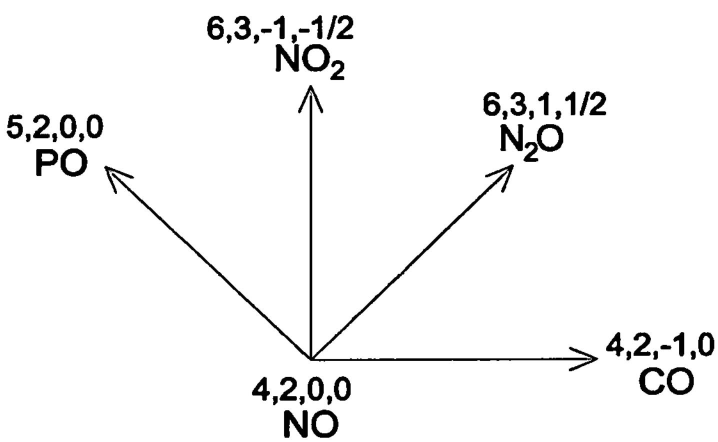
Fig.92

| Compound | Symbol | 4D Quantum Co-ordinates (Quantum Sum) | v1 H | v5 B | v6 C | v7 N | v8 O | v11 Na | v13 Al | v16 S | v17 Cl | v35 Br | v53 I | Element Vectors | Element Co-ordinates |
|---|---|---|---|---|---|---|---|---|---|---|---|---|---|---|---|
| Sodium hydride | NaH | (4,0,0,1) | 1 | | | | | 1 | | | | | | v1,v11 | (1,1) |
| Sodium azide | $NaN_3$ | (9,3,3,2) | | | | 3 | | 1 | | | | | | v7,v11 | (3,1) |
| Sodium dioxide | $NaO_2$ | (7,2,-2,-1/2) | | | | | 2 | 1 | | | | | | v8,v11 | (2,1) |
| Sodium chloride | NaCl | (6,1,0,0) | | | | | | 1 | | | 1 | | | v11,v17 | (1,1) |
| Sodium bromide | NaBr | (7,1,0,0) | | | | | | 1 | | | | 1 | | v11,v35 | (1,1) |
| Sodium iodide | NaI | (8,1,0,0) | | | | | | 1 | | | | | 1 | v11,v53 | (1,1) |
| Sodium borohydride | $NaBH_4$ | (9,1,-1,3) | 4 | 1 | | | | 1 | | | | | | v1,v5,v11 | (4,1,1) |
| Sodamide | $NaNH_2$ | (7,1,1,2) | 2 | | | 1 | | 1 | | | | | | v1,v7,v11 | (2,1,1) |
| Sodium hydrosulfide | NaSH | (7,1,-1,1/2) | 1 | | | | | 1 | | 1 | | | | v1,v11,v16 | (1,1,1) |
| Sodium hydroxide | NaOH | (6,1,-1,1/2) | 1 | | | | 1 | 1 | | | | | | v1,v8,v11 | (1,1,1) |
| Sodium hypobromite | NaBrO | (9,2,-1,-1/2) | | | | | 1 | 1 | | | | 1 | | v8,v17,v35 | (1,1,1) |
| Sodium hypochlorite | NaOCl | (8,2,-1,-1/2) | | | | | 1 | 1 | | | 1 | | | v8,v11 ,v17 | (1,1,1) |
| Sodium hypoiodite | NaIO | (10,2,-1,-1/2) | | | | | 1 | 1 | | | | | 1 | v8,v11,v53 | (1,1,1) |
| Sodium aluminate | $NaAlO_2$ | (10,3,-3,0) | | | | | 2 | 1 | 1 | | | | | v8,v11,v13 | (2,1,1) |
| Sodium bromate | $NaBrO_3$ | (13,4,-1-3/2) | | | | | 3 | 1 | | | | 1 | | v8,v11,v35 | (3,1,1) |
| Sodium bromite | $NaBrO_2$ | (11,3,-2,-1) | | | | | 2 | 1 | | | | 1 | | v8,v11,v35 | (2,1,1) |
| Sodium chlorate | $NaClO_3$ | (12,4,-3,-3/2) | | | | | 3 | 1 | | | 1 | | | v8,v11,v17 | (3,1,1) |
| Sodium chlorite | $NaClO_2$ | (10,3,-2,-1) | | | | | 2 | 1 | | | 1 | | | v8,v11,v17 | (2,1,1) |
| Sodium cyanide | NaCN | (7,2,1,3/2) | | | 1 | 1 | | 1 | | | | | | v6,v7,v11 | (1,1,1) |
| Sodium iodate | $NaIO_3$ | (14,4,-3,-3/2) | | | | | 3 | 1 | | | | | 1 | v8,v11,v53 | (3,1,1) |
| Sodium nitrate | $NaNO_3$ | (11,2,-2,1/2) | | | | 1 | 3 | 1 | | | | | | v7,v8,v11 | (1,3,1) |
| Sodium nitrite | $NaNO_2$ | (9,3,-1,0) | | | | 1 | 2 | 1 | | | | | | v7,v8,v11 | (1,2,1) |
| Sodium perbromate | $NaBrO_4$ | (15,5,-4,-2) | | | | | 4 | 1 | | | | 1 | | v8,v11,v35 | (4,1,1) |
| Sodium perchlorate | $NaClO_4$ | (14,5,-4,-2) | | | | | 4 | 1 | | | 1 | | | v8,v11,v17 | (4,1,1) |
| Sodium periodate | $NaIO_4$ | (16,5,-4,-2) | | | | | 4 | 1 | | | | | 1 | v8,v11,v53 | (4,1,1) |
| Sodium thiocyanate | NaSCN | (10,3,0,1) | | | 1 | 1 | | 1 | | 1 | | | | v6,v7,v11,v16 | (1,1,1,1) |
| Sodium bicarbonate | $NaHCO_3$ | (12,4,-3,0) | 1 | | 1 | | 3 | 1 | | | | | | v1,v6,v8,v11 | (1,1,3,1) |
| Sodium bisulfite | $NaHSO_3$ | (13,4,-4,-1) | 1 | | | | 3 | 1 | | 1 | | | | v1,v8,v11,v16 | (1,3,1,1) |
| Sodium cyanate | NaCNO | (9,4,-1,1) | | | 1 | 1 | 1 | 1 | | | | | | v6,v7,v8,v11 | (1,1,1,1) |

Fig.94

* Found in outer space
\# only one isomer shown http://www.chemspider.com/
https://www.ncbi.nlm.nih.gov/pccompound
https://www.astro.uni-koeln.de/cdms/molecules
Interstellar Molecules by Frank J. Lovas and Lewis E. Snyder

HYPER-CUBIC PERIODIC TABLE OF CHEMICAL ELEMENTS AND COMPOUNDS

FIELD OF INVENTION

A 4-dimensional periodic table (4D PT) of chemical elements based on the four known quantum numbers of the atom which determine the Cartesian coordinates (n,l,m,s) of a 4D-cubic lattice. Each chemical element lies on a different vertex of the 4D lattice. The 4D PT can be represented in digital or physical form. It can be physically built in 3-dimensions as a space frame comprising physical nodes representing the elements and joined by struts along 4 parallel directions, each direction representing a different dimension of the 4D lattice and each direction is associated with one of the 4 quantum numbers. The 4D PT can also be represented as six sets of parallel planes derived from paired combinations of quantum numbers. These sets of planes lead to a system of panels which comprise modules, each module comprising elements, and the system can be used to construct various 3D and 2D periodic tables derived from 4D. The 4D co-ordinate system extends to isotopes by adding the 5th dimension. It also extends to molecules and compounds in a larger periodic table. This invention can be used for teaching, learning, research and practice of chemistry within academia and industry.

Hyper-Cubic Periodic Table of Chemical Elements and Compounds

This patent continues the prior-filed Provisional Patent application 62/922,071 filed on Jul. 22, 2019.

Chemical elements in the universe are captured in the Periodic Table of Chemical Elements, a fundamental scheme for organizing different elements, nature's building blocks of all matter. It establishes the foundations in teaching, research and practice in all branches of chemistry. Advances in chemistry and its wide applications to technology, engineering, medicine, material science, solid state physics, nanotechnology, and other fields which involve physical matter, are anchored by this underlying system. Over the years, various improvements in the design of the periodic table have been proposed and a large number of 2D and 3D periodic tables have been developed. The website *The Internet Database of Periodic Tables* curated by Mark R. Leach (meta-synthesis.com) provides a record of these developments in addition to the books by J. W. van Spronsen, *The Periodic System of Chemical Elements, A history of the First Hundred Years* (1969) and by Edward G. Mazurs, *Graphic Representations of the Periodic System During One Hundred Years* (1967).

This invention discloses a 4-dimensional periodic table (4D PT) based on the four quantum numbers, namely, the principle quantum number n, the angular (orbital, azimuthal) quantum number l, the magnetic quantum number m and the spin quantum number s. These four quantum numbers are well-known and define the structure of the atom [Herzberg, 1944]. They are used here as the 4 generators or vectors of a 4D periodic table of elements where each point location of the table has distinct 4D Cartesian co-ordinates (n,l,m,s) that specify each element uniquely. The sequence n, I, m and s of these co-ordinates follows the chronological sequence in which they were introduced into the periodic table. Scerri (2007, p. 192-203) provides a history of the sequence in which the quantum numbers were introduced into the periodic table by physicists: n was introduced by Bohr, l by Sommerfeld, m by Stoner and s by Pauli. The implications of this chronology is that it establishes the sequence of (n,l,m,s) co-ordinates used here.

These four quantum numbers are used here to define 4 independent directions of a 4D Euclidean space, a space which is the natural spatial extension of the familiar 3D space specified by three Cartesian coordinates and represented by 3 independent and mutually perpendicular axes. Similarly, 4D space is represented by four Cartesian coordinates, in this case (n,l,m,s), all independent and mutually perpendicular. When all known combinations of permissible values of quantum numbers are mapped in four coordinates in 4D space, it leads to a very specific topological structure for the 4D PT. The structure is embedded in a 4-dimensional cubic lattice, and each vertex of this lattice has different coordinates from others and thus provides a unique location for each element. This uniqueness satisfies the Pauli's exclusion principle which prohibits the same 4-number combination for two atoms.

Quantum numbers have been used in prior tables but there is no instance where all four have independent directions in space. Finke's Right 2D table has 3 quantum numbers, l, m and s along the same horizontal direction and n along the vertical. In Janet's Left Step 2D table, n+l is combined along the vertical and l,m,s are along the horizontal. In Tsimmerman's 3D tetrahedral table, n and l are separated but m and s are combined along one direction. In Stowe's 3D table, x-y-z represent s, m and n, respectively, while l is represented by color as an independent "fourth" dimension. The use of "4D" in this case combines 3 dimensions of space with the attribute of color as the fourth "dimension". The latter use of 4D is carried over into the Janet-Stowe-Scerri model of a "4D periodic table" where 3 spatial dimensions are combined with a visual attribute as the fourth dimension, i.e. 3 spatial dimensions are combined with one non-spatial dimension. Though 4D PT has been used for these two tables, the present invention discloses all 4 dimensions as spatially equivalent and independent of each other.

None of the prior periodic tables disclose a 4-dimensional periodic table of elements defined by four Cartesian coordinates of a hyper-cubic lattice based on 4 quantum numbers of the atom. The prior work also does not disclose how a such a 4D PT with 4 distinct directions can be represented in 2D or 3D, or how a physical 3D model can be built.

A primary object of this invention is to provide a new periodic table of elements, a 4D PT, in physical form in 3D space wherein all four quantum numbers are represented as 4 sets of edges of a projected 4D-cubic lattice with coordinates (n,l,m,s), wherein each set of edges represents a different quantum number, and all edges within one set are parallel to each other.

Another object of the invention is to provide a way to build the 4D PT as a 3D model-kit composed of nodes and struts which can be assembled and disassembled to learn and teach the complex and complete relationships between the elements. Alternatively, the 4D PT can be built from 3D blocks or cells.

Another object of the invention is to build the 4D PT in 3D physical form from parallel planes which comprise a system of panels built from modules, each module representing a group of elements, and panels are interconnected by other joining elements.

Another object of the invention is to build the two 3D half-PTs and join them with one set of joining elements which represent the 4th dimension.

Another object of the invention is to provide a new periodic table which graphically or spatially displays conservation laws that underpin physical and chemical properties of elements. The 4D periodic table disclosed here shows principles of complementarity and zero cycle sum in the numbers associated with the physical and chemical features and properties of elements.

Another object of this invention is a periodic table of molecules and compounds as an extended lattice using the same 4D coordinates of chemical elements. Any molecule has the composite coordinates of the sum of quantum numbers (quantum sum) of the atoms comprising the molecule.

Another object of this invention is a periodic table of isotopes as an extended 5D lattice where the number of neutrons is added as an independent axis.

Another object of the invention is to provide a 2-dimensional graphic display of the 4D table in physical or digital formats like paper, plane surfaces, screens, tablets, phones, and the like, for purposes of learning, teaching and practice of chemistry.

Another object of the invention is to provide a stack of 2D panels or cards derived from the 6 pairs of quantum numbers and use these cards to assemble them into different 2D periodic tables.

Another object of the invention is to provide a basis for an interactive model of the 4D PT which can be navigated digitally by the user using touchscreen or other technologies which enable a navigation along the four dimensions specified by quantum numbers. These objects and features will become clear from the detailed description below which, along with the drawings, comprises a full disclosure of the invention. To those skilled in the art, it would be clear that deviations and variations of the invention are possible without substantially altering the scope of the invention.

BRIEF DESCRIPTION OF THE DRAWINGS

FIG. 34 shows Table 1 listing the number of topological elements in the 4D PT.

FIG. 36 shows Table 2 which lists the connectivity of all 120 elements in the 4D PT.

FIG. 46 shows a variation of the 3D PT in FIG. 45 where s=1/2 and s=−1/2 elements are separated and l and s are collinear.

FIG. 51 shows a variation of 3D PT in FIG. 49 where l and s are collinear.

FIG. 65 shows Table 3 which groups the elements in complementary pairs within the 4 blocks so show conservation of their quantum sum.

FIG. 82 shows the atomic masses (from Wang et al) of the isotopes in the excerpted B2FH diagram.

FIG. 83 shows the zero-cyclic sum in the mass differences in the nucleosynthesis cycle.

FIG. 92 shows the 4D cube of some oxides of C, N and P embedded in FIG. 91.

FIG. 94 shows a table of Sodium compounds with their 4D quantum coordinates and Element coordinates.

DETAILED DESCRIPTION OF THE INVENTION

Figure 1:
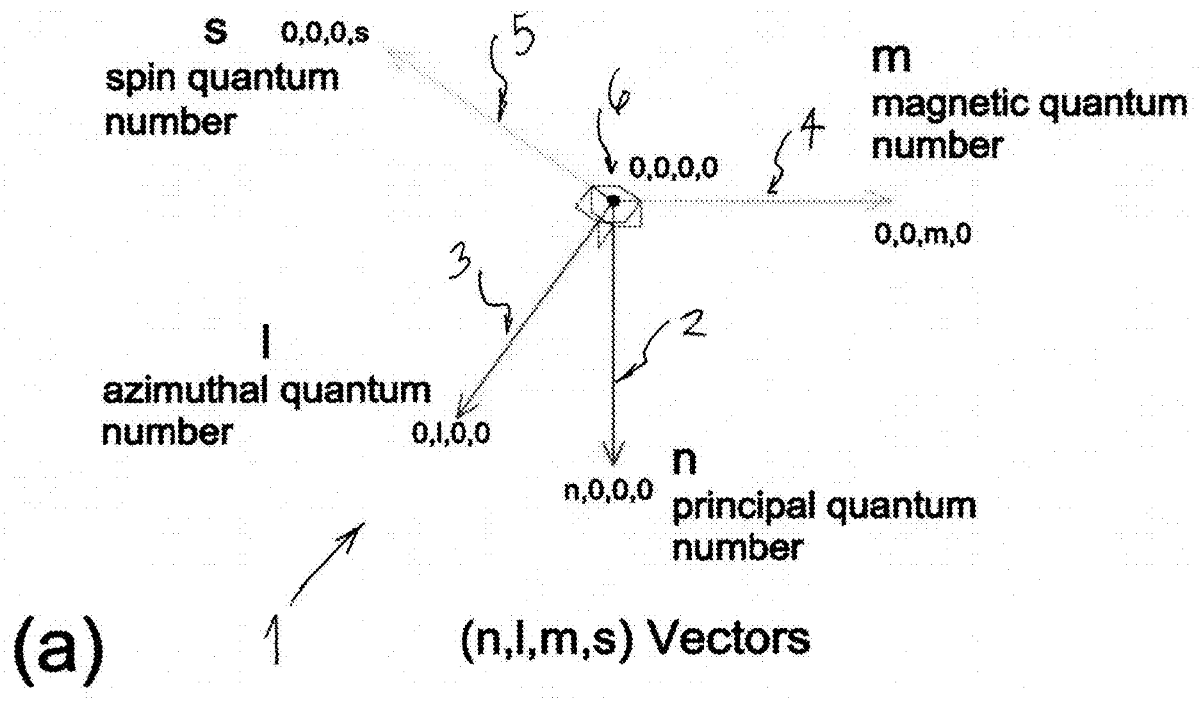
FIG. 1 shows a 4-directional vector-star based on the 4 quantum numbers n, l, m and s.

1. Vector Star: FIG. 1 shows the 4 quantum numbers by (n, l, m, s) vectors as generators of a 4D cubic lattice. The vector star 1 comprises 4 vectors 2-5, vector n, vector I, vector m, and vector s, respectively, emanating from the origin 6. The 4D lattice generated by these vectors has all edges of the lattice parallel to these 4 directions. All vectors meet at 90-degrees in 4D space and thus define the directions of edges of a 4D-cube and its array, a 4D-cubic lattice. This is similar to the familiar 2D graph paper which is a 2D lattice composed of squares, and has 2 vector directions at 90-degree angles defining the directions of all edges in the lattice. Its 3D version, a cubic lattice composed of arrays of cubes, has 3 vector directions at mutually perpendicular angles, where each cube composed of squares, and the 3 vector directions define the directions of all 3 sets of edges of the 3D-cubic lattice. Similarly, the 4D-cubic lattice is an array of 4D cubes, where all 4 directions are mutually perpendicular to each other and the 4 directions define the directions of all edges of the 4D-lattice.

1.1 Origin: In FIG. 1, the origin is shown at (0,0,0,0). Though this is correct, it requires the introduction of n=0 elements with 4D co-ordinates (0,0,0,1/2) and (0,0,0,−1/2), suggesting a particle (electron) with in two states, +1/2 spin and −1/2 spin. Since these two sets of quantum numbers do not define a complete atom, they are excluded from the periodic table of elements. This introduces n=1 as the lowest value of n, shifting the origin to 8 with coordinates (1,0,0,0) as in the extended vector-star 7 in FIG. 2. This is used throughout in FIGS. 3-6. Even here, it may be convenient to call Hydrogen (1,0,0,1/2) as the origin, since elements originate with Hydrogen. This will require the s vector to be emanating in a −ve direction while the other 3 vectors are represented by arrows in a +ve direction by convention.

Figure 2:
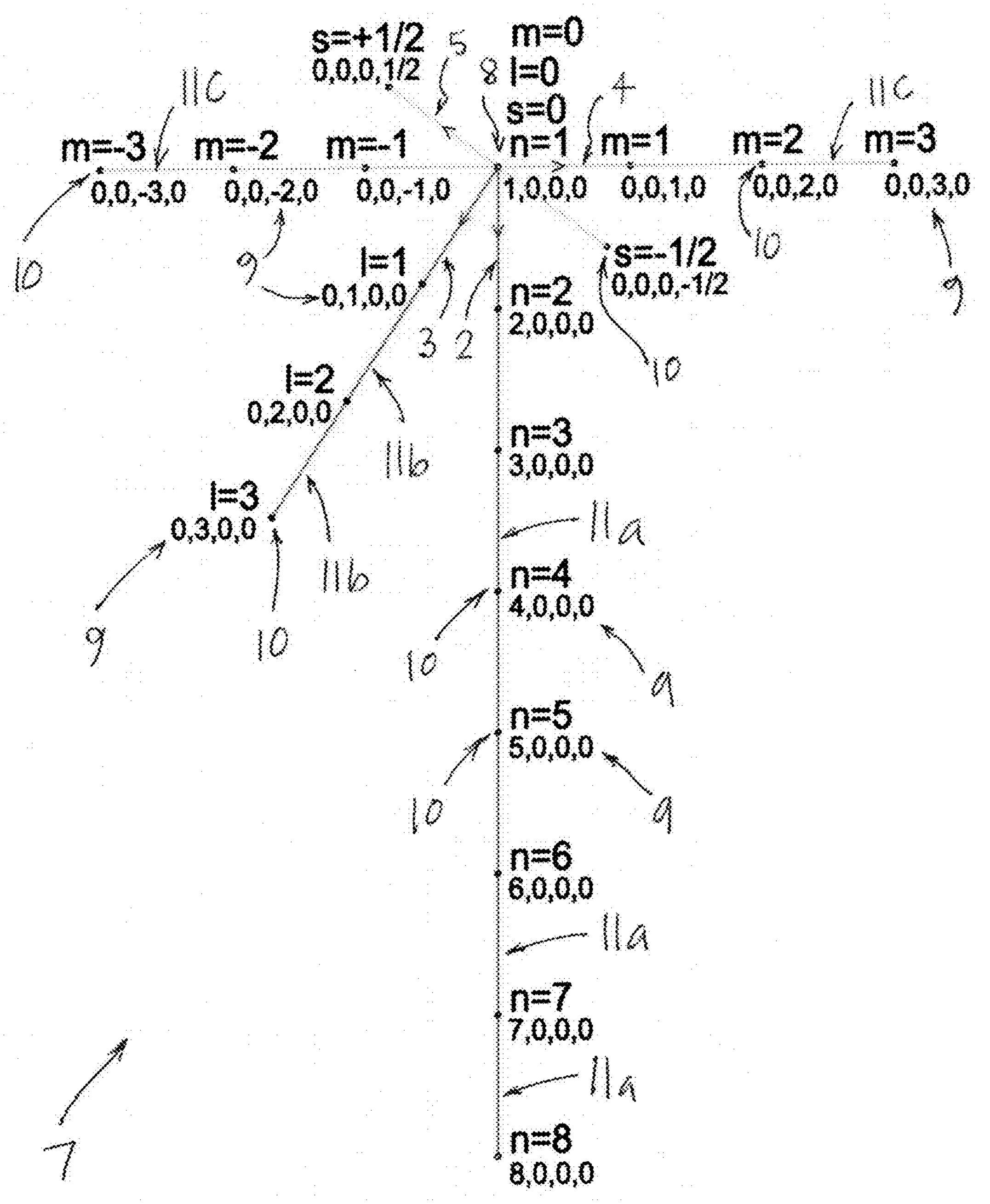
FIG. 2 shows the extended vector-star showing the extent of 4-directions based on known values of the 4 quantum numbers.

The extended vector-star 7 in FIG. 2 shows the extents (range) of the 4 vectors (n, l, m, s) based on the permissible values of 4 quantum numbers: n=1 thru 8, l=0 thru 3, m=−3,−2,−1,0,1,2,3, and s=1/2 and −1/2. These values lead to specific and unique coordinates 9 showing (n,l,m,s) values for each vertex (point) 10 on the 4D-lattice. The lines joining adjacent vertices are edges 11*a*-*d* of the 4D-lattice, edges 11*a* representing direction n, edges 11*b* representing direction 1, edges 11*c* representing direction m and edges 11*d* representing direction s. The extent of edges emanating from the origin 8 are shown in 7 and are part of the full 4D-lattice which defines the periodic table which grows from these edges. Each vertex location 10 defines the precise spatial location of a distinct chemical element in 4D space. Pauli's exclusion principle is satisfied geometrically since each vertex has unique co-ordinates and no vertices are duplicated.

Figure 4:
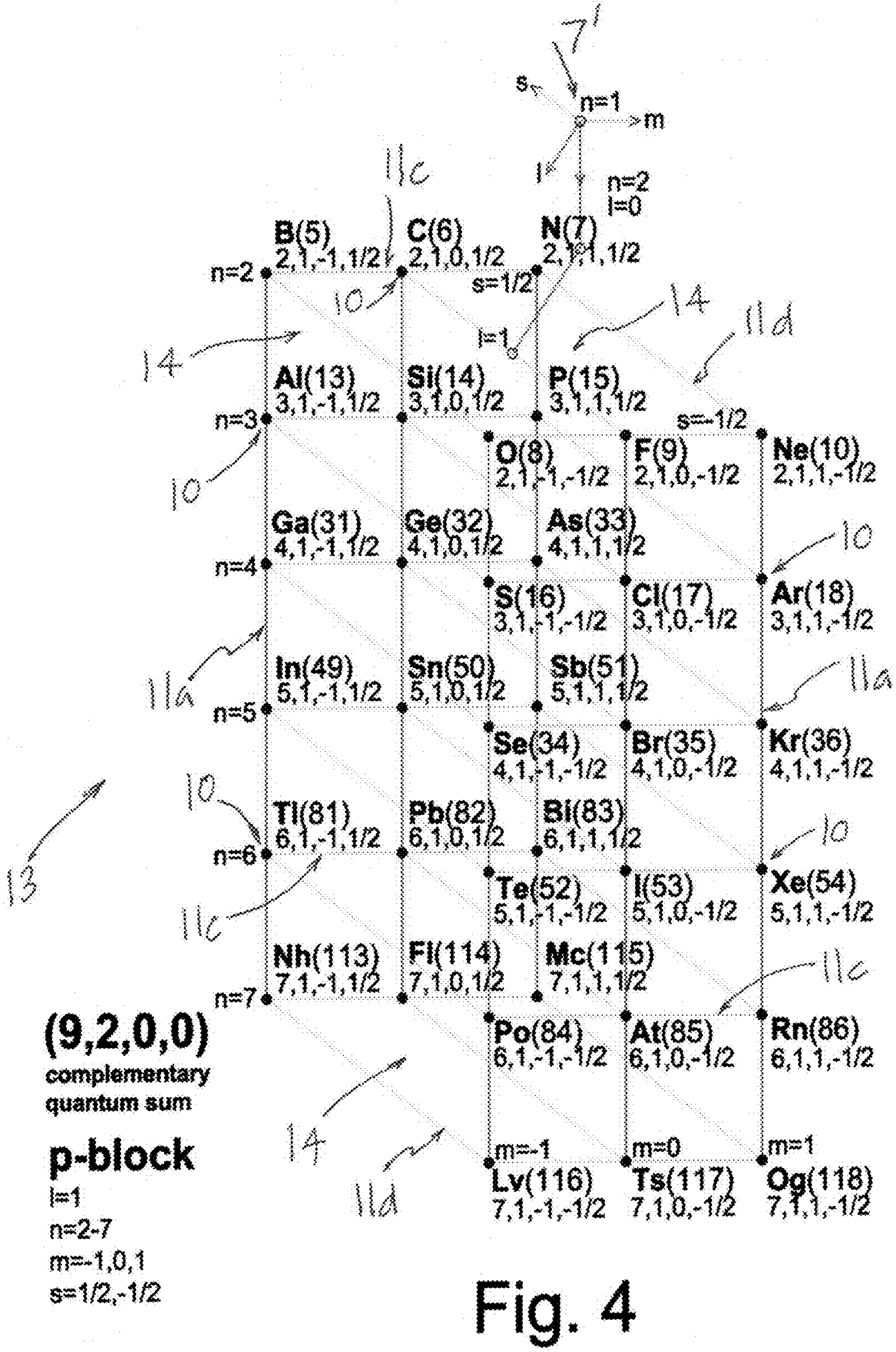
FIG. 4 shows the 36 p-block elements from vectors n, m and s based on n=2 thru 7, l=1 m=−1,0,1 and s=1/2, −1/2.
Figure 5:
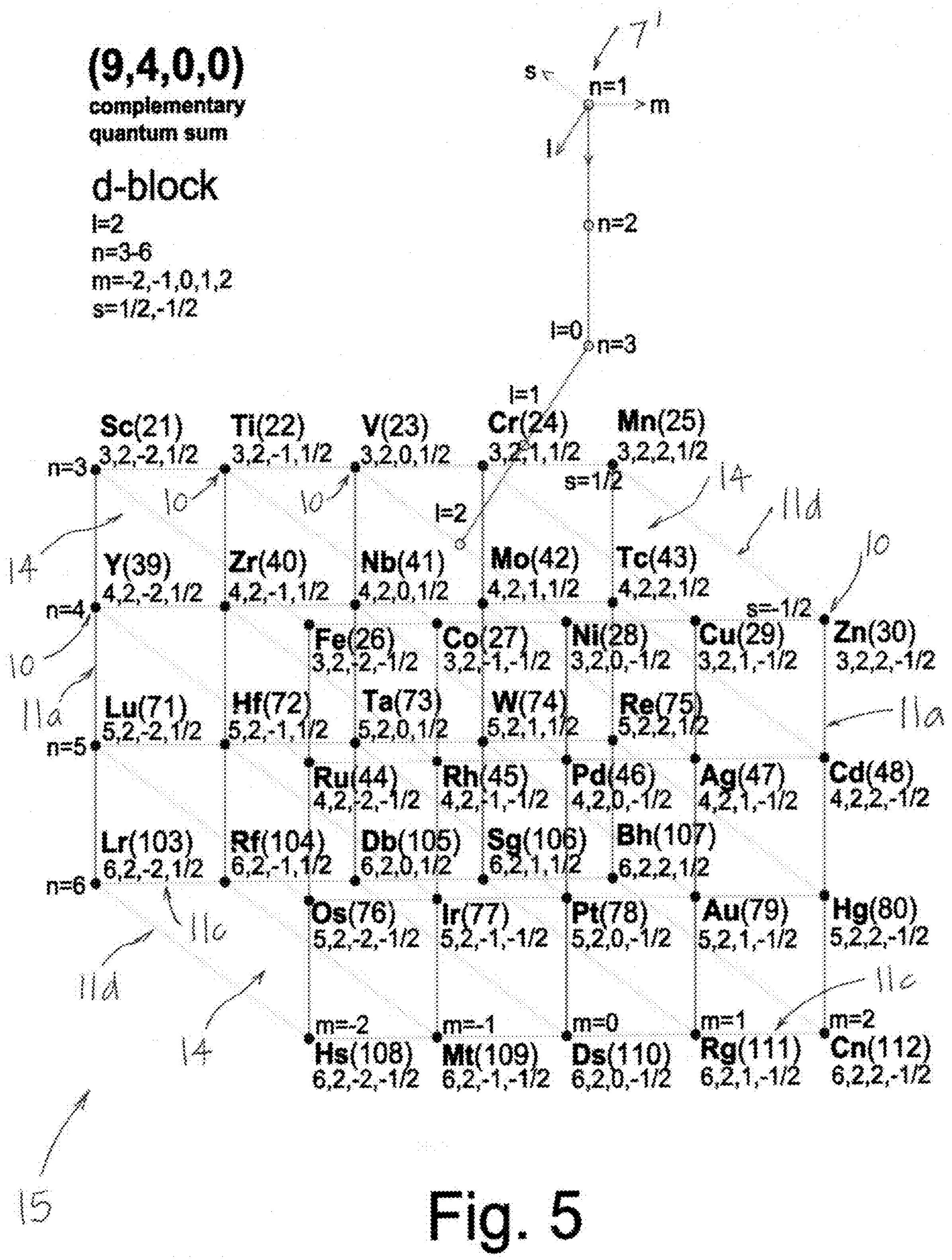
FIG. 5 shows the 40 d-block elements from vectors n, m and s based on n=3 thru 6, l=2, m=−2,1,0,1,2 and s=1/2, −1/2.
Figure 6:
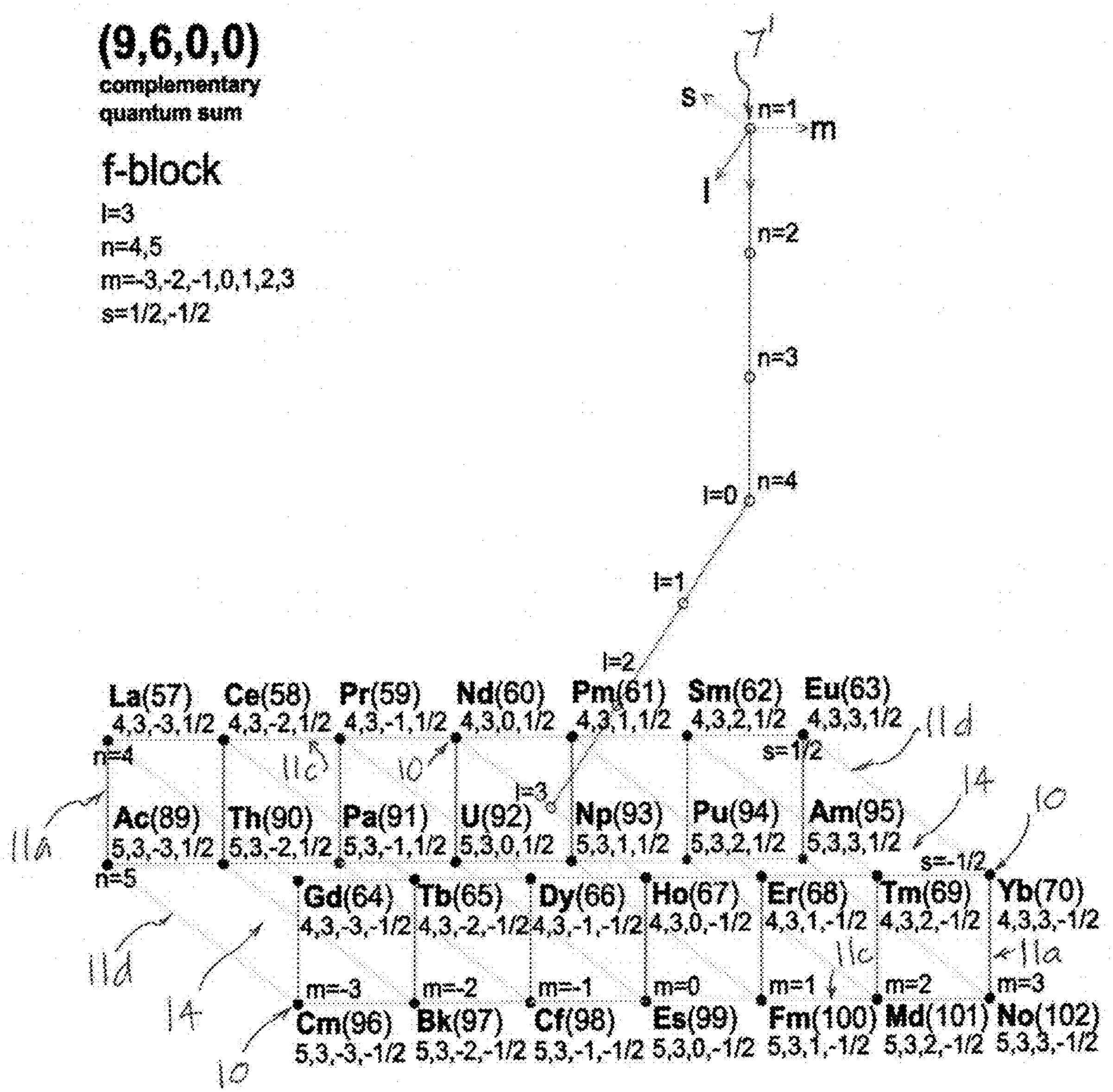
FIG. 6 shows the 28 f-block elements from vectors n, m and s based on n=4 thru 5, l=3, m=−3,−2,1,0,1,2,3 and s=1/2, −1/2.

1.2 Dimensional Build-up: The 4D PT can be built up in a number of ways sequentially and exhaustively as shown in FIGS. 3-6. In each figure, the vector star 7' is shown at the origin (1,0,0,0). These four figures are in incremental values of l, l=0 in FIG. 3, l=1 in FIG. 4, and l=2,3 in FIGS. 5 and 6, while n, m and s are variables within each. This leads to n-m-s cubes which define known electronic blocks of elements, each block having edges 11*a* parallel to direction n, edges 11*c* parallel to direction m, and edges 11*d* parallel to direction s. Thus, for the four values of l (0,1,2 and 3), there are four corresponding n-m-s blocks, namely, the s-block comprising l=0 elements (FIG. 3), p-block comprising l=1 elements (FIG. 4), d-block comprising l=2 elements (FIG. 5) and f-block comprising l=3 elements (FIG. 6). The shapes of these blocks are finite portions of a 2-cubic lattice (s-block) with edges 11*a* and 11*d*, and 3-cubic lattices (p-, d- and f-blocks) with edges 11*a*, 11*c* and 11*d*. Note that the s-block has m=0 elements and is thus a 2D lattice.

Figure 3:
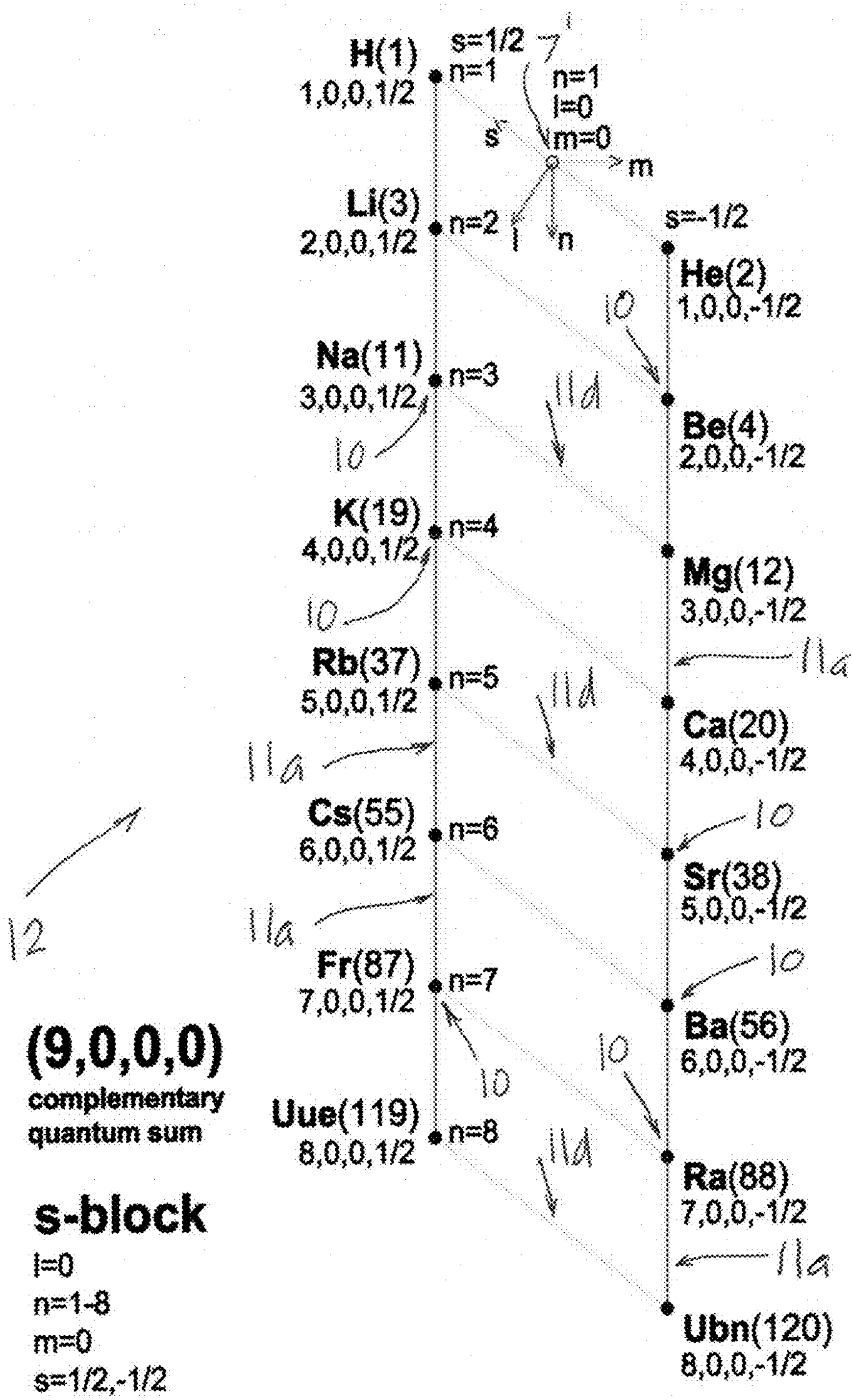
FIG. 3 shows the 16 s-block elements from vectors n and s based on n=1 thru 8, l=0 and s=1/2, −1/2.

1.21 s-block (l=0): FIG. 3 shows the s-block 12 comprising 16 elements with coordinates (n,0,0,s), where l=0 and m=0. It is a finite 2D lattice having 16 vertices 10, 14 edges 11*a* and 8 edges 11*d*, and is a part of the 4D cubic lattice defined by vector star 7' and edge directions n and s. By setting n=1 thru 8, m=0, and s=1/2 or −1/2, a 8×2 rectangular (2-cubic) array of 16 elements comprising the s-block is obtained (FIG. 3). It has 8 elements with s=1/2 and remaining 8 with s=−1/2. The sizes of arrays are counted by number of vertices in a block. Compared with the familiar 2D periodic tables where each element is represented by a square (or rectangle) "tile", the method used here is equivalent to counting each square tile as a vertex located at the center of the tile. The present invention treats the periodic table as a network of points compared to a tessellation of tiles.

1.22 p-block (l=1): FIG. 4 shows the p-block 13 comprising 36 elements with coordinates (n,1, m, s), where l=1. It is a finite 3D-cubic lattice comprising 36 vertices 10, 30 edges 11*a,* 24 edge 11*c* and 18 edges 11*d*, and is a part of the 4D cubic lattice defined by vector star 7'. The total edges equal 72. It also has 10 cubic cells 14, each is a n-l-s cell defined by 8 elements at its vertices, 6 faces and 12 edges defined by edge directions n, l and s. By setting n=2 thru 7, m=1,0,1 and s=1/2 or −1/2, a 6×3×2 (3-cubic) lattice of 36 elements is obtained. 18 of these elements have s=1/2 and the remaining 18 have s=−1/2.

1.23 d-block (l=2): FIG. 5 shows the d-block 14 comprising 40 d-block elements with coordinates (n,2, m, s), where l=2. It is a finite 3D-cubic lattice comprising 40 vertices 10, 30 edges 11*a,* 32 edges 11*c*, and 20 edges 11*d*, and is a part of the 4D cubic lattice defined by vector star 7'. The total edges equal 82. It also has 12 cubic n-l-s cells 14 bound by edge directions n, l and s. By setting n=3 thru 6, m=−2,−1,0,1,2 and s=1/2,−1/2, a 4×5×2 (3-cubic) array of 40 elements comprising the d-block is obtained (FIG. 5). Here too, the entire block can be seen as two halves, one half of 20 elements with s=1/2 elements, and the other half of 20 elements with s=−1/2 elements.

1.24 f-block (l=3): FIG. 6 shows the f-block 16 comprising 28 elements with coordinates (n,3, m, s), where l=3. It is a finite 3D lattice comprising 28 vertices, 14 edges 11*a,* 24 edges 11*c*, and 14 edges 11*d*. The total edges equal 52. It has 6 cubic n-l-s cells 14 bound by edge directions n, l and s. It as part of the 4D cubic lattice defined by vector star 7'. By setting n=4 and 5, m=−3,−2,−1,0,1,2,3 and s=1/2,−1/2, a 2×7×2 (3-cubic) array of 28 elements comprising the f-block is obtained (FIG. 6). As in the other blocks, there are two halves, 14 elements with s=1/2 and another 14 with s=−1/2.

1.25 3D Half-Tables (n,l,m cube): Since the quantum number s has only two values, 1/2 and −1/2, it is easy to see how the entire 4D periodic table can be split into two 3D half-tables 17 and 20. Half-table 17 comprises 60 s=1/2 elements only (FIG. 7), the other half-table 18 comprises 60 s=−1/2 elements (FIG. 8). Each half-table is built from the 3 quantum numbers (n,l,m), it is a finite portion of a 3D lattice comprising 60 vertices and three sets of edges, 44 edges 11*a,* 28 edges 11*b* and 40 edges 11*c*, making a total of 112 edges. In addition, it has 10 cubic cells 19, each a n-l-m cube bound by edge directions n, l and m. The shades planes are finite arrays of squares comprising n-m squares 18 bound edges having directions n and m. Each one of the 60 vertices of one 3D half-table is connected to the corresponding 60 vertices of the other 3D half-table by 60 edges parallel to direction s to make the full 4D periodic table. Here, s is the fourth dimension.

Figure 9:
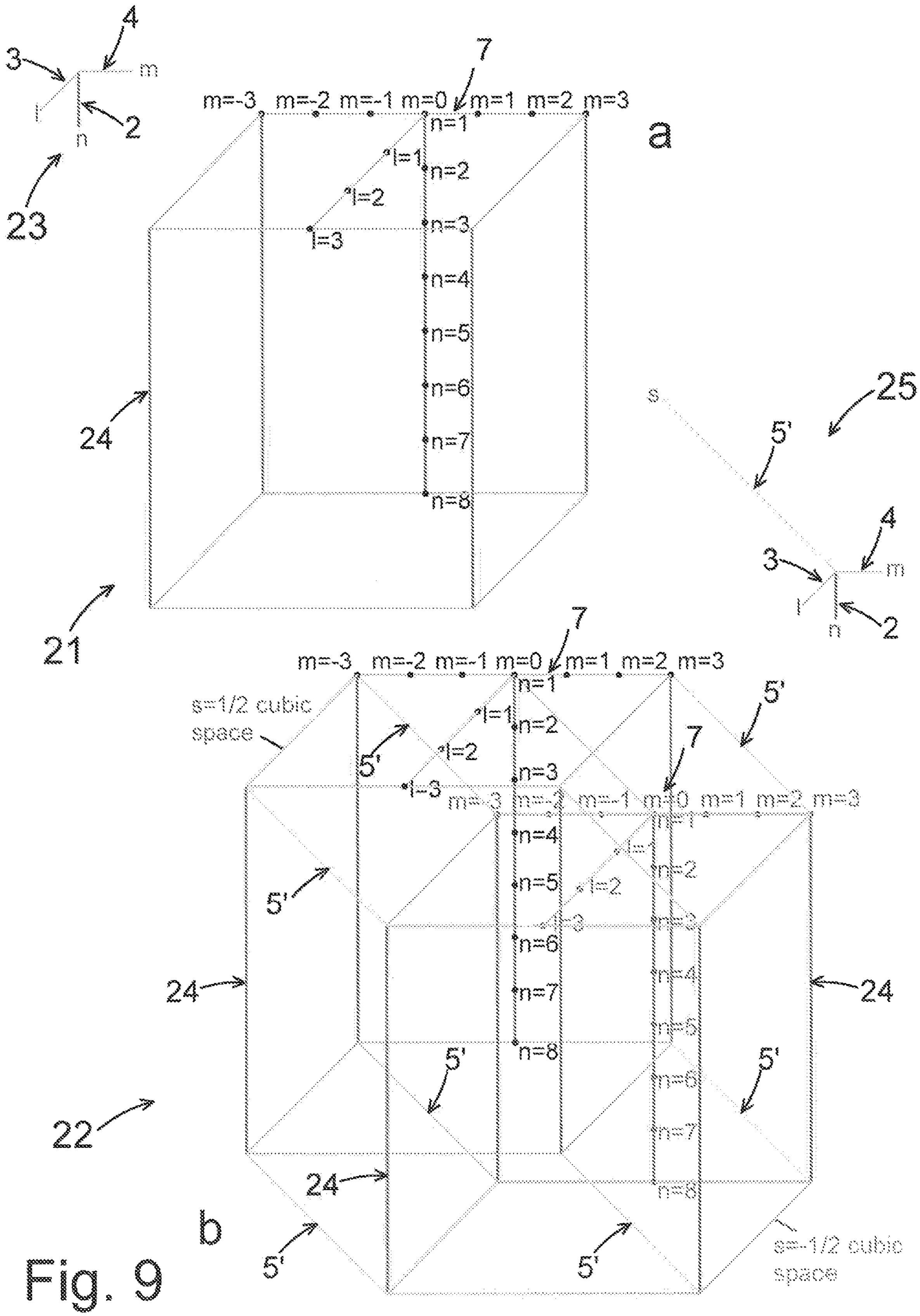
FIG. 9 shows the 3D co-ordinate space n.l,m extended to 4D coordinate space n,l,m,s by adding s, the fourth dimension.

The known method of joining two 3D cubes to make a 4D cube along the "fourth" dimension is applied here to the example of n-l-s coordinate systems for the range of values in FIG. 2. FIG. 9(*a*) shows the extent of the coordinate space 21 indicated by the imaginary "bounding box" 24 which is the overall size of the n,l,m 3D space based on the vector star 23 with vectors n, l and m. The extended vector star 7" is a modified version of 7 in FIG. 2 and is obtained by removing the s vector. The two bounding boxes 23 are joined in to derive the imaginary 4D bounding box 22 by direction s as shown in the vector star 25 to indicate the extent of 4D coordinate space. This will be used in subsequent 4D periodic tables in their 3D and 2D projections. The actual periodic table is contained within this bounding box and occupies a smaller portion of this 4D lattice space.

2. 3D and 2D Representations: The sequence of build-up by electronic blocks 12, 13, 15, 16 in FIGS. 3-6 is one of the four basic ways the 4D PT can be built up sequentially by treating each quantum number as the fourth dimension which is added to the any three. Since there are only 4 triplets of quantum numbers, n-l-m, n-l-s, n-m-s, l-m-s, (FIG. 10) there only four ways to build the 4D PT by adding the fourth quantum number as the "fourth" dimension to the familiar three. In a 3D projection, this means a quantum triplet is a cubic lattice and two such cubic lattices can be joined by the fourth quantum number in the same way a cube can be joined to another by adding the fourth dimension to make a hyper-cube. In this sense, each triplet leads to its corresponding complementary singlet, namely, s, m, l or n as the "fourth dimension". This provides a practical way to build the 4D PT in 3D space by constructing quantum triplets as a 3D cubic lattice, then adding the fourth quantum number, namely, n, l, m or s, at an angle to the other three in 3D space. This requires designing the node of a space frame that permits the three cubic angles at right angles to each other, and the fourth meeting at an angle to the cubic lattice. Though the cubic angles are not a requirement for building a 3D model of the 4D PT, they may be most convenient and simplest for understanding the 4D PT since the cubic angles are familiar, and the way to read cubic angles in 3 parallel directions taken two at a time is also familiar.

This 3-way reading of information is an extension of the graph paper concept, and standard tables and charts based on it, which is used in all STEM fields as way to represent information with 2 variables, one along the horizontal, second along the vertical. The 3D cubic chart is also familiar from mapping 3 variables in a cubic lattice reference framework, the x-y-z Cartesian grid. However, when it comes to representing and reading 4-way information, a 4-way Cartesian grid or a 4D-cubic lattice, we enter a challenging visual territory. The simplest way is to break it down into 3-way and 2-way grids, study them separately as part of a collective 4-way grid. This disclosure comprised these two integrally related parts of the same invention as two different dimensional representations, 3D and 2D, of the same 4D PT. The 3D PTs are described first based on the four quantum number triplets mentioned above and shown in FIG. 10. These are followed by related and derivative 2D PTs based on the six quantum number doublets, n-l, n-m, n-s, l-m, l-s, m-s (FIG. 11).

Figure 10:
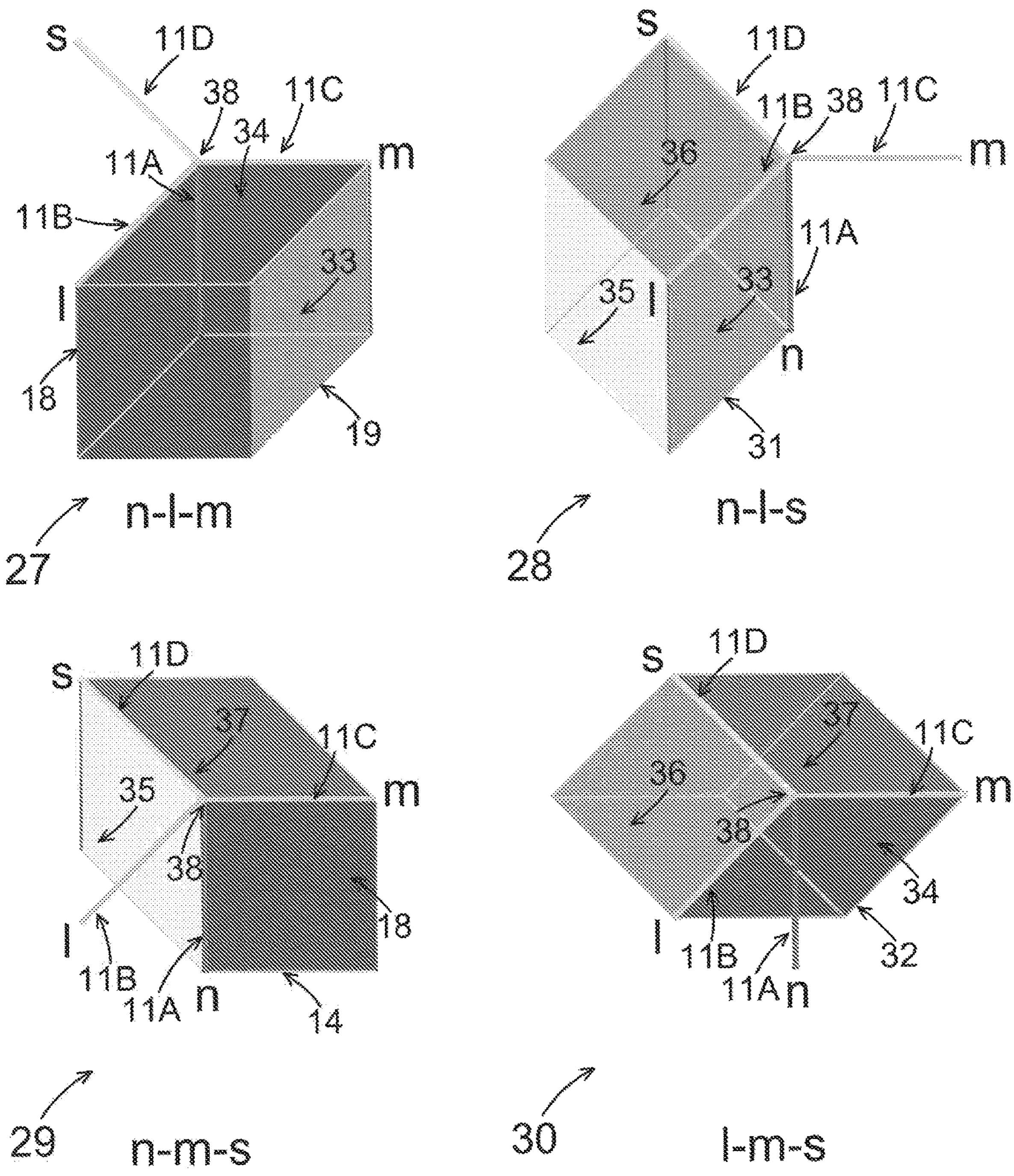
FIG. 10 shows the 4 cubes in a 4D cube from the 4 quantum triplets: n-l-m, n-l-s, n-m-s, and l-m-s.

In FIG. 10, 26 shows the 4 quantum triplets and associated cubes in relation to the vector star 38. These different cubes are the 3D cells of the 4D lattice. The vector star here is shown in a 3D embodiment, not as vectors as in FIGS. 1-8, but each vector is shown as a physical strut, a cylindrical rod or tube, which will be used later to build a 3D space frame of the 4D PT. Strut 11A corresponds to vector n or edge 11*a* in earlier illustrations, similarly, strut 11B corresponds to vector I or edge 11*b*, strut 11C to vector m or edge 11*c*, and strut 11D to s or edge 11*d*. These are shown overlaid with the 4 different cubes in 27-30. 27 shows the n-l-m cube 19 composed of faces 18, 33 and 34; 28 shows the n-l-s cube 31 composed of faces 33, 35 and 36; 29 shows the n-m-s cube 14 composed of face 18, 35 and 37; 30 shows the l-m-s cube composed of faces 34, 36 and 37. In each of the 4 cases, the complementary singlet, a free strut corresponding respectively to s, m, l and n is shown.

Figure 11:
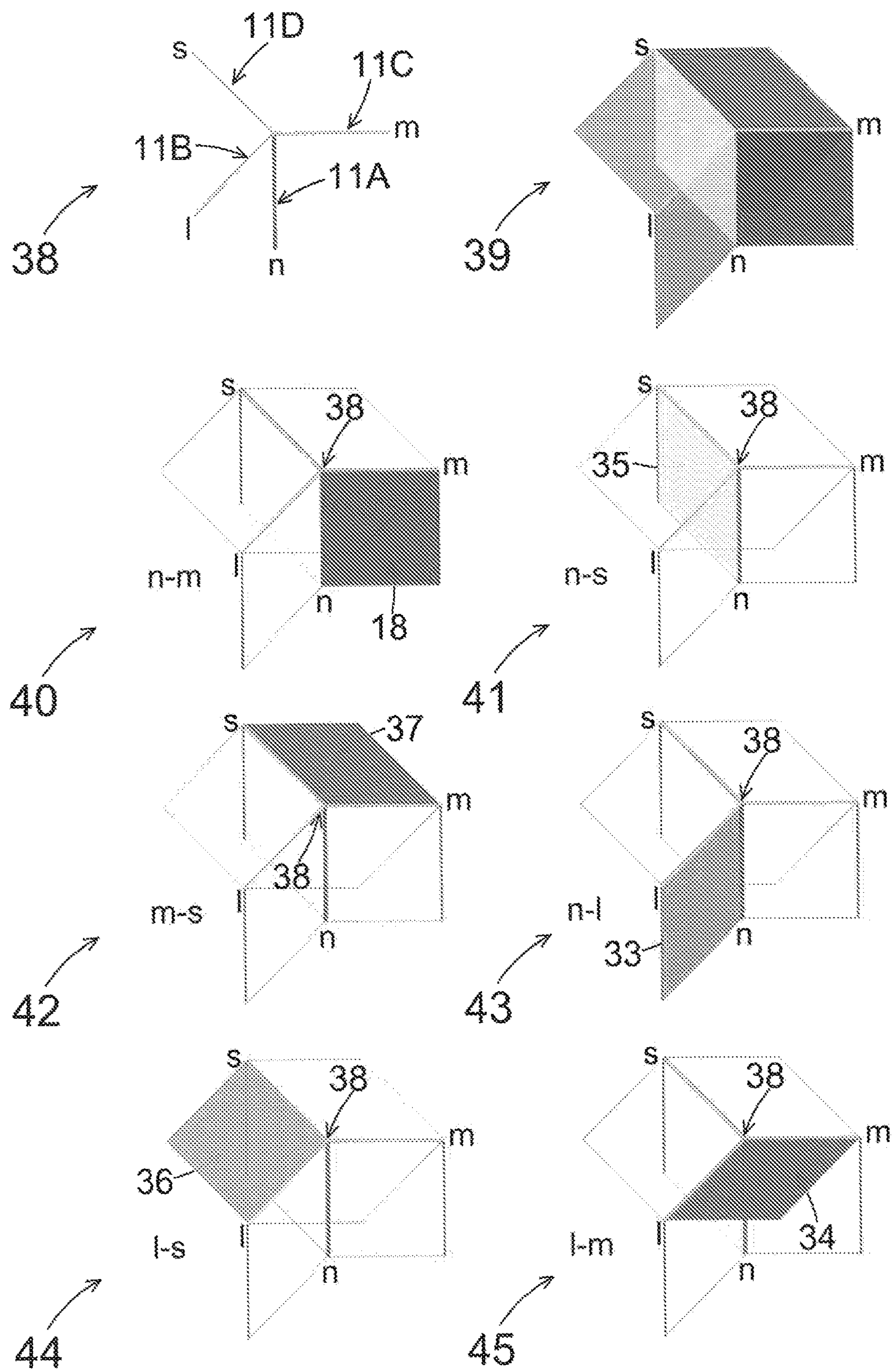
FIG. 11 shows the 6 faces of a 4D cube from the 6 quantum pairs: n-l, n-m, n-s, l-m, l-s and m-s.

FIG. 11 shows the vector-star 38 with each individual quantum doublet which define the 6 different faces of a 4D lattice. 39 shows the 6 faces meeting at one vertex of the 4D lattice, 40-45 show the individual faces. 40 shows the n-m face 18, 41 shows the n-s face 35, 42 shows the m-s face 37; 43, the n-l face 33; 44, the l-s face 36; and 45, the l-m face 34. The faces are colored in pairs of complimentary colors (shown with the RYB pigment system), n-m is paired with n-s, m-s with n-l and l-s with l-m. In each of the 6 cases, the face bound by 2 struts at the vector-star, is shown with a pair of free struts representing the complementary face.

3. 3D Construction: Our physical space is 3-dimensional, thus 4D structures can only be constructed by projecting them in 3D (or 2D) space. Since there are infinite states of 3D projections from 4D due to continuous angle variations of morphing the vector star in FIG. 1, a system of physical nodes that capture finite variations of angles is needed to build 3D space frame (or space grid, or lattice, or network) models of the 4D PT as one physical embodiment of the invention. The present invention discloses a space frame system comprising nodes connected by struts which allows four selected angle combinations to build preferred versions of the 3D PT. These angles determine the directions of struts. This system of nodes is based on a 12-coordinate system which is described next along with node-strut system in FIGS. 12-16. In these illustrations too the vectors in the vector-stars are shown as struts.

3.1 12-Coordinate System: Discrete states of a continuously morphing vector-star provide a convenient starting point for automating the exhaustive generation of 3D PTs projected from 4D. Independent rotations of each of the 4 vectors n, l, m, s, can be indexed by their individual spatial directions emanating from (0,0,0) to any location within their x-y-z space. Restricting to unit distances with positive and negative values within this space, 27 discrete states (33) of vector directions are possible for each quantum number based on triplet combinations of −1, 0 and 1 and indexed by their corresponding 3D Cartesian coordinates. These states are mapped on the vertices, faces and edges of a reference cube in the system 46 shown in FIG. 12. The six primary x-y-z directions emanating from the center (0,0,0) are: Right (1,0,0), Left (−1,0,0), Front (0,1,0), Back (0,−1,0), Top (0,0,1), Bottom (0,0,−1). The 12 secondary directions are paired combinations of these 6 and are oriented towards the mid-points of the reference cube, the 8 tertiary directions are triple combinations of the primary directions and are oriented towards the corners of the cube.

Figure 12:
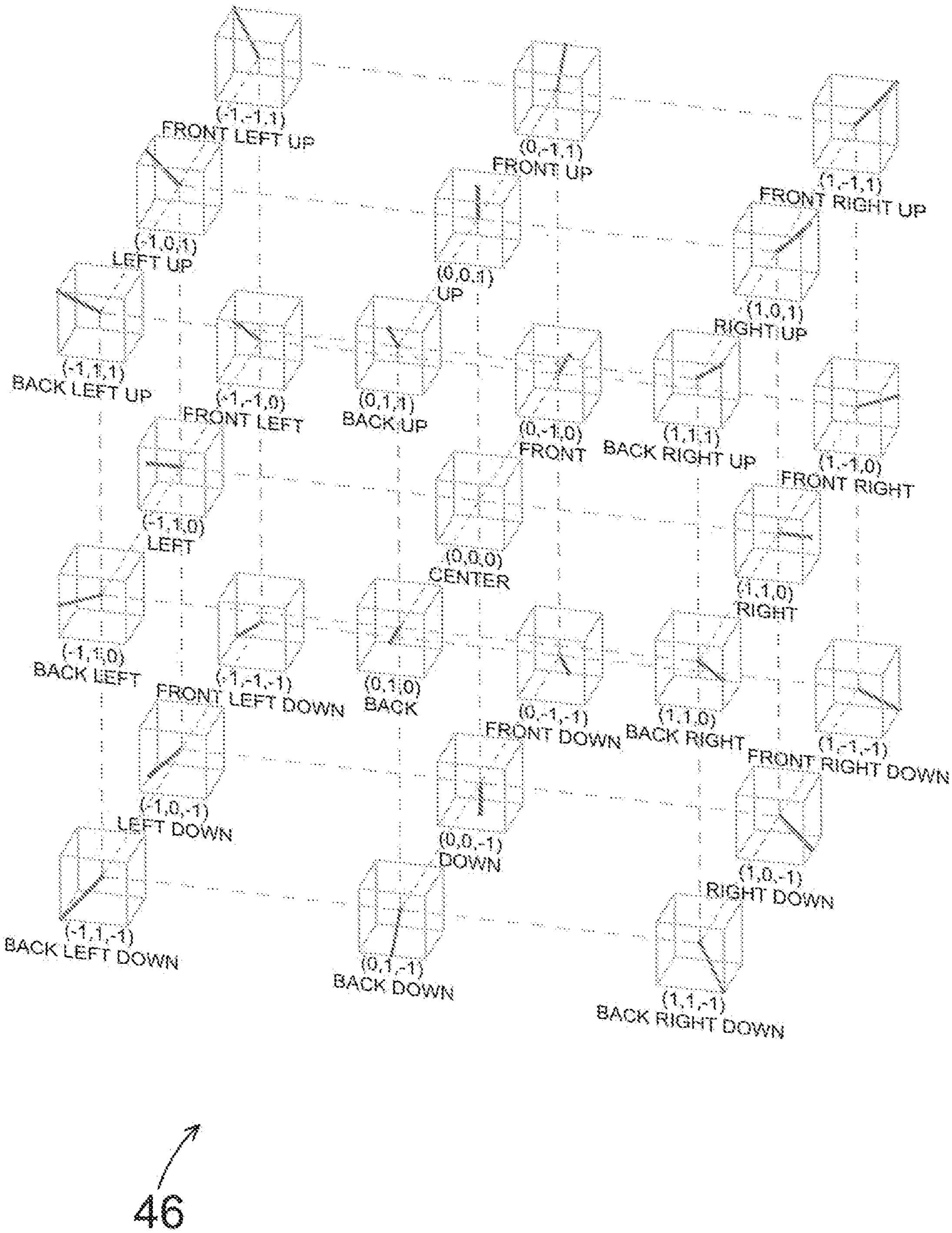
FIG. 12 shows the 27 discrete orientations of one strut and the coordinates of its spatial directions in 3D space.

Any states in between these discrete states are possible and lead to a continuum of vector orientations in 3D space. Conversely, any point in 3D space has a corresponding 3-vector values, opening up the repertory of possible strut directions of 3D space frames for the 4D PT. There are 27 corresponding states for each of the 4 vectors, namely, n, l, m, and s, leading to 4 analogous sets of 3D co-ordinate systems. FIG. 12 shows 46, a generic system of 3D vectors, with 3D co-ordinates for each direction. For each different vector, these can be indexed as (Nx, Ny, Nz) for vector n, (Lx, Ly, Lz) for vector l, (Mx, My, Mz) for vector m, and (Sx, Sy, Sz) for vector s.

From these 4 parallel sets, combinations obtained by taking any one direction from each set and combining it with any other from each of the remaining three sets lead to all possible 3D 4-vector stars for building the 4D periodic table in a physical form. These combinations of 4 vectors can be indexed with their twelve co-ordinates (Nx,Ny,Nz)(Lx,Ly,Lz)(Mx,My,Mz)(Sx,Sy,Sz) comprising 4 sets of 3 co-ordinates, one set for each different vector in 3D space. Though there are infinite combinations if real number coordinates for vector directions are used, restricting to discrete states, the total combinations are $3^{12}$ states. These can be mapped on the vertices, faces, edges, and centers of 3D cells and hyper-cells of a 12D cube. To these vector directions, vector lengths add another variable though the starting point for PT design is provided by unit vectors. The number of possibilities increase when the coordinates take on non-unit and non-integer values. The challenge is to select the most useful cases. Some of these are presented here.

Figure 13:
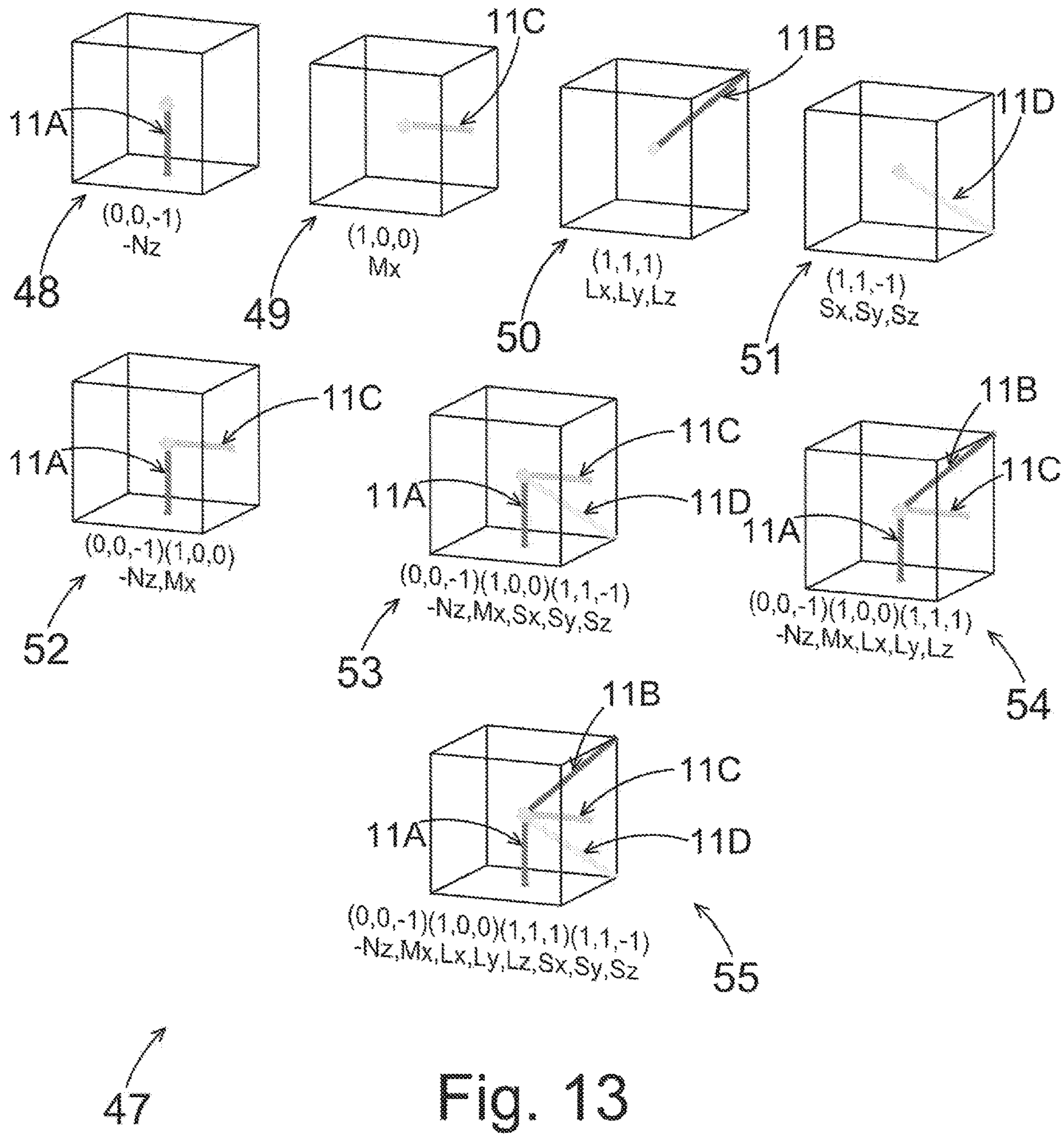
FIG. 13 shows some examples of strut combinations by combining individual directions of the 4 struts, each strut direction representing one of the 4 quantum numbers.

FIG. 13 shows 47 which includes 8 examples of vector combinations along with their coordinates, each vector contributing a group of 3 coordinates within brackets. Starting with examples of a single vector (one-strut), 48 is the n-vector direction (0,0,−1) in (Nz,Ny,Nz) space using the strut 11A, 49 is the m-vector direction (1,0,0) in (Mz,My,Mz) space using the strut 11C, 50 is l-vector (1,1,1) in (Lx,Ly,Lz) space using the strut 11B, and 51 is the s-vector (1,1,−1) in (Sz,Sy,Sz) space using strut 11D. The two-vector (two-strut) combination 52 is a combination of 48 and 49 in (Nz,Ny,Nz,Mz,My,Mz) space with 6 coordinates using struts 11A and 11C. Similarly, three-vector (three-strut) combinations 53 and 54 are from three single vectors (48-51) and mapped with 9 coordinates (Nz,Ny,Nz,Lx,Ly,Lz,Mx,My,Mz) and using struts 11A, 11C and 11D, and 11A, 11B and 11C, respectively. The four-vector (four-strut) combination 55 is a combination of all four single vectors (48-51) and uses struts 11A, 11B, 11C and 11D, and is indexed with 12 coordinates (Nx, Ny, Nz, Lx, Ly, Lz, Mx, My, Mz, Sx, Sy, Sz). All examples are shown with their co-ordinates as well as shortened alphabetic codes obtained by removing zeros and (0,0,0). These provide the basis for node design.

3.2 4D PT as a 3D Space Frame: A space frame kit for periodic tables can be built from 120 color-coded nodes (vertices) and 284 struts (edges) according to Table 1. The nodes can be color-coded according to the blocks, a different color for each electronic block. A further finer color difference, e.g. lighter or darker shades of the same color, can be introduced to distinguish s=1/2 and s=−1/2 elements. Color-coded struts require a different color for each quantum number. The kit comprises 88 n-struts (red), 56 l-struts (violet), 80 m-struts (cyan) and 60 s-struts (yellow) as shown in these illustrations. The nodes and struts within each block correspond to the numbers of vertices and edges as described in Sec 1.2. The 238 faces in Table 1 can be added as 4-sided panels to the kit, but this will complicate the design. However, it will permit the visualization of portions of the lattice with non-intersecting 3D cells (e.g. p-, d- and f-blocks) and other configurations.

The key consideration in building a 4D PT in 3D space is the design of a 4-directional node which captures each different spatial direction associated with a quantum number. These 4 spatial directions emanate radially from the center of any polyhedron to its vertices, edges or faces. Several classes of such structures were proposed earlier (Lalvani, 1991, 1996) and from this inventory of node designs a vast collection of 3D constructions of 4D PTs is possible. Any regular, semi-regular or irregular polyhedron could be used to determine the direction of struts emanating from its center to any combination of its vertices, edges or face. In addition, other available node options can be used.

The proposed 4D lattice can be built from construction kits (used in architecture, design arts and structural engineering) or crystal lattice kits. The former includes Pearce's "universal" node system with 26 cubic directions, Mengringhausen's Mero system with 18 cubic directions, Bear's zome system using Zometool's 62 icosahedral directions, Fuller's "octet truss" with 12 node directions similar to the HCP crystal lattice. Some of these model-building systems will produce co-planar faces, hence physically intersecting struts, while some others like BCC lattice will produce overlapping vertices. The latter is unfortunate since the BCC node produces the 4-valent (4-connected) tetrahedral node familiar from the diamond lattice and is the only node option that can provide a global symmetry in the 3D lattice projected from 4D. All other 3D models of the proposed 4D PT will have varying degrees of departure from higher symmetries obtained from nodes based on the five regular polyhedra.

Figure 14:
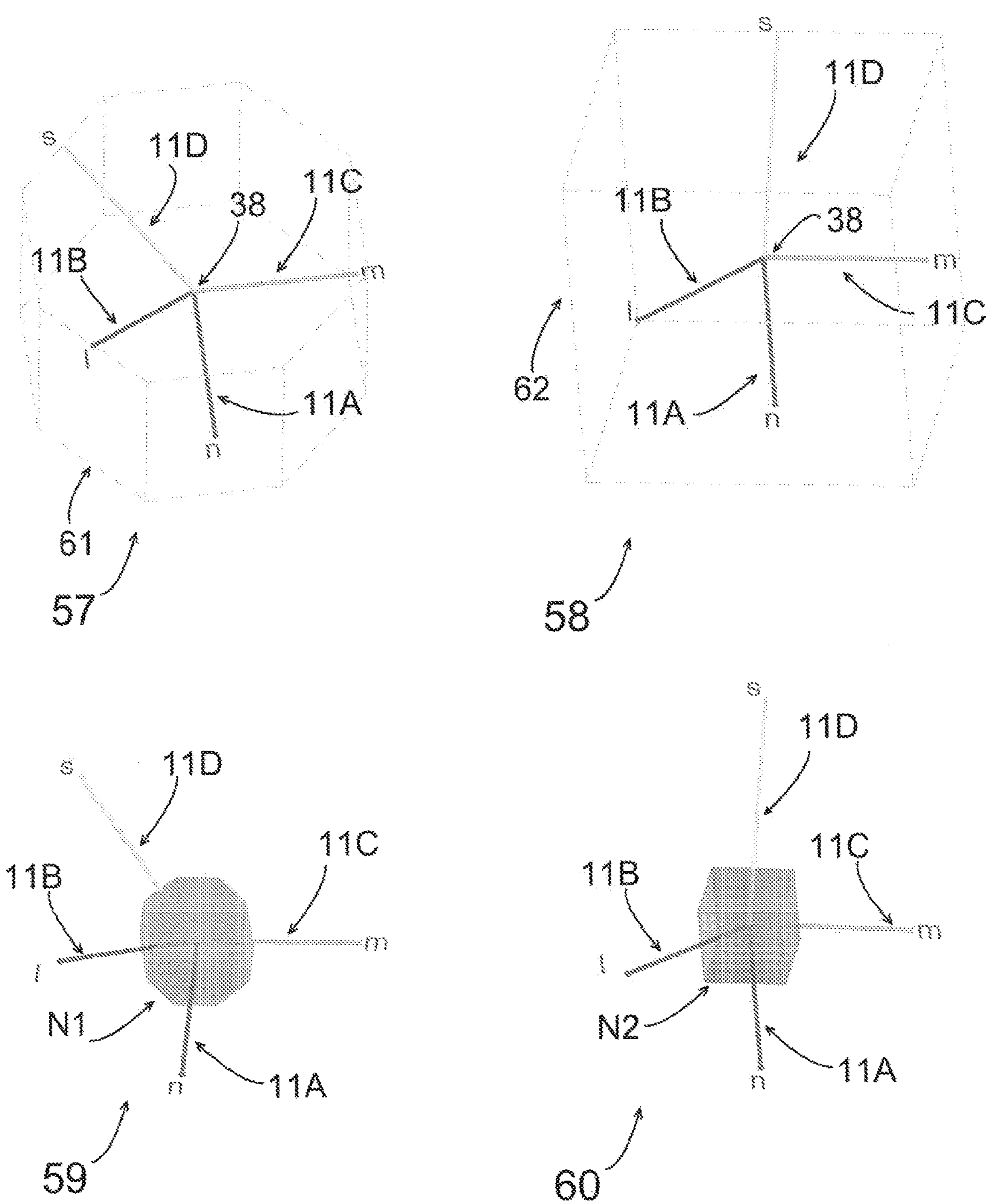
FIG. 14 shows two examples of nodes with 4 struts emanating from it.
Figure 15:
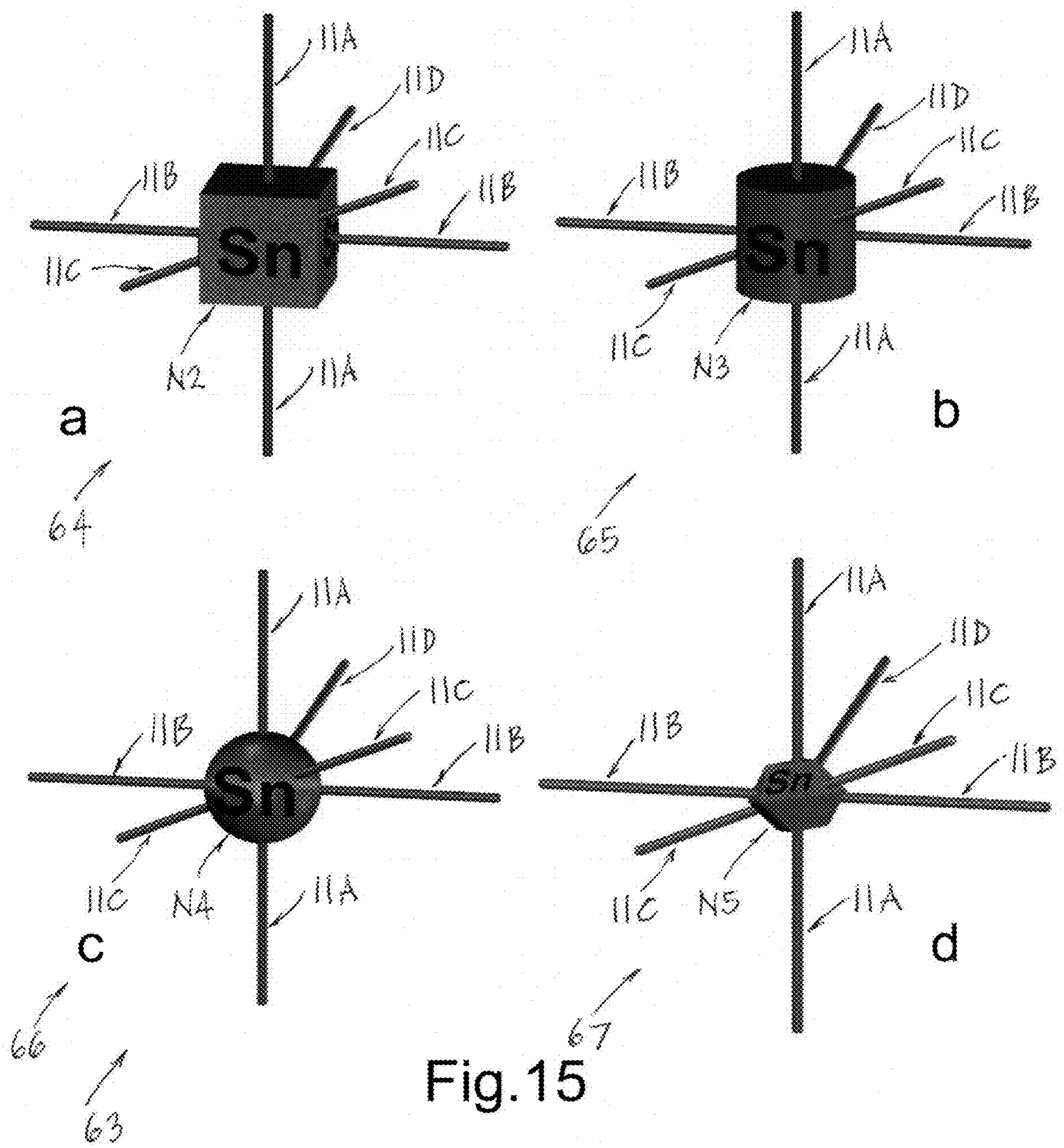
FIG. 15 shows some examples of node shapes receiving struts along the 4 directions.
Figure 16:
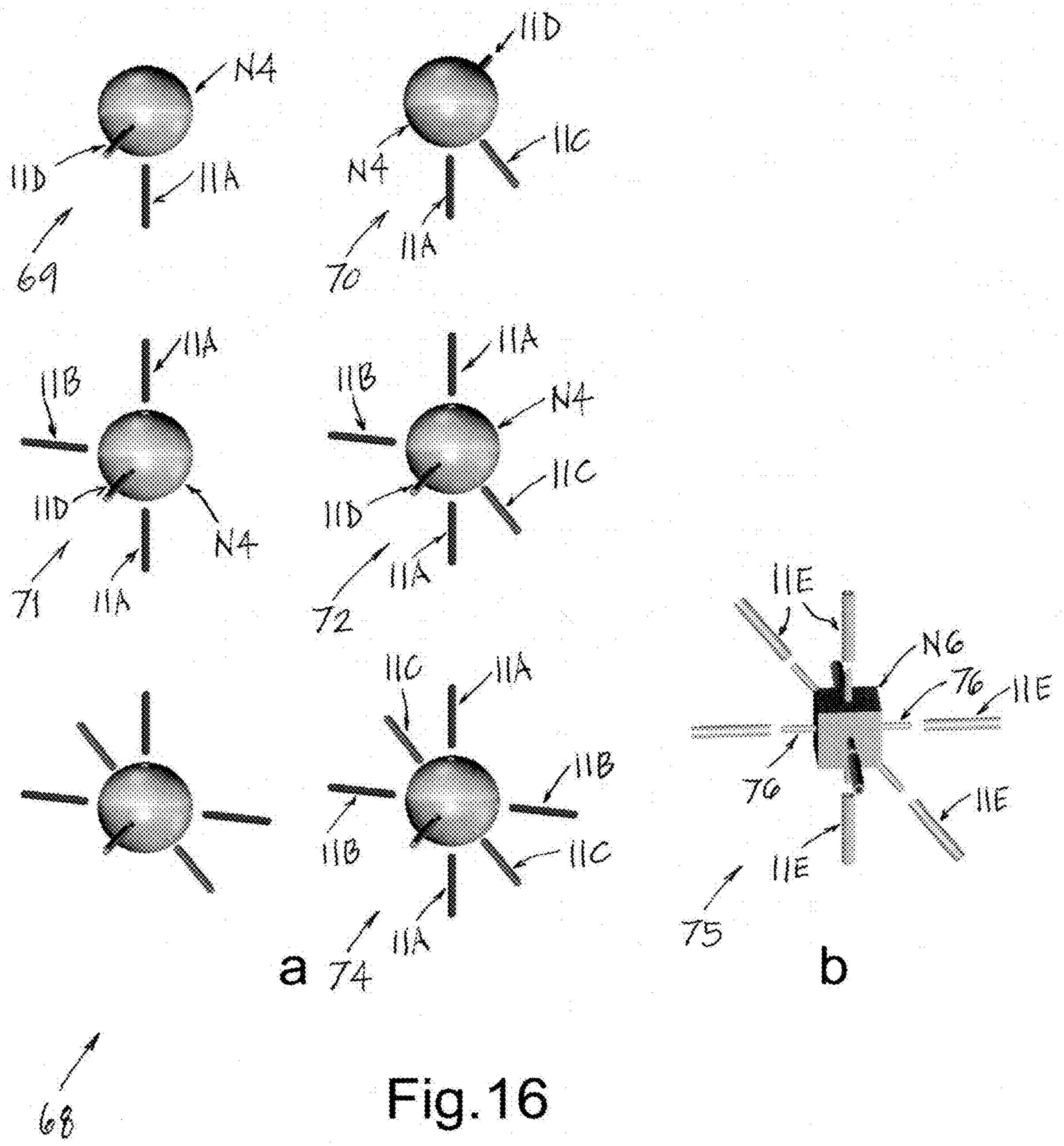
FIG. 16 shows struts with holes or protrusions so the struts can be assembled and dis-assembled.

FIG. 14 shows 48 which illustrates two related examples of nodes based on the octagonal prism N1 in 59 and a cube N2 in 60 from which 4 struts 11A-11D emanate as shown to enable connection to other nodes. Their corresponding vector stars are shown in 57 and 58, respectively, and show their derivation from a reference octagonal prism 61 and a reference cube 62. The octagonal prism node N1 has two struts, n-strut and m-strut, radiating to the mid-points of its faces and the other two, l-strut and s-strut, to the mid-points of its edges. It thus has two different strut lengths as seen in 61. The cubic node N2 also has two directions to its mid-faces (also n- and m-struts), and l-strut to its corner and s-strut to its mid-edge. It has 3 different lengths as seen in 62. These are just two choices available from any four directions of the octagonal prism and the cube. From these node directions, the periodic table can be built by joining them with color-coded struts (FIG. 15), one color for each direction (representing each quantum number), and keeping all struts parallel to these four directions. The names of elements can be marked on the one more sides or faces of the node for visibility from different viewpoints.

Alternative node shapes are possible and four examples are shown in 63 (FIG. 15) with the same directions of struts. 64 shows the cubic node N2 with struts 11A, 11B and 11D having directions along the faces of the cube 11C along the edges of the cube. 65 shows a cylindrical node N3, 66 shows a spherical node N4, and 67 shows a polyhedral node N5, all three as variants having the same struts and directions as 64.

The struts can be removable and can be inserted into the nodes with receiving holes or nodes with protrusions. Two examples are shown in 68 (FIG. 16) using a spherical node N4 with holes and a cubic node N6 with protrusions. 69-74 show different types of nodes that are needed to satisfy the connectivity described later in Table 2. This range includes: 2 struts in 69, 3 struts in 70, 4 struts in 71, 5 struts in 72, and 7 struts in 74. The node must allow a variable number of struts to be inserted depending on its location in the PT. This could mean all identical nodes with eight holes, with two along the same direction, since some struts need to be collinear as in FIG. 15 for the element Sn. Alternatively, struts could have customized holes following the variable connectivity in Table 2. 75 shows a cubic node N6 with protrusions 76 to receive hollow struts 11E.

Various known physical or mechanical attachment techniques can be used to connect the nodes with struts. These include friction- or force-fit, the ends of struts designed to snap-fit or screwed in, using a secondary joining element between the node and strut, a magnetic connection, an adjustable connection where the two contact surfaces expand or contract to enable the attachment, and so on. The nodes and struts could be constructed from materials like wood, metal, plastic, rubber, cork, and so on. The nodes and struts could be individually cast in one piece, injection molded, 3D-printed, assembled from sub-components or folded from flat material.

For the purposes of illustration, a cubic node will be used for the PT designs shown here. Customized nodes can be selected from the systematic inventory of node options using the 12-coordinate system disclosed herein.

4D PT, Four Examples

FIGS. 17-24 show 4 embodiments of the 4D PT projected in its 3D states and constructed as 3D space frames from nodes and struts.

Figure 7:
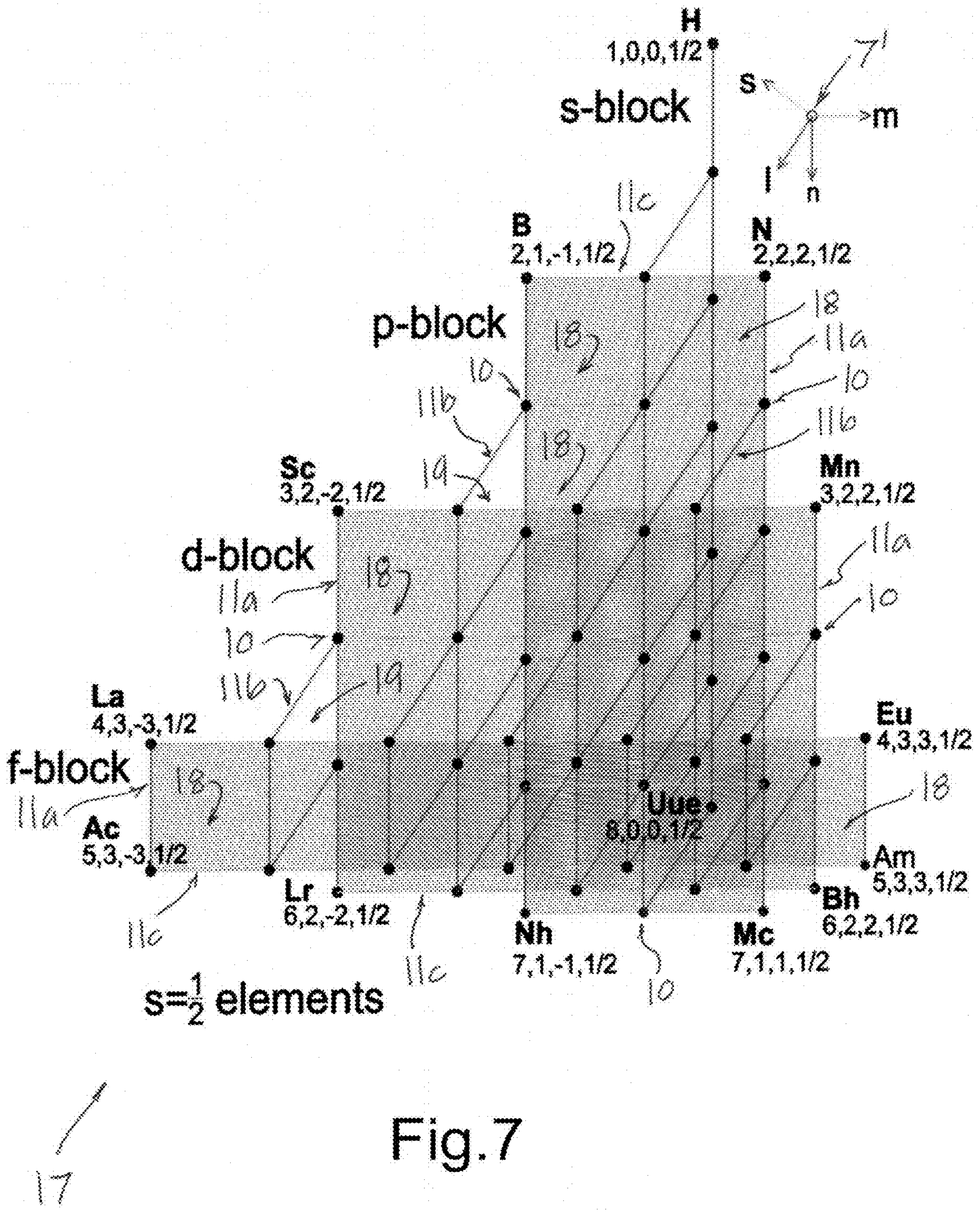
FIG. 7 shows the half-PT with 60 s=1/2 elements.
Figure 8:
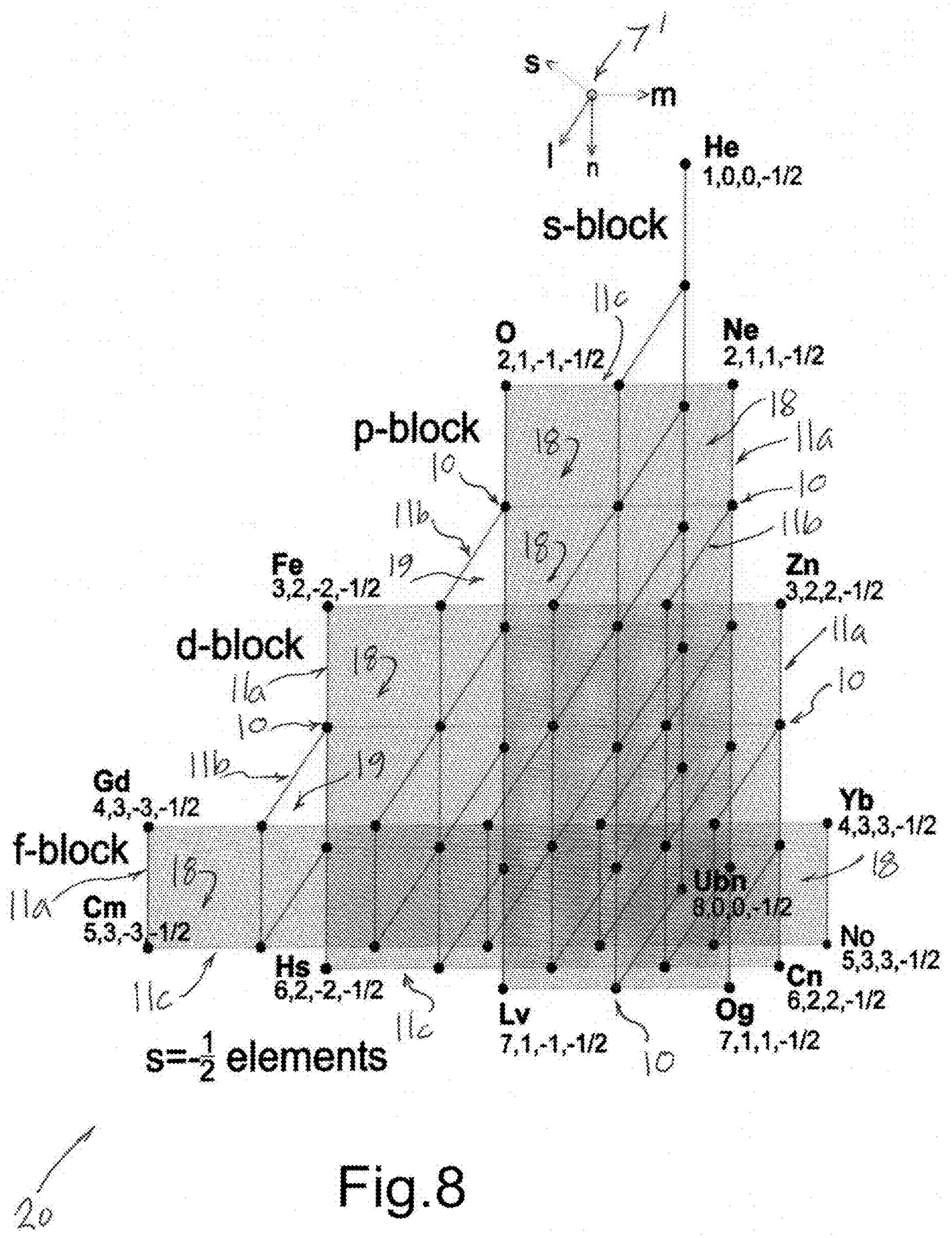
FIG. 8 shows the half-PT with 60 s=−1/2 elements.
Figure 17A:
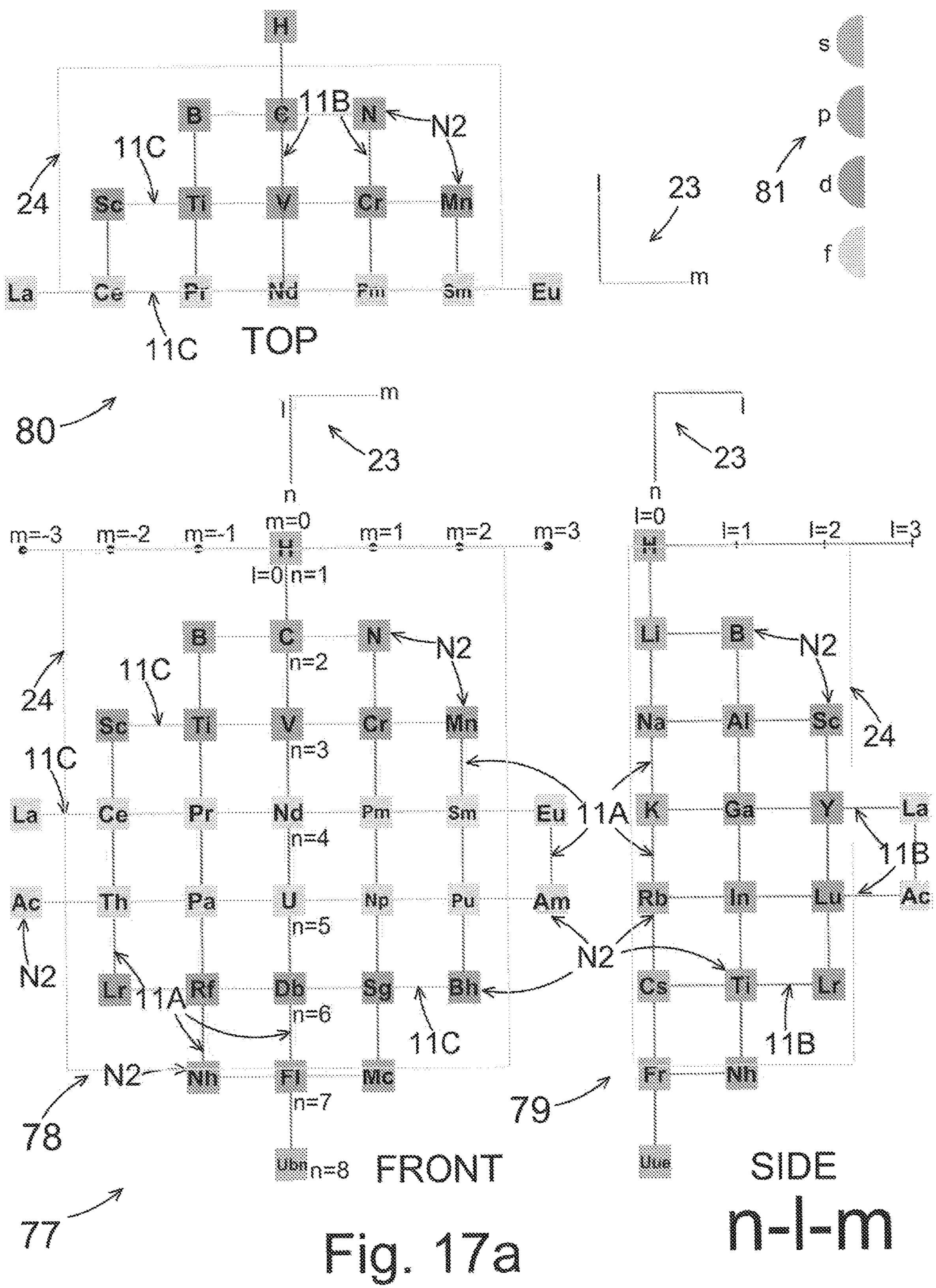
FIG. 17*a* shows Front, Side and Top views of the half-3D PT (s=1/2) based on the n-l-m cube.
Figure 17B:
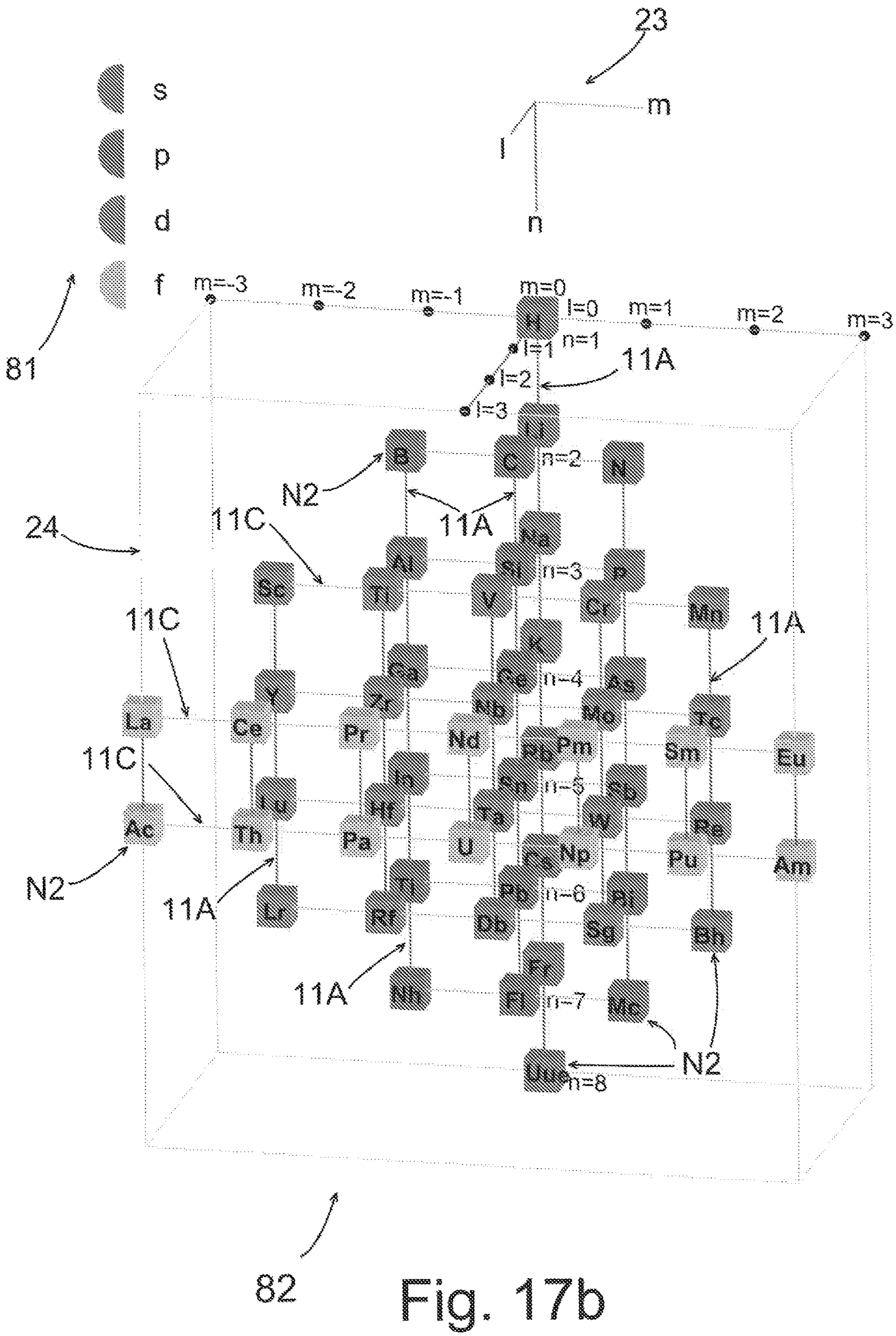
FIG. 17*b* shows the half-3D PT (s=1/2) based on the n-l-m cube.

FIGS. 17*a* and 17*b* show the n-l-m cubic half table 77 comprising 60 s=1/2 elements constructed from the cubic node N2 and corresponding to the half-PTs in FIG. 7. In FIG. 17*a*, it is shown in three views, Front view 78, Side view 79 and Top view 80. These views clearly display that the elements in the half-table lie on vertices of a 3D-cubic lattice since all three views show right angles. The N2 nodes are joined to others by struts 11A along the vertical direction n, struts 11C along the horizontal direction m in 78 and 80, and struts 11B perpendicular to both as seen in 79 and 80. The vector star 23 and the bounding box 24 correspond to those in FIG. 9. 81 shows the color of the nodes according to the s-, p-, d, and f-blocks. FIG. 17*b* shows the half-PT in an isometric view. The other half-PT with corresponding 60 s=−1/2 elements is geometrically and topologically identical.

Figure 18:
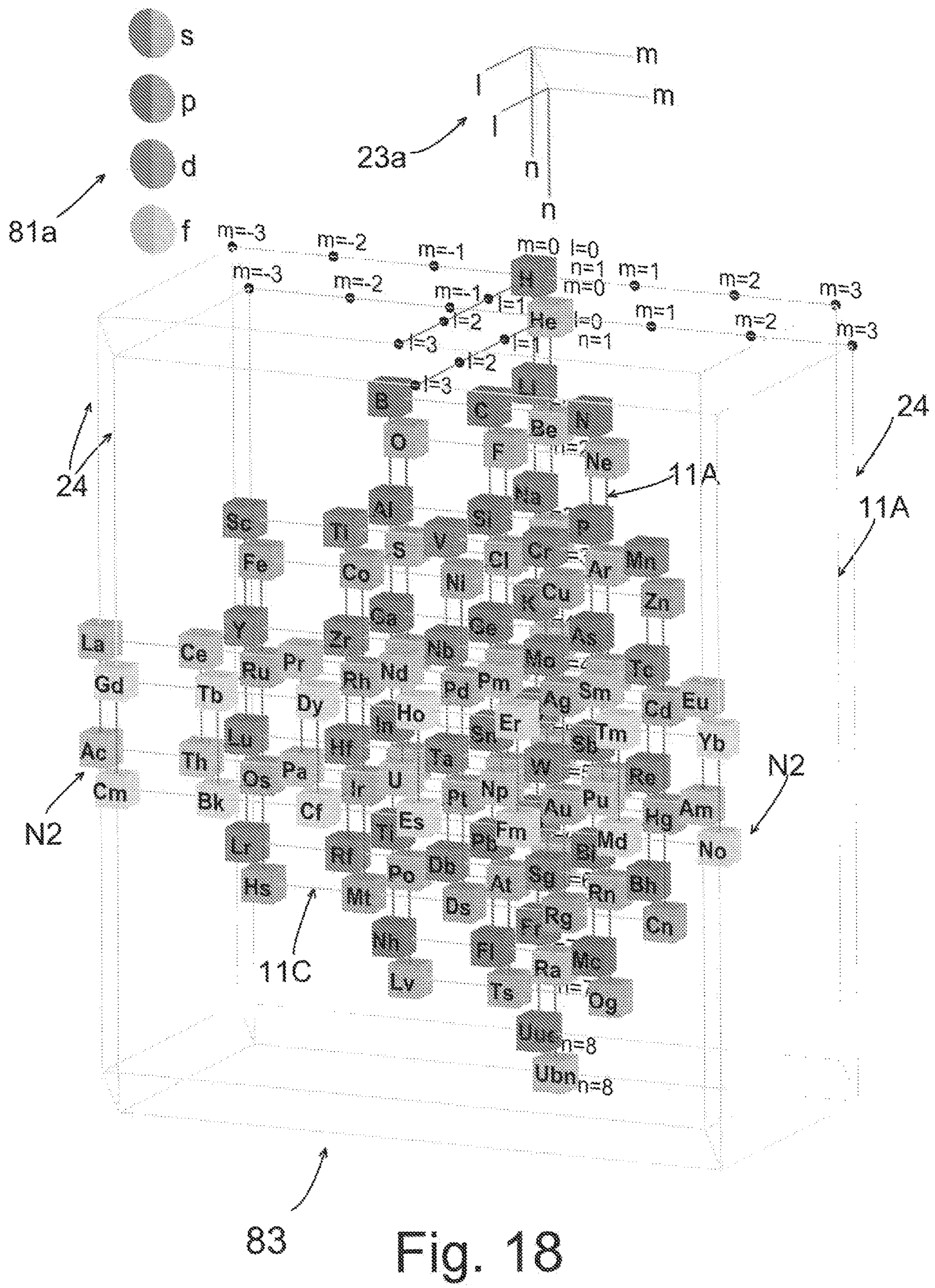
FIG. 18 shows the full 3D PT (4D1) built obtained by joining the two half-PTs.

FIG. 18 shows a 3D model 83 of the 4D PT (4D1) corresponding to the quantum triplet n-l-m and having cubic nodes N2 joined by three strut directions at right angles to each other and corresponding to n, I, and m. It is built using struts 11A, 11B, 11C and 11D. They emanate from the center of a reference cube to its faces, and the fourth direction, corresponding to s, joins the center to its corner. 4D1 is obtained by joining two half-PTs along the angles determined by this s direction. It results in corresponding nodes in the two half-PTs connected to each other point-to-point. The strut 11D corresponding to s becomes concealed within this point-to-point connection. The imaginary bounding box 24 around the lattice frame shows the 4D cubic space comprised of two cubic half-PT spaces joined by s as in FIG. 9 identified by the H—He connection. The vector star 23*a* is also shown as two joined vector stars 23. The colors of blocks are indicated in 81*a*, with s=−1/2 elements being a bit lighter than s=1/2 elements.

Figure 19:
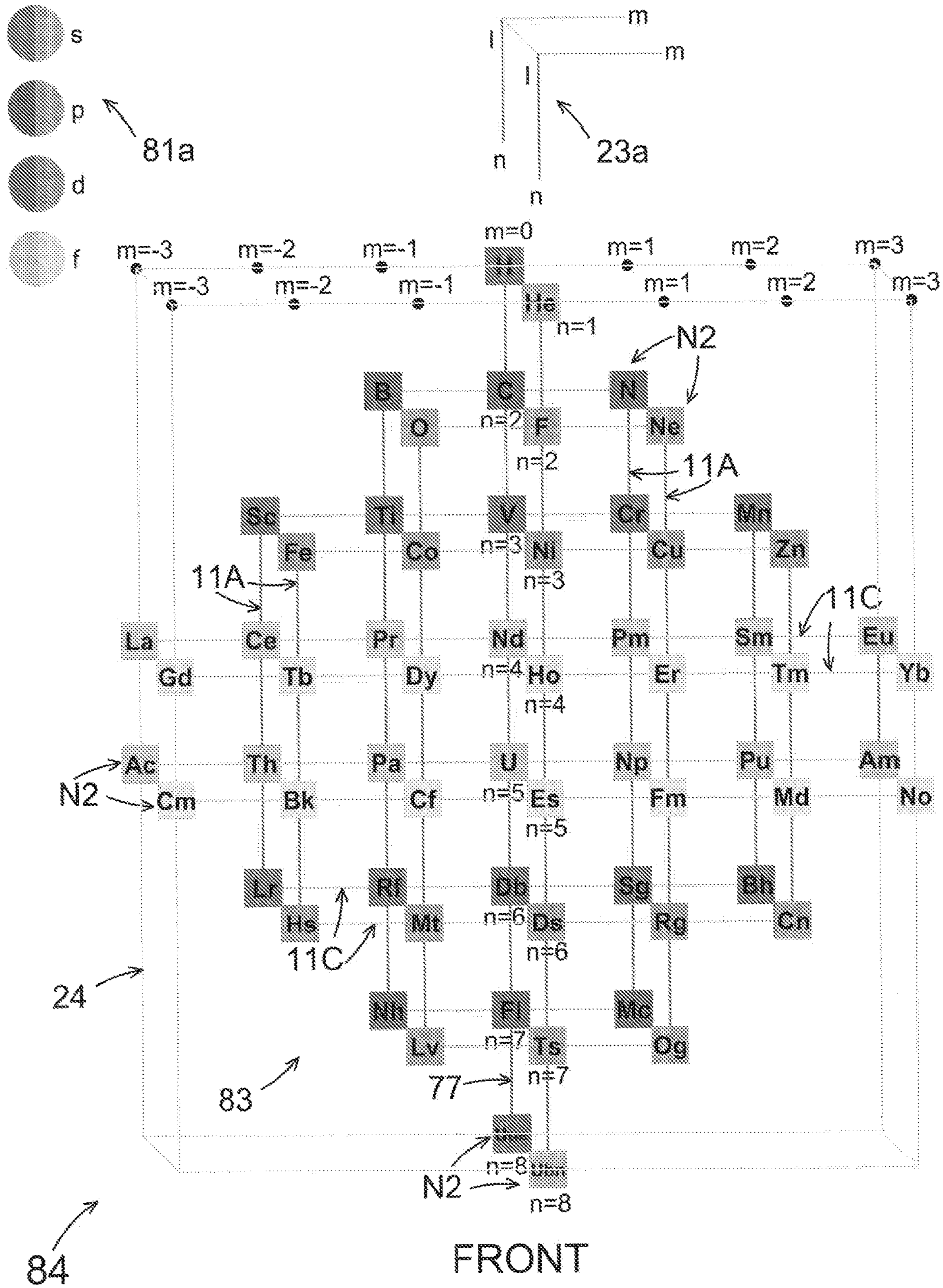
FIG. 19 shows the front view of 4D1 in FIG. 18.

FIG. 19 shows a front view 84 of the 4DPT 83 (4D1) in FIG. 18 where the angled s direction is clear from the point-to-point connection of the cubes N2 in one half-PT 77 to the other half-PT. This direction corresponds to the Front Left Down position in FIG. 12 and corresponds to the H—He connection.

Figure 20:
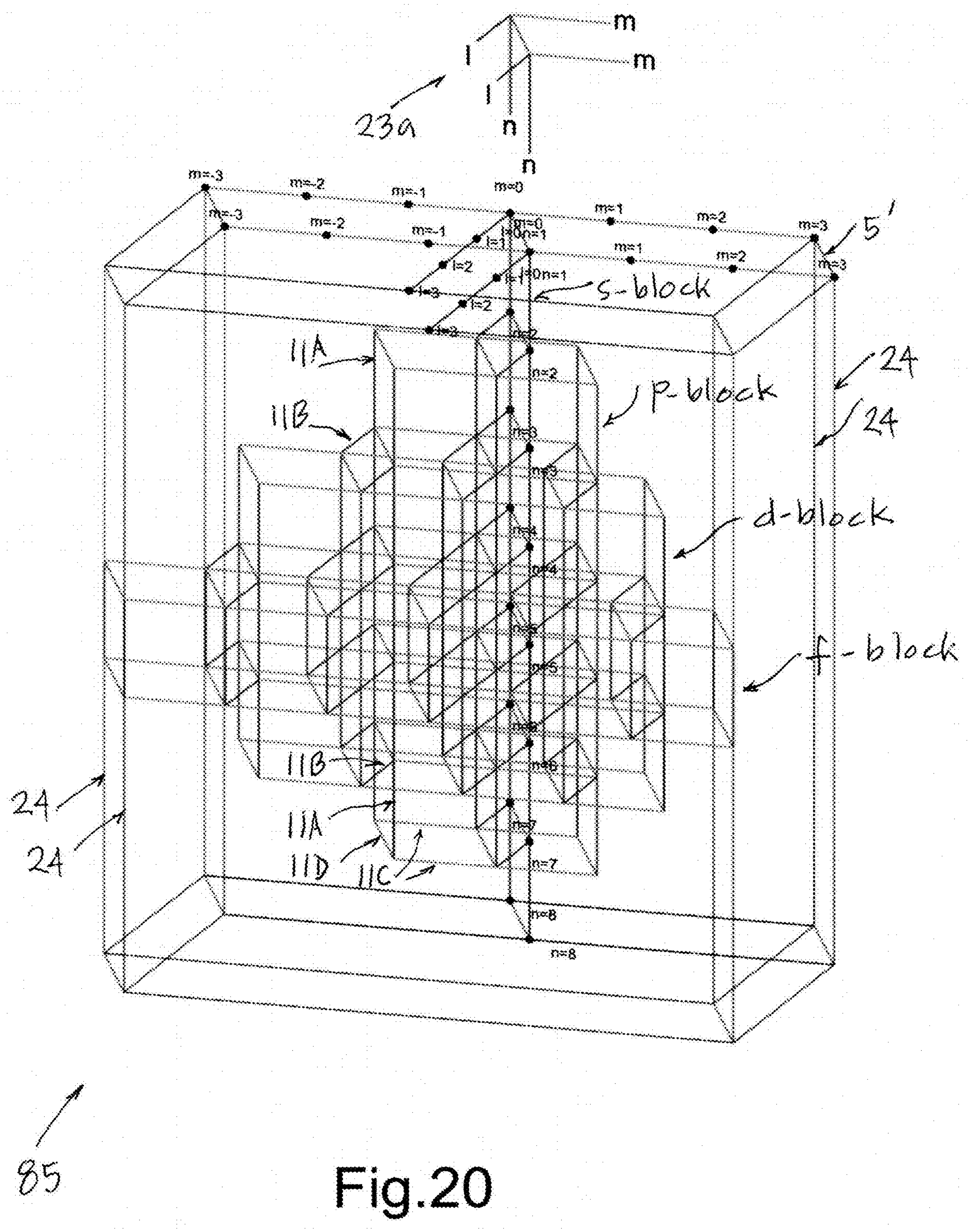
FIG. 20 shows the 4D-cubic lattice projected in 3D, the underlying structure of the 3D PT in FIG. 18.

FIG. 20 shows a 4D-cubic lattice frame 85 of the periodic table in FIG. 18. The imaginary bounding box 24 around the lattice frame shows the outer extent of the 4D cubic space. The four electronic blocks, s-, p-, d- and f-blocks, are indicated. They can be visually identified as boxes of varying heights and widths but same depth and composed of n-struts 11A, m-struts 11C and s-struts 11D. The blocks are nested together and are joined by l-struts 11B.

Figure 21:
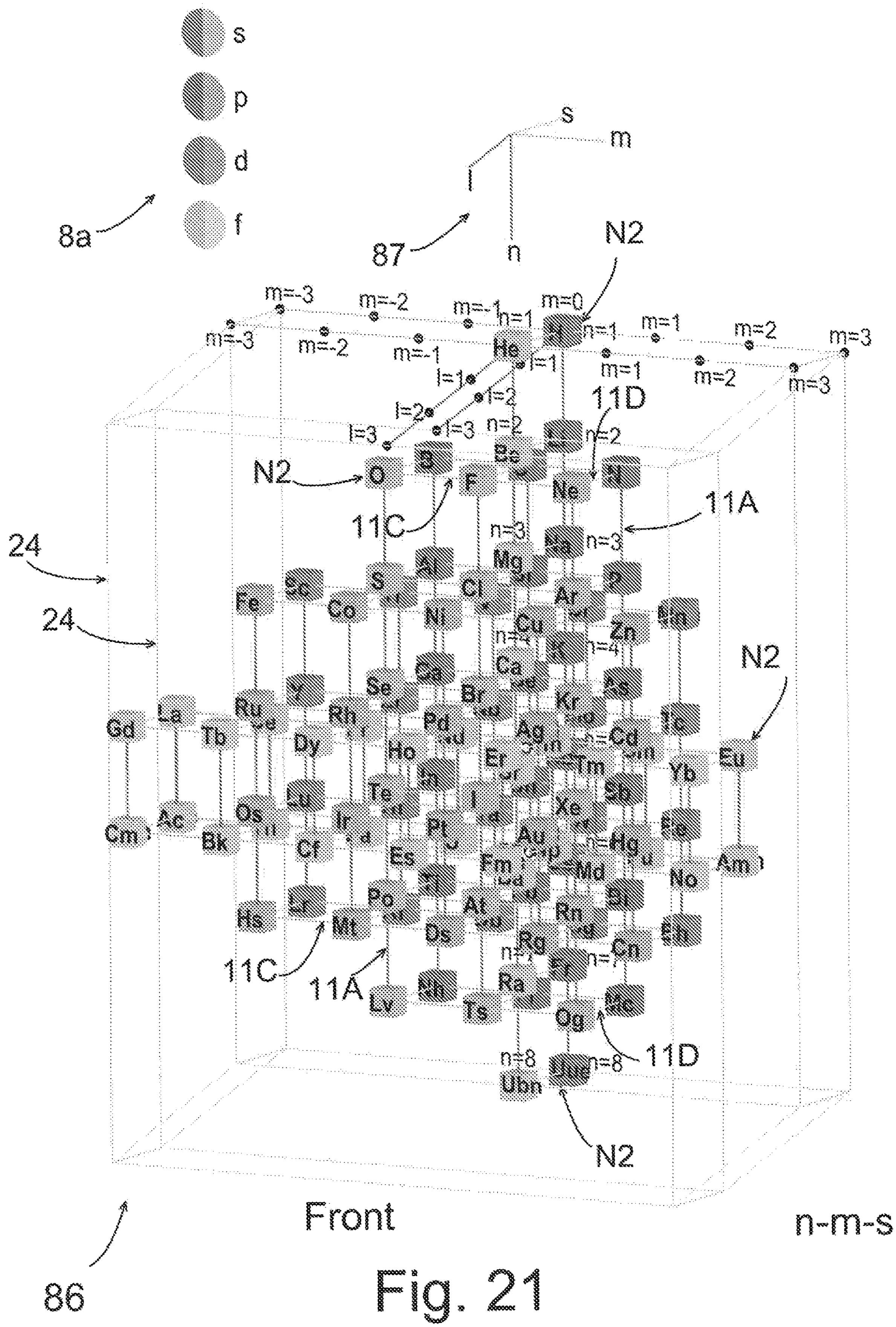
FIG. 21 shows another 3D PT (4D2) derived from the 4D PT and based on the n-m-s cube.

FIG. 21 shows another 3D model of the 4D PT (4D2) corresponding to n-m-s cube with cubic nodes N2 where the three directions corresponding to n, m, s are at right angles to each other and also emanate from the center of a reference cube to its faces and the fourth direction corresponding to l is at an angle from center to cubic node to its corner. It is constructed with n-struts 11A, m-struts 11C and s-struts 11D at right angles to each other and l-struts 11B at an angle to the other three. Here, the nodes connect point-to-point along the I-direction. It is shown with its vector star 87, the color code for nodes in the four blocks in 81*a*, and the imaginary bounding box 24.

Figure 22:
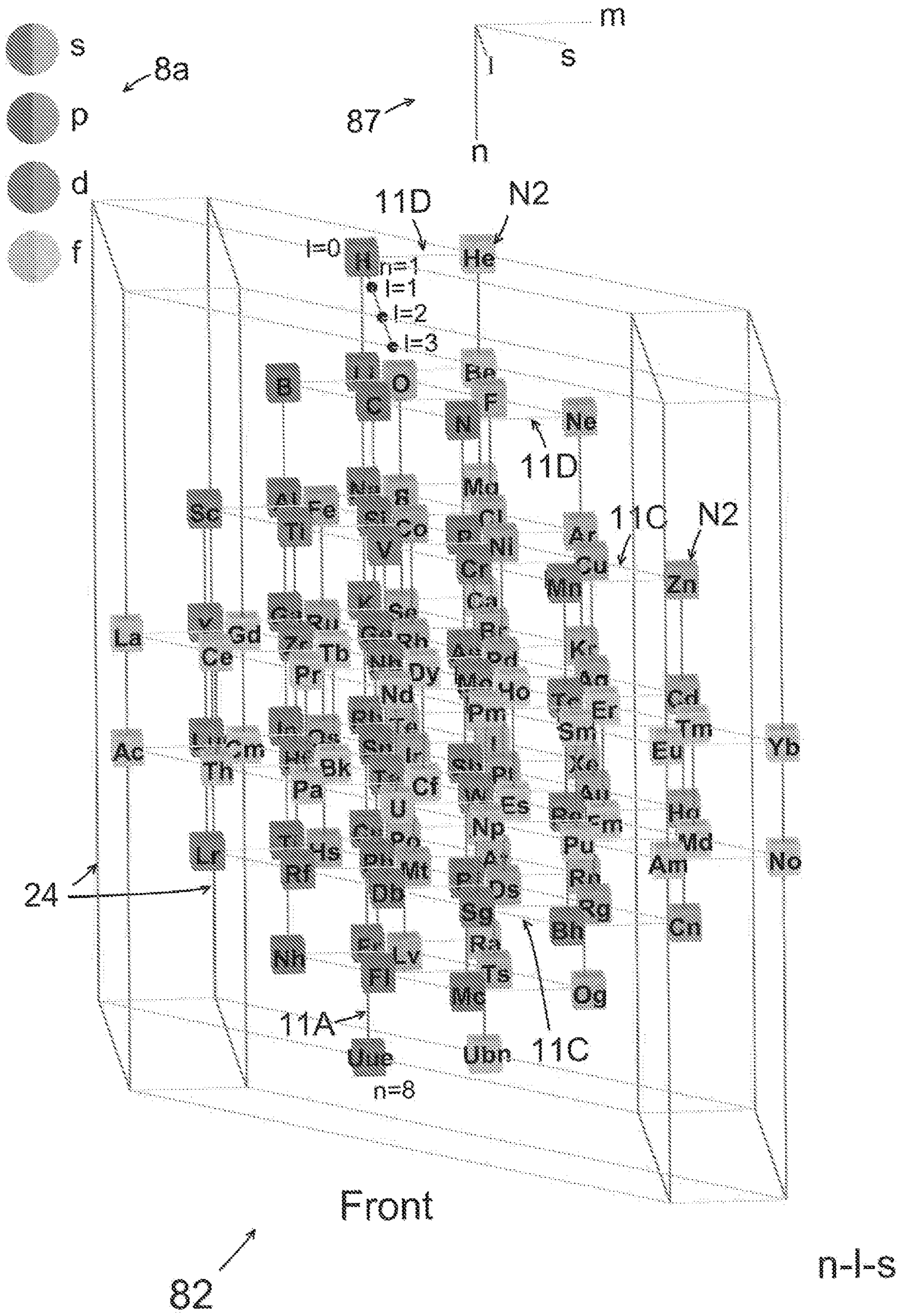
FIG. 22 shows a third 3D PT (4D3) derived from the 4D PT and based on the n-l-s cube.

FIG. 22 shows a different 3D model of the 4D PT (4D3) corresponding to n-l-s cube where three directions corresponding to n, I, s are at right angles to each other while the fourth direction m is at an angle of 45 degrees to s. It is constructed from N2 nodes, n-struts 11A, l-struts 11B, m-struts 11C and s-struts 11D. It is shown with the vector star 89 and the color codes for the nodes and the electronic blocks. Here the imaginary 4D bounding box surrounding the PT shows the hyper-cubic space more clearly.

Figure 23:
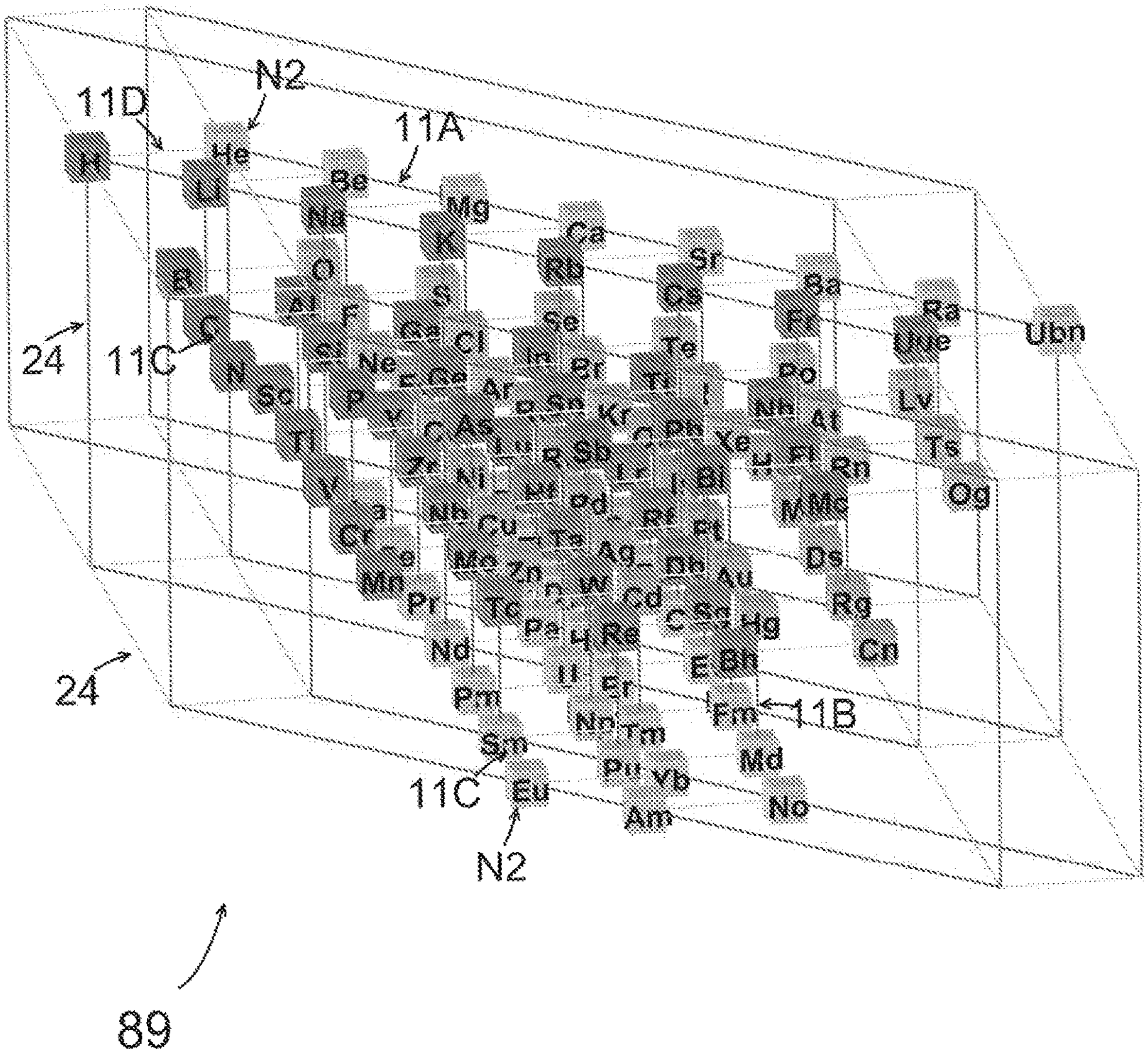
FIG. 23 shows a fourth 3D PT (4D4) derived from the 4D PT and based on the l-m-s cube.

FIG. 23 shows a fourth 3D model of the 4D PT (4D4) corresponding to l-m-s cube in l,m,s are at cubic angles and n is at 45 degrees to s. It is constructed from N2 nodes, n-struts, l-struts, m-struts and s-struts. Here too the imaginary 4D bounding box clearly highlights the hyper-cubic space.

Figure 24:
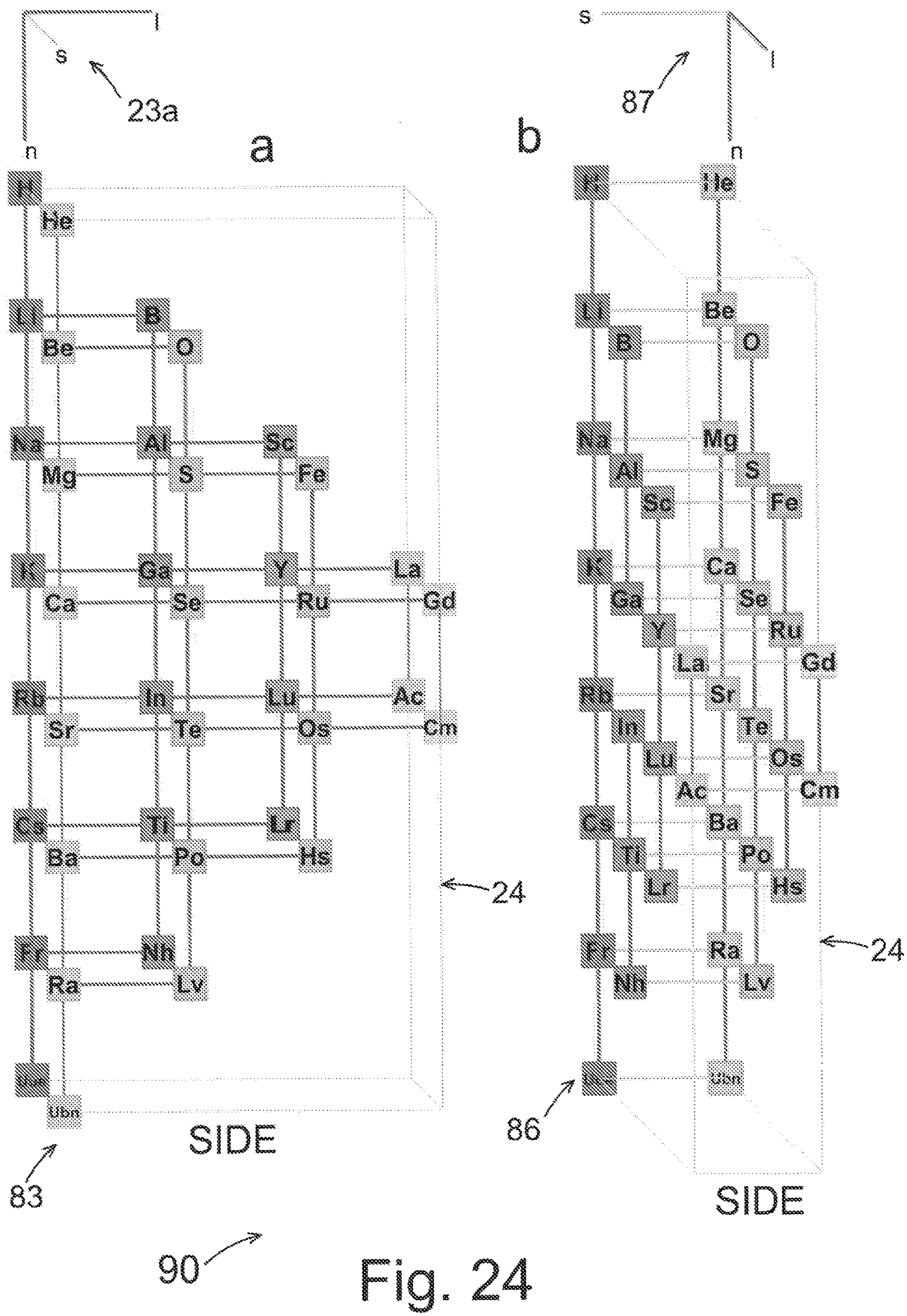
FIG. 24 compares the side views of the two PTs, 4D1 and 4D2.

FIG. 24 shows 91 in comparative side views of 83 (4D1) and 86 (4D2) which reveal how the 4 electronic blocks are clearly separated in 4D1 while they are nested in 4D2. This provides two different ways to represent the same 120 elements, both as 3D models of 4D PT, and both having the same underlying topology which is described next. This underlying topology is an important part of the invention since it determines the structure of the PT and how the elements are connected to their neighbors.

Variations

Figure 25:
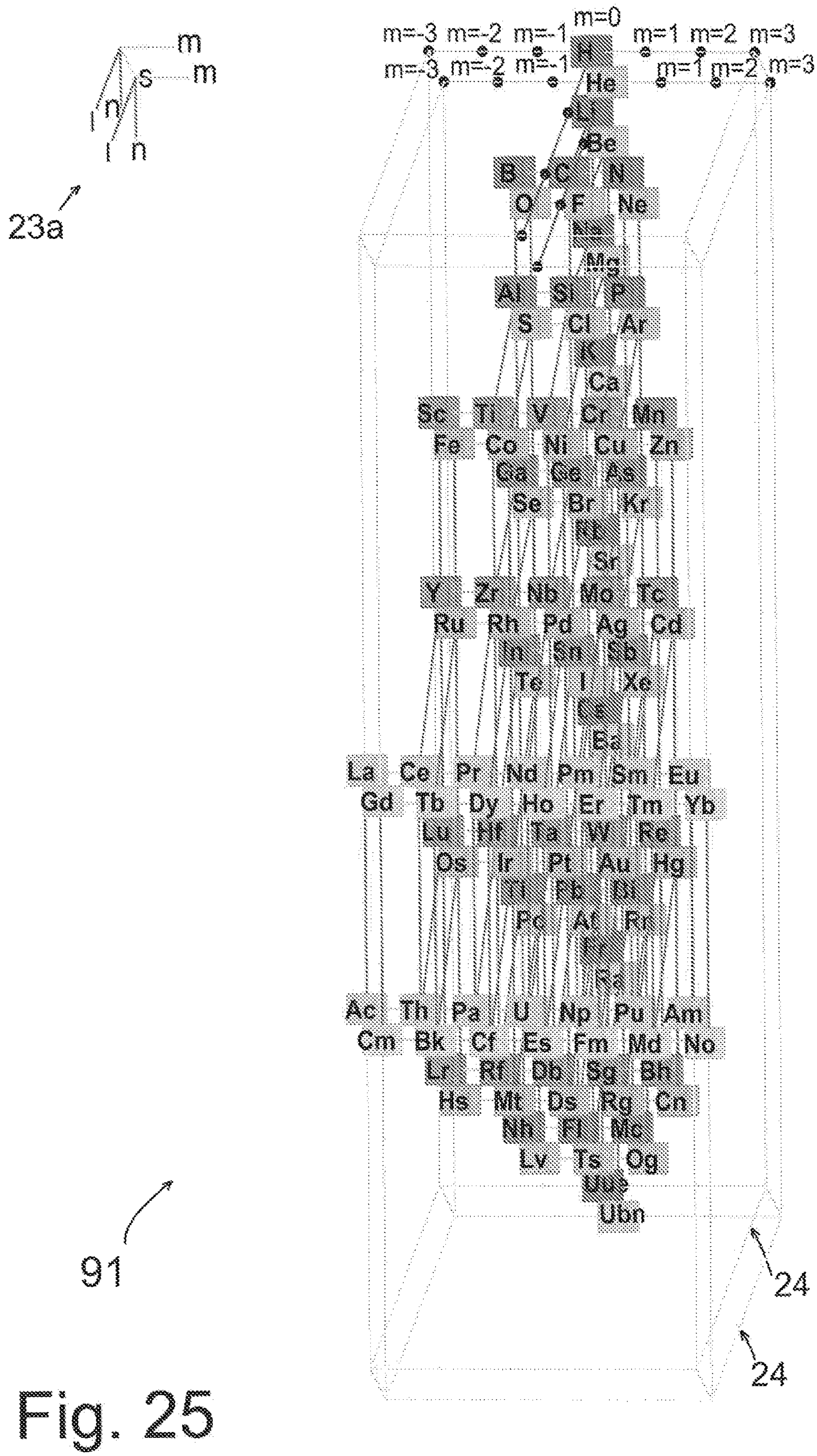
FIG. 25 shows a variant of 4D1 where the blocks have been re-arranged so the atomic numbers of elements are in a continuous number sequence from 1 thru 120 starting from top.
Figure 26:
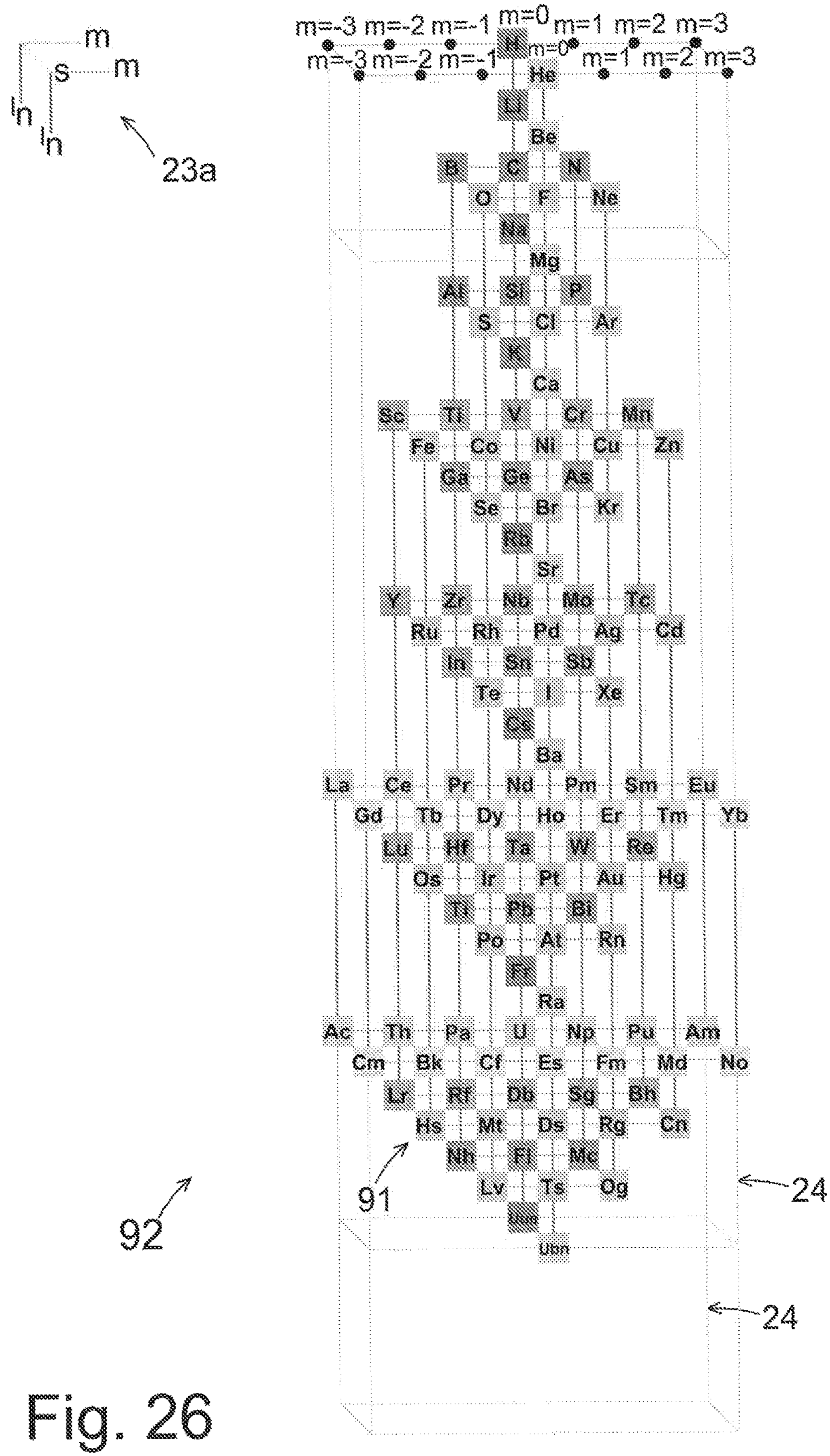
FIG. 26 shows the front view of the PT in FIG. 25.
Figure 27:
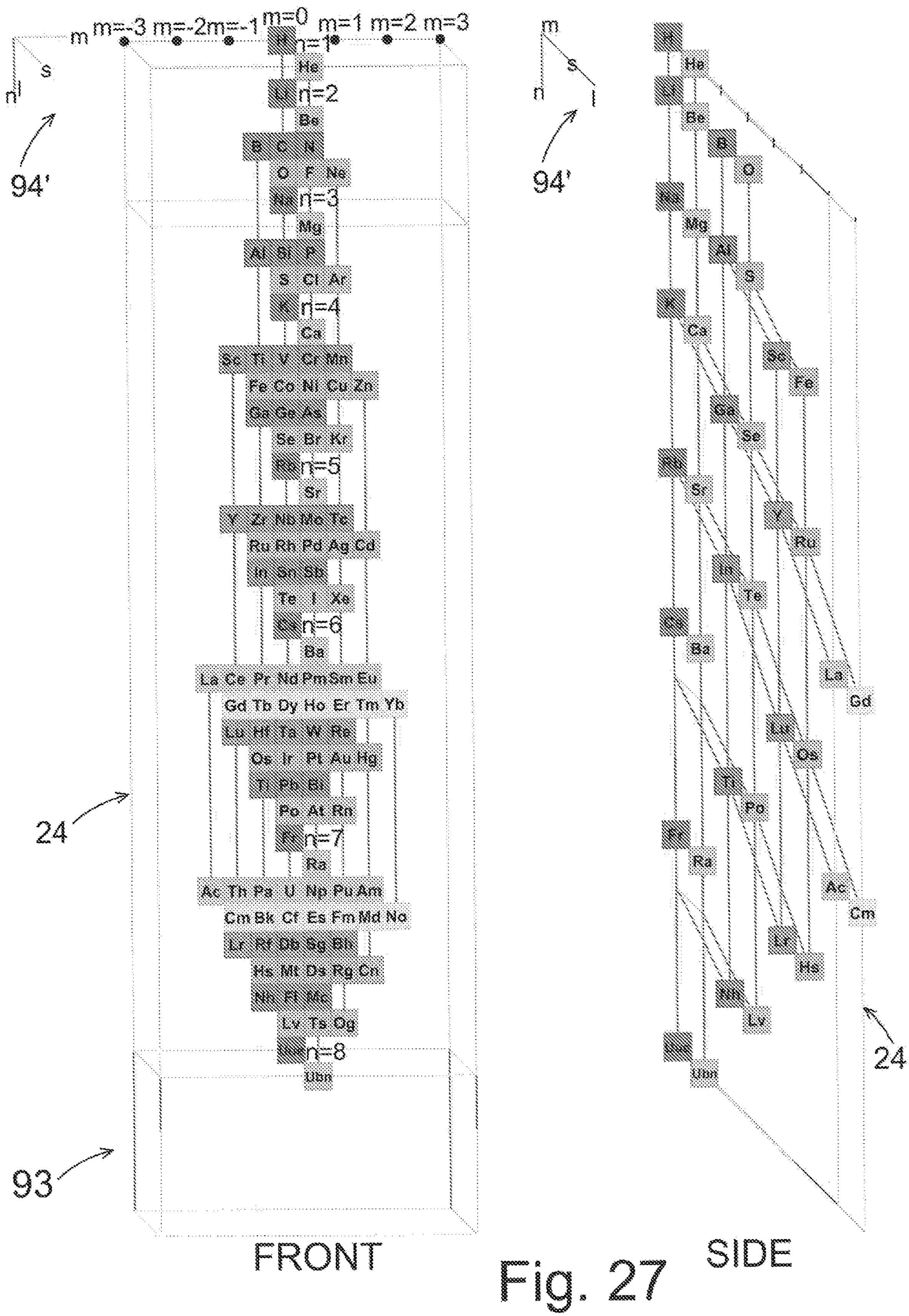
FIG. 27 shows the front and side views of a 3D PT derived from the one in FIG. 26 by removing horizontal gaps between nodes so the elements touch.

3D Variations: FIG. 25 shows a 3D variant 91, a variation of 83 (4D1) in FIG. 18, derived by a few geometric changes which include bringing the elements closer together along the m-axis, stretching the n-axis non-uniformly (i.e. not in unit increments as 4D1) to permit a continuous atomic number sequence of elements reading from left-to-right and top-to-bottom in its Front view. This Front view 92 is shown in FIG. 26. FIG. 27 shows a further adjustment of the 3D PT by bringing the elements even closer together so they touch along the m-axis. This leads to the variant 93 shown in its Front and Side along with its vector star 94.

2D Variations: FIGS. 28-33 show eight examples of 2D PTs which are Front views of 3D PTs projected from 4D. They are thus variations of 3D PTs 91 and 93. But they also lead to 2D PTs since the Front view is like a flattening of the third dimension. So the examples are flattened versions so all the 4 axes lie on the same 2D x-z plane and their y-components equal 0 (x,y,z components refer to FIG. 12). Since the flattening doesn't change the connectivity of the PT, all are topologically isomorphic to each other and to the 3D PTs in FIGS. 25 and 26. In all eight, n is vertical, m is horizontal, s is at an angle of 45 degrees to n, and l varies from vertical to angled positions. In three of these, 94 and 95 in FIGS. 28 and 96 in FIG. 29, the l-axis (joining Li—C) is vertical and aligned with n. In 99 in FIG. 29, l is tilted to the right and in 103 in FIGS. 30 and 106 in FIG. 31, l is tilted to the left. These are thus rotations and elongations of l-axis with its vertical component (Lz) fixed while Lx varies from −ve (left tilt), 0 (vertical), and +ve (right tilt). The other difference is the shape of the 2D tile representing each element. In 94 (FIG. 28), 96 and 99 (FIG. 29), the square tile is aligned with vertical and horizontal axes. In 95 (FIG. 28) and 106 (FIG. 31), the square tile is turned at 45 degrees and in 103 (FIG. 32), the tile is a rhombus tilted to the left. 95 (FIG. 28) also shows the continuous atomic numbers for the 120 elements, with the numbers corresponding to the tile locations in 94 (FIG. 28) and 96 (FIG. 29). Since all six PTs are isomorphic, the l-rotations in other PTs do not change this continuous number sequence the others.

Figure 32:
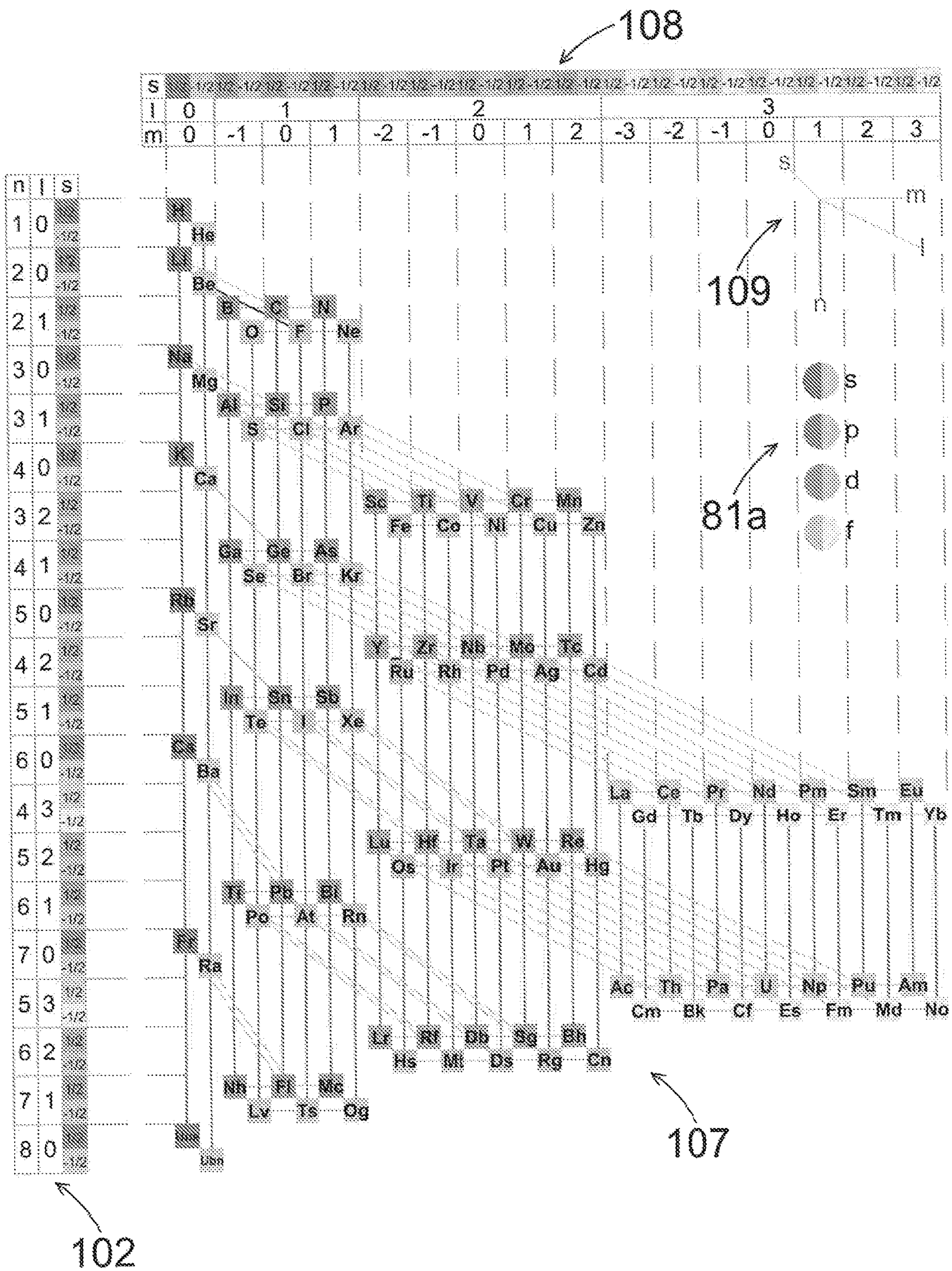
FIG. 32 is a variant of the 2D PT in FIG. 29 with the 4 electronic blocks shifted to the right so they do not overlap.
Figure 33:
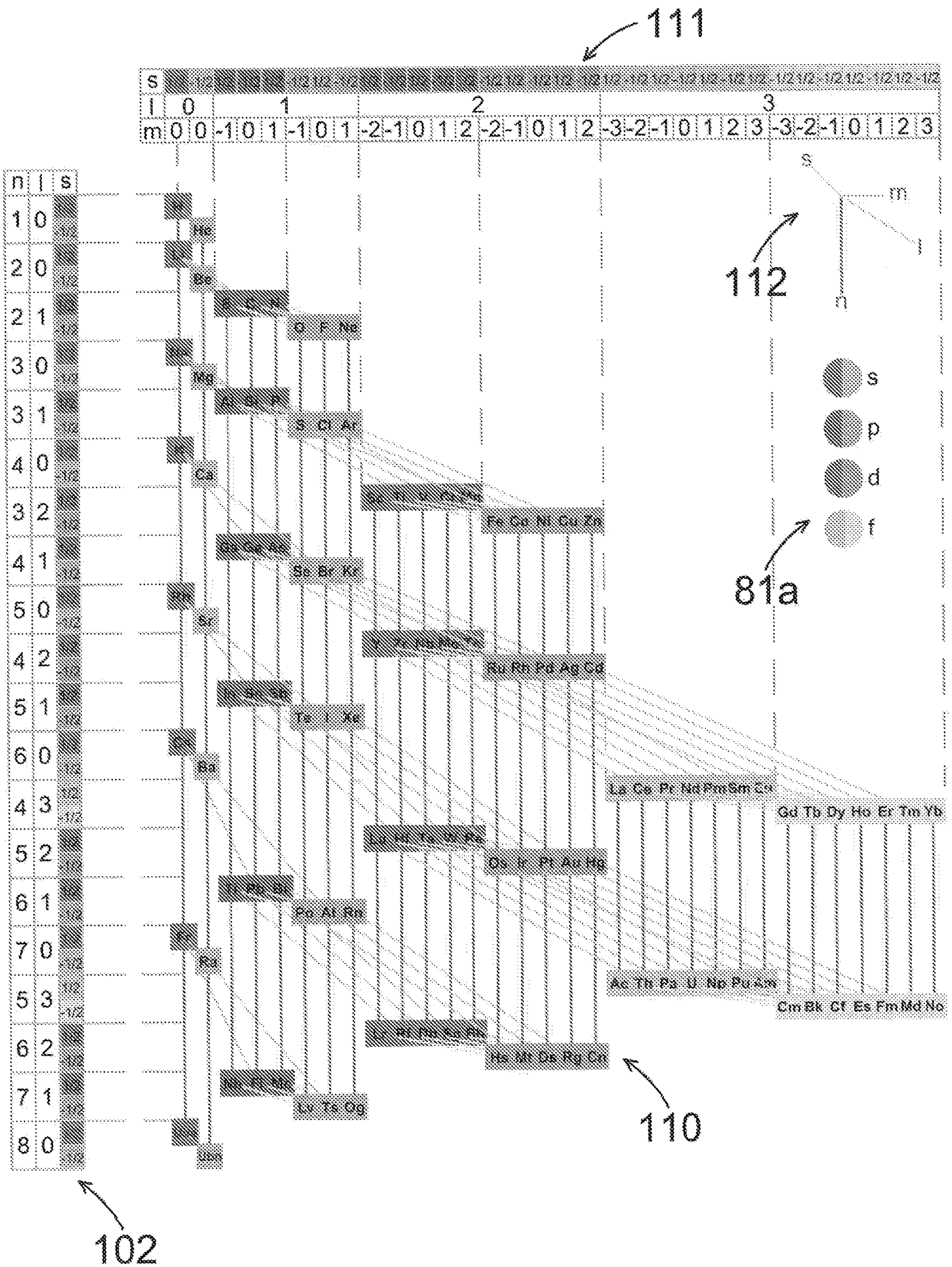
FIG. 33 is a variant of the 2D PT in FIG. 32 where the s=1/2 and −1/2 elements are clearly separated by a horizontal shift.

FIG. 32 shows a PT 107 which can be derived from 99 in FIG. 29 by a further change in the I-axis which is here titled to the right in incrementally changing angles and lengths so all four electronic blocks are clearly separated. The blocks are no longer nested as in the earlier six PTs. In 110 (FIG. 33), the half-blocks are no longer nested and are separated further by rotating and elongating the s-axis. This PT configuration is closer to some of the known PTs since the elements correspond to the chemical Periods along the horizontal m-axis with the difference that this PT is topologically isomorphic to the 3D PTs in FIGS. 25-27.

4. 4D Topology: The space frame in FIG. 20 is the underlying 4D network of 4D-1 and is topologically identical to the networks of 4D2, 4D3 and 4D4 (FIGS. 21-23), 3D variants in FIG. 25-27 and the 2D derivatives in FIGS. 28-33. Each network has the same topology and comprises the following topological elements: 120 vertices (one for each chemical element), 284 edges, 238 faces, 83 3D cells (cubes), and 10 4D cells (4-cubes or hyper-cubes). These provide natural groupings of elements in the 4D PT. The groupings correspond to the vertices, edges, faces, cubes and hyper-cubes in the 4D PT. These edge connections lead to diads (element pairs), the square faces lead to tetrads (groups of 4 elements), the cubes lead to octads (groups of 8 elements) and the hyper-cubes lead to hexa-decads (groups of 16 elements). The 4D topology produces hierarchical groupings of elements into a binary sequence 1, 2, 4, 8,16.

4.1 Euler-Poincare Equation: The numbers of topological elements in increasing dimensionality from 0 thru 4 mentioned above are represented by N0, N1, N2, N3 and N4 (Table 1, FIG. 34). Their numbers satisfy the following relation $$N0-N1+N2-N3+N4=1 \tag{1}$$

This equation can be easily derived from the well-known Euler-Poincare (or Euler-Schlafli) formula for higher dimensional structures [Coxeter, 1973; Loeb, 1976].

Equation (1) specifies an absolute topology of the 4D periodic table when all topological elements of all dimensionalities (0 through 4) are fully expressed. It applies to examples mentioned in FIGS. 18-33. It also provides one invariant in the continuously morphing of these 3D and 2D PTs derived from 4D. These continuous transformations are topology-preserving. Some degeneracies are obtained when vector directions overlap and becoming collinear. In doing so some faces and cells are lost as in some cases mentioned later. Such tables have a degenerate topology and equation (1) no longer holds. Examples of the latter include the 3D PTs in FIGS. 39, 42-44, 46-48, 51, 53 and 54, and the 2D PTs in FIGS. 55-64.

An invariant topology of the periodic table in Table 1 is one answer to the question "Is there a best form for the periodic table?" [Scerri, 2007]. Here the term "best form" is interpreted as the one in which all topological elements inherent in the periodic table having 4 independent quantum numbers are clearly expressed or visible. In the currently known 2D and 3D periodic tables some of these topological elements are repressed or not visible. The continuous transformations of the periodic table by rotations of vectors also addresses, in part, the second part of this discussion which deals with many different periodic tables. For a fixed topology, infinite geometric variations or transformations of the same periodic table can be obtained. Geometric transformations like changes in lengths of vectors and variable changes in lengths and angles are shown in FIGS. 22-24, 26, 27, 28, 29, 30 but do not change the underlying topology. These are useful to express features of the PT like continuous atomic number sequences or elements as in FIGS. 22-28 or their separation into Periods to display their periodic properties as in FIGS. 29 and 30.

4.2 Element Connectivity: The 4D lattice structure prescribes a built-in connectivity for each element with its neighboring elements. This is an example where the known values of quantum numbers of elements force a connectivity between them in a very specified manner when mapped in 4D space as disclosed herein. Element connectivity is here defined by the number of elements that are connected to its neighbors directly by edges of the lattice. In topological terms, this is the "vertex valency" of a graph or network and equals the number of edges meeting at that vertex. Though any element in the periodic element can be connected to any other within or without the block, the connection by edges provides the most direct connectivity along the 4 quantum number directions and determines this number. The edge connection between 2 adjacent elements is a one-step change in a quantum number, i.e. only one of the 4 quantum numbers is changed by one unit at a time. This is the minimum change from one element to another and may have implications for chemo-genesis.

Figure 35:
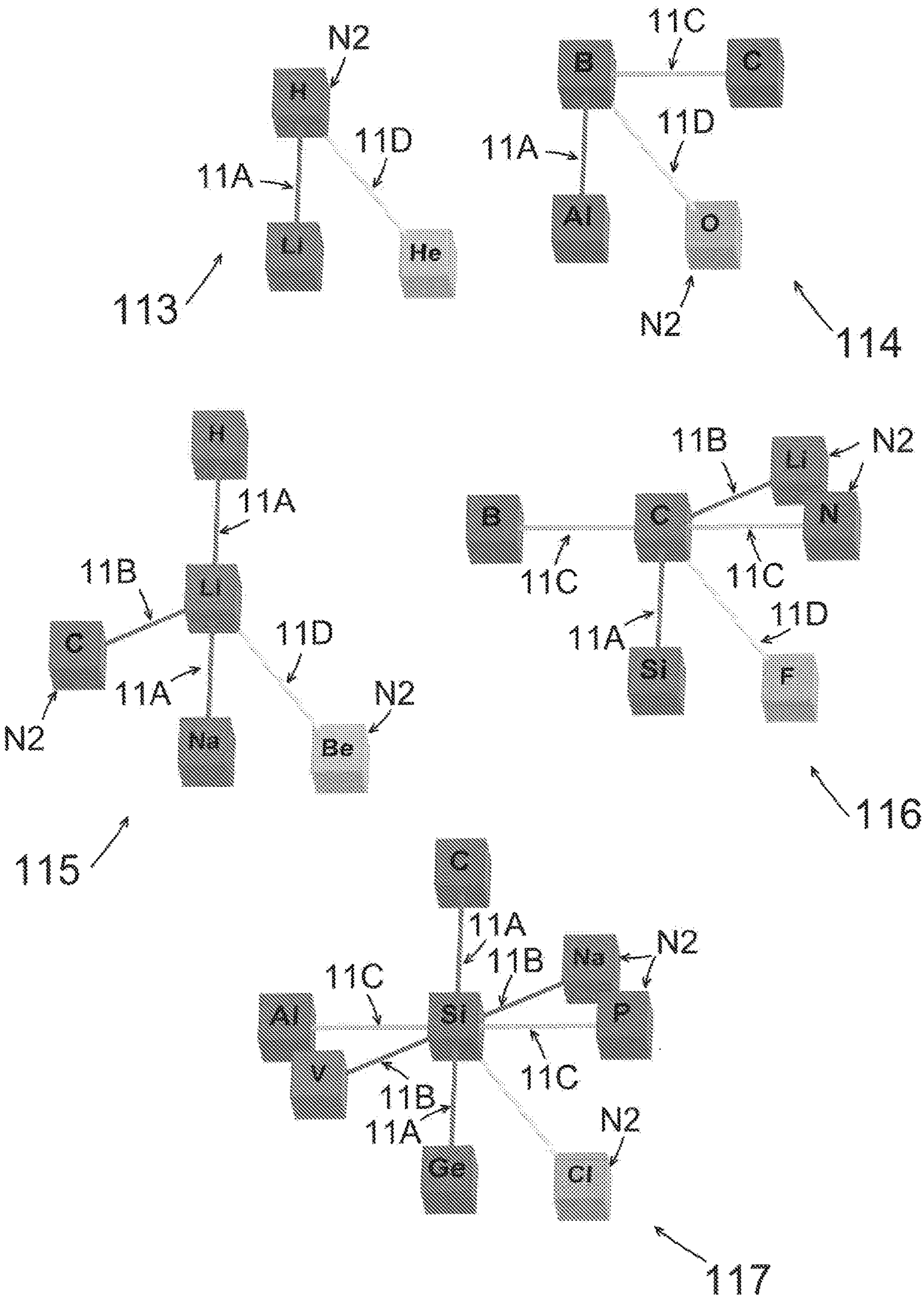
FIG. 35 show varying connectivity between elements in the 4D PT. Examples are shown with H, B, Li, C and Si which have corresponding connectivity of 2,3,4,5 and 7 with their neighboring elements.

FIG. 35 shows the element connectivity for five early elements in the periodic table. Each element is shown with its four quantum numbers so the changes in each quantum number can be inspected easily. These changes follow the vector star on top left. The element connectivity shows ranges from 2 for H in 113 where H connects only to He and Li directly along the edge of the lattice; to 3 for B in 114 which connects only to C, O and Al; 4 for Li in 115 which connects to H, Be, Na and C; 5 for C in 116 which connects to N, Li, B, F and Si; and 7 for Si in 117 which connects to C, Na, Al, Cl, Li, V and P. These numbers, 2, 3, 4, 5 and 7, are the only available values of element connectivity in the periodic table. The absence of connectivity value of 6 is a surprise. Table 2 (FIG. 36) shows the element connectivity of all 120 elements in the 4D periodic table. The table is broken up into 2 columns with s=1/2 elements on left and s=−1/2 elements on its right. Each column is broken further into the 4 blocks. The third column on extreme right indicates the location of each element with respect to the entire block. These locations are the Vertex location at outer corners of a block, the Edge locations at the outer edges of the block, and the Face locations are within the outer or interior faces of blocks. Since the s-block is 2-dimensional, it has only Vertex and Edge locations. The 4 elements at the corners of the s-block have a connectivity value 2, and elements along its edges have a value 4. The p-, d- and f-blocks are 3-dimensional and have 3 distinct locations. There are 8 elements at their corners (Vertex locations) with a connectivity value 3. The elements on the outer edges of each block (Edge locations) have a value 5. Elements on faces of the block (Face locations) have a value 7. Since f-block has no interior vertices, value 7 is absent.

Figure 37:
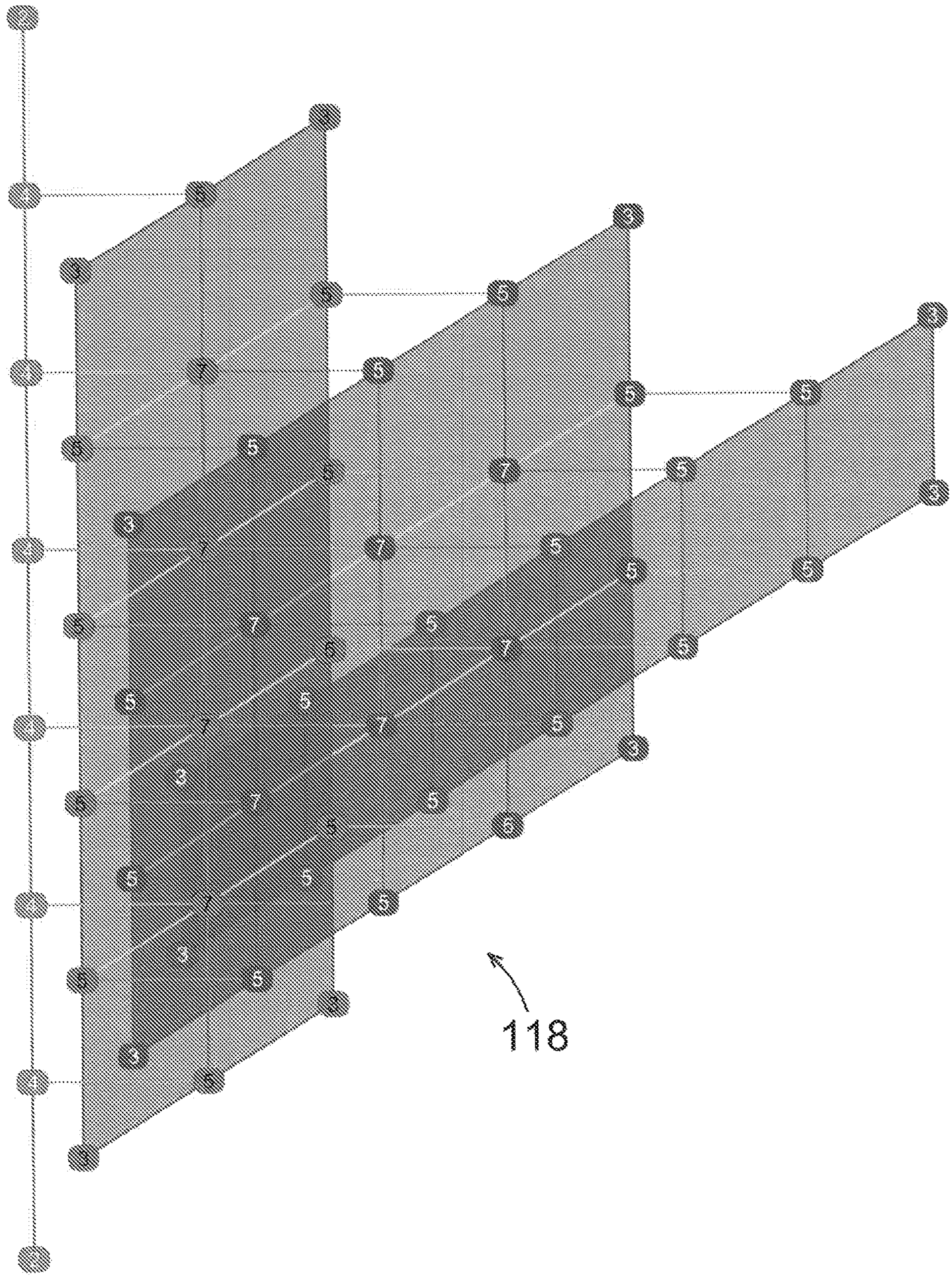
FIG. 37 shows the connectivity of 60 elements in the half-PT.

In FIG. 37, 118 shows the distribution of element connectivity in the 60 s=1/2 elements in the half-PT 77 in FIG. 17*b*. Their corresponding connectivity values within each block is indicated and corresponds to Table 2. The connectivity values of s=−1/2 elements are identical to corresponding s=1/2 elements, indicating a mirror symmetry in these value within each block. The overall symmetry in the connectivity values within p-, d- and f-blocks corresponds to mmm, the crystallographic symmetry group of a rectangular parallelepiped (box, brick) since each block has three orthogonal 2-fold axes of rotation and also three orthogonal mirror planes. For the 2-dimensional s-block, the connectivity values have a crystallographic symmetry mm2 with one 2-fold axis of symmetry and two orthogonal mirror planes meeting at it.

Like the number of topological elements in Table 1, these element connectivity values in Table 2 are also absolute in the 4D periodic table. The numbers in Tables 1 and 2 are one way to test if a periodic table has a 4D structure. If a periodic table doesn't match the number of topological elements and connectivity values in Tables 1 and 2, it is not fully expressing all available relationships between chemical elements and is topologically degenerate. Some examples are shown in the next section.

5. 3D PTs with Planes from 4D: This section shows a different embodiment of the invention and deals with 3D PTs composed of planes derived from 4D.

FIGS. 38-54 show various examples of 3D PTs derived from the six sets (or families) of planes corresponding to pairs of quantum numbers in FIG. 11. Each set of planes is defined by one of the six quantum doublets, namely, n-l, n-m, n-s, l-m, l-s, m-s. These lead to 6 classes of planes which lead to 6 classes of PTs. Examples of each class are shown. The planes can also be derived from the four quantum triplets which determine the 4 cubes from 4D, namely, n-l-m, n-l-s, n-m-s, l-m-s. Each class comprises many parallel planes since all planes are constrained to only directions prescribed by the quantum doublet. Each individual plane comprises either modules of same color (i.e. same block) or different colored modules with each color representing a different electronic block. In addition, s=1/2 and s=−1/2 elements within each block has a different shade of the same color. Each module represents a group of elements within an electronic block and is determined by a single step change in only one quantum number.

Each plane can be physically constructed as a panel from a rigid material and connected to other panels with physical connector pieces along the directions of the 4 quantum numbers reminiscent of the space frame embodiment. In a variation of this, the imaginary bounding box could be used as a physical space frame to which the panels are physically connected with suitable attachment means. The panel can also be physically constructed form individual modules which are connected to make one rigid panel. individual tiles, each tile representing a different chemical element, ca interlock to make up modules which are combined with other modules to make the panel. The panels are then joined to each other with external joining elements to construct the 3D model of the 4D PT with or without a physical supporting bounding box.

FIGS. 38-54 show selected examples of 3D PTs built from the 6 classes of planes and selected variations within a class to show the scope this embodiment of the invention.

Figure 38:
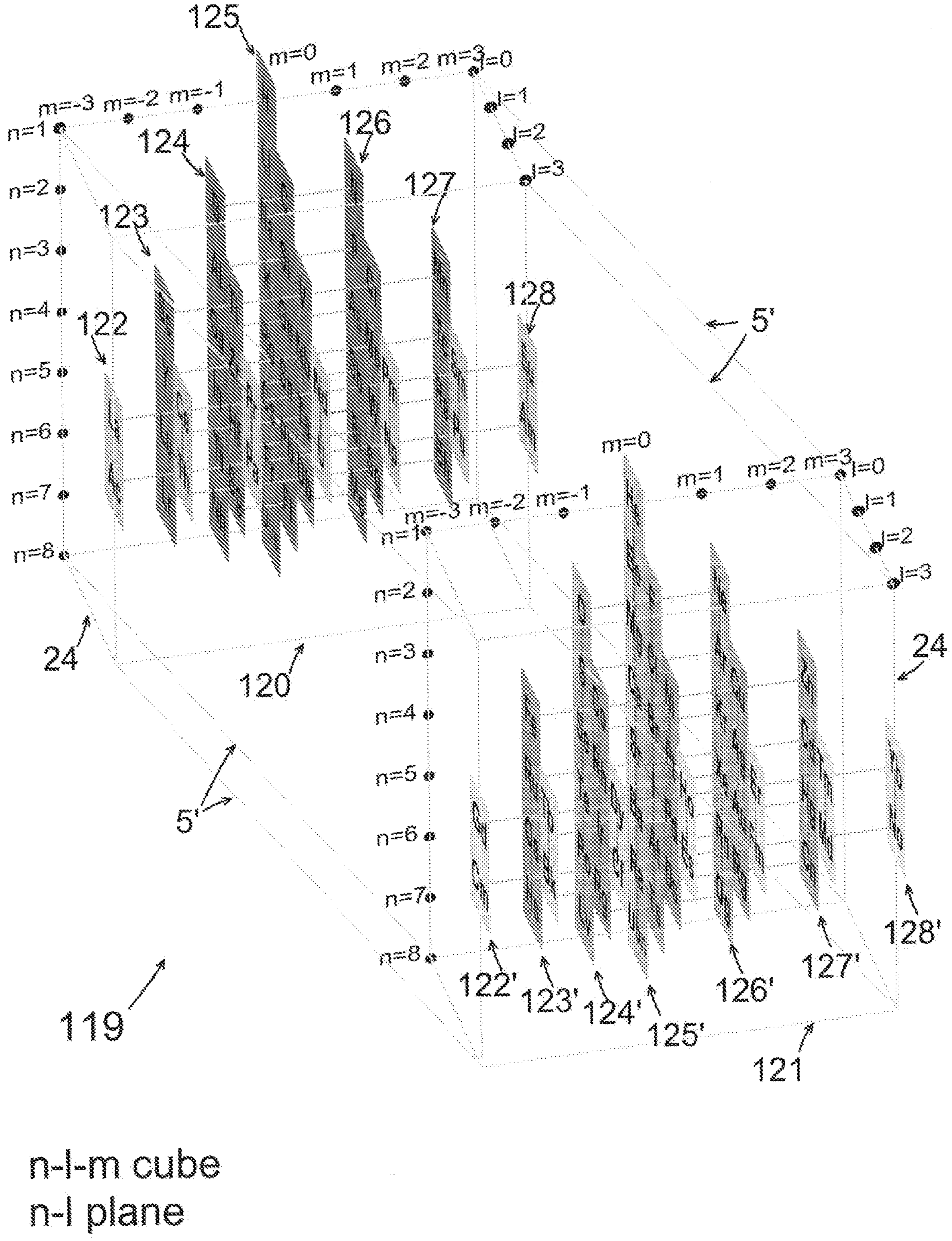
FIG. 38 shows a 3D PT composed of 2D parallel n-l planes based on the n-l-m cube.
Figure 39:
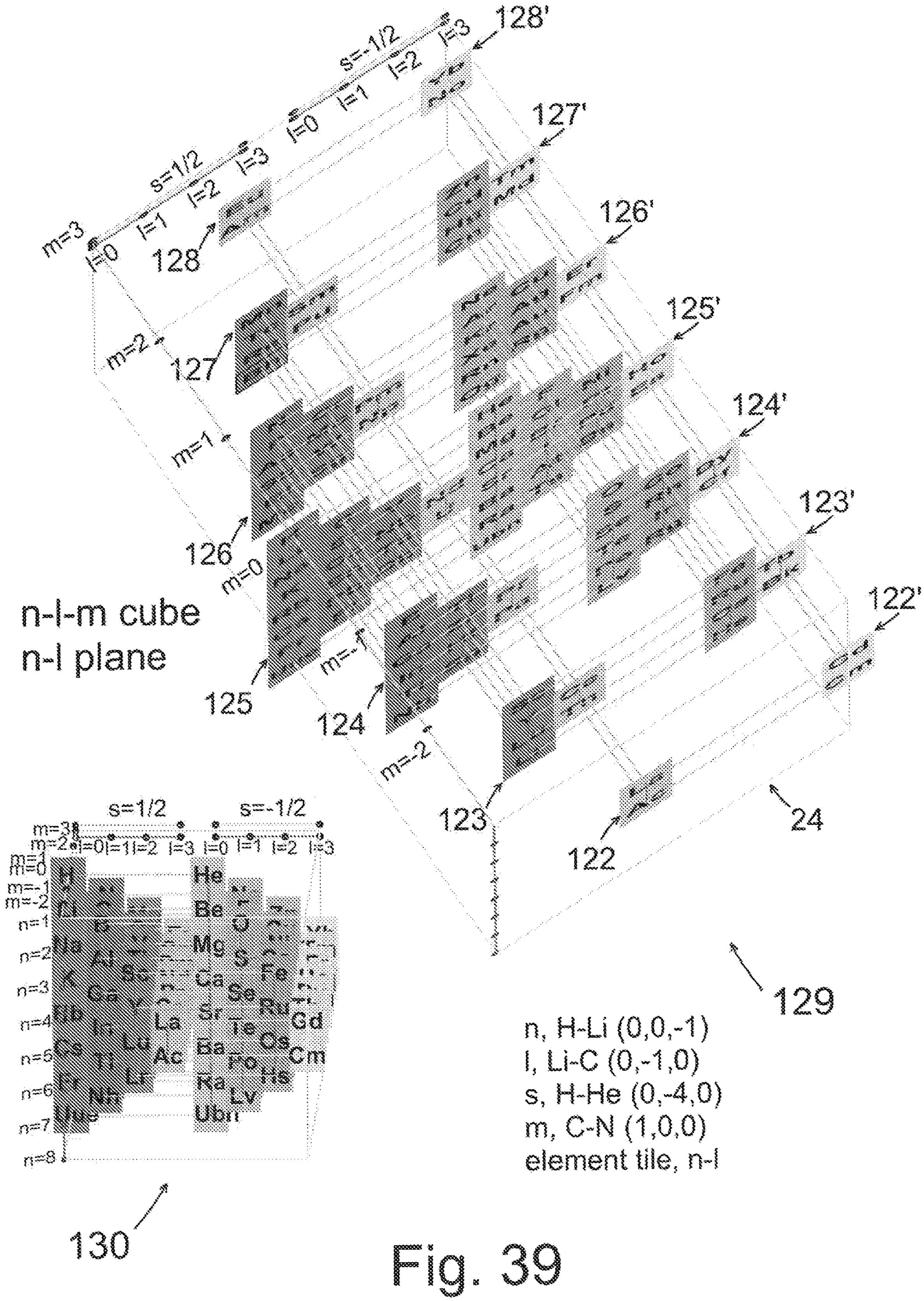
FIG. 39 shows a variation of the 3D PT in FIG. 38 where l is collinear with s.

5.1 n-l-m Cube 5.11 n-l Planes: FIG. 38 shows 119, a 3D PT based on n-l-m cube and built of n-l panels. The s=1/2 and s=−1/2 elements are separate half-PTs 120 and 121, respectively, joined by 5' along s, the fourth dimension. Each half PT has 60 elements on 7 parallel vertical n-l panels constructed as multi-colored panels 122-128 in half-PT 120 and 122'-128' in half-PT 121. Each panel comprises modules in different colors representing the four electronic blocks. The number of elements in successive panels are in a symmetrical arrangement of 2,6, 12,20, 12,6,2. Each panel corresponds to the 7 values of m, namely, −3,−2,−1,0,1,2,3. Each half-PT is embedded in a 3D n-l-m lattice, and the two 3D lattices are joined by s at any angle in 3D space. When s takes on specific locations, for example when it becomes collinear with either n, l or m, three new 3D cubic PTs are obtained. One of these three examples is as shown in FIG. 39 with 129 and 130. The two views are of the same PT shown from different angles with the 14 panels marked as 122-128 (s=1/2) and 122'-128' (s=−1/2).

Figure 40:
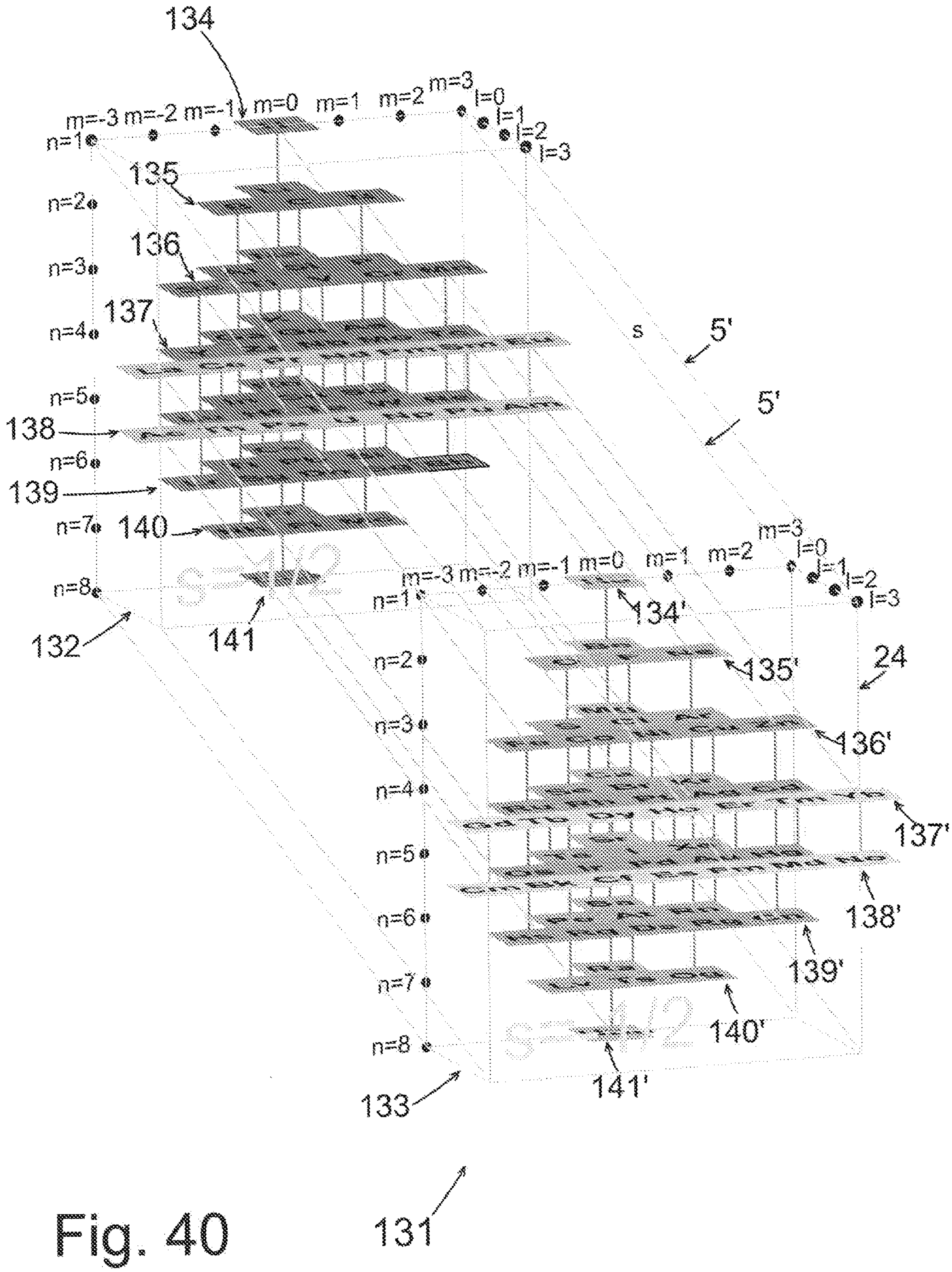
FIG. 40 shows a 3D PT composed of 2D parallel l-m planes based on the n-l-m cube, where s=1/2 and s=−1/2 elements are separated.

5.12 l-m Planes: FIG. 40 shows a 3D PT 131 based on n-l-m cube and built of l-m panels. It comprises two half-PTs 132 and 132 for s=1/2 and s=−1/2 elements, respectively. Each half-PT is based on the n-l-m cube and joined by 5' along s at an arbitrary angle. Each half-PT comprises 8 horizontal l-m panels, 134-141 and 134'-141', all panels parallel to each other. The panels comprise modules corresponding to n=1 thru 8, the elements within modules are defined by the four colored electronic blocks. The numbers of elements in each panel are in order of increasing n and equal 1,4,9,16,16,9,4,1. These numbers are in a series of increasing squares of integers 1 thru 4 in one half, and the reversed sequence in the other half.

Figure 41:
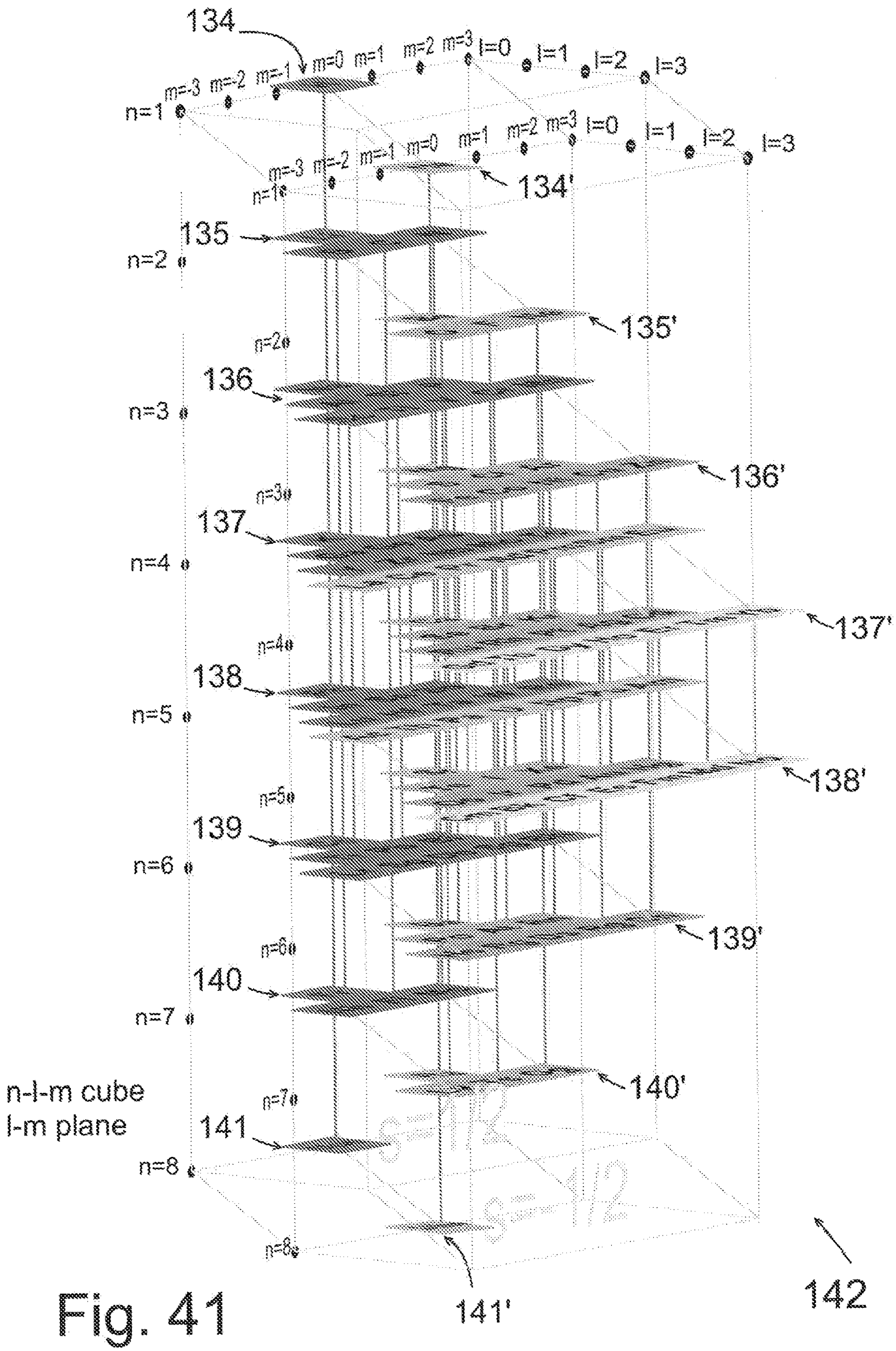
FIG. 41 shows a variation of the 3D PT in FIG. 40 where the s=1/2 and s=−1/2 elements are nested.
Figure 42:
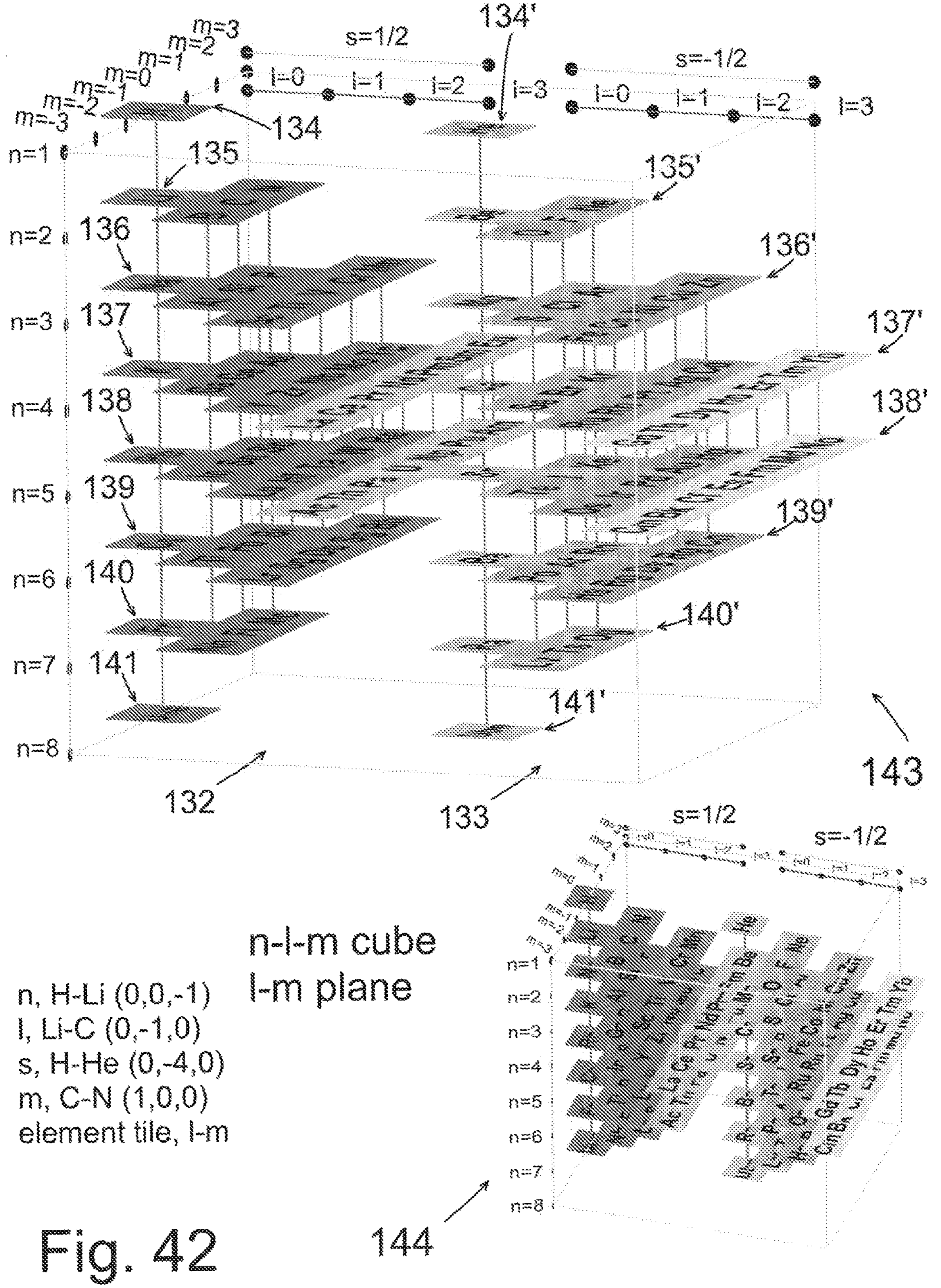
FIG. 42 shows a variation of the 3D PT in FIG. 40 where s=1/2 and s=−1/2 elements are separated and l and s are collinear.
Figure 43:
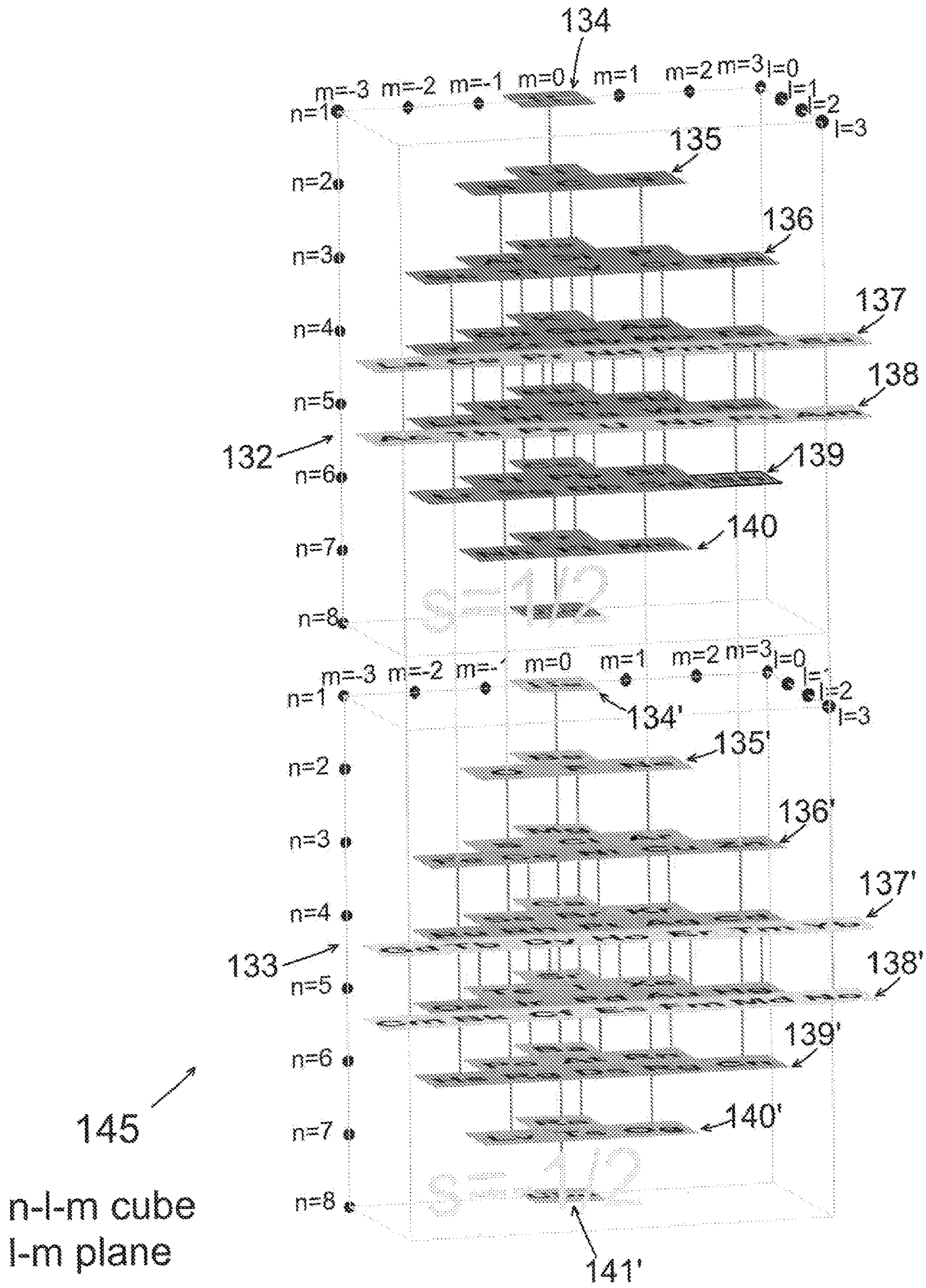
FIG. 43 shows a variation of the 3D PT in FIG. 40, where s=1/2 and s=−1/2 elements are separated and n and s are collinear.
Figure 44:
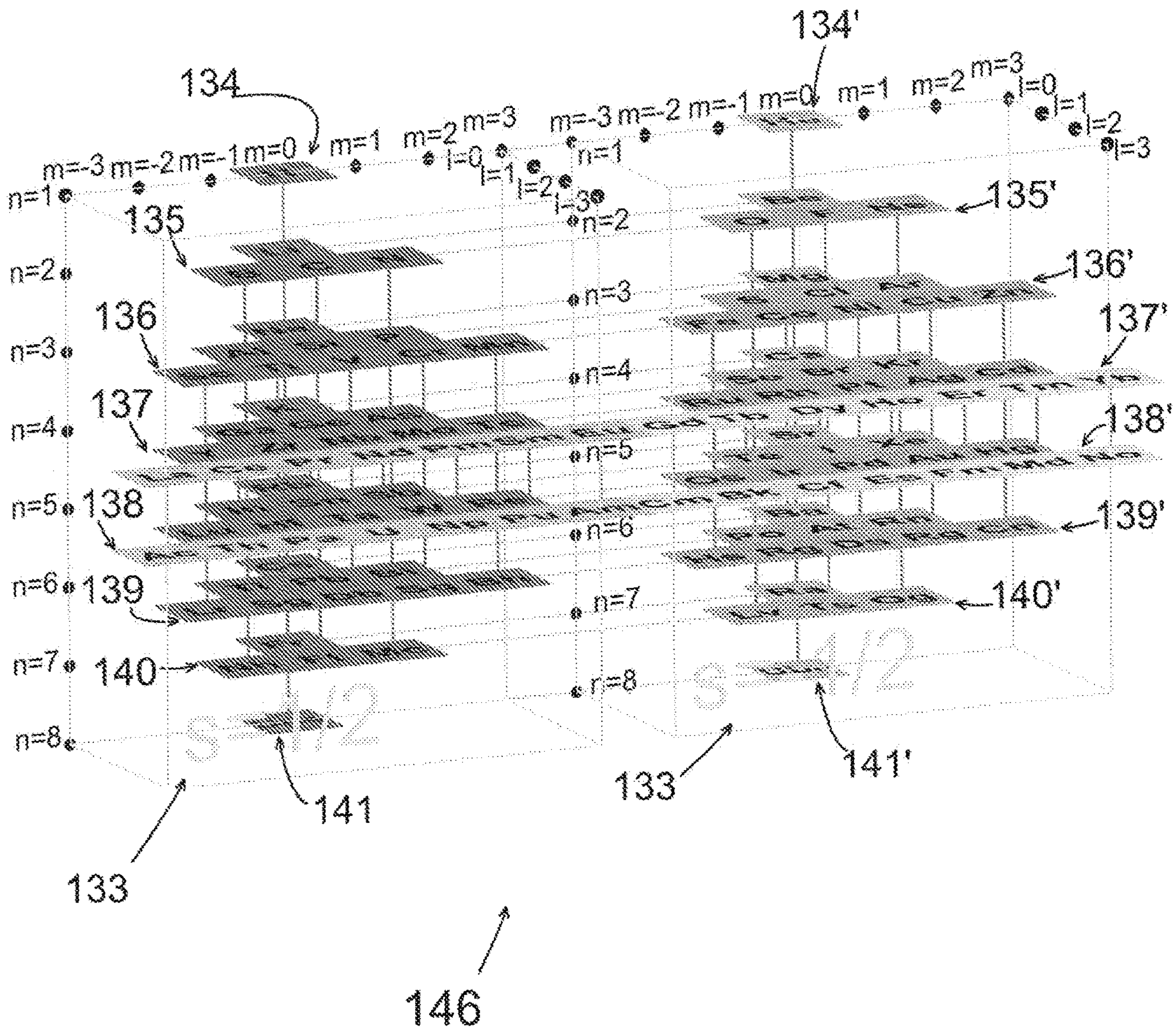
FIG. 44 shows a variation of the 3D PT in FIG. 40, where s=1/2 and s=−1/2 elements are separated and m and s are collinear.
Figure 45:
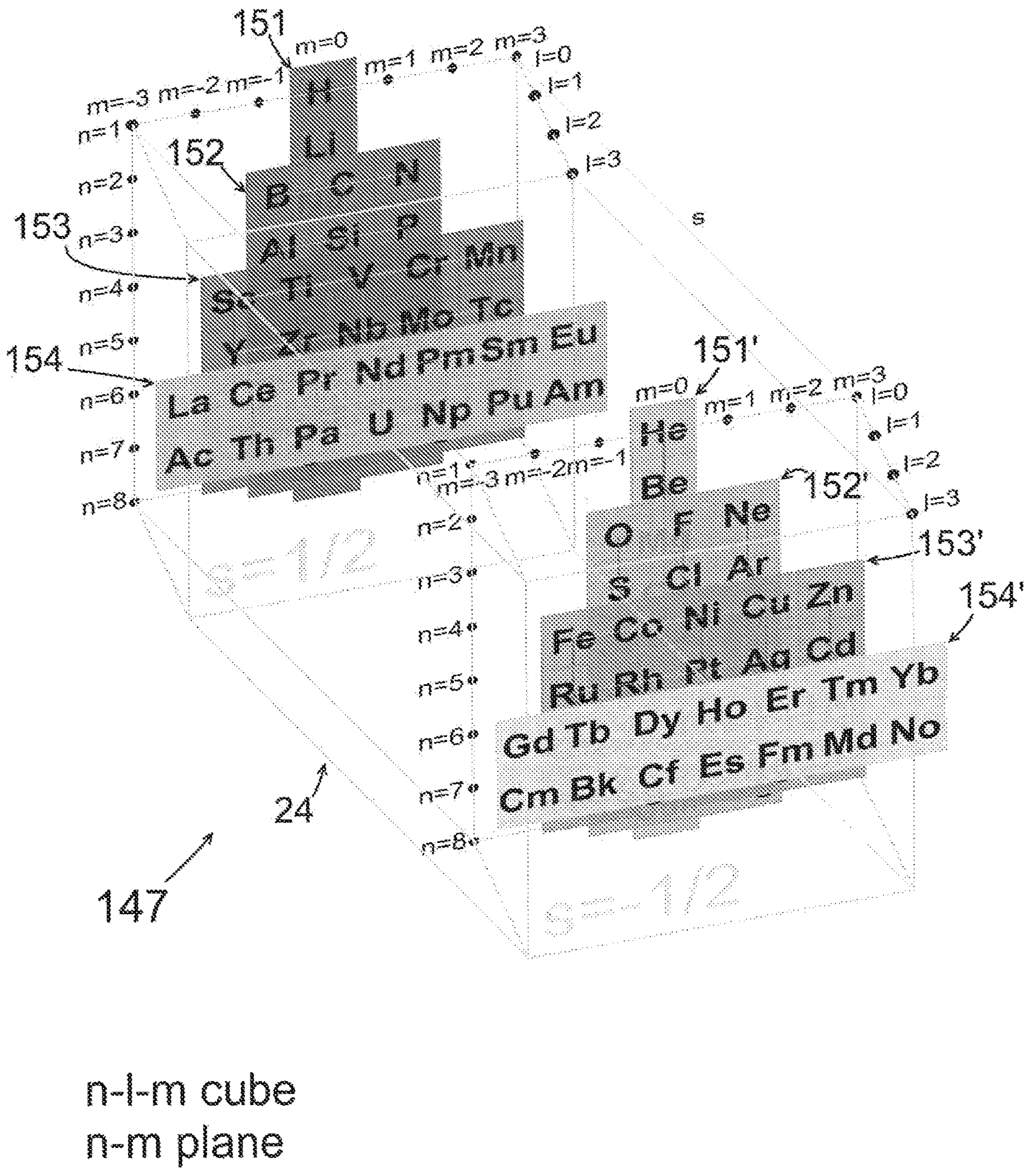
FIG. 45 shows a 3D PT composed of 2D parallel n-m planes based on the n-l-m cube, where s=1/2 and s=−1/2 elements are separated.
Figure 47:
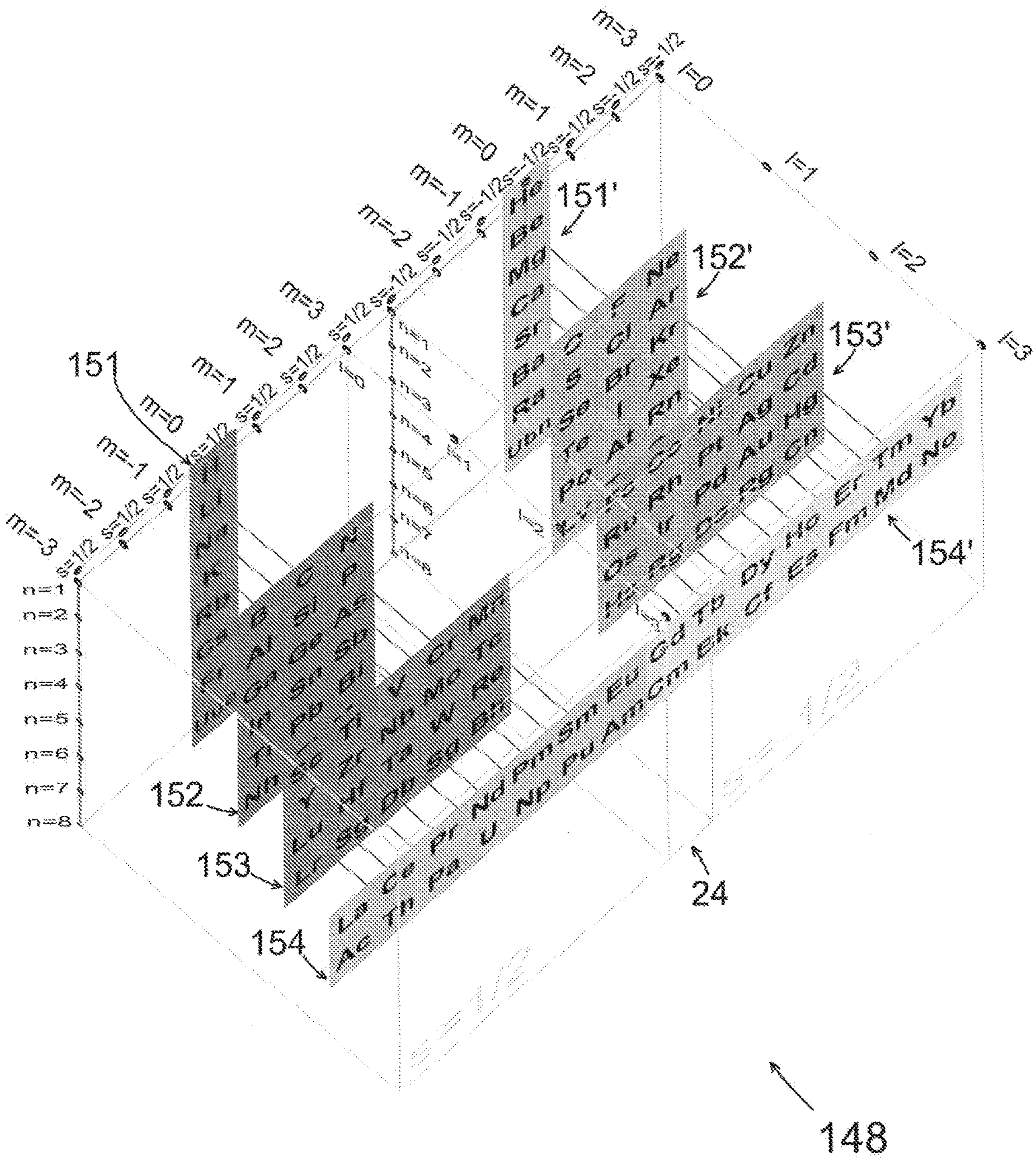
FIG. 47 shows a variation of the 3D PT in FIG. 45 where s=1/2 and s=−1/2 elements are separated and m and s are collinear.
Figure 48:
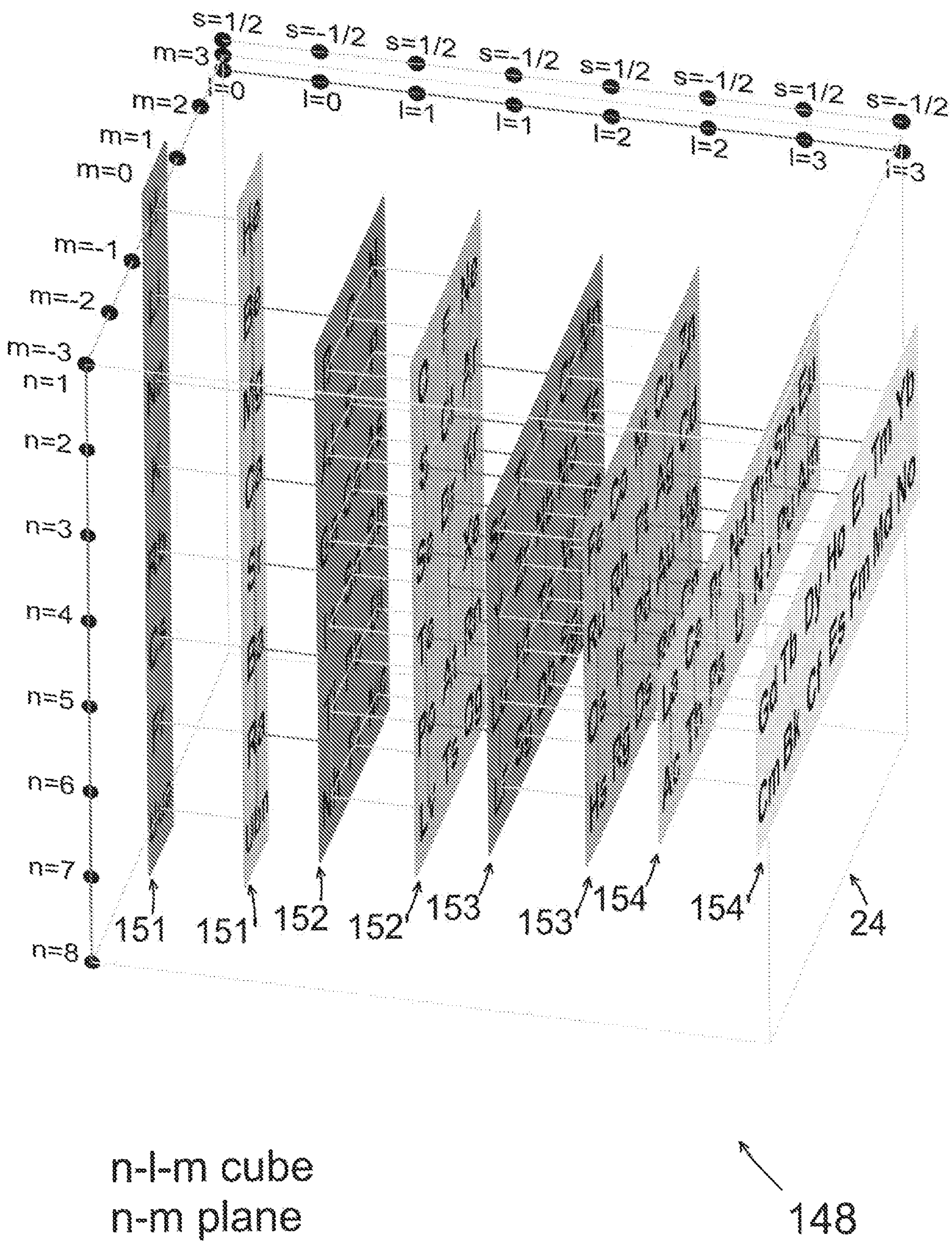
FIG. 48 shows a variation of the 3D PT in FIG. 45 where s=1/2 and s=−1/2 elements are nested and m and s are collinear.

FIGS. 41-44 show variations of the PT 131 in FIG. 40. FIG. 41 shows 142 where the s-axis is shortened so the two half-PTs are nested within each other as opposed to being separated as in 131. In FIG. 42, the variant 143 has the two half-PTs 132 and 133 re-aligned so s is collinear with l and the largest panels in the middle are contiguous; 144 is a different view of 143. In FIG. 43, the variant 145 has the two half-PTs aligned so s is collinear with n. In FIG. 44, in the variant 146, s is collinear with m. These are the only three ways in the two half-PTs with n-l-m cubes can be joined within their alignment along the cubic axes.

5.13 n-m Planes: FIGS. 45-48 show four PTs 147-150 based on n-l-m cube and n-m panels. Three of them, 148-150, comprise two separate half-PTs joined by s in three different cubic positions. In 146 and 148, s aligned with I; in the latter the distances between the panels are equal. In the variant 149 in FIG. 47, s is aligned along m. In 150 in FIG. 48, the component panels are oriented in the same way as 148 in FIG. 36, and s is aligned with l, with the difference that s=4 units in 148 and the half-PTs are separate, while in 150 s equals 1 unit and the half-PTs are intermeshed. Further, l is one unit in 148 and 2 units in 150.

Figure 49:
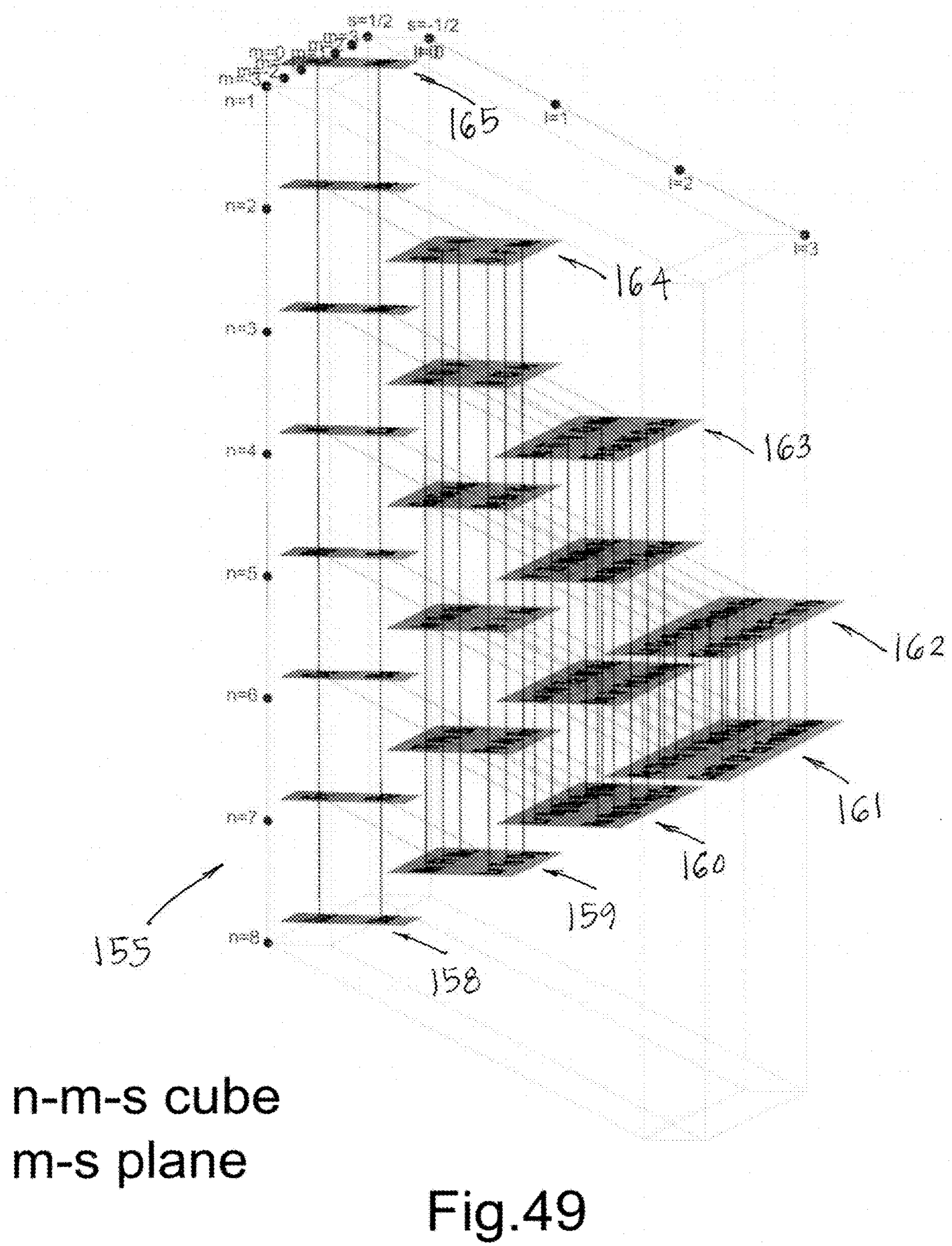
FIG. 49 shows a 3D PT composed of 2D parallel m-s planes based on the n-m-s cube where s=1/2 and s=−1/2 elements are nested.
Figure 50:
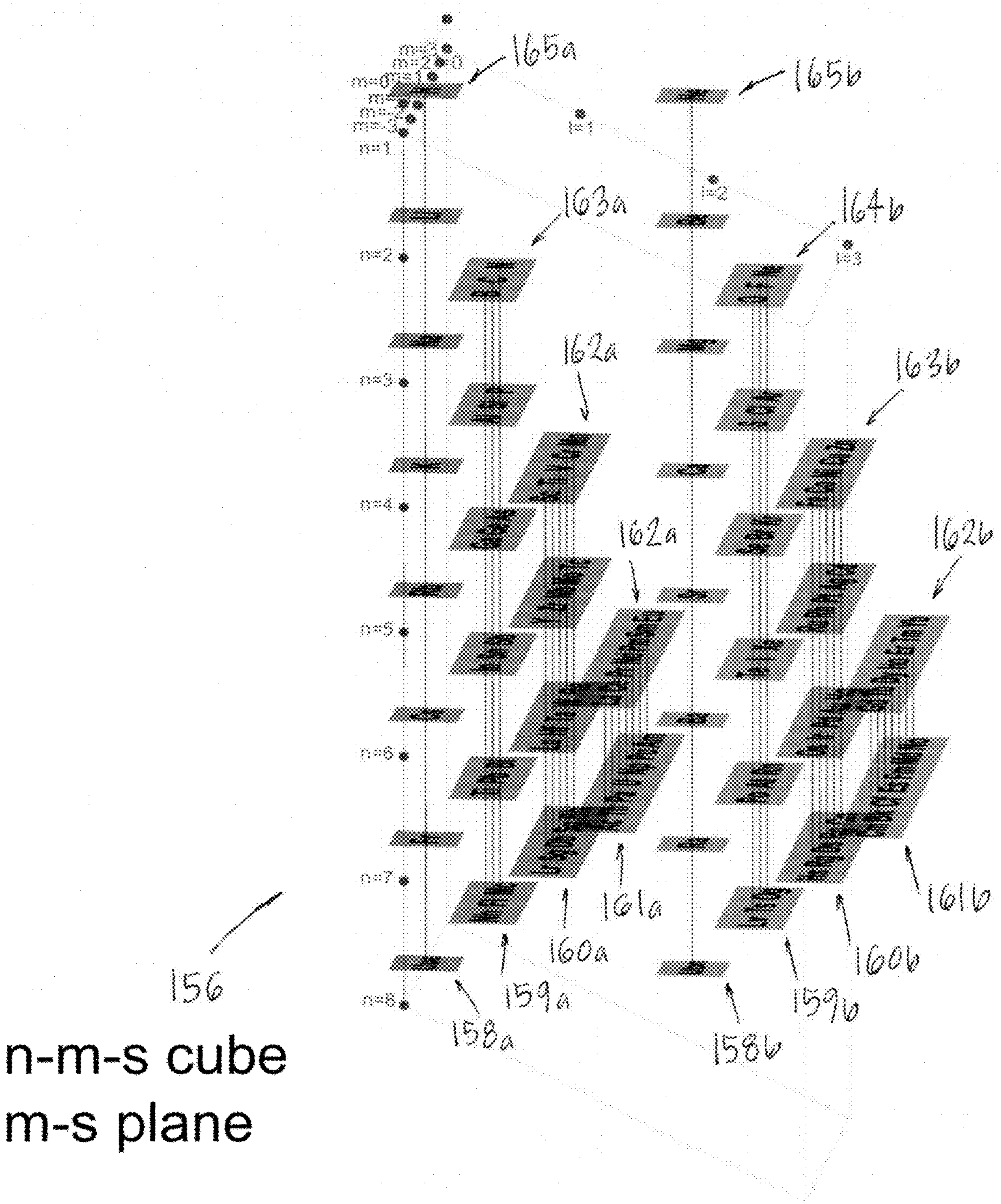
FIG. 50 shows a 3D PT composed of 2D parallel m-s planes based on the n-m-s cube where s=1/2 and s=−1/2 elements are separated.

5.2 n-m-s Cube 5.21 m-s Planes: FIGS. 49-51 shows three PTs 155-157 based on n-m-s cube and m-s panels for elements. 155 and 157 are similar, both meshed half-PTs and comprise panels 158-165 separated into electronic blocks. 157 (FIG. 51) is a variant of 155 (FIG. 49) where the independent modules have merged together into 8 parallel m-s panels, one for each value of n, and l and s are collinear. **157*a* is a different view of 157. 156 (FIG. 50) has separated half-PTs with panels split up into s=1/2 panels 158*a*-165*a*** and *s*=−1/2 panels **158*b*-165*b***.

Figure 52:
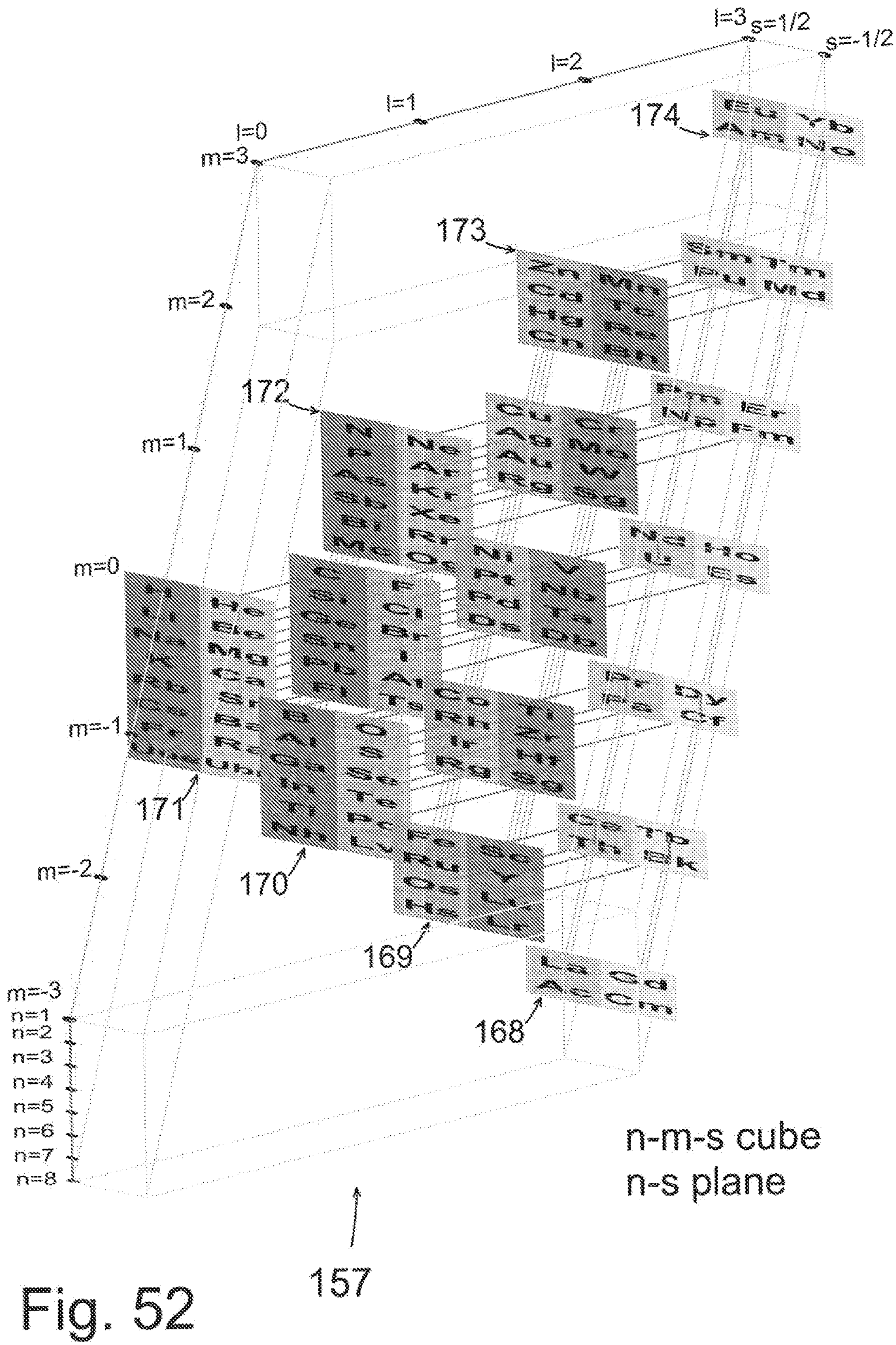
FIG. 52 shows a 3D PT composed of 2D parallel n-s planes based on the n-m-s cube where s=1/2 and s=−1/2 elements are nested.
Figure 53:
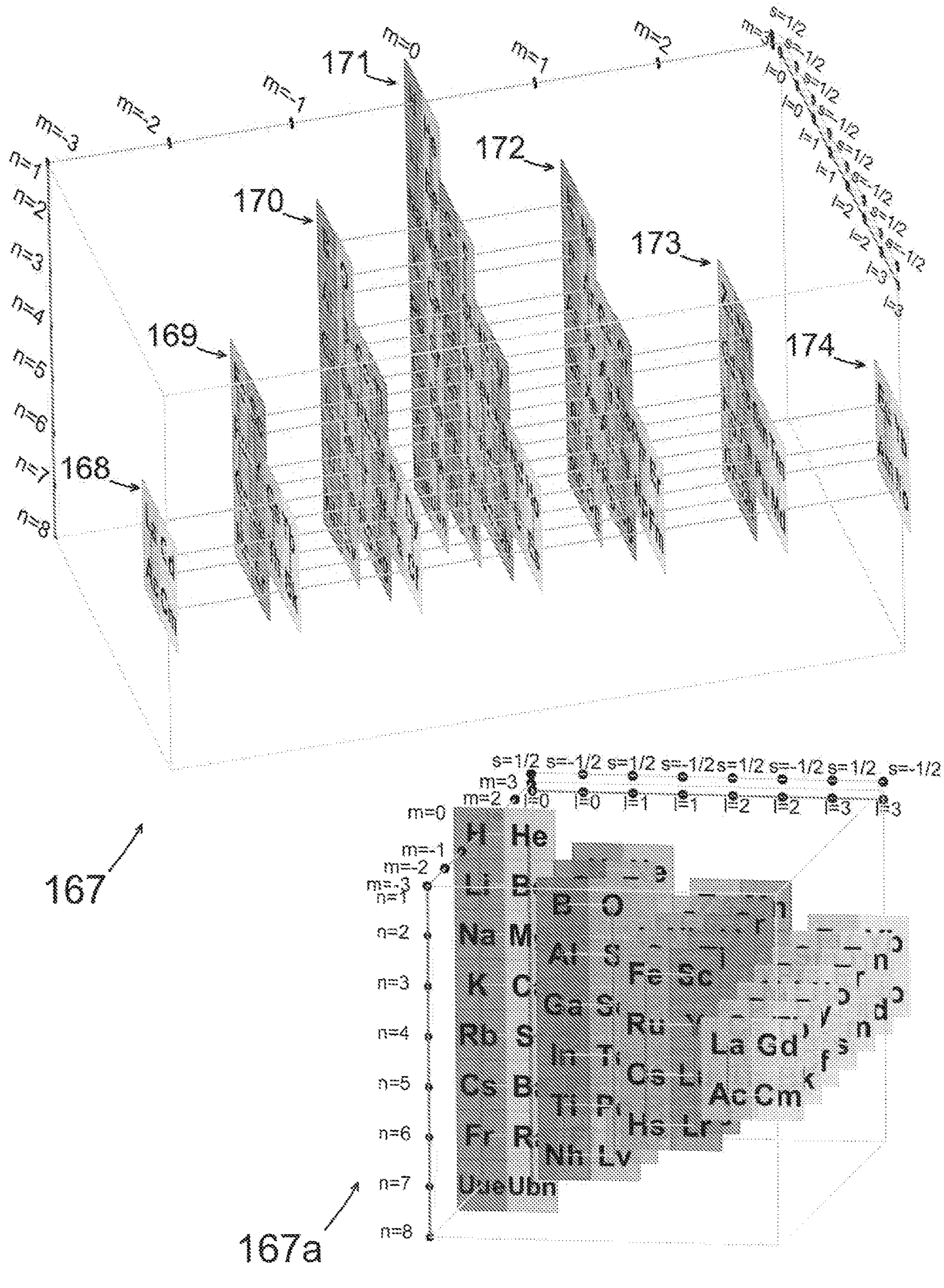
FIG. 53 shows a variation of 3D PT in FIG. 52 where l and s are collinear.

5.22 n-s Planes: FIG. 52 shows another PT 166 based on n-m-s cube but with panel sets 168-174 oriented in parallel n-s planes. In FIG. 53, these panels 168-174 are aligned in 167 so as to coalesce into 7 larger vertical panels. The number of elements in the successive large panels correspond to the seven values of m and equal 4,12,24,40,24,12,4 in a symmetrical arrangement within the half-PT. **167*a* is another view of 167**.

Figure 54:
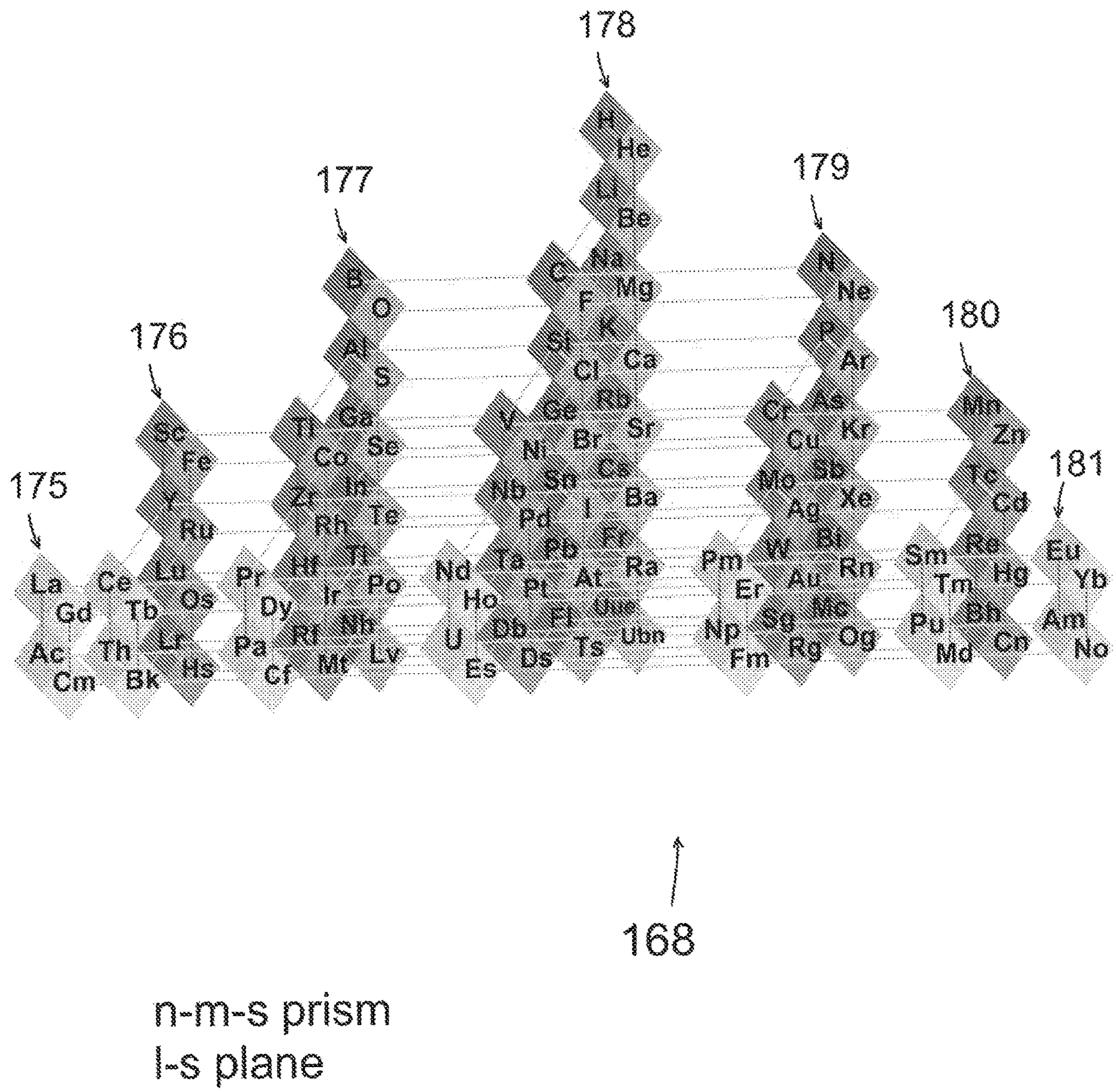
FIG. 54 shows a 3D PT composed of 2D parallel l-s planes based on the n-m-s prism.

5.23 l-s Planes FIG. 54 shows a different type of 3D PT 168 from 4D. Instead of cubes, it is based on a rhombic n-m-s prism, where n and m are at right angles to each other, and both s and l are at an angle to both but at right angles to each other. The elements are tiled into arrays of turned squares and comprise panel sets 175-181 corresponding to the 4 electronic blocks.

6. 2D PTs with Planes from 4D: In a different embodiment of the invention, the panel and module system in the 3D PTs lead to a 2D PT kit that can be arranged and re-arranged to give many different 2D PTs. The individual flat panels or modules of the 3D PTs described in Section 5 can be placed side by side in many different ways as in any board game made of tiles. The modules can interlock as in jigsaw puzzle pieces to make a physically continuous whole. In a digital version, the modules could be easily maneuvered by touch or other means of input. In both digital and physical versions, these PTs could be made from individual 120 element tiles which can be combined into modules which can be combined into panels which can be laid side by side in various ways. Various 2D PTs constructed from modules in the 3D PTs are shown in FIGS. 55-63. All have square tiles for elements and the individual square tiles of the same color are fused into modules. Other tile shapes are possible and one example is shown with turned squares.

Figure 55:
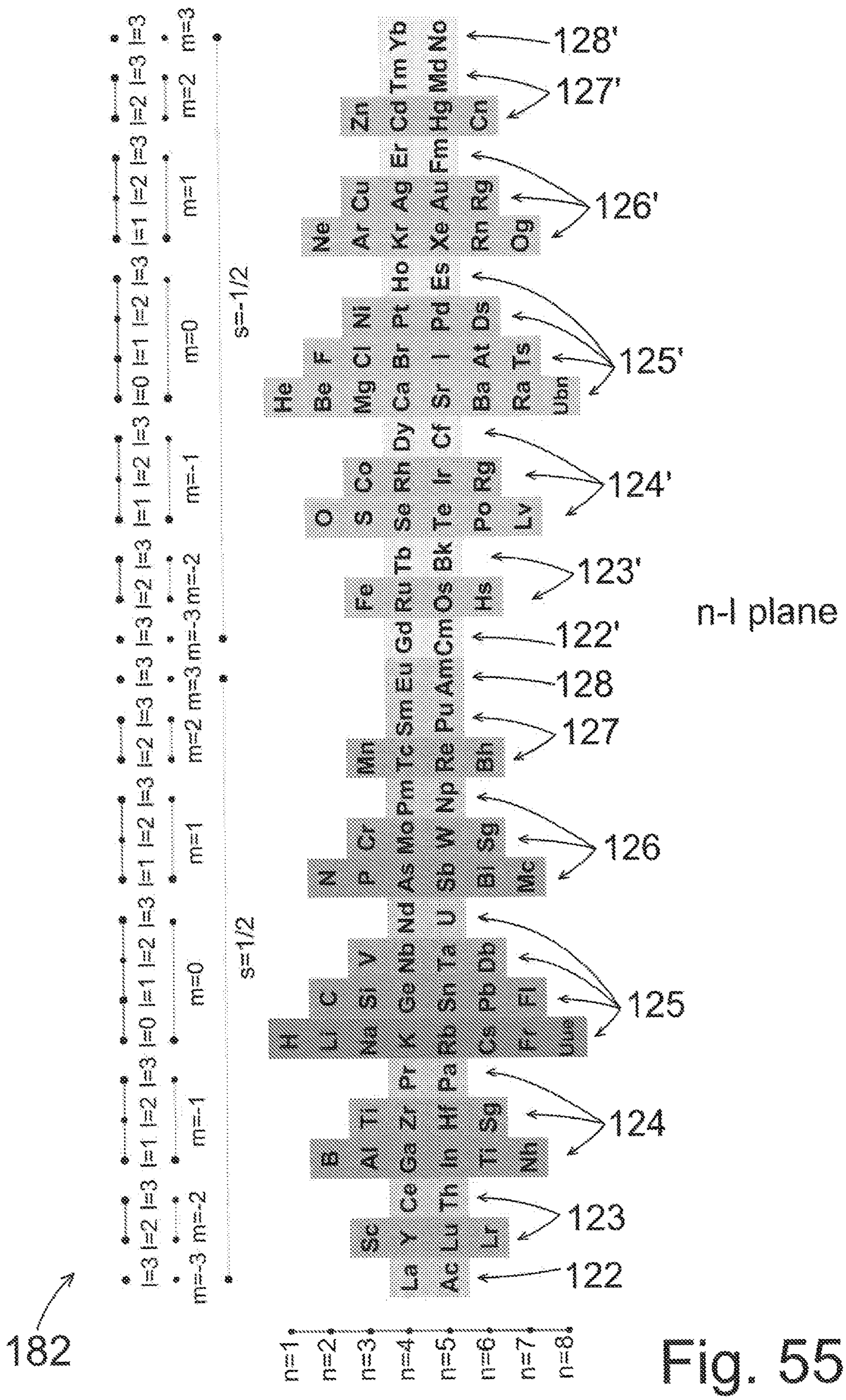
FIG. 55 shows a 2D PT composed of n-l panels.

6.1 n-l Plane: FIG. 55 shows a 2D PT 182 derived from the 3D PT 119 (FIG. 38) and 129 (FIG. 39). It comprises panels 122-128 for s=1/2 elements, each panel has modules indicates by the number of arrows for each panel number. The corresponding s=−1/2 panels are 122'-128', also comprising modules as shown. It is a horizontal PT with n along the vertical axis and l, m and s along the horizontal. It comprises two half-PTs, s=1/2 and s=−1/2. Each half-PT has 7 n-l multi-colored panels for each value of m, −3,−2,−1,0, 1,2,3. Each panel has all values of n and l for a fixed m and s. The panels comprise strips of elements having a fixed values of l, m and s and a variable n, and their colors indicate their electronic block. The panels are in 4 sizes and comprise 2, 6, 10 and 18 elements from the smallest to the largest. The successive elements in the 7 panels within one half-PT are 2,6, 10, 18, 10,6,2 elements. It can become a vertical PT by re-orienting the element symbols without changing their position.

Figure 56:
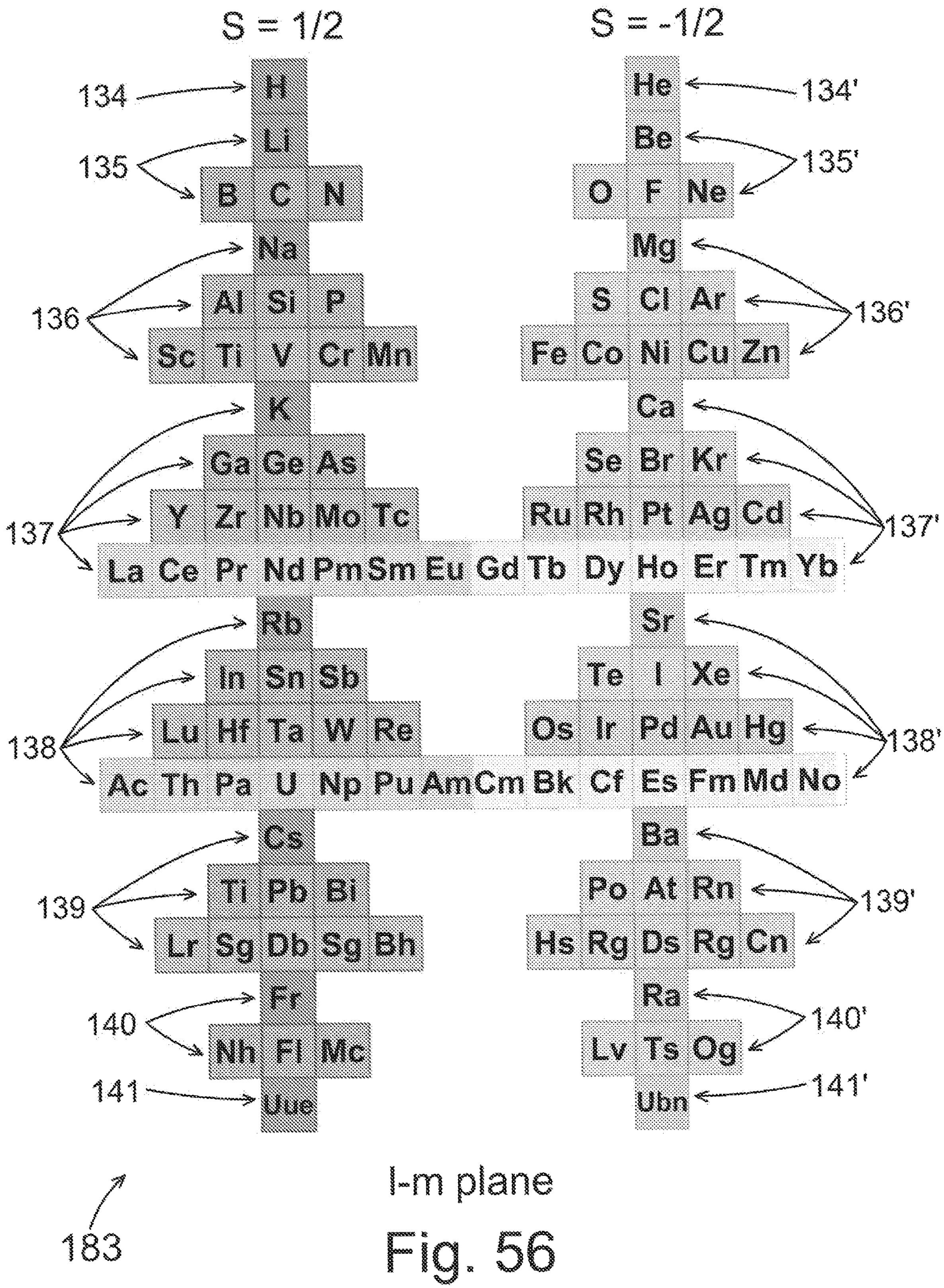
FIG. 56 shows a 2D PT composed of l-m panels.
Figure 57:
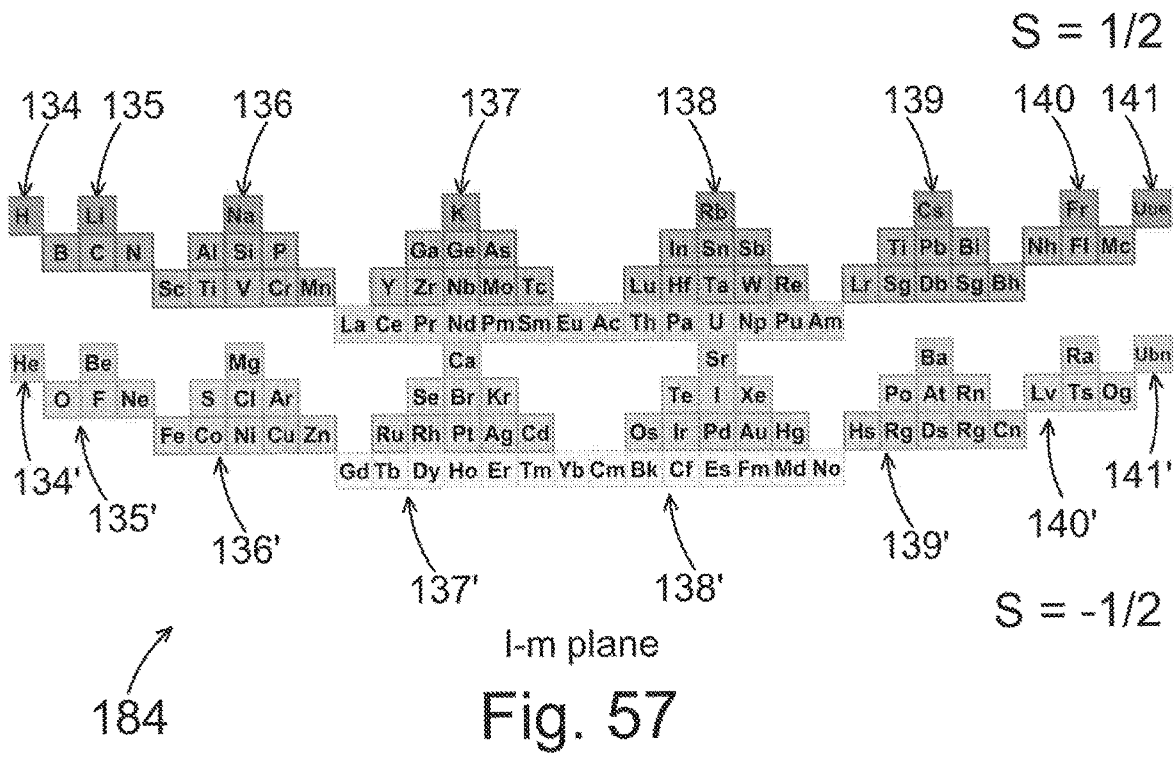
FIG. 57 shows variation of the 2D PT in FIG. 56 and composed of l-m panels.

6.2 l-m Plane: FIG. 56 is a 2D PT derived from the 3D PTs in FIGS. 40-44. It is a double-PT comprising two half-PTs joined by horizontal s, each half-PT comprising 8 l-m panels, one for each value of n. This PT has n and l along the vertical and m and s along the horizontal. It comprises 16 panels in two halves, with s=1/2 elements in panels 134-141 and s=−1/2 in panels 134'-141'. In FIG. 57, these 16 l-m panels are re-arranged into a horizontal PT 184 which also comprises two half-PTs. It is another example of a double-PT. Each half has n and m horizontal and l and s vertical. This PT can also become a vertical PT by rotating the element symbols by 90 degrees without changing their location.

Figure 58:
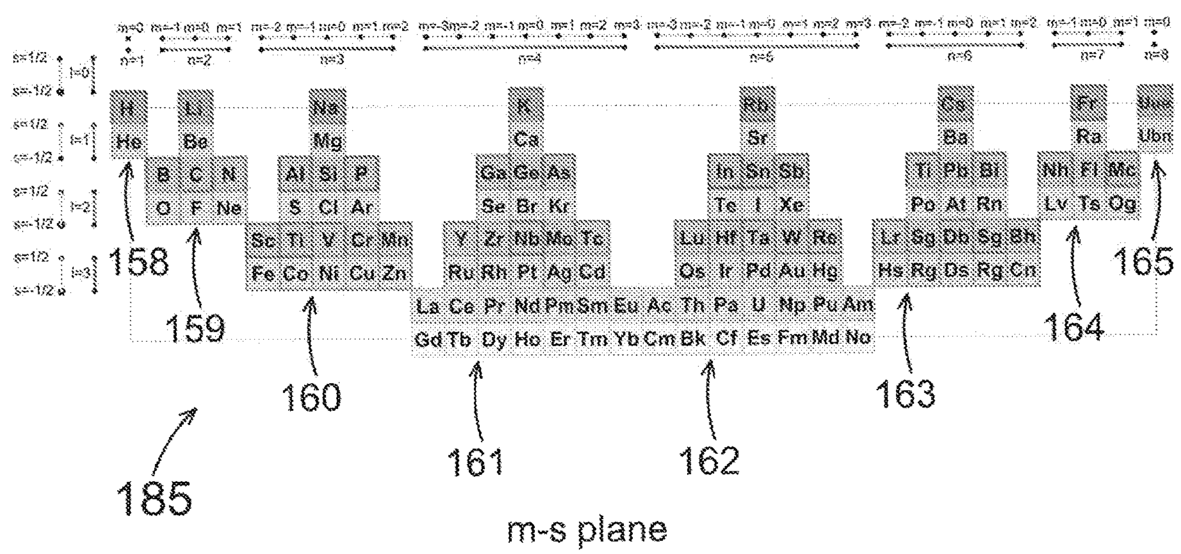
FIG. 58 shows a 2D PT composed of m-s panels.

6.3 m-s Plane: FIG. 58 is a 2D PT 185 derived from the 3D PTs in FIGS. 49-51. It shows another horizontal PT which can also be read vertically by reorienting the element symbols in their own location. It has n and m along the horizontal and l and s along the vertical. It comprises 8 panels, one for each value of n from 1 thru 8. It comprises panels 158-165 as in 157 in FIG. 51. Each panel has increasing number of colored modules in the following sequence of increasing n: 2, 4, 6, 8, 8, 6, 4, 2. The number of elements within modules are in two sets of sequence 1,3, 5 and 7, one set for each block the s=1/2 elements followed by s=−1/2 elements within each panel. The corresponding number of elements within the panel are in the sequence 2, 8, 18, 32, 32,18, 8, 2.

Figure 28:
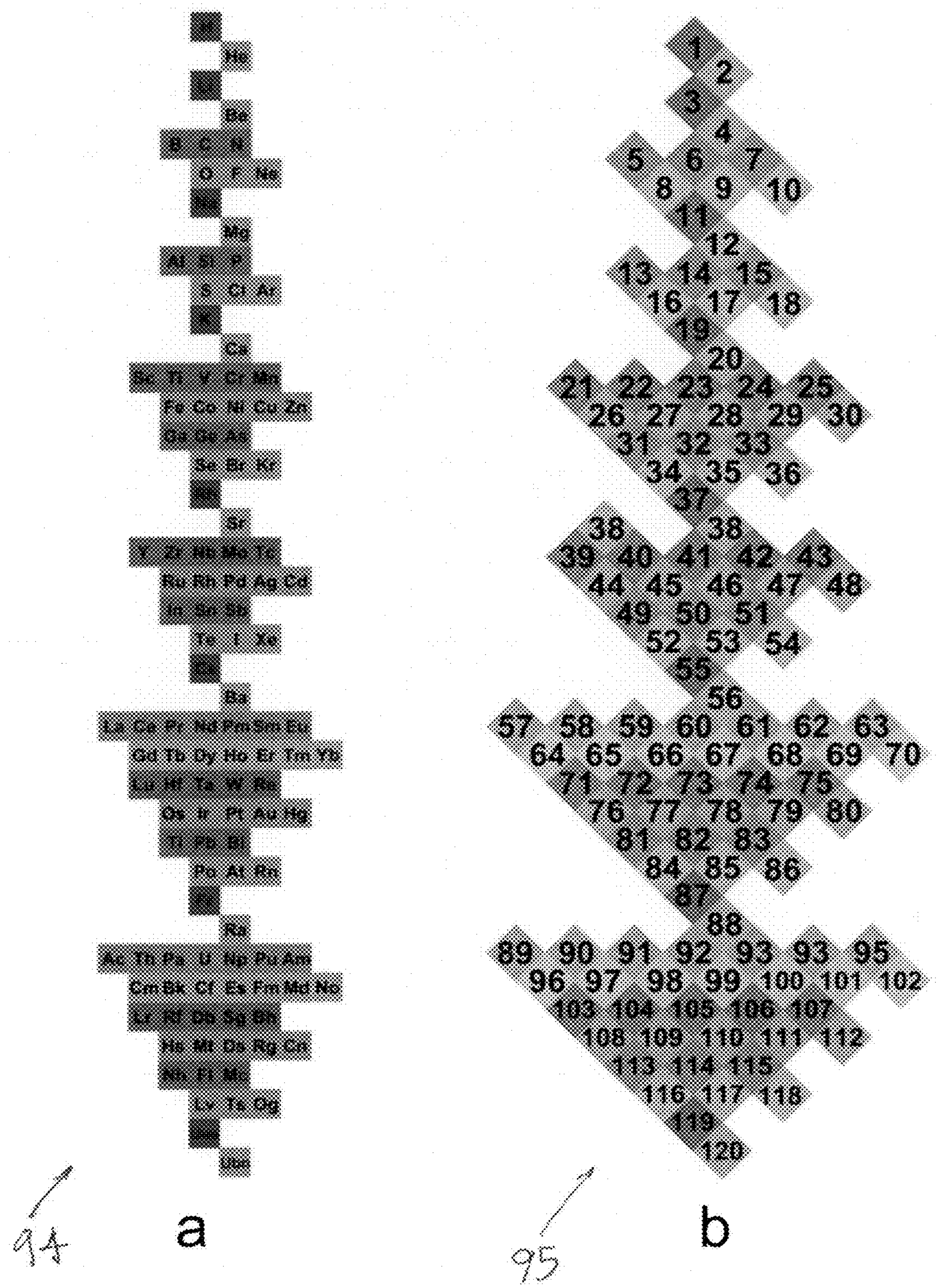
FIG. 28 shows two 2D PTs derived by flattening the 3DPT in FIG. 27. The one on the right is a variant by changing the tile shape.
Figure 29:
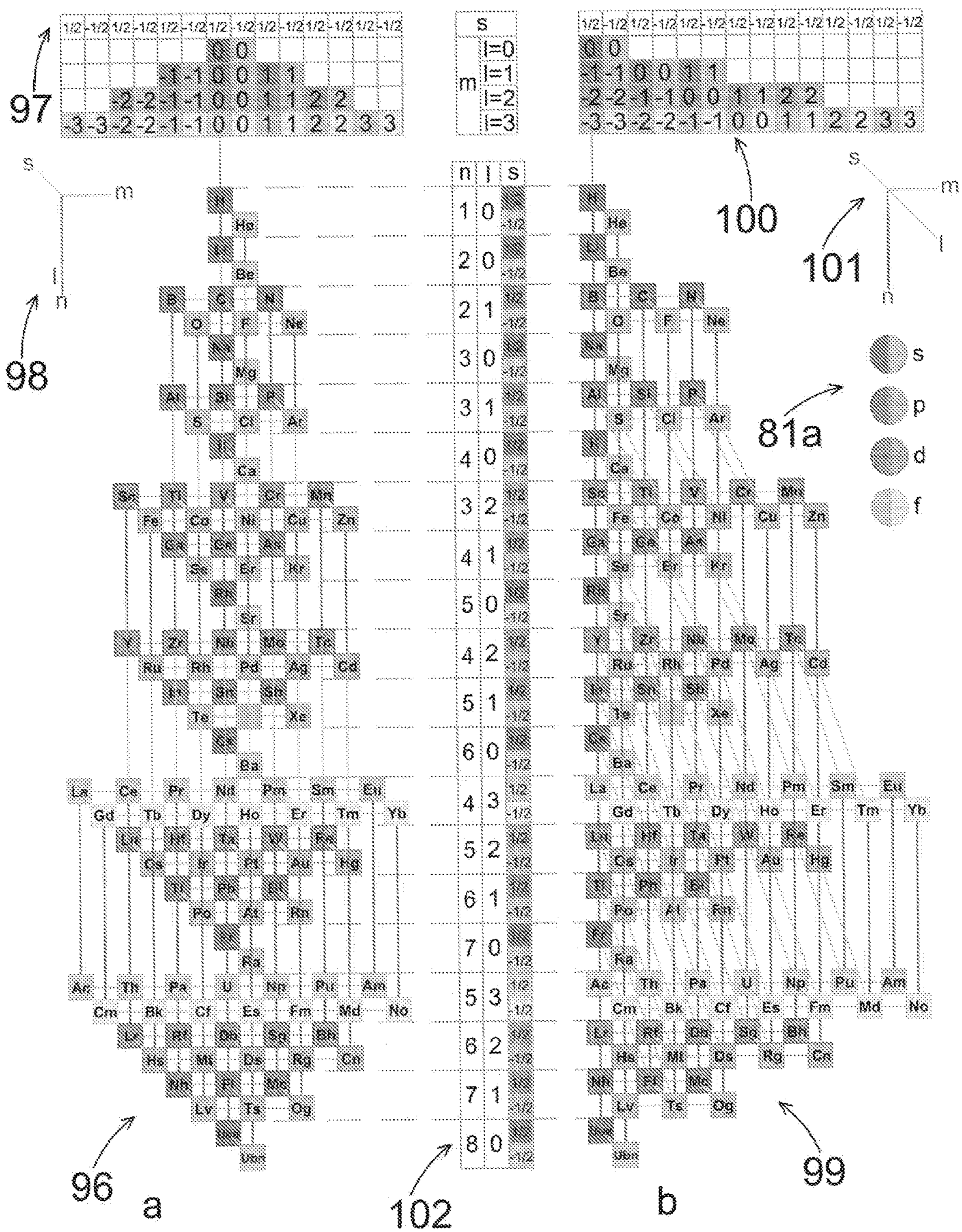
FIG. 29 shows two related 2D PTs derived from the 3D PT in FIG. 25. Their vector stars are flat, l is vertical in the PT on left (a) and tilted in the one on right (b). Note that (a) is the same as the Front view in FIG. 26.
Figure 30:
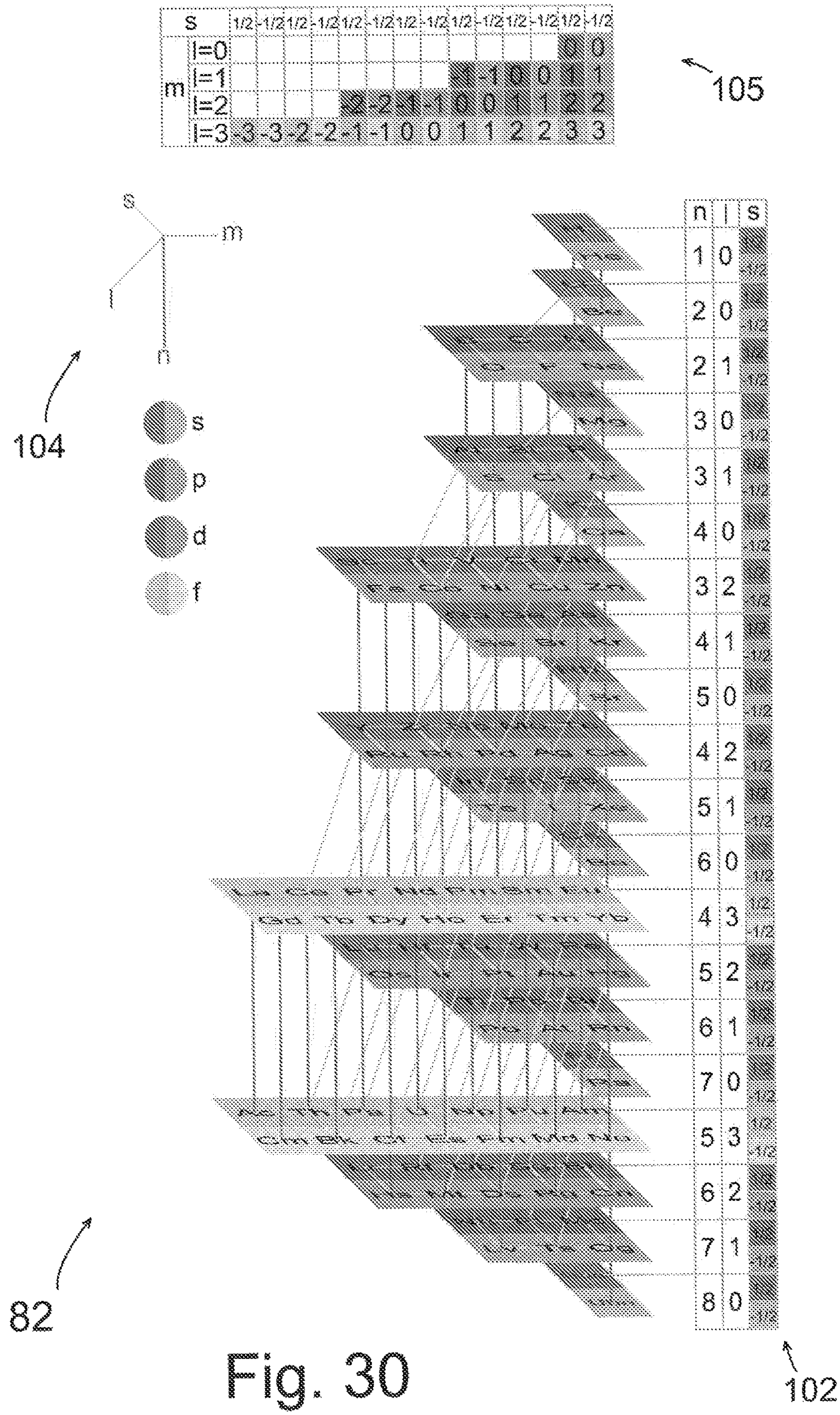
FIG. 30 shows another flat 2D PT with a parallelogram tile shape.
Figure 31:
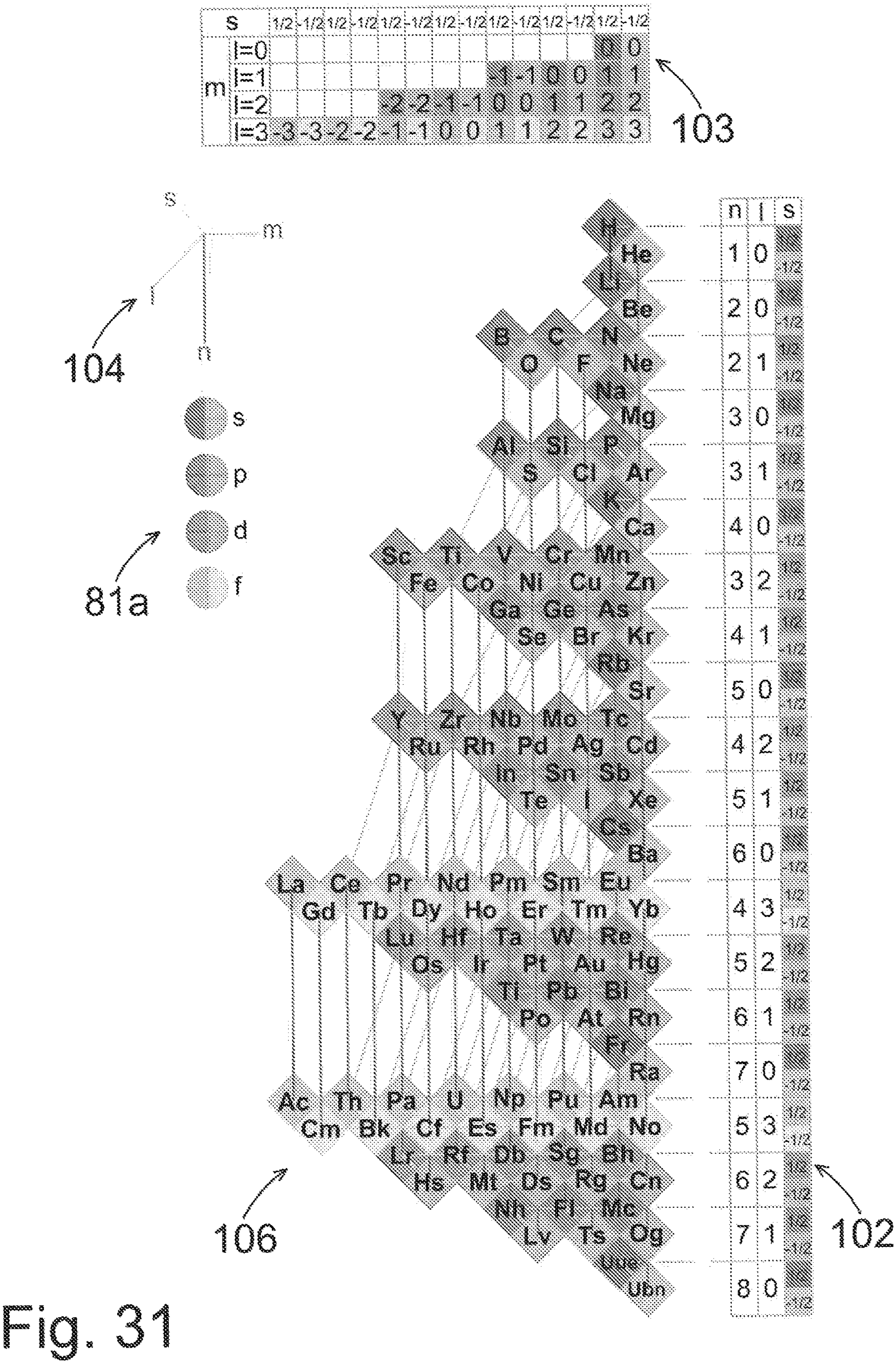
FIG. 31 is a variant of the 2D PT in FIG. 28 with an inclined l direction.
Figure 59:
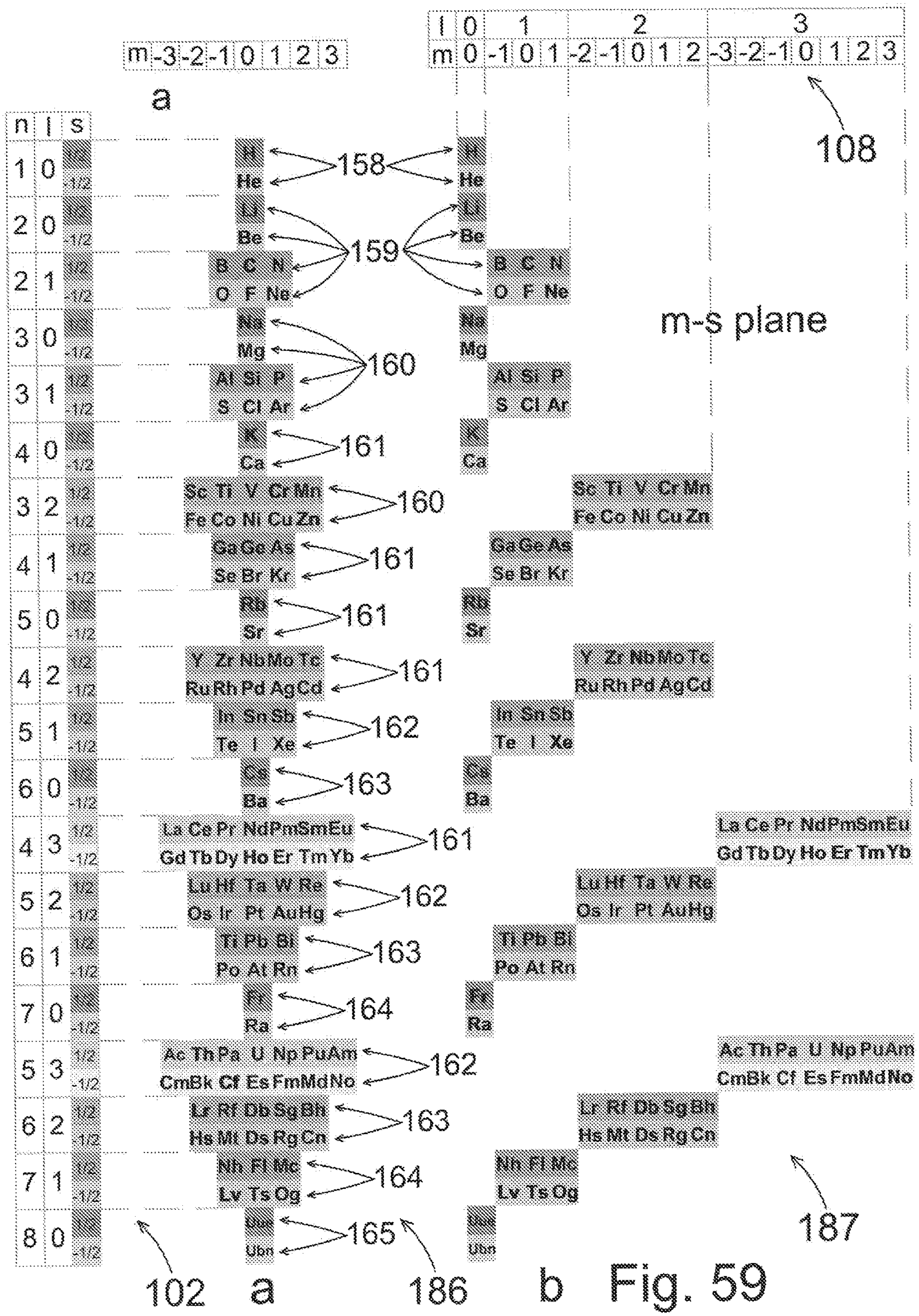
FIG. 59 shows another 2D PT composed of m-s panels and re-arranged so elements are in continuous atomic number sequence.

FIG. 59 shows two variant PTs 186 and 187 where the modules are re-arranged so the elements can read in a continuous atomic number sequence as in 2D PTs 94 and 95 in FIG. 28. The modules numbers are indicated for 186 and correspond to 187 which are horizontally aligned. In 186, n, I, s are vertical, m is horizontal; in 187 n,s are vertical, m horizontal and l is angled. Both show continuous atomic number sequence reading top-down, left-right. Vertical and horizontal sidebar scales 102 and 108 are similar to the ones in FIGS. 29-33 indicate values of associated quantum numbers.

Figure 60:
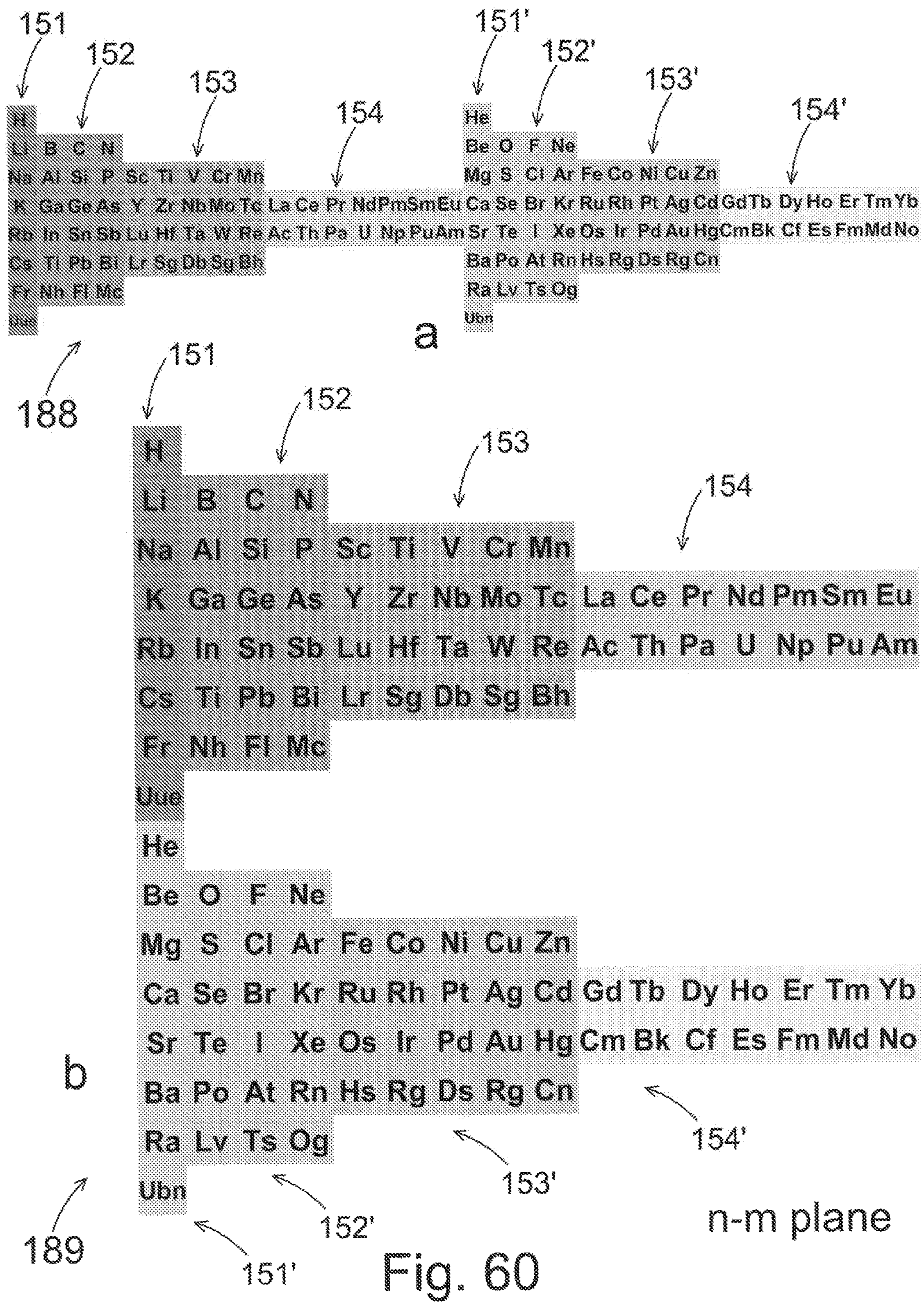
FIG. 60 shows two variations of a 2D PT composed of n-m panels.

6.4 n-m Plane: FIG. 60 shows two 2D PTs 188 and 189 derived from 3D PTs in FIGS. 45-48. Both have two half-PTs joined by s with each half-PT comprising 4 colored n-m panels, one for each electronic block, and numbered 151-154 for s=1/2 elements and 151'-154' for s=−1/2 elements. In (a), s is horizontal along with l and m, and n is vertical. In (b), n and s are vertical, and l and m are horizontal. Both PTs could be rotated at 90 degrees clockwise or counter-clockwise and the element symbols also turned for reading.

Figure 61:
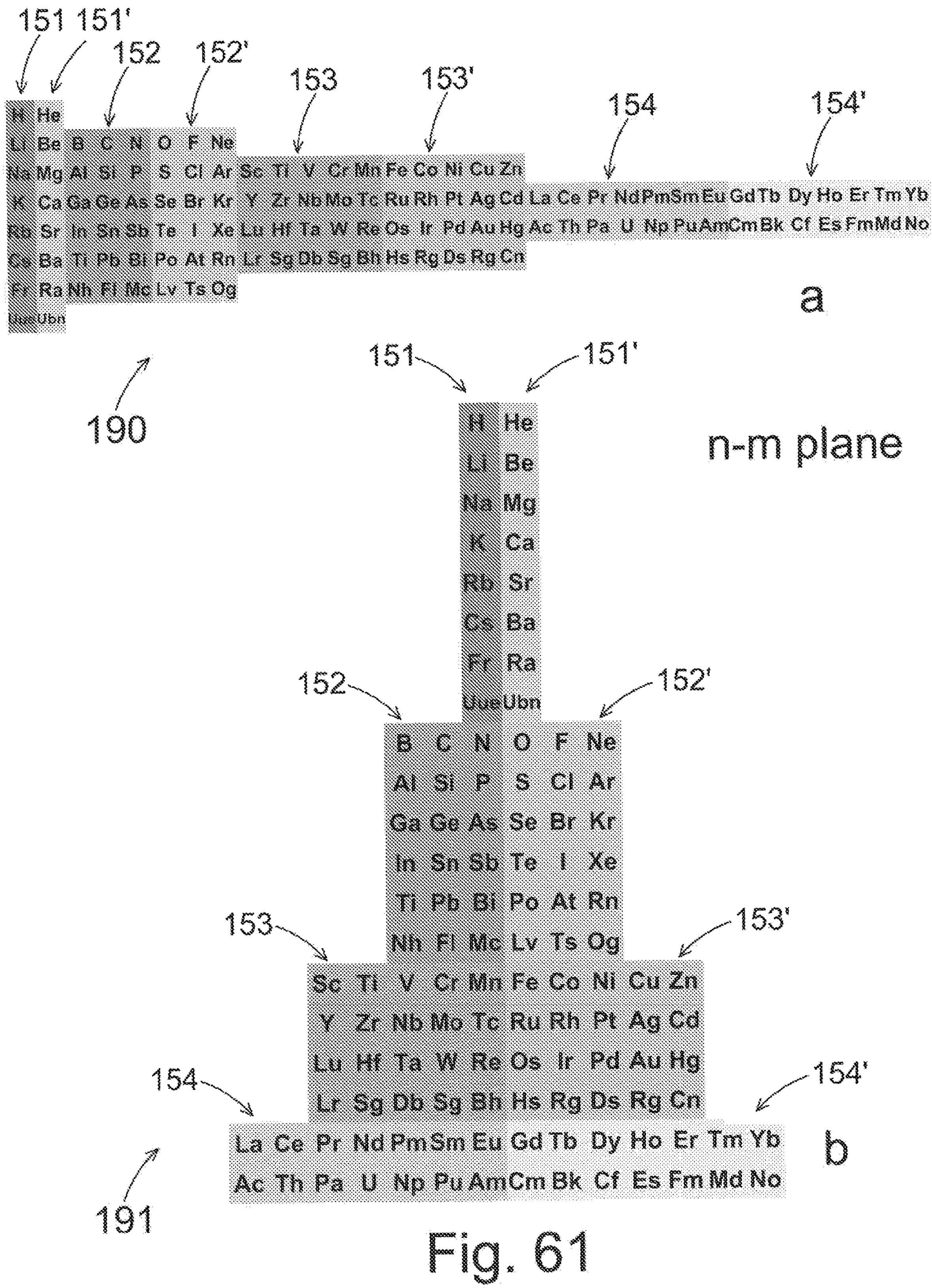
FIG. 61 shows another 2D PT composed of n-m panels with s=1/2 and s=−1/2 elements side by side within the block.

FIG. 61 shows two 2D PTs 190 and 191 comprising the same 8 n-m panels 151-154 and 151'-154' as in FIG. 60 with the difference that they are both full PTs and the half-PTs are joined and not separate as in 188 and 189. In 190, n is vertical while s is aligned with l and m along the horizontal. The composite panels representing the four colored electronic blocks are organized by l along the horizontal. Within each l or electronic block, s elements appear sequentially with s=1/2 (darker shade of color) followed to s=−1/2 to its right. Also within each l, m is repeated within the s=1/2 and s=−1/2 elements. This PT is the same as Corbino's PT and Janet's PT can be derived as its Left version along with sliding the blocks down (effectively a l-rotation in 3D). In 191, the four electronic blocks are stacked vertically, thus n is repeated along the vertical, s is horizontal along with s, and l is angled variably to the horizontal and vertical. These PTs can also be turned clockwise or counterclockwise to produce variants with the same structure.

Figure 62:
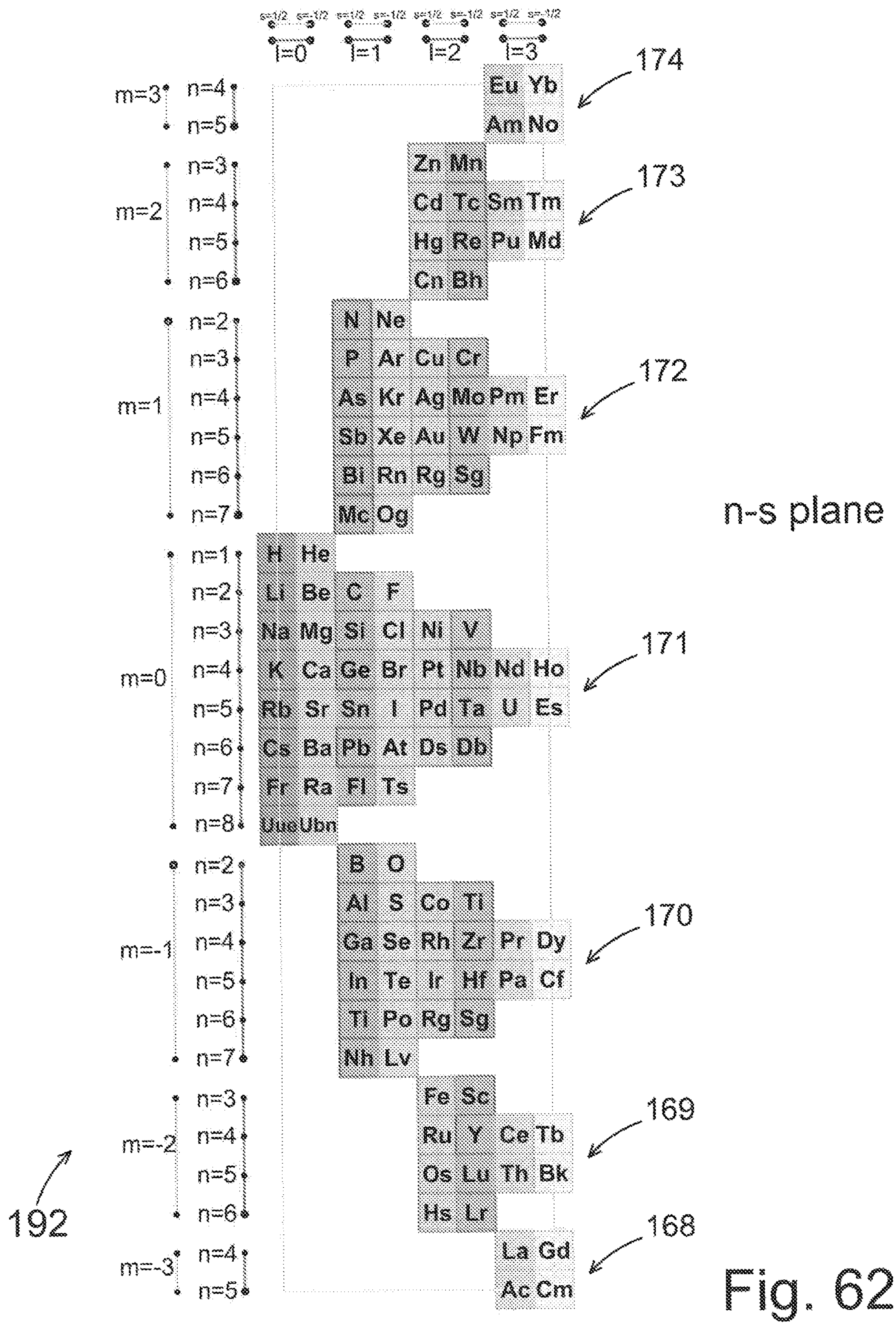
FIG. 62 shows a 2D PT composed of n-s panels.
Figure 63:
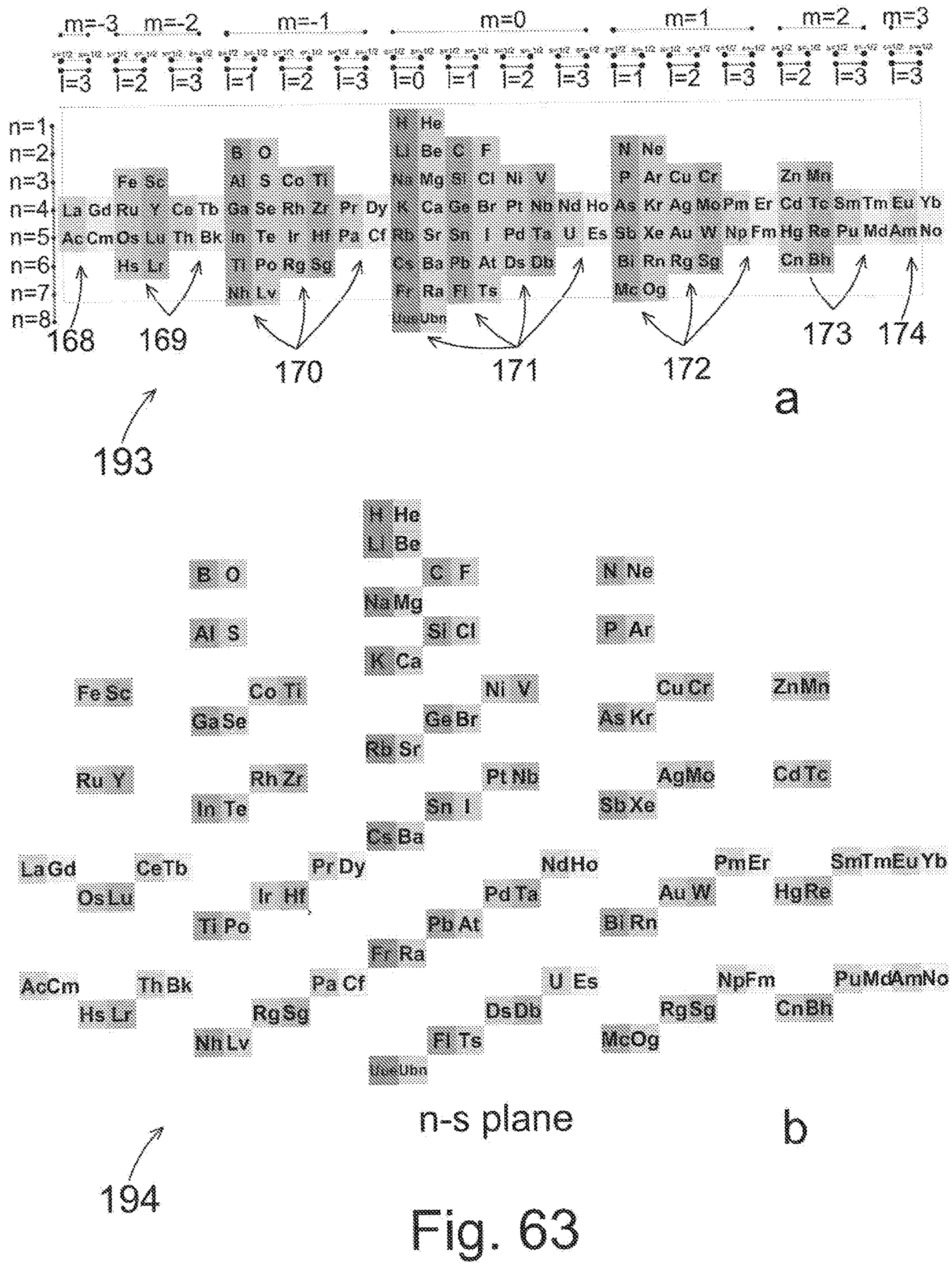
FIG. 63 shows two 2D PTs composed of n-s panels, a compact one and a spread out variant.

6.5 n-s Plane FIG. 62 shows a vertical 2D PT 192 based on 3D PTs in FIGS. 52 and 53. It has n and m vertical, and l and s horizontal. It comprises 7 n-s panels 168-174, one for each m along the vertical with the largest m=0 panel in the middle and comprising elements from the 4 blocks (s,p,d,f) in their s=1/2 and s=−1/2 states. The next panel, m=1 and −1 on either side of the largest panel, comprise elements from 3 blocks (p,d,f), the m=2 and −2 panels have elements from 2 blocks (d.f), and the last two panels with m=3 and −3 have elements from the f-block. In the PT 193 in FIG. 63, the same 7 n-s panels in FIG. 62 are re-arranged so n is vertical and l, m and s are horizontal. In PT 194 in FIG. 63, the elements in 193 are separated along the n-axis so that the elements can be read in a continuous Z sequence as in FIGS. 28-33.

Figure 64:
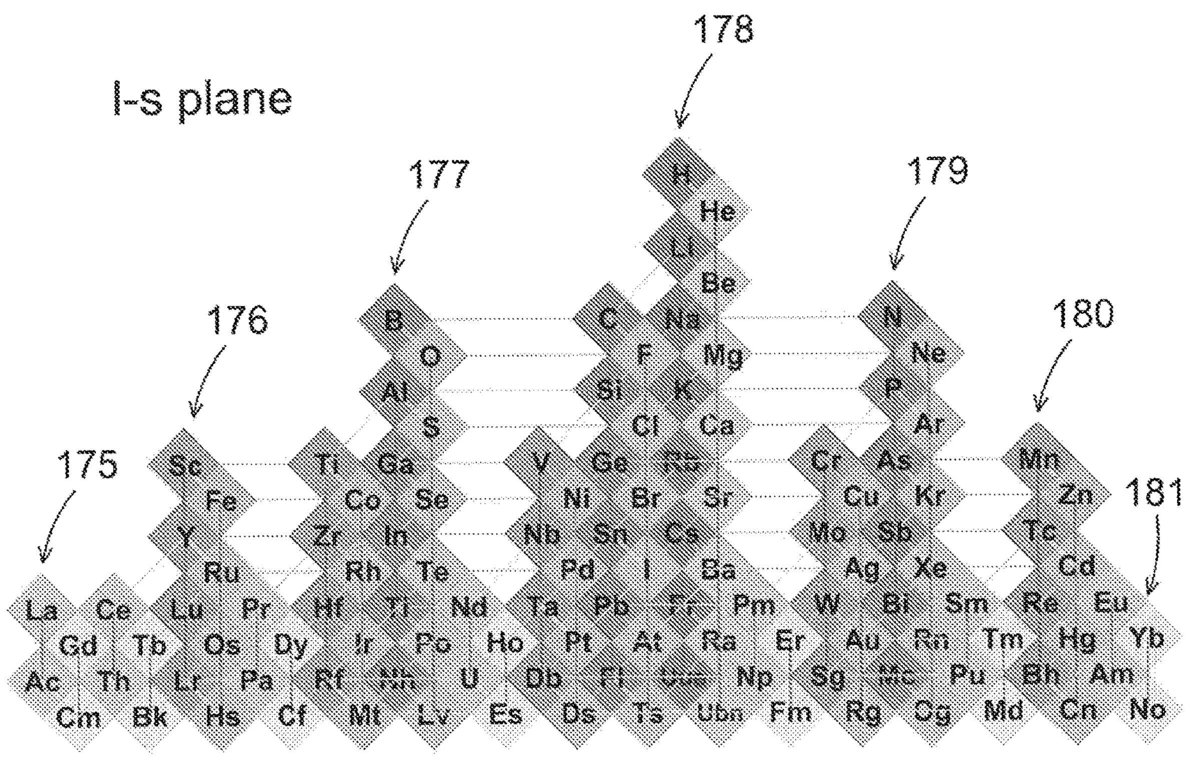
FIG. 64 shows a 2D PT composed of l-s panels.

6.6 l-s Plane FIG. 64 shows a horizontal 2D PT 195 derived from the 3D PT 168 in FIG. 54 and comprises l-s panels 175-181. Here n is vertical, n is horizontal, and both l and s are angled. The element tiles are turned by 45 degrees to produce rotated squares, an arrangement which permits the 4 quantum numbers to follow four different directions, namely, horizontal, vertical and the two diagonal directions. This produces a 2D organization which permits all 4 quantum numbers to be expressed independently since no quantum numbers are aligned along the same direction. The underlying network structure obtained by joining the centers of element tiles thus represents true 4D topology and satisfies Table 1.

6. Complementarity in Quantum Numbers

The 4D PT reveals a global conservation principle of complementarity within each block: the sum of quantum numbers (quantum sum) of element pairs in complementary locations around the center of symmetry of the block is conserved. In addition, the sum of quantum numbers of element pairs in complementary locations within any topological element (2D, 3D or 4D cell) is conserved.

Figure 66:
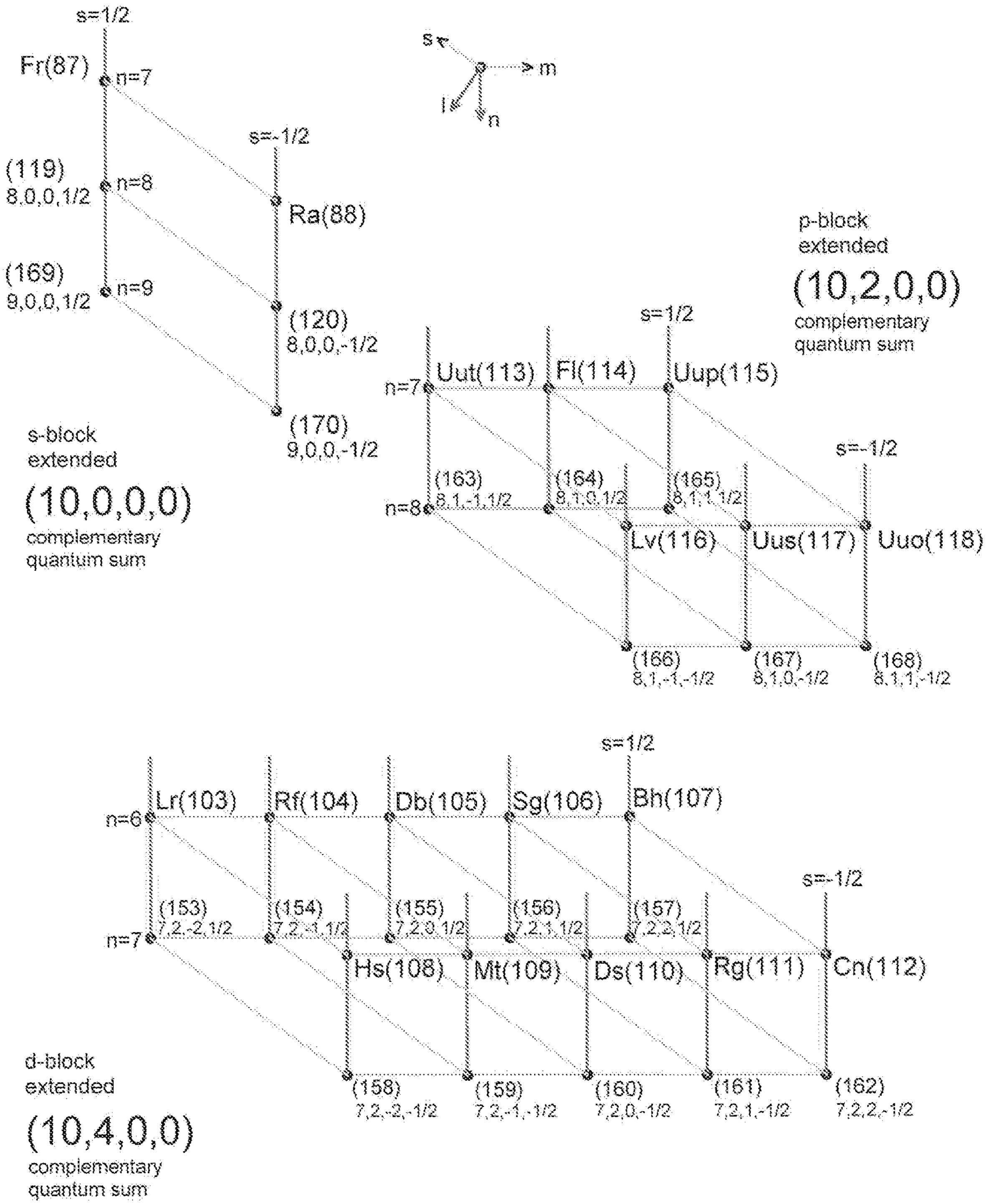
FIG. 66 shows the extended s-, p- and d-blocks of the extended PT which includes n=9 elements.
Figure 67:
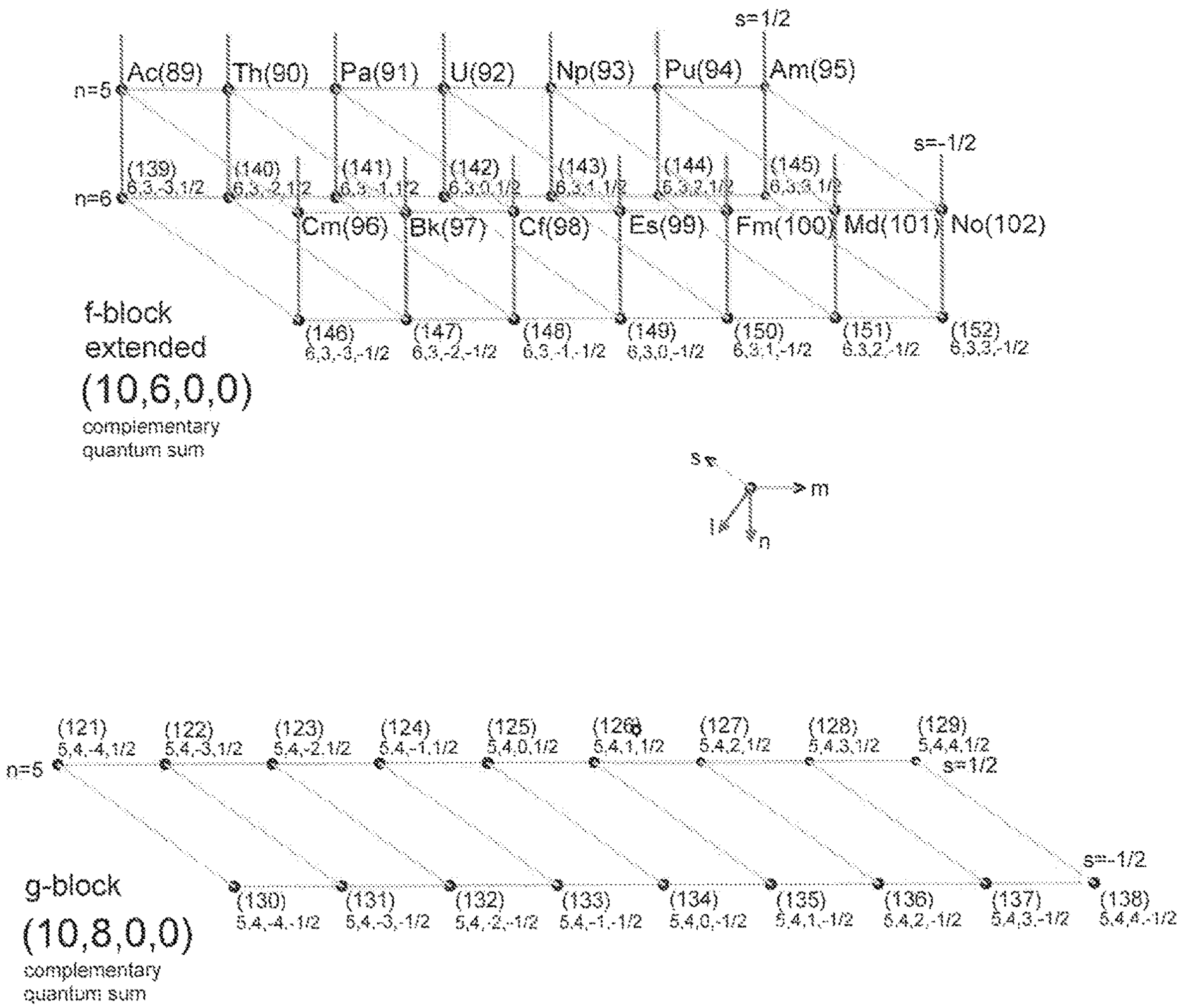
FIG. 67 shows the extended f-block and the g-block of the extended PT of the n=9 system.
Figure 68:
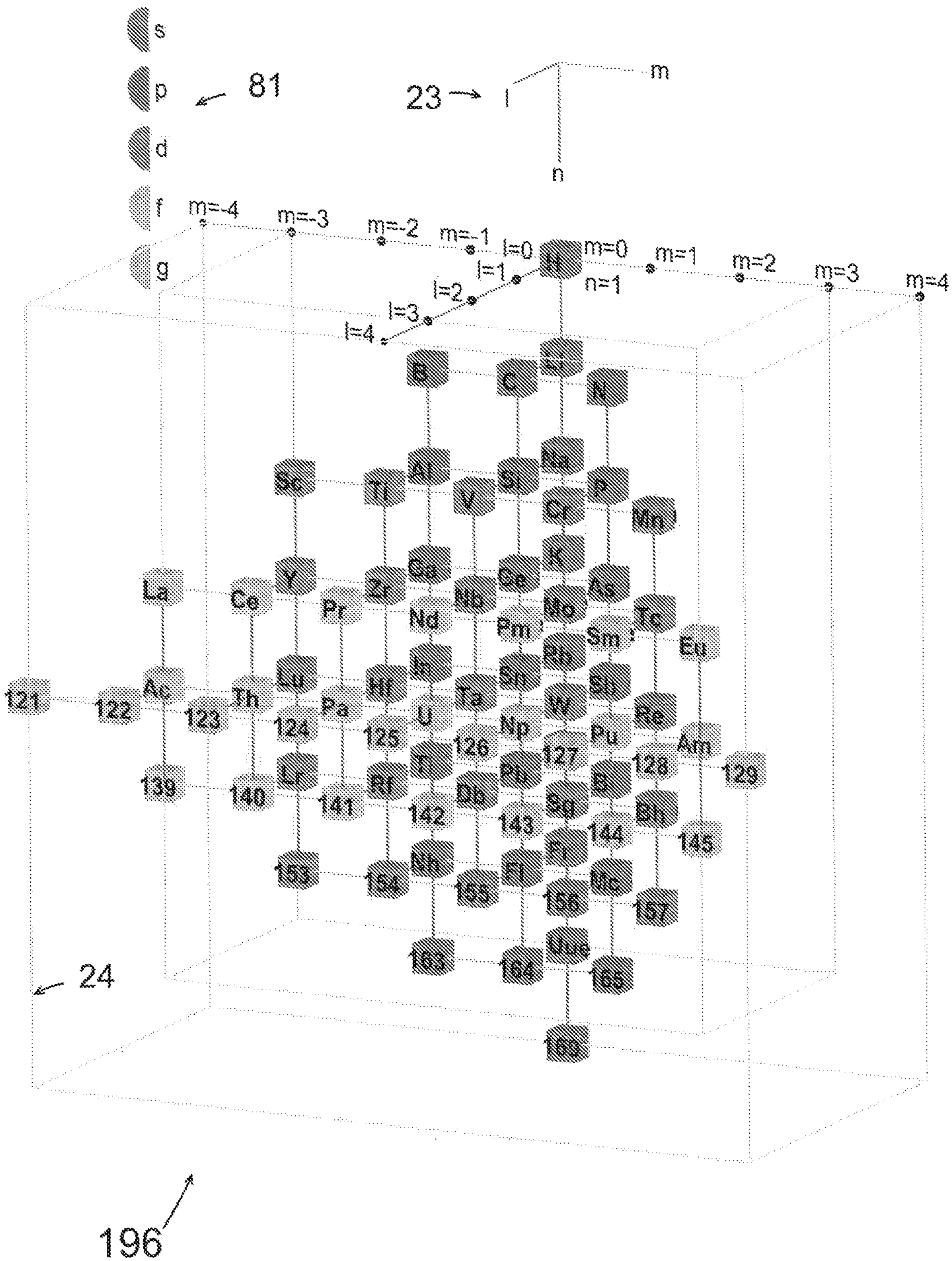
FIG. 68 shows the half-PT or 85 s=1/2 elements of the n=9 system.

Table 3 (FIG. 65) shows the 120 elements organized in 60 complementary pairs of s=1/2 elements s=−1/2 elements in two columns. The elements are further organized in the 4 blocks. The s=1/2 elements are in increasing atomic number or increasing n (reading top to down) while the s=−1/2 elements are in the reverse order of atomic number or decreasing n (reading bottom to top). The quantum sums for complementary pairs of elements are in the extreme right hand column. This pattern in complementarity, like Tables 1 and 2, provides another invariant in the design of periodic table and is independent of the shape of a particular table. There are two patterns of complementarity here. First, the complementary quantum sum within each block is conserved. Second, these quantum sums show a simple pattern: (9,0,0,0), (9,2,0,0), (9,4,0,0) and (9,6,0,0) as indicated by complementary sums for each electronic block in FIGS. 3-6. This pattern of conservation in quantum sums of elements in complementary locations provide a rule for extending the table to g-block and beyond. For example, by extending the PT to include n=9 elements and extending the same pattern of electron configurations in the n=8 system, the respective quantum sums of complementary located elements in the extended s-, p-, d-, -f, -g blocks are in the sequence (10,0,0,0), (10,2,0,0), (10,4,0,0), (10,6,0,0) and (10,8,0,0) for the resulting 170 elements. Extended s-block, p-block and d-block are shown in FIG. 66 and extended f-block and g-block in FIG. 67 with their respective complementary quantum sums. This provides a systematic way to extend beyond the n=8 system by retaining the 4D structure. The extended half-PT for 85 s=1/2 elements is shown in FIG. 68 along with its vector star 23, the bounding box 24 and the color-code 81 for the colors of electronic blocks. It is an extension of the half-PT for the n=8 system in FIG. 17*b* and is an extended cubic lattice comprising 85 elements. The outer form is a disphenoid, an isosceles tetrahedron. With the 85 s=−1/2 elements added, the full extended PT is a 4D-disphenoid, two parallel disphenoids joined by s-axis, the same way a cube is connected to a parallel cube to make a 4D-cube. The 4D-disphenoid has 170 elements lying on the vertices of an extended 4D cubic lattice.

Some examples of complementarity are provided with elements of s- and p-blocks followed by examples of complementarity within topological elements of the 4D PT.

6.1 Blocks: In the s-block (FIG. 3), the global center of symmetry is at (4.5,0,0,0); this is between n=4 and n=5 levels and the center is located at the middle of 2D cell K—Ca—Sr—Rb. The complementary locations around this center are H (1,0,0,1/2) and Ubn (8,0,0,−1/2), Li (2,0,0,1/2) and Ra (7,0,0,−1/2), Mg (3,0,0,−1/2) and Cs (6,0,0,1/2), and so on. The quantum sum of these complementary pairs in s-block equals (9,0,0,0). Similarly, in the p-block (FIG. 4), the global center of symmetry is at location (4.5,0,0,0) lying at the center of cell between n=4 and n=5 planes. Complementary locations in the p-block are B (2,1,−1,1/2) and Og (7,1,1,−1/2), or C (2,1,0,1/2) and Ts (7,1,0,−1/2), or Al (3,1,−1,1/2) and Rn (6,1,1,−1/2), or Ge (4,1,0,1/2) and I (5,1,0,−1/2), and so on. The quantum sum of complementary pairs in p-block equals (9,2,0,0). The quantum sums of complementary pairs in the d- and f-blocks can be verified similarly by inspection of FIGS. 5 and 6.

Figure 69:
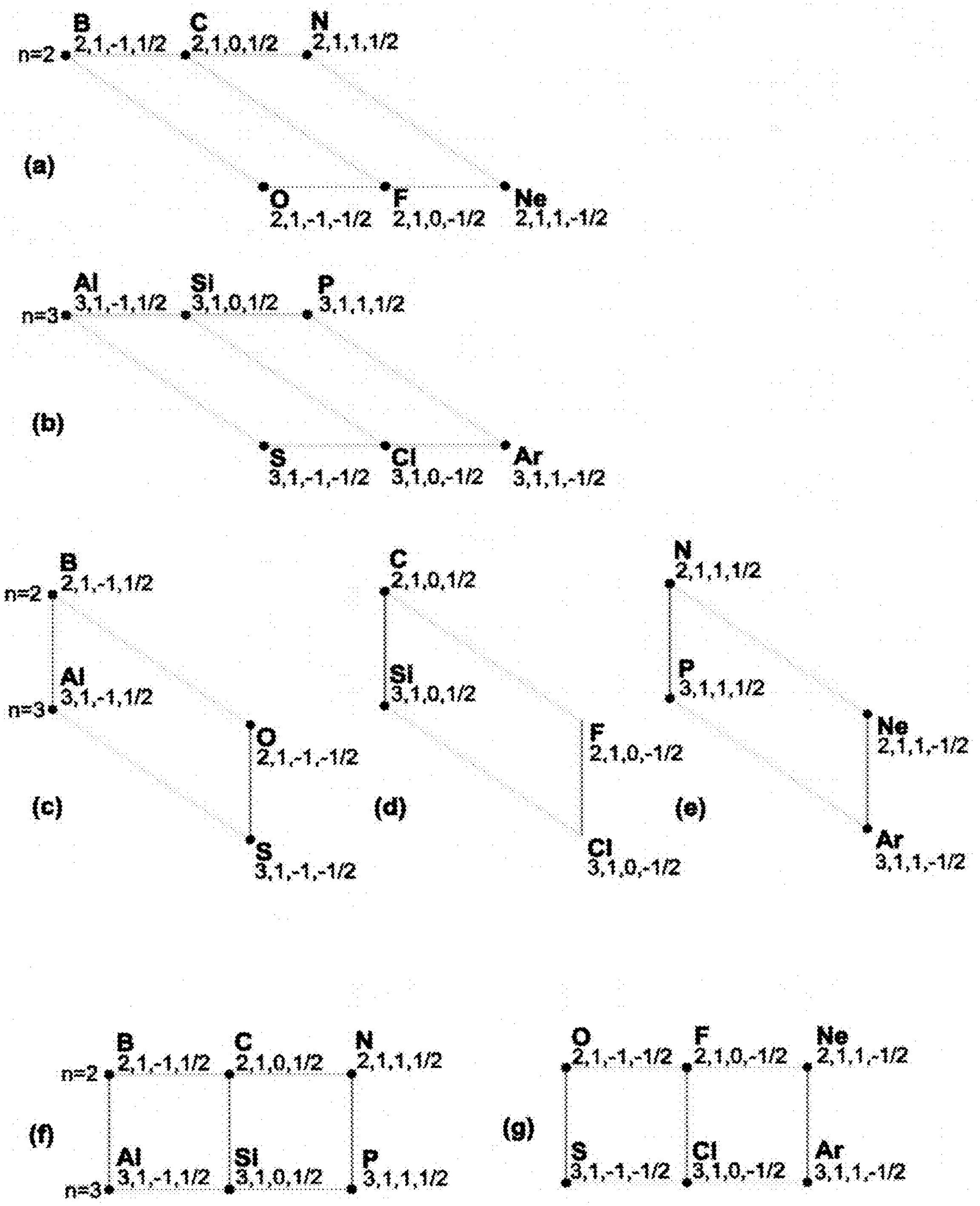
FIG. 69 shows conservation of complementary quantum sums in atomic numbers within portions of the p-block.

6.2 2D Cells: Complementarity within 2D cells (faces of 4D lattice) is illustrated in FIG. 69 with one example of elements in a few cells from the p-block and applies to others cells and blocks. The p-block, an n-m-s block, comprises 3 different planes, n-m, n-s and m-s planes from FIG. 11. Complementarity appears in each plane, both as a whole and within its parts. It applies to all 238 faces of the 4D lattice.

6.21 m-s, n-s, n-m Planes: In FIG. 69*a*, consider the elements in one of the m-s planes, n=2 plane, with B, C, N, O, F and Ne. The elements in opposite locations on this plane are B+Ne, C+F, N+O, their quantum sums equal (4,2,0,0). This can be expressed in the quantum relation B+Ne=C+F=F+Ne=(4,2,0,0). To illustrate one more example, the n=3 m-s plane (FIG. 69*b*), the local complementary quantum sums are conserved by the relation Al+Ar=Si+Cl=P+S=(6,2,0,0). This pattern continues for n=4, 5, 6 and 7 planes where the corresponding quantum sums are (8,2,0,0), (10,2,0,0), (12,2,0,0) and (14,2,0,0). In addition, these sums work within individual 2D m-s cells. For example, in FIG. 69*a*, the complementary quantum sums in B−C−F−O equals (4,2,0,0) and satisfies the relation B+F=C+O=(4,2,0,0), or in C—N—Ne—F the same relation holds F+N=C+Ne=(4,2,0,0). This complementarity works for quantum sums in all 2D m-s cells of each block throughout the 4D lattice though the sums vary in a pattern.

In n-s planes, the complementary quantum sums of outermost elements (n=2 and n=7) in all three planes, B—O-Lv-Nh plane, C—F-Ts-FI plane and N—Ne-Og-Mc plane are equal to (9,2,−2,0). In the individual 2D cells within each plane, it is constant between the n levels. For example in FIG. 69 (*c,d,e*), between n=2 and n=3 levels, this sum is (5,2,−2,0) in all three cases. This sum increases down the block to (7,2,−2,0), (9,2,−2,0), etc. increasing by (2,0,0,0) with each level. Similar patterns exist in other blocks. In the n-m plane, the quantum sum within the n=2 and n=3 levels (FIG. 69*f,g*) the quantum sum equals (5,2,0,1) for the s=1/2 elements and (5,2,0,−1) for the s=−1/2 elements. It increases down the block to the outermost elements and equals (9,2,0,1) for s=1/2 elements and (9,2,0,−1) for s=−1/2 elements. Within each individual 2D n-m cell, the same pattern exists as in the other planes in the p-block as well as in the other blocks. In general, complementarity in quantum sums works in any planar 4-sided polygon within the 4D PT.

Figure 70:
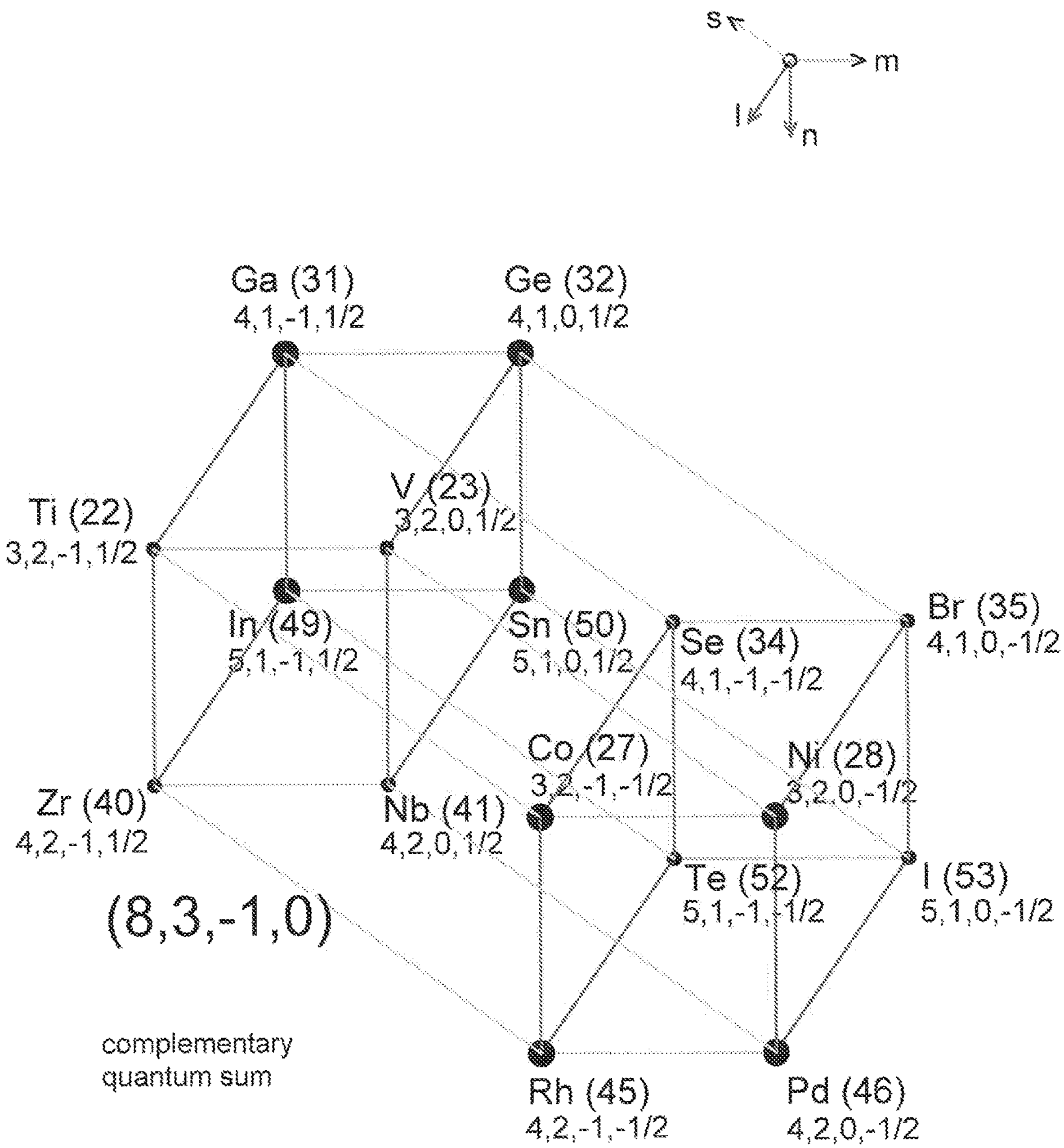
FIG. 70 shows conservation of complementary quantum sums within one 4D cell of 16 elements.

6.3 3D and 4D Cells: FIG. 70 shows one of the 10 4D cells (a hyper-cube) of 16 elements in the PT. This hypercube has 8 3D cells (cubes) and 24 2D cells (squares). It thus has all 6 colored faces in the 4D lattice in FIG. 11 and the 4 orientations of the cubes in FIG. 10 in one diagram. It shows complementarity in quantum sums between all pairs located on the opposite vertices of each 2D cell, each 3D cell and each 4D cell. The complementarity in the 2D cells follows the earlier section. In one of the 3D cells, the octet of elements Ga—Ge—Sn—In—Ti—V—Nb—Zr, the four complementary pairs are Ga—Nb, Ge—Zr, Sn—Ti and In—V. Their quantum sums equal (8,3,−1,1). Similarly, in another octet Ga—Ge—Sn—In—Se—Br—I—Te, the quantum sums of complementary pairs Ga—I, Ge—Te, Sn—Se and In—Be equal (9,2,−1,0). And so on, in all the other six octets. In the 16-plet, the 8 pairs of complements Ga—Pd, Ge—Rh, Br—Zr, I—Ti, V—Te, Sn—Co, Se—Nb and Ni—In equal (8,3,−1,0). There is another layer of pattern in the quantum sums of the different cells, for example, 3D cells and 4D cells. These patterns remain invariant in any 3D or 2D state of the 4D PT but harder to read in instances of topological degeneracies.

7. Complementarity in Atomic Number

Figure 71:
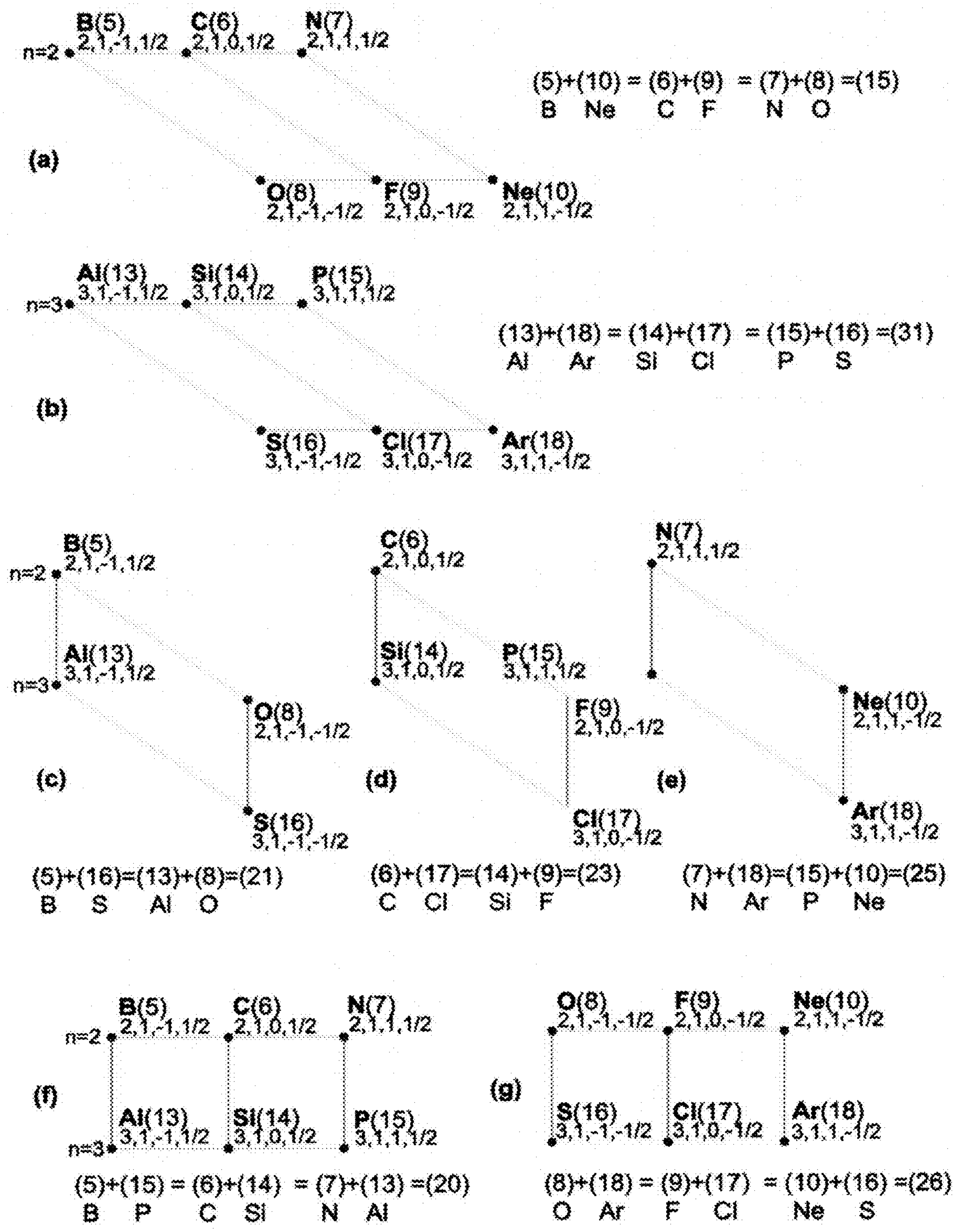
FIG. 71 shows complementarity in atomic numbers of elements within planes of the p-block.
Figure 72:
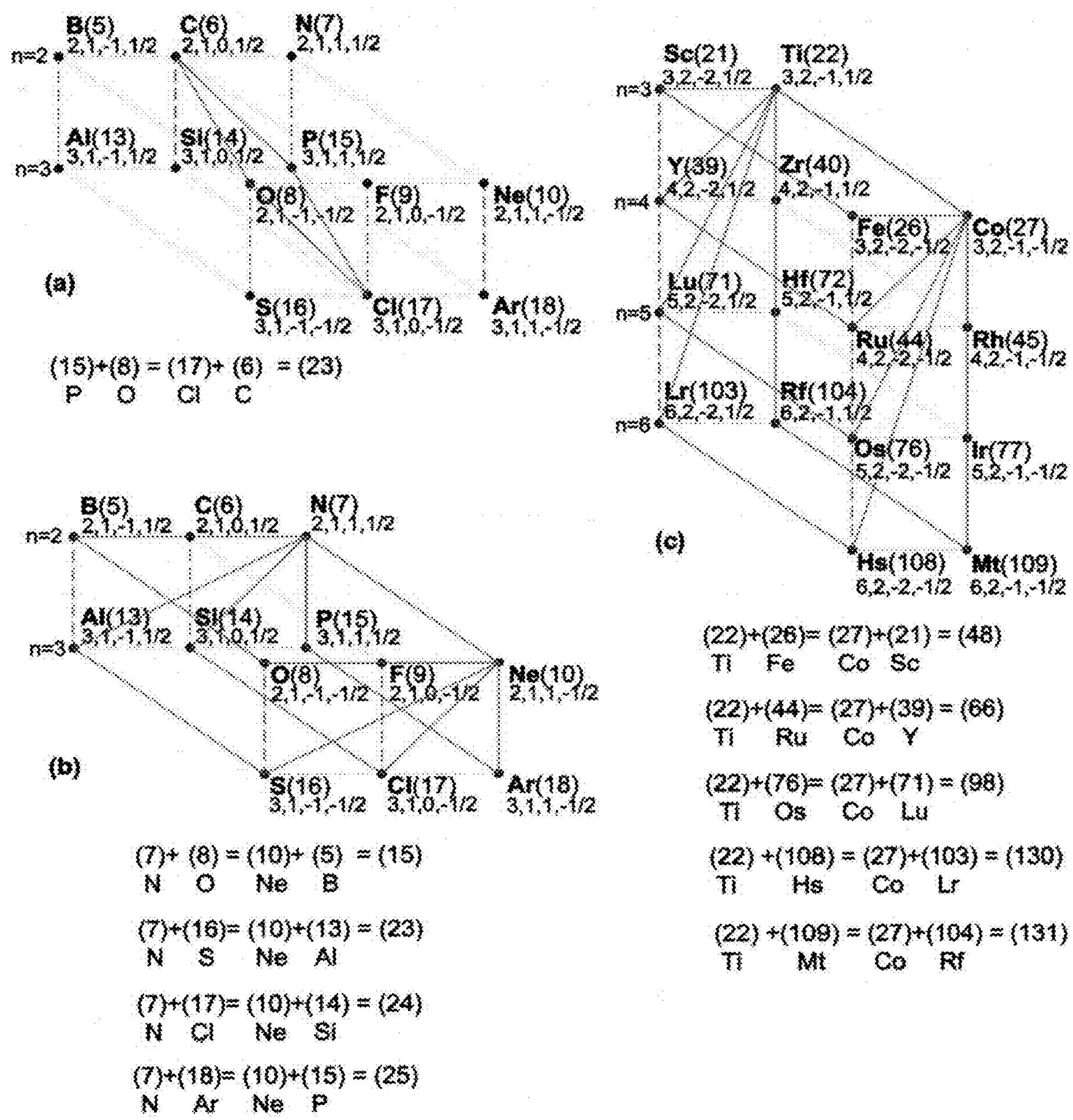
FIG. 72 shows complementarity in atomic numbers of elements within 3D cells of the p-block and d-block.

Complementarity in Z is more complex and is shown for sums of Z (Z-sum) for pairs of elements on plane parallelograms (squares, rectangles, rhombuses, parallelograms) in FIGS. 71 and 72. Additional patterns like progressive complementarity, concentric complementarity and complementary tetrahedral groupings of Z exist in the 4D PT. An example of concentric complementarity in Z can be seen by inspection of Table 3 under the column 'Complementary Z-sum'. In the columnar format, this results in mirror-symmetry in complementary Z-sum with equal number of identical Z-sums on either side of an imaginary mirror plane. For example, in the s-block, the mirror plane is at the line between the pairs K—Sr and Rb—Ca, each pair has a Z-sum of 57. The pattern of Z-sums continues above in the sequence 57, 67, 91, 121 and is mirrored below. In the p-block, the Z-Sum numbers are a pattern of numbers 85, 99, 123 repeated as shown. In the d-block, Z-Sums are in a pattern of 119 and 133 as shown, and in the f-block all Z-sums are 159. In the s-, p- and d-blocks, these numbers are in a concentric 2D (s-block) and 3D (d- and f-blocks) arrangements and can be confirmed by inspecting FIGS. 3-5. FIG. 71 (with identical elements as in FIG. 69) shows a group of examples of the simplest pattern in atomic numbers along faces (2D cells) of blocks. 12 elements of the p-block are illustrated in seven different planes defined by n-, m- and s-axes with n=2,3, m=−1,0,1, and s=1/2 and −1/2. These include two m-s planes (a,b), three n-s planes (c,d,e) and two n-m planes (f,g). The complementary Z-sum equations for each plane are shown alongside. (a) and (b) show six n=2 elements (B,C,N,O,F,Ne) and six n=3 elements (Al,Si,P,S, Cl,Ar), respectively. The three pairs of complementary Z-sums of atomic numbers are represented in the respective equations: B+Ne=C+F=N+O=15 and Al+Ar=Si+Cl=P+S=31, respectively. A similar pattern can be seen in the other planes in (c-g) and is represented by corresponding equations accompanying the diagrams. This pattern exists in all individual faces within each block.

FIG. 72 shows examples of complementary Z-sums in atomic numbers along diagonal planes within a block. For the purposes of illustration, two examples of p-block elements and one of d-block elements are shown with different parallelograms, an oblique one in (a) and varying rectangles in (b) and (c). FIGS. 72*a* and 72*b* show different complementary Z-sums due to different pairings within the same 12 elements in FIG. 71. FIG. 72*a* shows a tilted parallelogram C—P—Cl—O with the complementary sum equation P+O=Cl+C=23. FIG. 72*b* shows one set of five rectangles anchored by the edge N—Ne comprising rectangles N—Ne—O—B, N—Ne—S—Al, N—Ne—Cl—Si and N—Ne—Ar—P. Their complementary Z-sum equations are incremental as shown immediately below the diagram. Similar rectangles are possible by anchoring around any edge of the lattice within any block. FIG. 72*c* shows Z-sums in five rectangles in increasingly larger sizes (due to larger differences in n between the elements) within a portion of the d-block elements. These exhibit higher complementary Z-sums of atomic numbers as shown in the equations below the diagram.

7.1 Atomic Mass+Binding Energy: The complementary pattern in Z naturally applies to the sum of atomic mass and binding energy in complementarily located elements. Binding energy here refers to nuclear binding energy. For A=2*Z elements, electron binding energy should be added but lies outside the range of decimal places shown. The pattern works clearly for all elements up to Z=50 (A=100), i.e. where the number of protons equal the number of neutrons. The introduction of atomic number A adds an additional dimension to the 4 dimensions of the lattice extending it to a 5D periodic lattice as briefly described later in Section 9.

8. Zero Cyclic Sum

The periodic table displays an important conservation principle here termed zero-cyclic sum (or zero-sum for short) which shows an underlying pattern in numbers associated with chemical elements. When all edges (vectors) of the 4D lattice are assigned directions along increasing atomic numbers, the net sum of changes in numbers associated with elements in any closed cycle within the periodic table equal zero. A closed cycle joins any element to any other element in a polygonal loop and changes in numbers are positive when they increase in the same direction (say, clockwise), e.g. an increase in atomic number and negative when they decrease (counter-clockwise direction). Within a cycle, the clockwise sum and counter-clockwise sum are also equal. Examples of zero-cyclic sum are shown for atomic number, atomic mass, nuclear binding energy, electron binding energy and mass excess, and applies to some other properties the author has tested.

Figure 73:
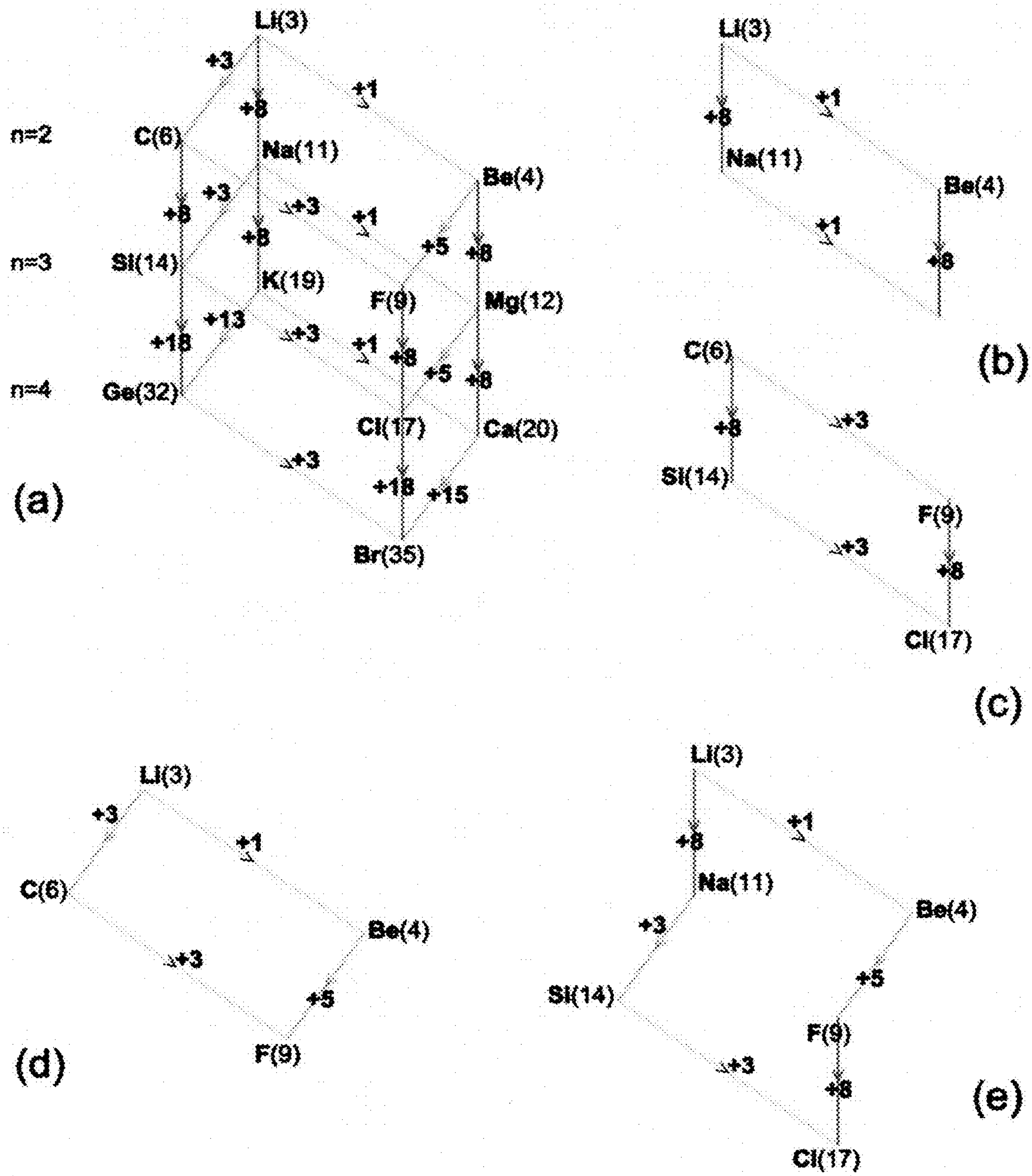
FIG. 73 shows zero-cyclic sum in atomic numbers shown with examples of 12 elements in the s- and p-blocks.

8.1 Atomic Number Z: FIG. 73 shows a small excerpt from the periodic table comprising 12 elements with their atomic numbers indicated within brackets. The elements are from s-block and p-block. All edges of the lattice are marked with arrows having a direction from lower to higher Z. The +sign with a number on each edge indicates the increase in Z between elements connected by the edge. The net change in Z within any closed cycle of elements in clockwise or counter-clockwise direction is zero. This is shown in detail in the four diagrams (b) through (e). (b) shows 4 elements from s-block in a 4-sided planar configuration, (c) shows a similar configuration of 4 elements from p-block, (d) shows 4 elements from s-block and p-block also in a planar 4-sided polygon, and (e) shows 6 elements from s-block and p-block in a non-planar hexagon. The Li—Be—Mg—Na—Li cycle in (b), read in a clockwise manner, has the sum+1+8−1−8 which equals zero; the minus sign is for the counter-clockwise arrows. Similarly, the clockwise sum in C—F—Cl—Si—C cycle (c) yields the equation+3+8−3−8=0, the clockwise sum in Li—Be—F—C—Li cycle in (d) yields+1+5−3−3=0, and the clockwise sum in the hexagonal cycle Li—Be—F—Cl—Si—Na—Li yields+1+5+8−3−3−8=0. These four examples show that the cyclic sum of change in Z between a few chosen elements within a block and between blocks equals zero. Extending this idea over the entire periodic table leads to a conservation principle in atomic numbers of chemical elements: the net change in atomic number in closed cycles of elements within the periodic table is zero. This is also the conservation in the change in number of protons in the periodic table.

Figure 74:
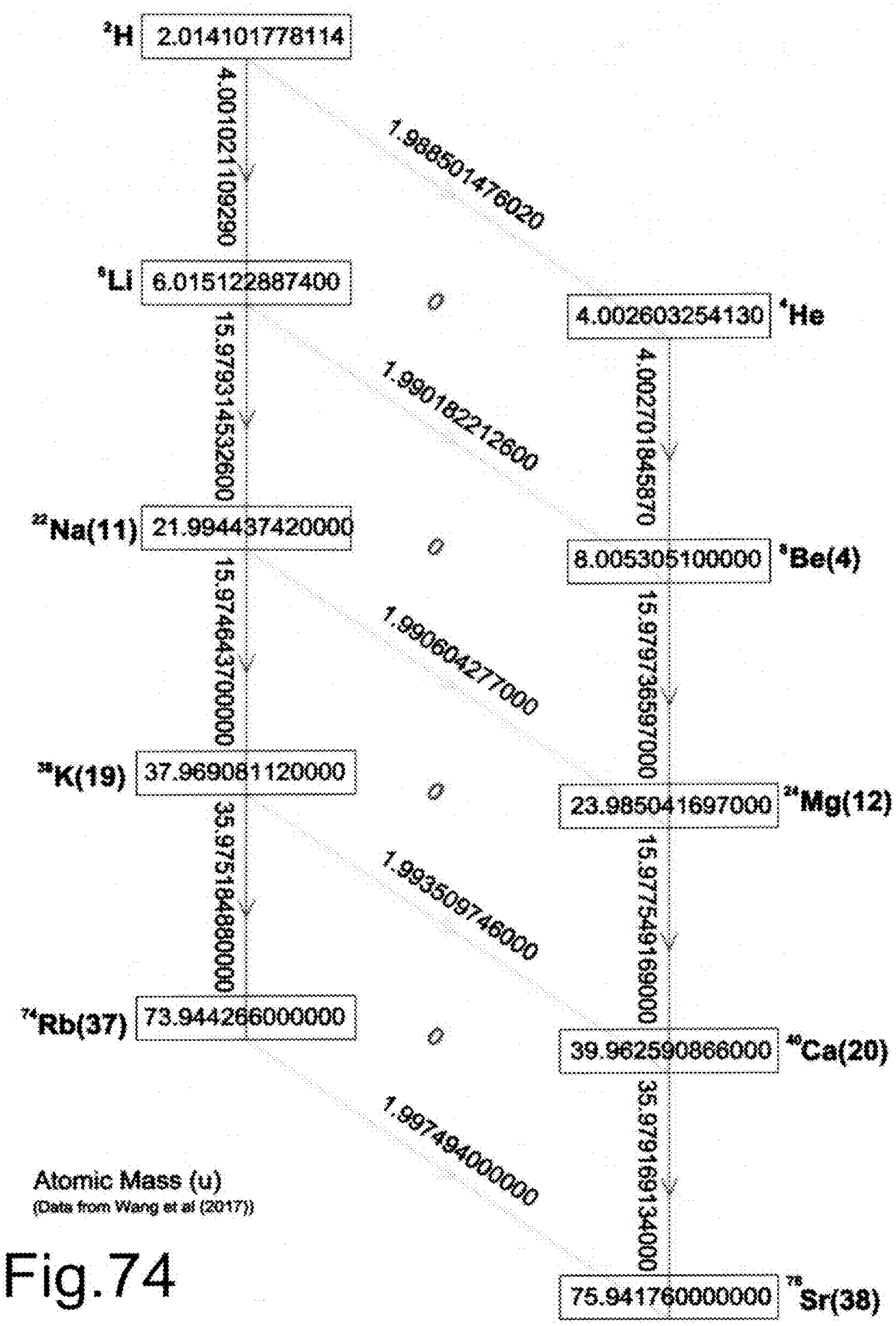
FIG. 74 shows zero-cyclic sum in the atomic masses in 4 cycles within 10 elements of the s-block.

8.2 Atomic Mass: Zero-cyclic sum applies to atomic mass and is shown with one example of 10 elements in the s-block (FIG. 74). The chosen elements have the same number of protons and neutrons, the atomic mass number A is shown for each (on upper left of each element symbol) and the atomic number Z is shown within brackets. The masses are shown at the vertices of the s-block lattice, and mass differences at the edges. The diagram has 4 cycles, each 4-sided. Starting from top left of each, these cycles are H—He—Be—Li—H, Li—Be—Mg—Na—Li, Na—Mg—Ca—K—Na, and K—Ca—Sr—Rb—K. The sum of mass differences in each cycle is zero and is indicated in the middle of each cycle. For example, the clockwise sum of mass differences in the cycle H—He—Be—Li—H is 1.988501476020+4.002701845870-1.990182212600-4.001021109290=0. Other cycle sums in the illustration are derived in the same way. Mass data is taken from the table in Wang et al (2017).

Figure 75:
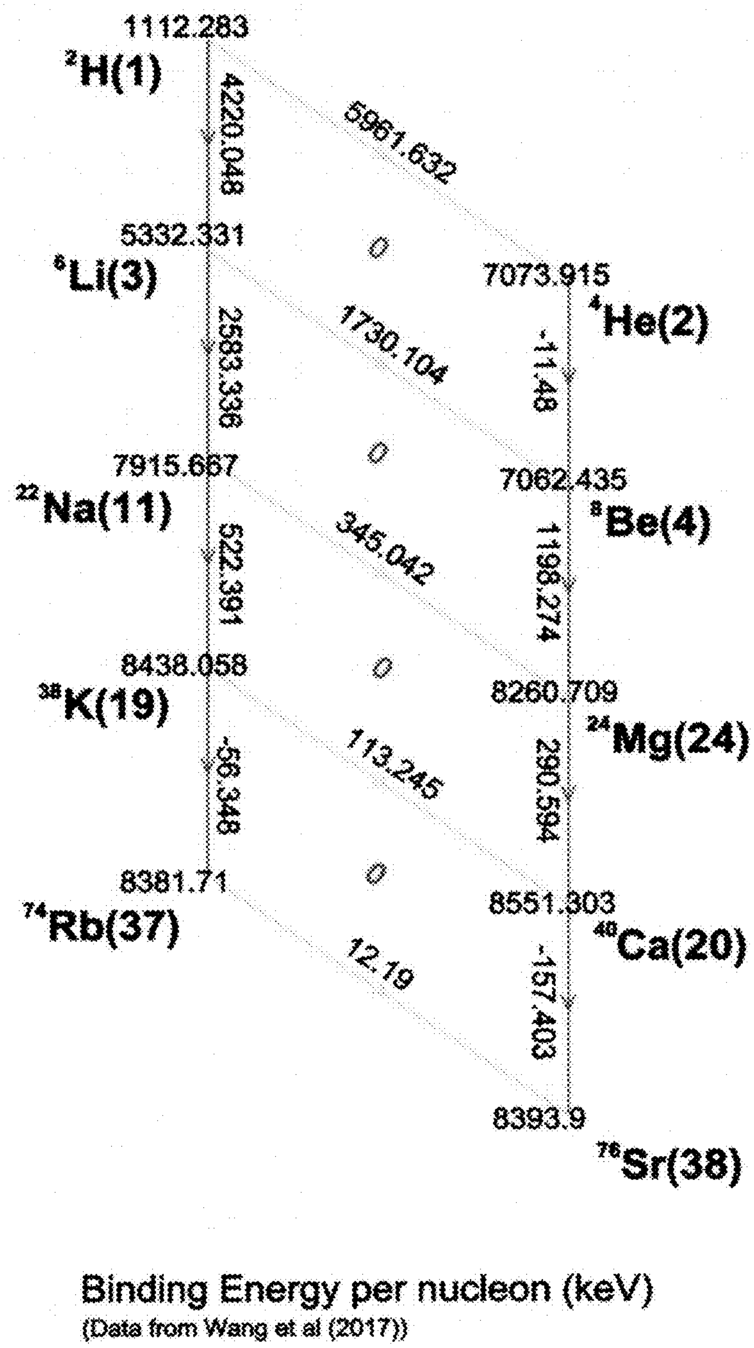
FIG. 75 shows zero-cyclic sum in the binding energy per nucleon within 10 elements of the s-block.

8.3 Nuclear Binding Energy: FIG. 75 shows the binding energy per nucleon (in keV) for the same 10 elements of the s-block as in FIG. 74. The energy is indicated on the vertices, and the energy difference on the edges that join them. As before, the direction of arrows is along increasing atomic numbers, + indicates an energy gain along this direction and − is energy loss along this direction. This is illustrated with one cycle, H—He—Be—Li—H. The sum of energy differences equals 5961.632+(−11.48)−1730.104−4220.048=0. Similarly, the other three cycles in the diagram, namely, Li—Be—Mg—Na—Li, Na—Mg—Ca—K—Na and K—Ca—Sr—Rb—K also show a net zero-sum in energy differences. Nuclear binding energy data is taken from Wang et al (2017).

Figure 76:
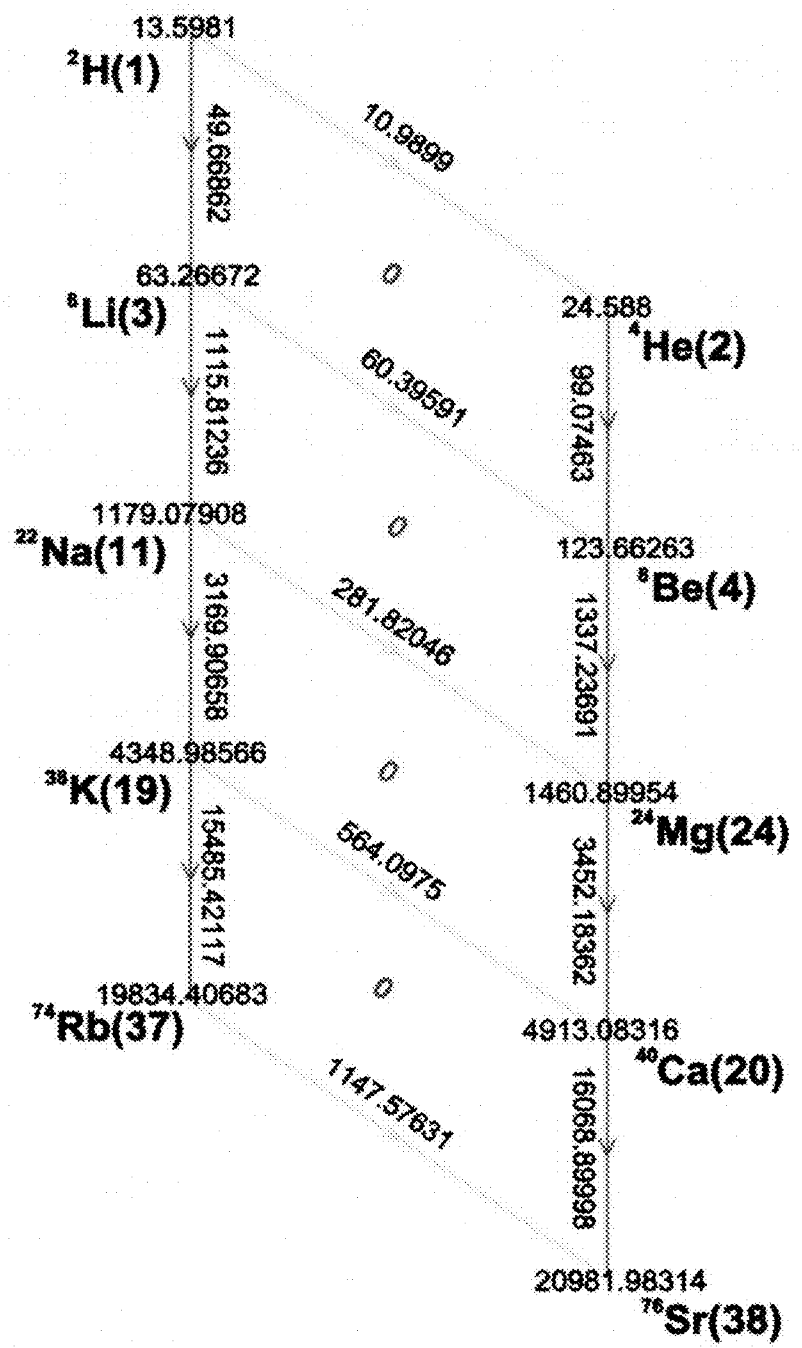
FIG. 76 shows zero-cyclic sum in the total binding energy within 10 elements of the s-block.

8.4 Electron Binding Energy: FIG. 76 shows the electron binding energy (in eV) for the same 10 s-block elements as in FIG. 74. As before, the energy is indicated on the vertices and the energy difference on the edges joining them. The clockwise sum of energy difference in each of the four cycles is 0. For example, the energy difference in the H—He—Be—Li—H cycle equals 10.9899+99.07463−60.39591−49.66862=0. The electron binding energy data is taken from Dan Thomas (1997).

Figure 77:
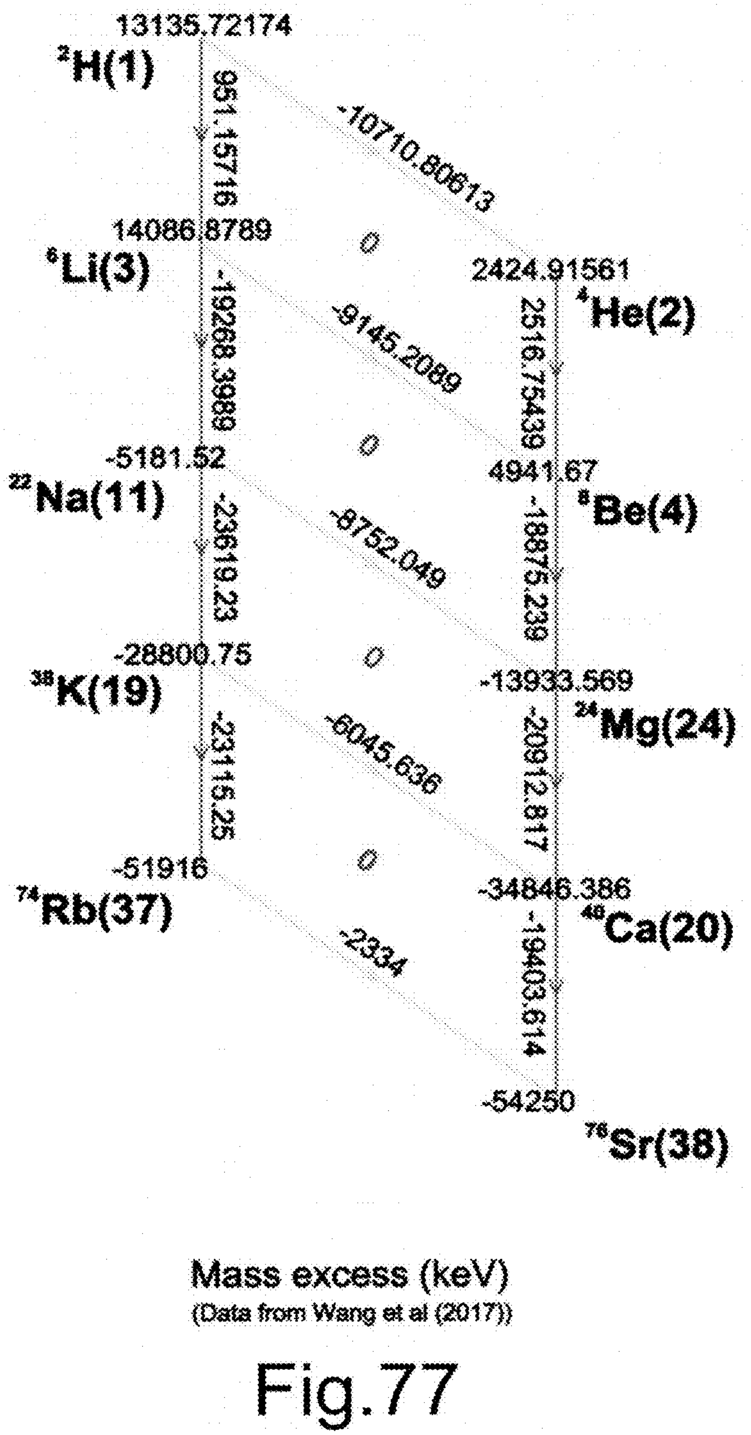
FIG. 77 shows zero-cyclic sum in mass excess within 10 elements of the s-block.

8.5 Mass Excess: FIG. 77 shows the Mass Excess (in keV) for the same 10 s-block elements as in FIG. 74. The mass excess is indicated on the vertices and the difference in mass excess on the edges joining them. The clockwise sum of the mass excess difference in each of the four cycles is 0. For example, the mass excess difference in the H—He—Be—Li—H cycle equals −10710.80613+2516.75439−(−9145.2089)−951.15716=0. Mass excess data is taken from Wang et al (2017).

9. Isotopes

The 4D periodic table of elements can be extended to include isotopes by adding a 5th spatial dimension to the lattice for the variation in the number of neutrons N. This extends the mass number A systematically to include deviations from Z. This new axis (N-axis) can begin with N=0 and have only positive values of N as in the current 2D table of isotopes or nuclides [Sonzogni, 2018]. Alternatively, N=0 location can be where the number of protons and neutrons are equal, i.e. A=2*Z, and N increases away from this position in the positive direction when neutrons are added, or decreases to negative values in the opposite direction. A more compact idea to achieve this would be to re-arrange this neutron axis into several independent axes based on nuclear quantum numbers. This will add several more dimensions to the periodic table.

Figure 78:
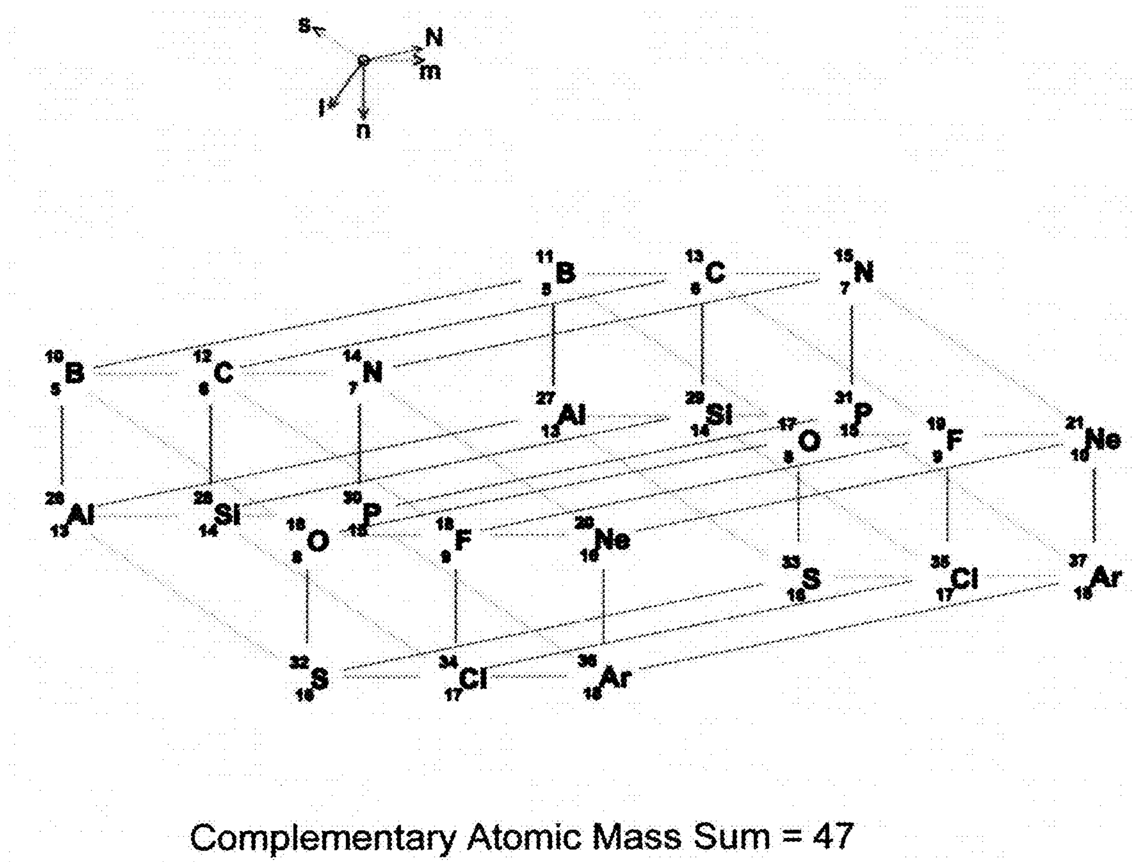
FIG. 78 shows the extension of the 4D PT to a 5D lattice of isotopes by adding N as the fifth dimension. A portion of p-block elements and their isotopes are shown along with their conserved complementary atomic mass sum.

FIG. 78 shows a small portion of this 5D lattice for 12 elements of the p-block located on the left side (same as n=2 and n=3 elements in FIG. 4). These are indexed with their mass number A and atomic number Z, where A=2*Z. Their notation is in the standard form with A on the upper left of the element symbol and Z on the lower left. Additional 12 corresponding nuclides are on located in corresponding locations on the right hand side with one neutron added to each nuclide. These 12 isotopes thus have A=2*Z+1, and the two sets are joined by the N axis representing a gain of 1 neutron by each of the 12 nuclides.

The 5D table exhibits complementarity and the principle of zero-cyclic sum in numbers associated with isotopes in the same manner we saw earlier in elements having equal number of protons and neutrons. This is illustrated with the example of complementarity in A and zero-sum in mass differences in a nucleosynthesis cycle. The basic principles apply to other properties described earlier for Z elements.

9.1 Atomic Mass Number A: In FIG. 78 the sum of atomic mass number A of isotopes in complementary locations is conserved and equals 47 for each of the 12 complementary pairs shown. Also conserved is the sum of atomic numbers Z of elements in complementary locations which equals 23 in this example. The principle of zero cyclic sum in increase and decrease of Z and A also holds here. Conservation of complementary sum of A within a small subset of the 5D lattice would suggest that complementarity of A applies to other subsets of isotopes in each of the four blocks.

Figure 79:
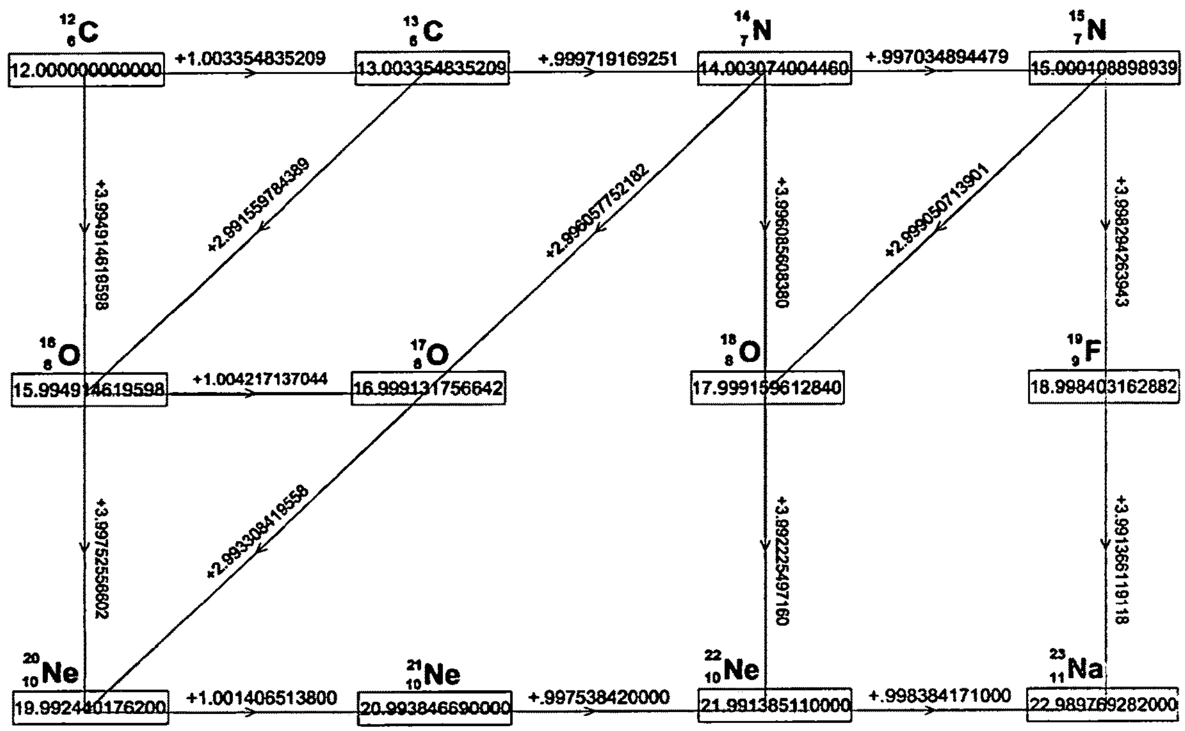
FIG. 79 shows a simplified version of a portion of the nucleosynthesis diagram from the B2FH paper with 10 isotopes of the p-block identified. Atomic masses have been added.

9.2 Isotope Atomic Mass: The zero-sum principle in isotopes is illustrated with one example taken from nucleosynthesis and applies to any cycle in the 5D lattice of isotopes. FIG. 79 shows a diagram excerpted from the B2FH paper (Burbidge et al, 1957, p. 552, FIG. 1,2) and shown here in a simplified network with 12 elements at the nodes and inter-connecting lines from the original drawing. This diagram represents cycles in elements in nucleosynthesis within stars and comprises cycles with different number of sides and meeting non-uniformly at the vertices of the network as compared with identical cycles in FIGS. 71-74. The 12 elements in this excerpted diagram are arranged in 3 parallel rows with 4 elements in each row. The top row (reading from left) comprises $^{12}$C, $^{13}$C, $^{14}$N and $^{15}$N; the middle row has $^{16}$O, $^{17}$O, $^{18}$O and $^{19}$F; and the bottom row has $^{20}$Ne, $^{21}$Ne, $^{22}$Ne and $^{23}$Na. The diagram shows 6 cycles. Reading clockwise from top left of each cycle, these are: three 3-sided cycles ($^{12}$C-$^{13}$C-$^{16}$O), ($^{14}$N-$^{15}$N-$^{18}$O) and ($^{16}$O-$^{17}$O-$^{20}$Ne); one 4-sided cycle ($^{13}$C-$^{14}$N-$^{17}$O-$^{16}$O); one 5-sided cycle ($^{18}$O-$^{15}$N-$^{19}$F-$^{23}$Na-$^{22}$Ne); and one 6-sided cycle ($^{14}$N-$^{18}$O-$^{22}$Ne-$^{21}$Ne-$^{20}$Ne-$^{17}$O). For each isotope, the atomic mass is given by the number inside the rectangular box at each node. Each edge indicates the mass difference between the two elements bounding that edge. The direction of arrows on the edges indicate increase in mass.

Figure 80:
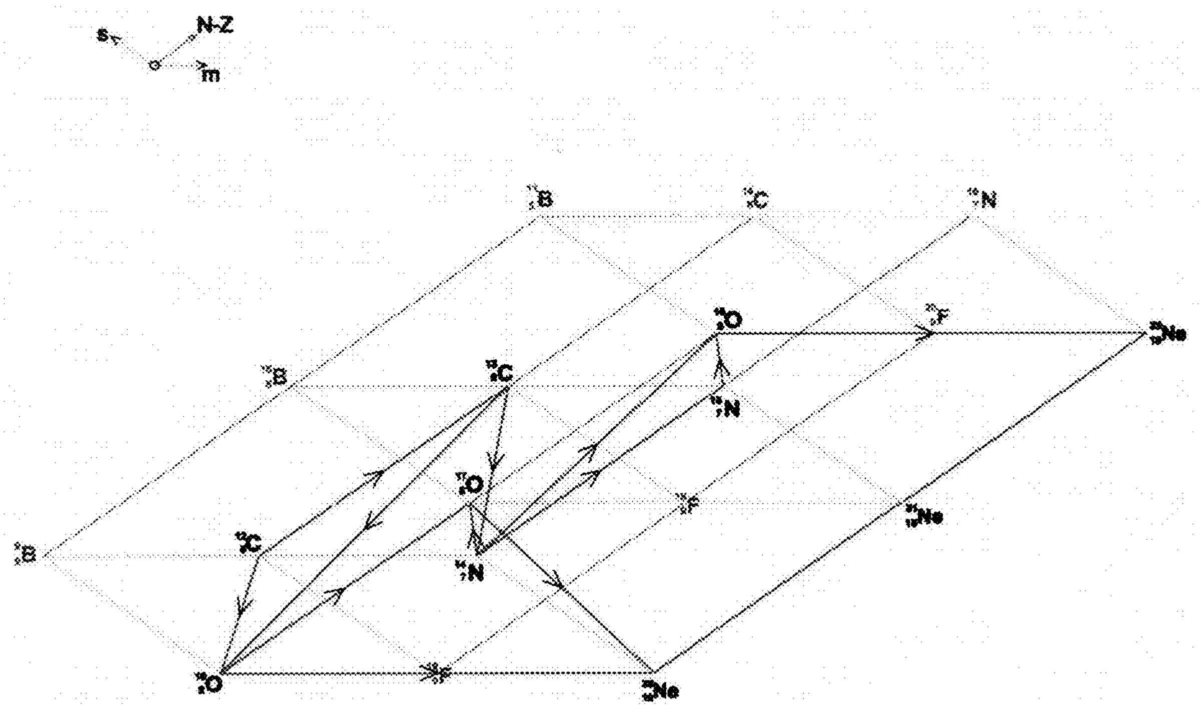
FIG. 80 shows the mapping of the excerpted B2FH diagram in a portion of the 5D lattice of isotopes.

FIG. 80 shows 10 isotopic elements of FIG. 79 belonging to the p-block and represented in a 3D portion of the 5D lattice. The generating vector star is shown on the upper left with m, s and N (or N—Z) as its 3 vectors, with n and I remaining same in all isotopes shown. The isotopes have the same cyclical relationship and directions of arrows in FIG. 79. The diagram shows 5 of the 6 cycles and eliminates the 5-sided cycle containing Na which belongs to the s-block.

Figure 81:
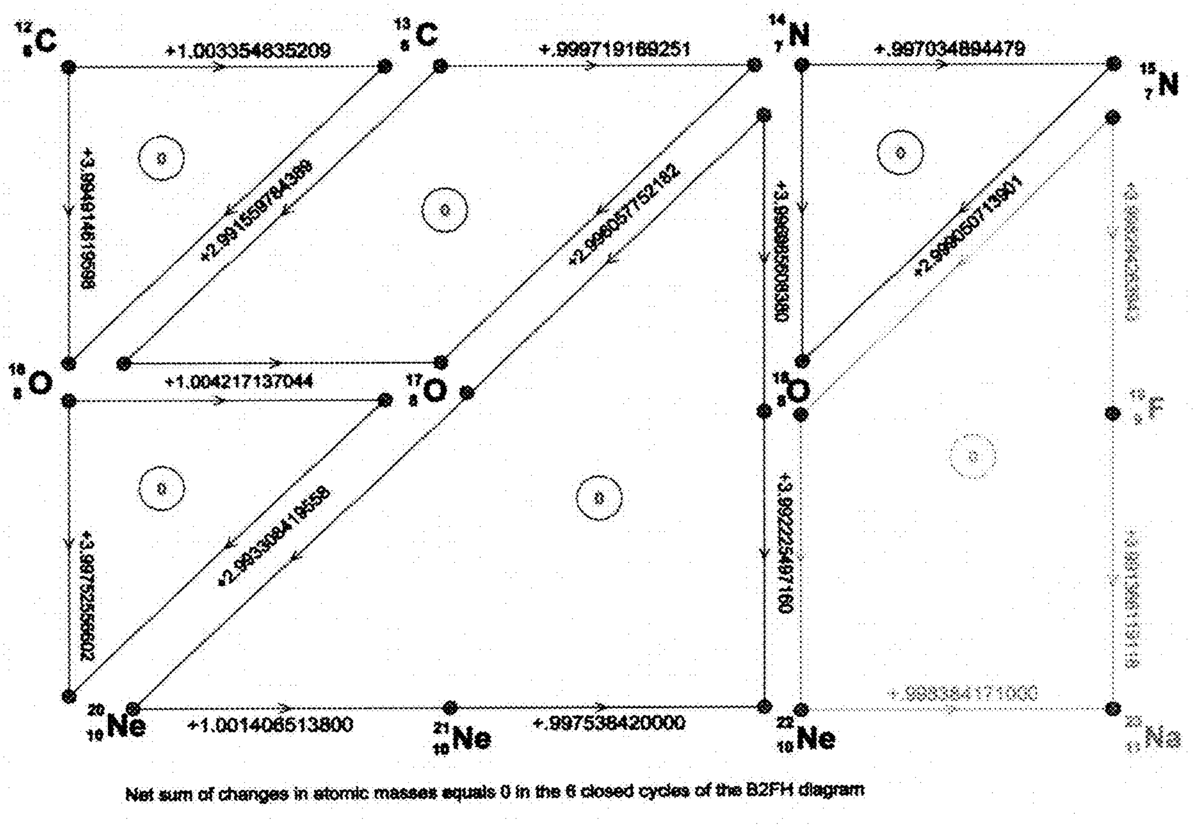
FIG. 81 shows 6 separated cycles within the excerpted B2FH diagram. Each cycle displays a zero-cyclic sum in the changes in atomic masses.

FIG. 81 shows the 6 cycles of FIG. 79 in an exploded view where each cycle is shown as an independent polygon and mass differences for shared edges are shown with a shared number. When the mass differences are added within each cycle by summing the edges of the polygon in clockwise (or counter-clockwise) direction, their sum equals zero in all six cycles. This is indicated by 0 within a small circle inside each polygon. The details are shown in Tables 4 (FIG. 82) and Table 5 (FIG. 83). Table 4 shows the atomic masses of the 12 isotopes in the B2FH paper and their masses are from Wang et al (2017). Table 5 shows the 6 cycles in the B2FH paper, with mass differences indicated for each cycle under different edges (edge1, edge2, edge3, etc.). The + and − signs correspond to the directions of the edges in FIG. 79 in clockwise manner with + indicating an increase in mass, and − indicating a loss of mass. The last column indicates the clockwise sum in each of the 6 cycles and equals 0.

Figure 84:
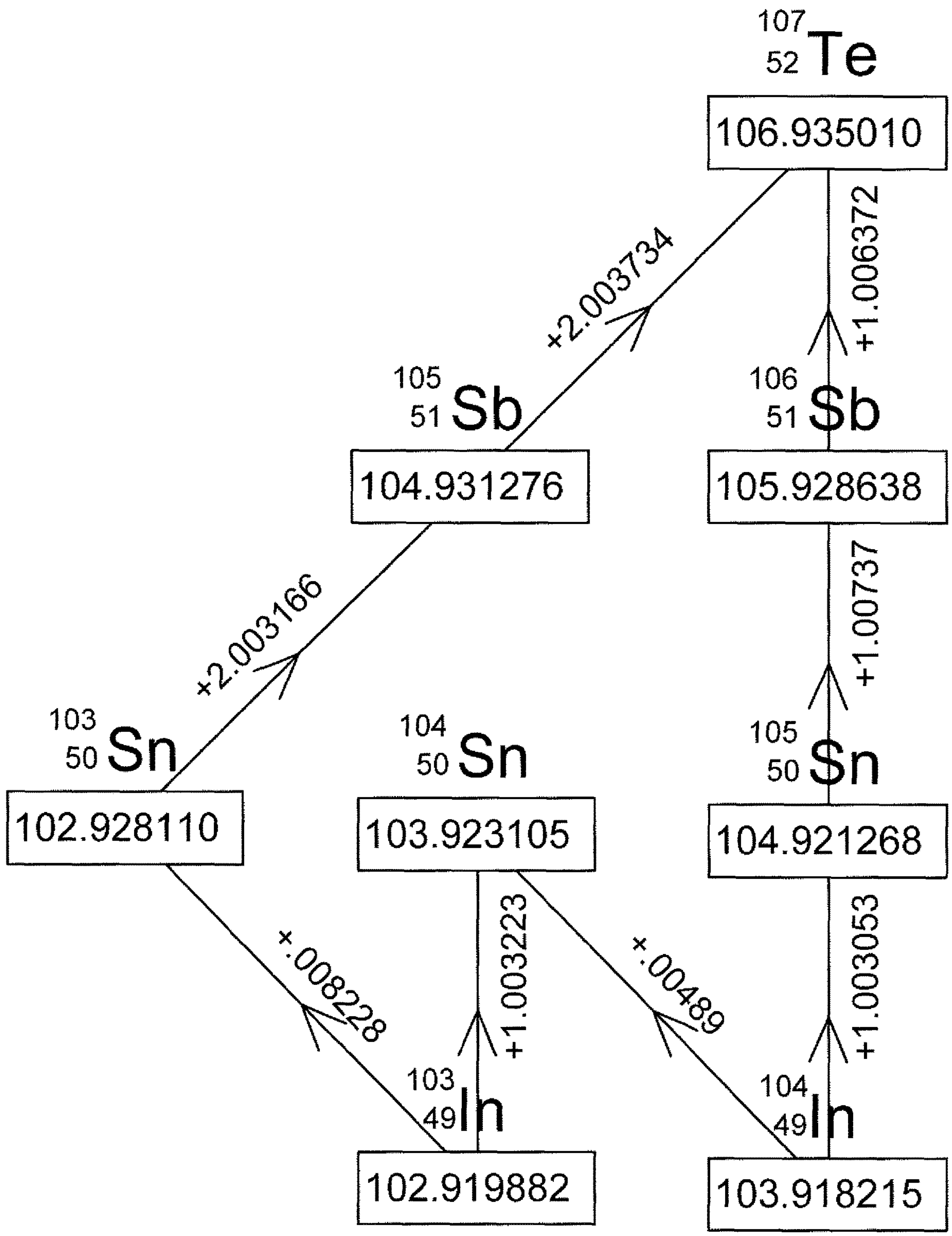
FIG. 84 shows the zero-cyclic sum in atomic masses of 8 higher isotopes in the rp-process in nucleosynthesis.

The zero-sum principle applies to any cycle between any isotopes and also to other properties of isotopes. FIG. 84 shows a path in nucleosynthesis of eight isotopes of Sn, Sb, Te, In and zero-cyclic sum in their mass differences in a diagram of rp-process (rapid proton capture process in nucleosynthesis) overlaid on the known 2D table of nuclides with masses added by the author. The diagram is excerpted from FIG. 26 of the paper Precision Atomic Physics Techniques for Nuclear Physics with Radioactive Beams by K. Blaum, J. Dilling and W. Nortershauser, *Physica Scripta* Vol 2013 T152; the masses are taken from the AME2016 paper by Wang et al cited earlier. This is another complex polygonal loop within the 5D lattice of isotopes. It comprises 8 edges joining the 8 isotopes, the masses of isotopes are indicated inside boxes, the edges have a direction indicated by an arrow in the direction of higher mass. The number at the edges is the mass gain indicated by a +sign. The cyclic sum of mass change in the clockwise direction starting from, say, $^{103}Sn$. The cyclic sum $^{103}Sn+^{105}Sb+^{107}Te-^{106}Sb-^{105}Sn-^{104}In+^{104}Sn-^{103}In+^{103}Sn$ equals 0. Mass is conserved in the cycle. Similarly, number of neutrons is also conserved in the loop.

Figure 85:
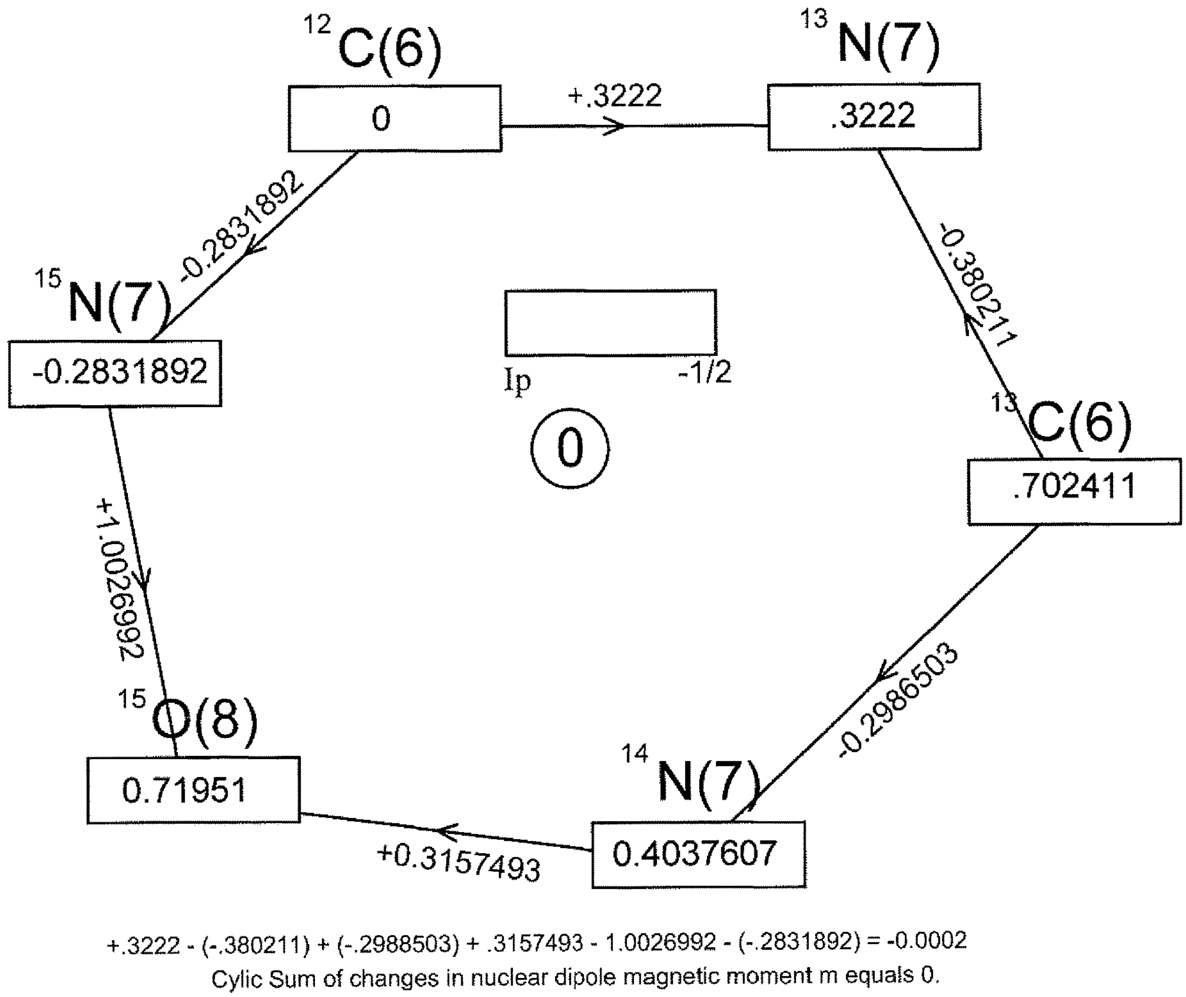
FIG. 85 shows the zero-cyclic sum in nuclear diploe moment in the CNO cycle.
Figure 86:
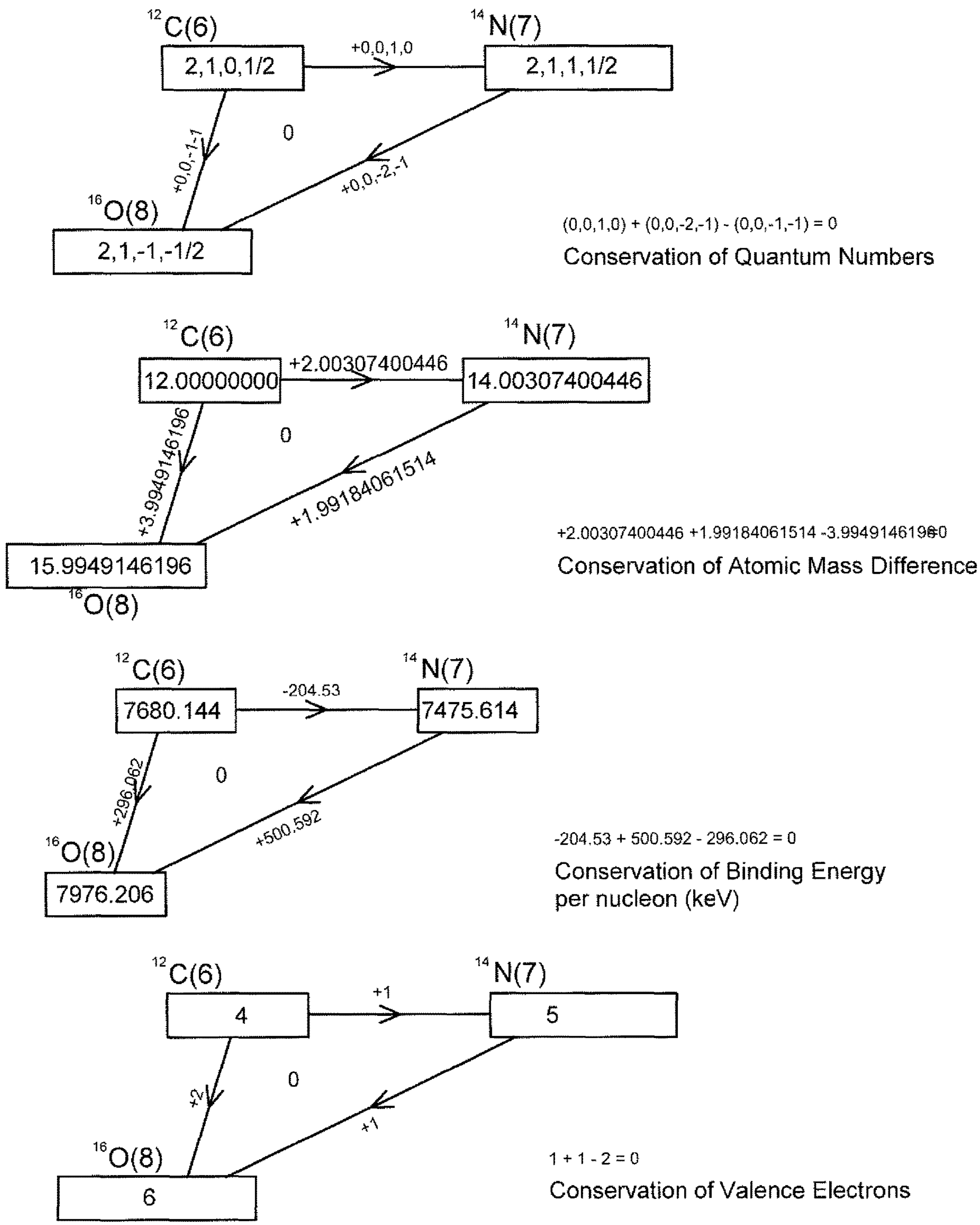
FIG. 86 shows the zero-cyclic sum in various properties of C, N, O shown with conservation of quantum number sum, atomic mass difference, binding energy and number of valence electrons.

FIG. 85 shows the CNO cycle in nucleosynthesis for isotopes of B, C, N, O, F and Ne within the 5D lattice table and the zero-cyclic sum in their nuclear dipole magnetic moments numbers equals 0. FIG. 86 shows zero-cycle sum in various properties of three isotopes, $^{16}O$, $^{12}C$ and $^{14}N$; these properties include quantum numbers, atomic masses, binding energy per nucleon, and valence electrons, and other properties can be added. These are a few examples within the 5D lattice but the principle applies to all closed loops for different properties within the lattice. This also suggests that if each individual loop has a zero-sum, the sum of all possible loops within the 5D lattice will also have a zero-sum. The conservation principle applies locally and globally and is in line with known conservation laws (e.g. conservation of mass, conservation of energy, etc.) with the added advantage that the proposed higher-dimensional periodic table is a graphic representation of the application of these laws to chemical elements in one comprehensive diagram.

10. Periodic Table of Compounds

All molecules and compounds can be systematically mapped in an extended 4D periodic table by using each of the 120 elements in the 4D PT as a new sub-vector in a manner similar to the vector-star method described earlier. The vectors of the 118-vector star are indexed v1, v2, v3, v4, v5, . . . v120, where the suffixes correspond to the atomic number of corresponding elements. The space of the compounds is a 120D-cubic lattice embedded within a super 4D-cubic lattice having the 4 quantum number co-ordinates. It provides a location for all combinations of all elements in one space. This space provides the starting point of an inclusive generative taxonomy for compounds wherein known compounds are indexed by specific co-ordinate locations and new compounds can be generated systematically. Isomers will require branching from each node of a generic compound to extend the morphologic space of compounds. This will add more local dimensions at each vertex to extend the morphological space of compounds.

Figure 87:
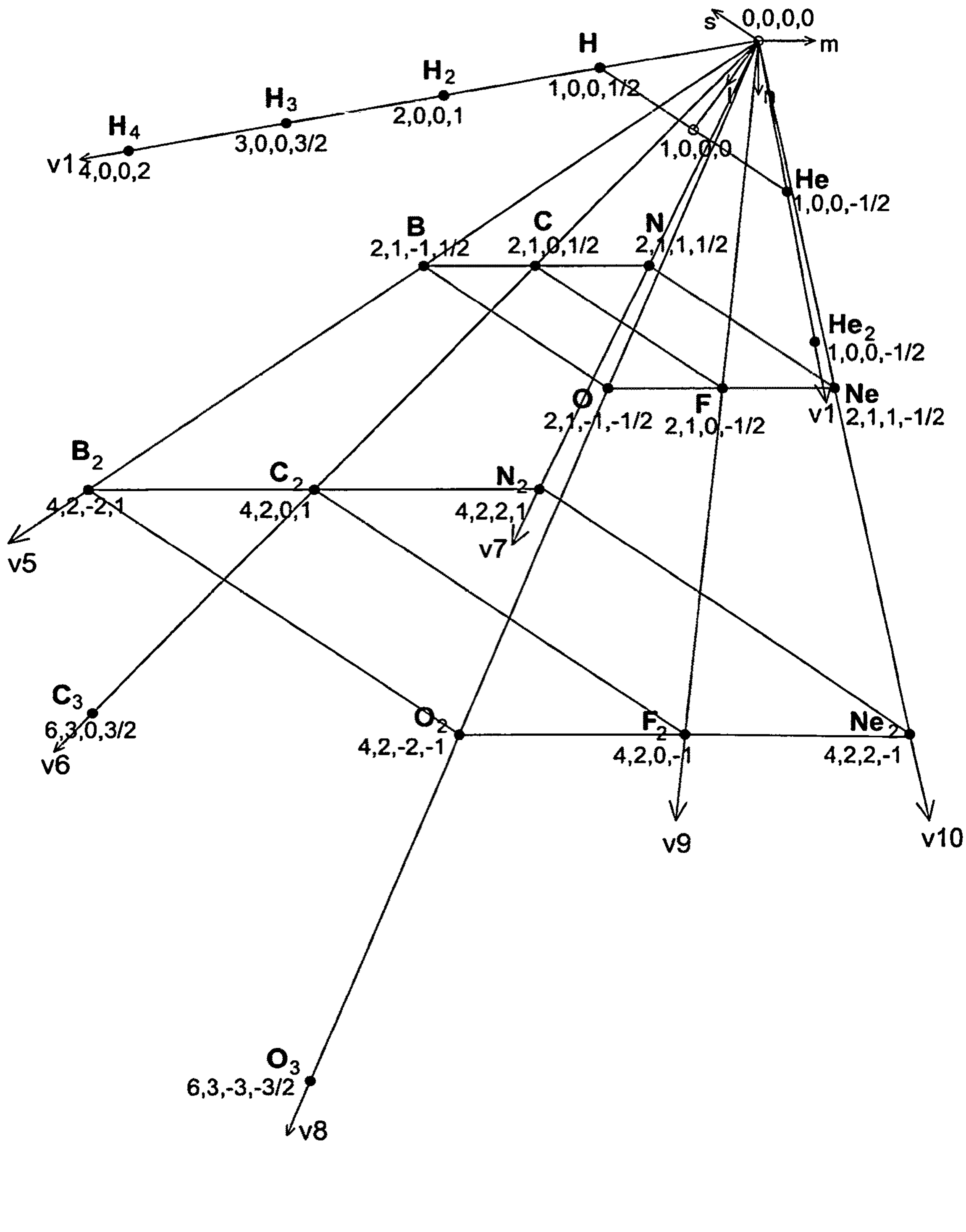
FIG. 87 shows the method of generating a super periodic table by extending all 120 elements as vectors from a common origin, the extended vectors with multiple atoms of same element, e.g. H, $H_2$, $H_3$, $H_4$ and so on for each element.

As an example, eight of these 118 vectors, v1-v8, are shown in FIG. 87; the vector numbers correspond to the atomic number of each element, e.g. v1 for atomic number 1, v2 for atomic number 2, and so on. Two are from the s-block n=1 elements H (v1) and He (v2), and six from the p=block n=1 elements, namely, B(v5), C(v6), N(v7), O(v8), F(v9) and Ne(v10). Each vector axis comprises molecules or multiples of each element which act as generators for compounds. For example, vector v1, specifies H (1,0,0,1/2), H2 (2,0,0,1), H3 (3,0,0,3/2), . . . ; vector v8 specifies O (2,1,−1,−1/2), O2 (4,2,−2,−1), O3 (6,3,−3,−3/2), and so on. Classes of compounds corresponding to each compound for each element can be systematically and exhaustively generated by combining vector with others within subsets of the 118D space. A few examples are shown in FIGS. 88-93.

Figure 88:
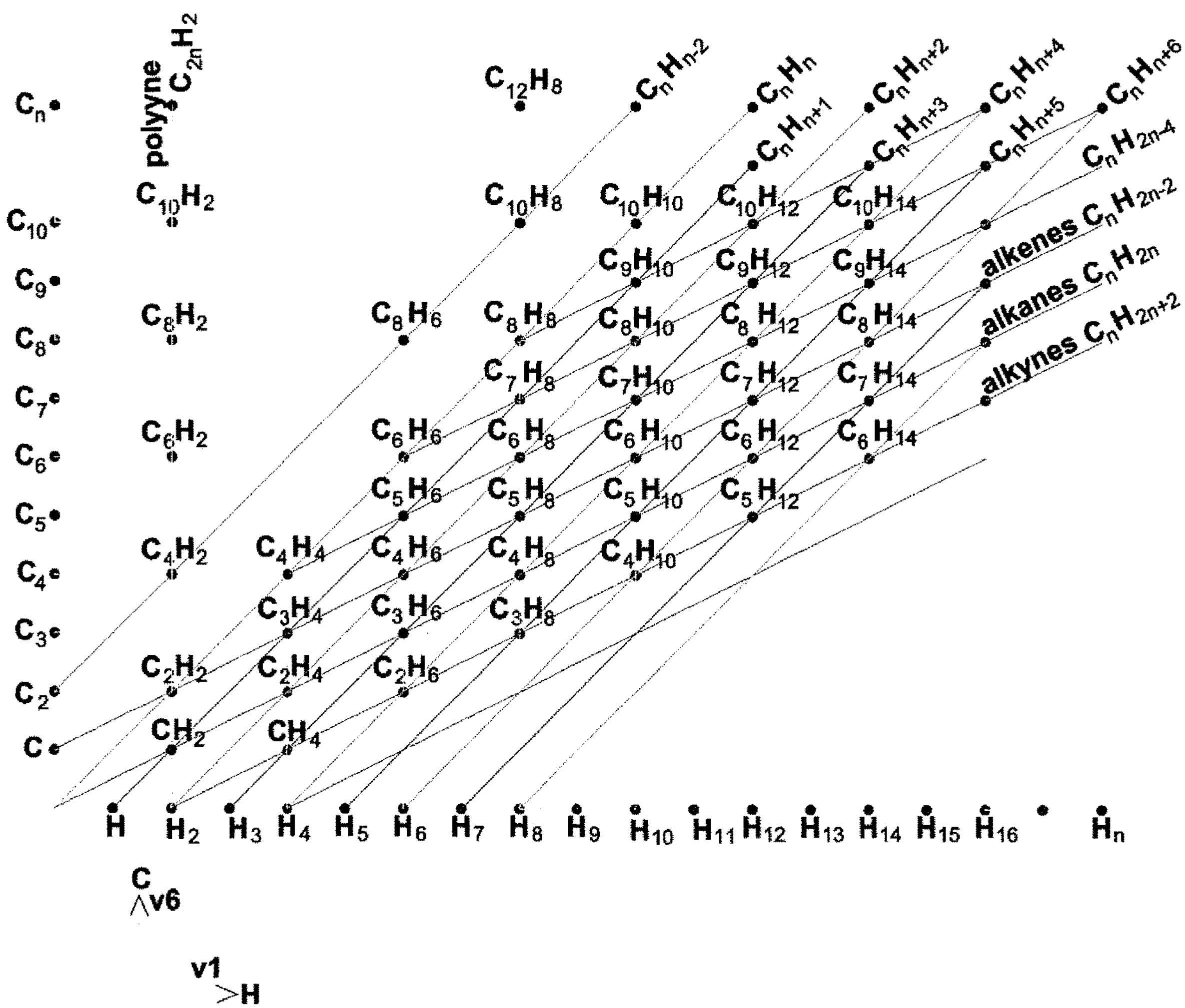
FIG. 88 shows a 2D PT of hydrocarbons multiples of H and C along 2 of the 120 vectors.

FIG. 88 shows a 2D table of hydrocarbons defined by v1, the Hydrogen axis, and v6, the Carbon axis. These two axes are defined by the 2-vector star shown below the table.

Some formulae for classes of hydrocarbons are indicated as diagonals within this 2D lattice.

Figure 89:
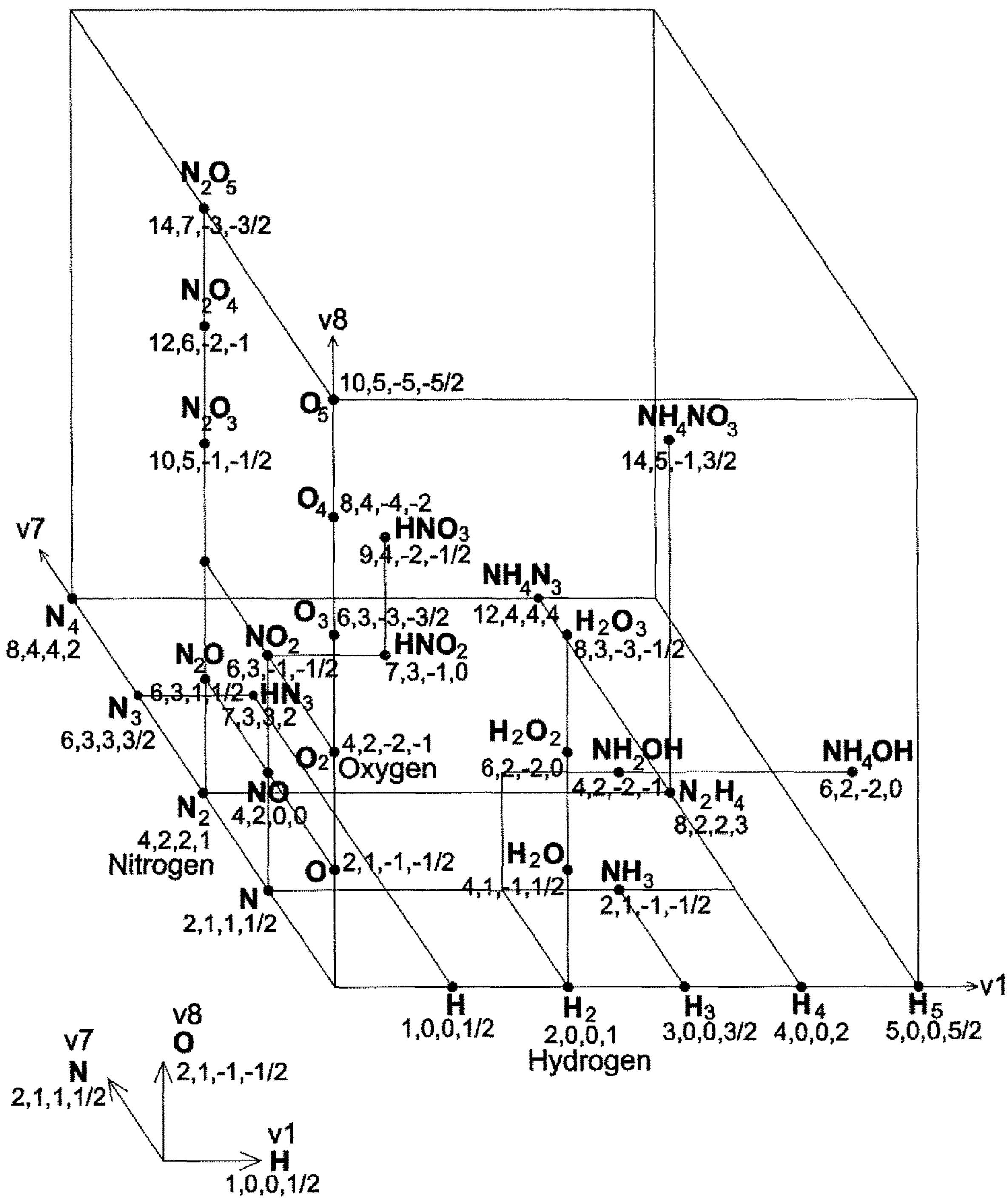
FIG. 89 shows a 3D PT of compounds of H, N, O along 3 of the 120 vectors.

FIG. 89 shows a 3D table of compounds of Nitrogen (v7), Oxygen (v8) and Hydrogen (v1). The 4D quantum co-ordinates are shown for each molecule and compound, the generating 3-vector star is shown below.

Figure 90:
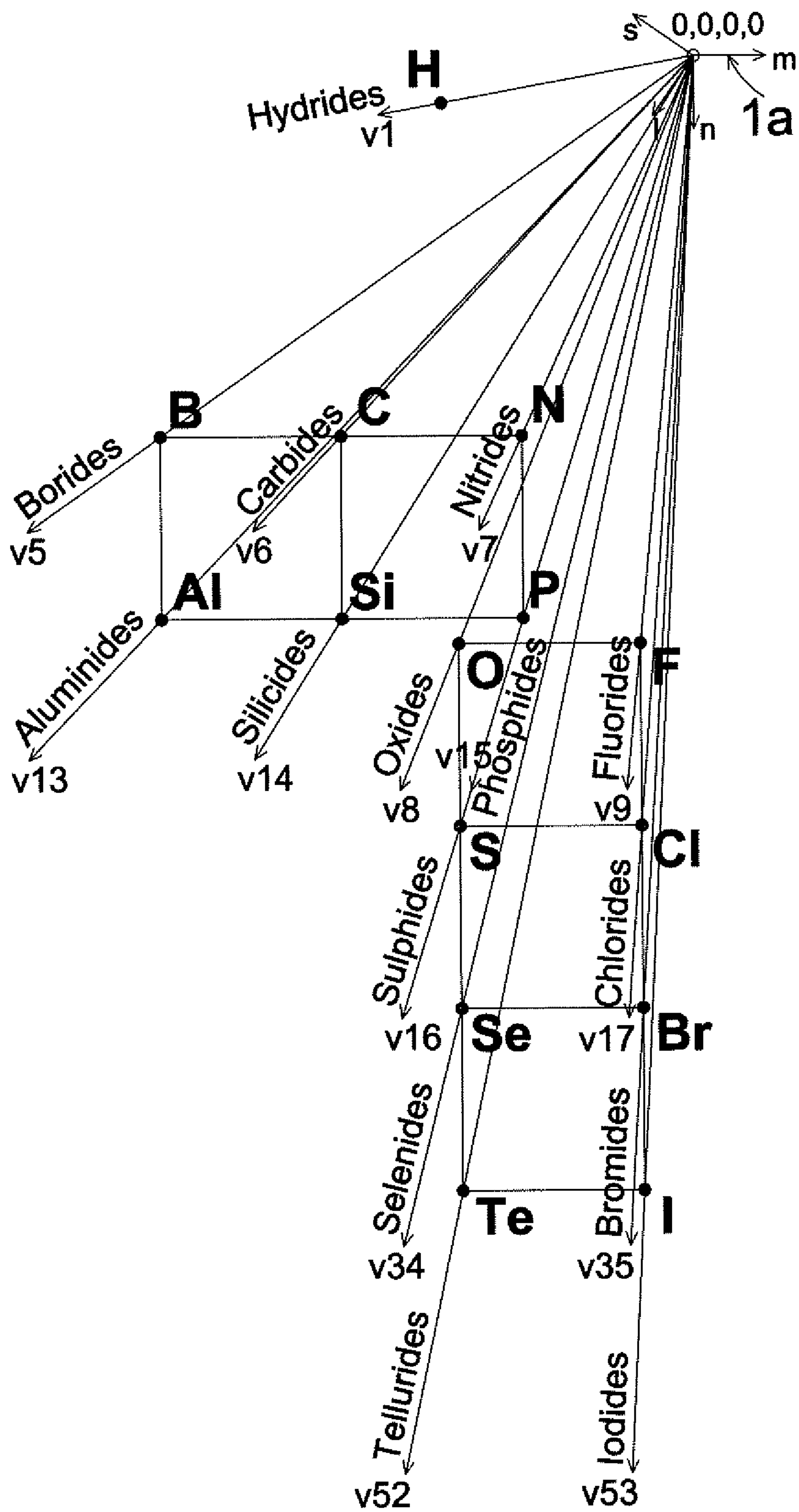
FIG. 90 shows the generating vectors for deriving the families of compounds from 14 p-block elements.

FIG. 90 shows the method for generating families of compounds of various elements generated by their corresponding vectors: v1 (H) generates hydrides, v5 (B) generates borides, v6 (C) carbides, v7 (N) nitrides, v8 (O) oxides, v9 (F) fluorides, and so on. Vectors for 15 families are shown as an example.

Figure 91:
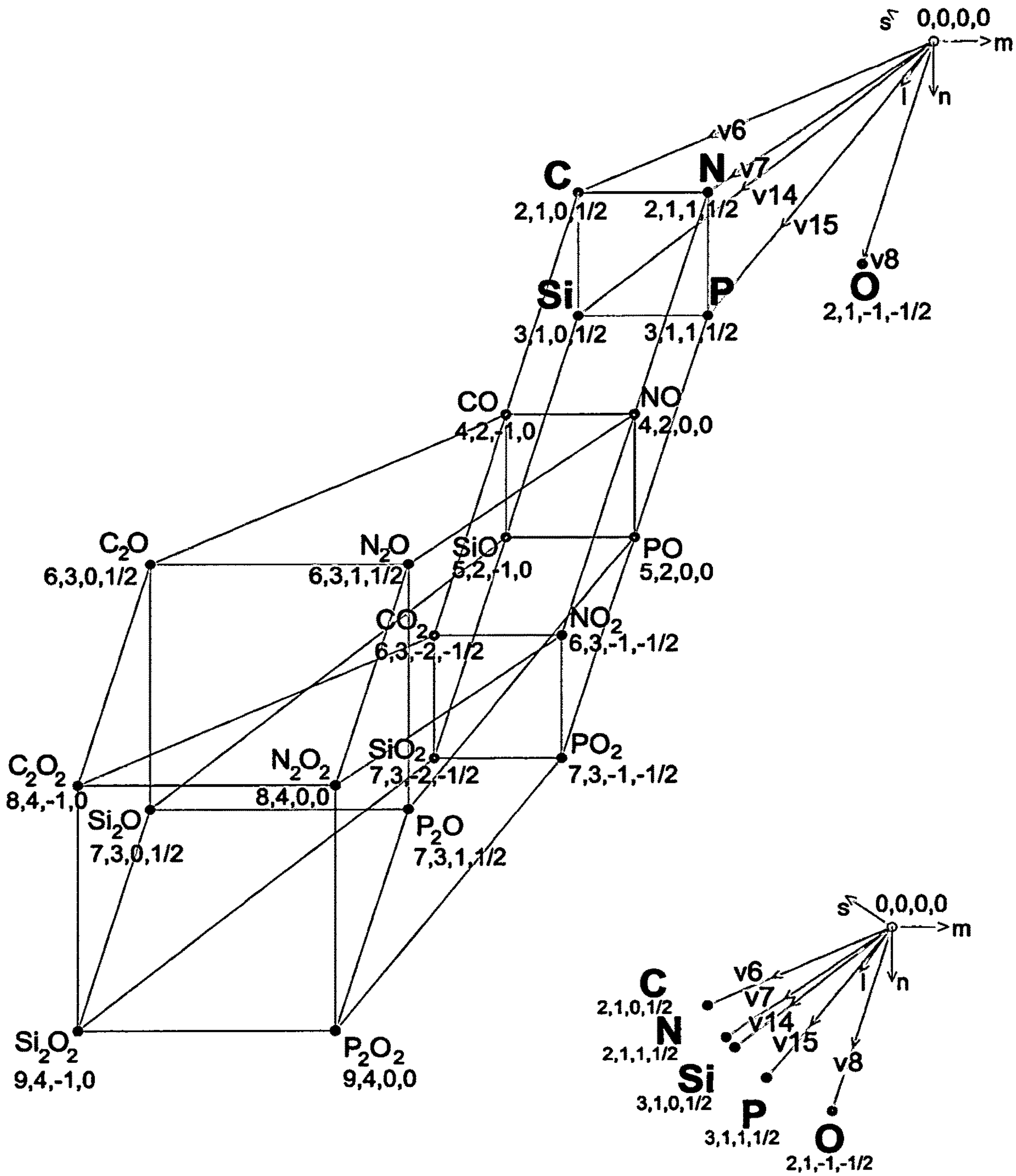
FIG. 91 shows a portion of the 5D lattice of compounds from 5 elements C, N, Si, P and O.

FIG. 91 shows 16 oxides of four elements, C (v6), N (v7), Si (v14) and P (v15). This is a smaller subset of possible oxides of these compounds since the set shown is restricted to one or two atoms of each element. The 16 compounds are defined by a hyper-cube (4D cube) in a perspective state since the generating vectors are radiating from a point the origin (0,0,0,0). The vector star is shown on bottom right.

FIG. 92 shows the same 4D cube in a more familiar orthographic view. In this centrally symmetric view, it is easy to see complementarity between compounds—the sum of quantum numbers of the 8 complementary pairs of compounds on opposite locations around the center of 4D cube are equal and conserved at (13,6,−1,0). The generating 4-vector star is shown below.

Figure 93:
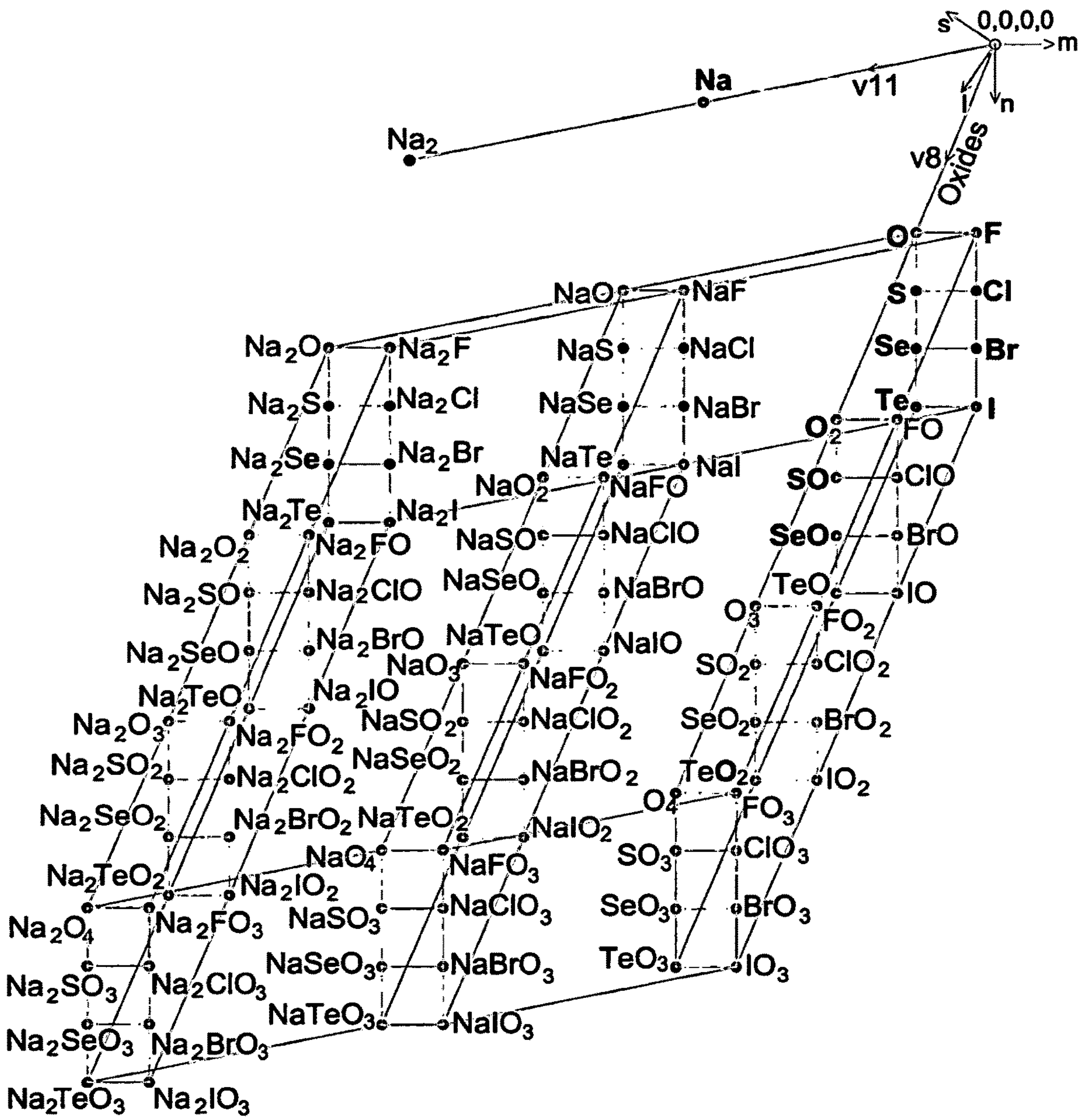
FIG. 93 shows a 4D lattice of compounds of oxides of Na combined with other p-block elements.

FIG. 93 shows an example of oxides of sodium in a 4D lattice. The primary generator axes are v8 (O) and v11 (Na). These are combined with 8 other elements: F, Cl, Br, I in one column (on upper right of illustration) and O, S, Se, Te. Moving along vector v11 from these 8 elements, Na and Na2 are added to generate sodium compounds. Moving along vector v8 from these compounds, all sodium oxides with O, O2 and O3 are generated.

FIG. 94 shows a Table of Sodium compounds with their quantum co-ordinates, element vectors (v1, v5, v6, . . . ) and element co-ordinates which specify the combinations of vectors being used. For example, sodium dioxide NaO2 has element co-ordinates defined by v8, v11 which represent Oxygen and Sodium, respectively. Since there are 2 oxygen atoms (v8=2) and 1 sodium atom (v11=1), the element co-ordinates are (2,1). This way the 120D co-ordinates can be compacted to only those vectors that are being used.

Figure 95:
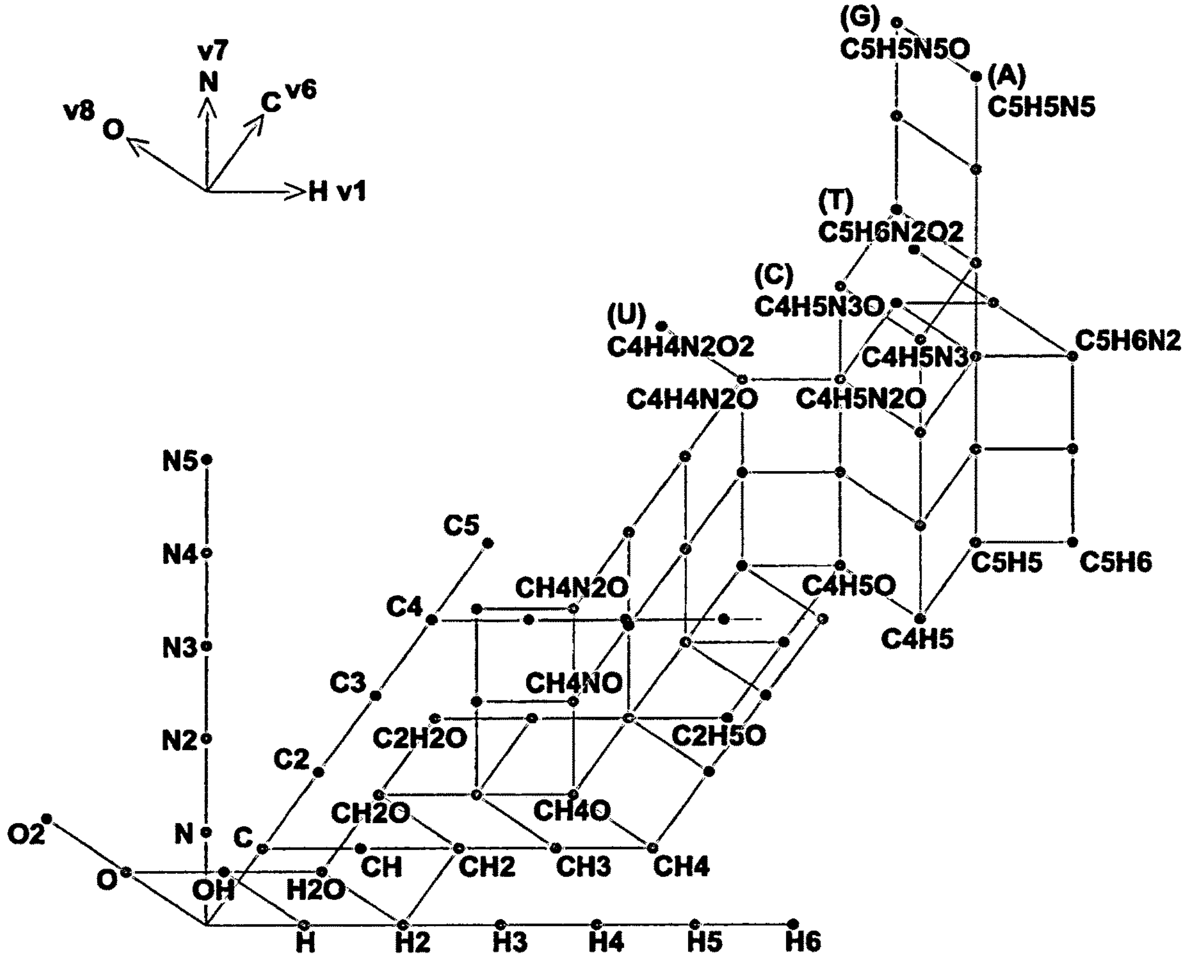
FIG. 95 shows partially filled space of H, C, N, O leading to the 4 DNA bases.

FIG. 95 shows the (v1,v6,v7,v8) space of (H,C,N,O) compounds. This 4D diagram defines the primary morphological space of abiogenesis emanating from the origin (0,0,0,0) and provides potential chemogenetic pathways from simpler compounds to the DNA-RNA bases on the upper right of the diagram.

Figure 96:
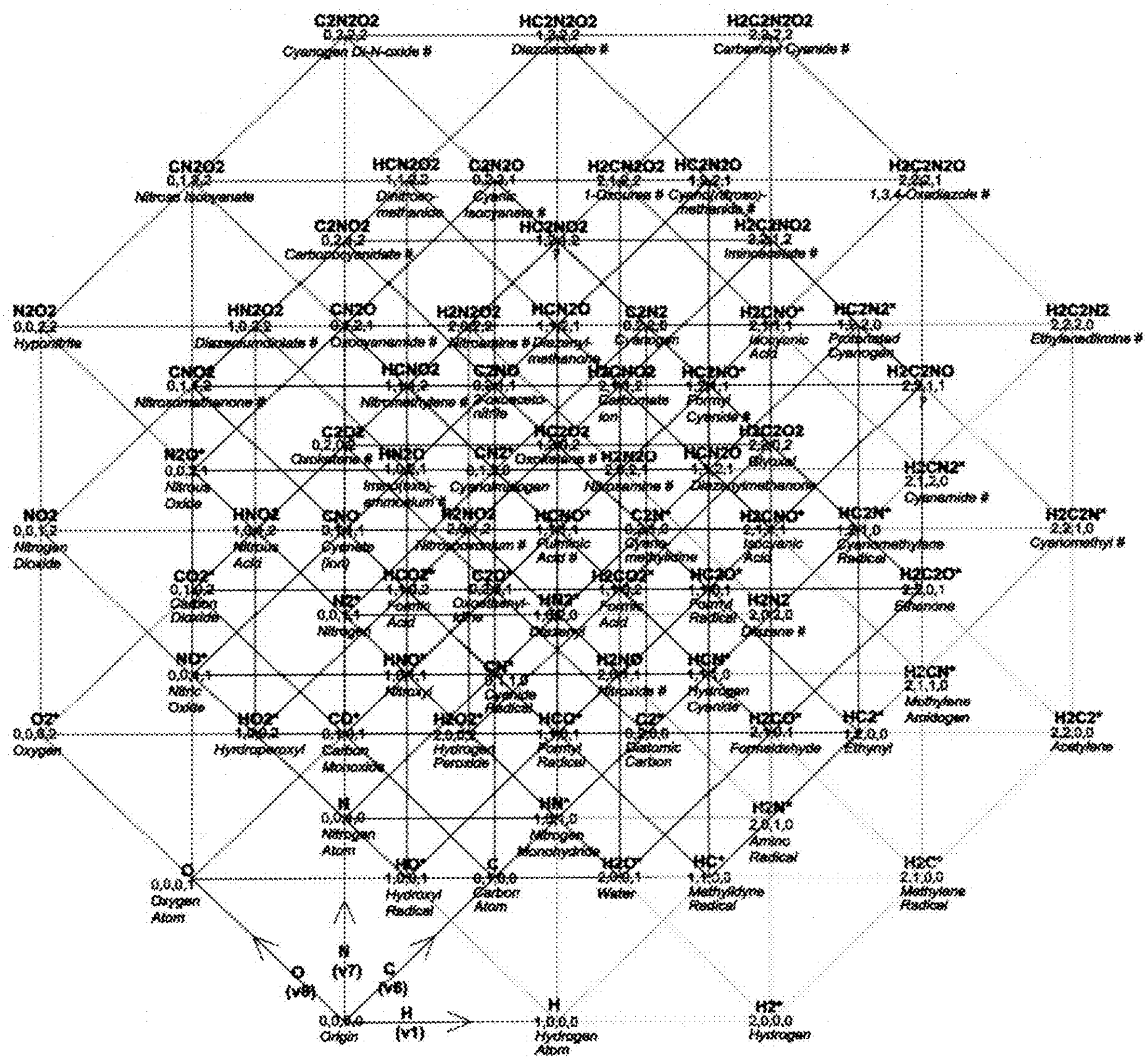
FIG. 96 shows the space of H, C, N, O with compounds having up to 2 atoms of each.

FIG. 96 shows a fuller mapping of a small portion of the early portion of (abiogenetic) space nearer the origin (0,0,0,0). The portion shown here comprises compounds with no more than 2 atoms of each of the 4 elements H, C, N, O. They are mapped exhaustively in a 2×2×2×2 4D lattice as shown. It has 81 point locations for compounds organized from all combinations of these four elements. As mentioned earlier, the isomers (compounds with isomers are marked with #) will require branching from each node to define point locations of each compound. It is surprising that all 80 combinations (excluding the origin (0,0,0,0)) are known. Some of these have been found in outer space (marked with

*) and lie closer to the origin, some others are synthetic. In mapping the extended lattice with more compounds from the same 4 elements, we may discover that nature is experimenting (potentially) with all combinations some of which are not (chemically) possible, others are not stable and disappear, and some others may appear in future or are yet to be discovered.

This invention shows the architecture of chemistry through a 4D-dimensional periodic table of elements to include 120 elements and beyond, and its extensions to a 5D-dimensional periodic table of isotopes. The system extends in a natural manner to an open-ended 118-dimensional periodic table of chemical compounds. This 118D PT is embedded in a super-4D lattice wherein the point locations of compounds are specified by the 4 quantum numbers. An integrated view enhances the appreciation of chemistry as a unified system where elements in the periodic table are the fundamental building blocks that interact to create the incredible variety of materials and forms available to us to make, shape and transform matter to create products that enhance our living.

CONCLUSION: The principal embodiment of the invention provides a new periodic table of elements, a 4D PT, in physical form in 3D space as a 3D model-kit wherein all four quantum numbers are represented as 4 sets of edges of a projected 4D-cubic lattice with coordinates (n,l,m,s), wherein each set of edges represents a different quantum number, and all edges within one set are parallel to each other. The model-kit is composed of nodes and struts which can be assembled and disassembled to learn and teach the complex and complete relationships between the elements. The periodic table can be built in two half 3D PTs and joined with set of joining elements representing one of the quantum numbers as the 4th dimension. The periodic table, graphically or spatially, displays conservation laws like complementarity and zero-cyclic sum that underpin physical and chemical properties of elements.

The invention can be presented in 2-dimensional graphic displays in physical or digital formats like paper, plane surfaces, screens, tablets, phones, and the like, for purposes of learning, teaching and practice of chemistry. An interactive digital model can be navigated digitally by the user using touchscreen or other user interface technologies which enable a navigation along the four dimensions specified by quantum numbers.

Other embodiments for continuation patents include building the 4D PT from 3D blocks or cells, or parallel inter-connected 2D panels representing groups of elements, a set of cards derived from the 6 pairs of quantum numbers and use these cards to assemble them into different 2D periodic tables. Extensions of the invention for continuation in part or division patents include a periodic table of molecules and compounds as an extended lattice using the same 4D coordinates of chemical elements. Another continuation in part includes a periodic table of isotopes as an extended 5D lattice where the number of neutrons is added as an independent axis.

The invention claimed is:

1. A 3-dimensional model kit representing a 4-dimensional periodic table of 120 chemical elements, wherein said model-kit of said periodic table is constructed as a 3-dimensional space frame, wherein said space frame comprising 120 nodes and 284 struts, each said node representing a different said chemical element, said nodes connected to other said nodes by said struts, wherein each said node having a center which corresponds to a vertex of a 4D-cubic lattice, each said strut has an axis which corresponds to an edge of said lattice, said lattice comprising 120 said vertices and 284 said edges, 238 square faces, 83 cubes and 10 hyper-cubes, wherein said centers of said nodes have 4D co-ordinates (n,l,m,s) defined by the known values of quantum numbers n, l, m and s, where n is the principal quantum number, l is the azimuth quantum number, m is the magnetic quantum number, and s is the spin quantum number, said co-ordinates uniquely determine the spatial location of each said node and its associated said chemical element, wherein said values of said quantum numbers are given by the following range of said quantum numbers in increments of 1:

said quantum number n has the range from 1 to 8, said quantum number I has the range from 0 to 3, quantum number m has the range from −3 to 3, and quantum number s has the range from −1/2 to 1/2, wherein, said coordinates are all combinations of said range of said values and limit the extent of said periodic table within said lattice, wherein said struts emanate from said nodes at 6 angles determined by 4 independent spatial directions, each said direction representing one of the 4 dimensions and corresponding to said edges of said lattice and associated with one said quantum number, said directions defining 4 sets of said struts correspondingly named n-struts, l-struts, m-struts and s-struts, wherein all said struts within one said set are parallel to each other and meet other said struts at said angles, wherein said nodes and said struts are joined to construct [the 4] electronic blocks, namely, s-block, p-block, d-block and f-block from said n-struts, said m-struts and said s-struts, wherein said blocks are joined by l-struts to assemble said periodic table, wherein said nodes are built from a hard material and connected to other said nodes by struts built from a hard material, wherein said connection between said nodes and said struts is achieved by a physical means of attachment, wherein said periodic table is used as a reference for study, teaching, research and practice of chemistry and related fields.

2. The 3-dimensional model kit representing the 4-dimensional periodic table according to claim 1, wherein said angles are selected from the group comprising a. one, two or three 90-degrees angles, b. any acute angle, c. any obtuse angle, or d. any combination of above.

3. The 3-dimensional model kit representing the 4-dimensional periodic table according to claim 1, wherein said blocks include the following:

said s-block is 2D and constructed from 16 said nodes, 14 said n-struts and 8 said s-struts, said p-block is 3D and constructed from 36 said nodes, 30 said n-struts, 24 said m-struts, 18 said s-struts, said d-block is 3D and constructed from 40 said nodes, 30 said n-struts, 32 said m-struts, 20 said s-struts, and said f-block is 3D and constructed from 36 said nodes, 28 said n-struts, 24 said m-struts, 14 said s-struts, wherein said blocks are joined with a total of 56 l-struts.

4. The 3-dimensional model kit representing the 4-dimensional periodic table according to claim 1, wherein
said nodes are colored according to said blocks, wherein each said block has a different color.

5. The 3-dimensional model kit representing the 4-dimensional periodic table according to claim 1, wherein
said elements within said blocks comprise two halves, one said half corresponding to s=1/2 elements and the other said half corresponding to s=−1/2 elements, wherein said halves are connected by said s-struts.

6. The 3-dimensional model kit representing the 4-dimensional periodic table according to claim 5, wherein
said periodic table can be constructed from two half-periodic tables, one said half comprising 60 s=1/2 elements and other said half comprising 60 s=−1/2 elements, wherein
said two half-periodic tables are 3-dimensional and corresponding elements in each said half are connected by 60 s-struts.

7. The 3-dimensional model kit representing the 4-dimensional periodic table according to claim 1, wherein
said angles between said struts are derived from said directions selected from the group comprising:
a. directions obtained by joining the center of any polyhedron to its vertices,
b. directions obtained by joining the center of any polyhedron to its edges,
c. directions obtained by joining the center of any polyhedron to its faces, or
d. directions obtained by joining the center of any polyhedron to any combination of its vertices, edges and faces.

8. The 3-dimensional model kit representing the 4-dimensional periodic table according to claim 1, wherein
said angles between said struts are selected from the group comprising the following:
a. three 90-degree angles between said directions representing said quantum numbers n, l and m,
b: three 90-degree angles between said directions representing said quantum numbers n, l and s,
c. three 90-degree angles between said directions representing said quantum numbers n, m and s, or
d. three 90-degree angles between said directions representing said quantum numbers l, m and s.

9. The 3-dimensional model kit representing the 4-dimensional periodic table according to claim 1, wherein
said directions of said struts are selected from the group comprising the following:
a. 2 directions representing said quantum numbers n and l are perpendicular to each other,
b. 2 directions representing said quantum numbers n and m are perpendicular to each other,
c. 2 directions representing said quantum numbers n and s are perpendicular to each other,
d. 2 directions representing said quantum numbers l and m are perpendicular to each other,
e. 2 directions representing said quantum numbers l and s are perpendicular to each other,
f. 2 directions representing said quantum numbers m and s are perpendicular to each other, or
g. Any combination of above.

10. The 3-dimensional model kit representing the 4-dimensional periodic table according to claim 1, wherein
the 3-dimensional shapes of said nodes of said space frame are selected from the group comprising the following:
a. a sphere,
b. a cylinder, or
c. any polyhedron.

11. The 3-dimensional model kit representing the 4-dimensional periodic table according to claim 10, wherein
said nodes are selected from the group comprising the following:
a. solid, or
b. hollow.

12. The 3-dimensional model kit representing the 4-dimensional periodic table according to claim 1, wherein
said physical means for attachment between said nodes and said struts is selected from the group comprising:
a. said nodes have protrusions extending beyond their said 3-dimensional shape to receive said struts to enable a physical attachment, or
b. said nodes have holes to receive said struts to enable a physical attachment.

13. The 3-dimensional model kit representing the 4-dimensional periodic table according to claim 12, wherein
said nodes and said struts can be assembled and disassembled.

14. The 3-dimensional model kit representing the 4-dimensional periodic table according to claim 1,
wherein
said periodic table exhibits complementarity between pairs of elements having complementary spatial locations, said locations corresponding to pairs of complementary vertices of said lattice and defined by values of said (n,l,m,s) coordinates at said locations, said complementary vertices having opposite said coordinates and lying on any of the following:
said faces,
said cubes, or
said hypercubes.

15. The 3-dimensional model kit representing the 4-dimensional periodic table according to claim 14, wherein
sums of said quantum numbers of said pairs of elements at said complementary locations within said blocks is conserved, wherein said sums equal the following:
(9,0,0,0) within said s-block,
(9,2,0,0) within said p-block,
(9,4,0,0) within said d-block, and
(9,6,0,0) within said f-block.

16. The 3-dimensional model kit representing the 4-dimensional periodic table according to claim 14, wherein
said complementarity exhibits itself in conservation of sums of atomic numbers pairs of elements at said complementary locations, wherein said sums equal the following:
57, 67, 91 and 121 within the s-block,
85, 99 and 123 within the p-block,
133 and 199 within the d-block, and
159 within the f-block.

17. The 3-dimensional model kit representing the 4-dimensional periodic table according to claim 1, wherein
said periodic table exhibits zero-cyclic sum in the known numeric values of properties of said elements in any closed cycle within said periodic table, wherein
said properties are selected from the group comprising the following:
quantum numbers,
atomic numbers,
atomic masses, and
binding energies,
wherein
said cycle connects any number of said vertices of said lattice in any sequence in a closed loop, wherein said sum is the sum of differences in values of said properties between said element at one said vertex and said element at next said vertex counted over all said elements at said vertices of said cycle, wherein a positive said difference from any starting said vertex to the next said vertex determines the direction of said cycle, wherein said positive differences are added along said direction and negative said differences are subtracted along said direction, and wherein said sum of all differences within said cycle of said numeric values of said properties of said elements equals zero.

18. The 3-dimensional model kit representing the 4-dimensional periodic table according to claim 1, wherein said periodic table can be presented on 2-dimensional surfaces selected from the group comprising:

a. physical formats, or b. digital formats, wherein said formats are selected from the group comprising:

c. passive, or d. interactive.

* * * * *